US010572679B2

(12) United States Patent
Frank et al.

(10) Patent No.: US 10,572,679 B2
(45) Date of Patent: Feb. 25, 2020

(54) PRIVACY-GUIDED DISCLOSURE OF CROWD-BASED SCORES COMPUTED BASED ON MEASUREMENTS OF AFFECTIVE RESPONSE

(71) Applicant: Affectomatics Ltd., Kiryat Tivon (IL)

(72) Inventors: Ari M Frank, Haifa (IL); Gil Thieberger, Kiryat Tivon (IL)

(73) Assignee: Affectomatics Ltd., Kiryat Tivon (IL)

( * ) Notice: Subject to any disclaimer, the term of this patent is extended or adjusted under 35 U.S.C. 154(b) by 394 days.

(21) Appl. No.: 15/010,412

(22) Filed: Jan. 29, 2016

(65) Prior Publication Data

US 2016/0224803 A1 Aug. 4, 2016

Related U.S. Application Data

(60) Provisional application No. 62/109,456, filed on Jan. 29, 2015, provisional application No. 62/185,304, filed on Jun. 26, 2015.

(51) Int. Cl.
*G06F 7/02* (2006.01)
*G06F 16/00* (2019.01)
(Continued)

(52) U.S. Cl.
CPC .... *G06F 21/6245* (2013.01); *G06F 16/24578* (2019.01); *G06F 16/00* (2019.01)

(58) Field of Classification Search
CPC .......... G06F 17/3053; G06F 16/24578; G06F 19/36; G06F 2203/011; G06F 17/30; G06F 16/00; G06F 3/015; H04N 21/44218
See application file for complete search history.

(56) References Cited

U.S. PATENT DOCUMENTS 7,698,250 B2 4/2010 Dwork et al.
8,010,663 B2 8/2011 Firminger et al.
(Continued)

FOREIGN PATENT DOCUMENTS

WO WO2014074426 5/2014

OTHER PUBLICATIONS

"Risk Assessment in Practice," Deloitte & Touche LLP, Oct. 2012, retrieved Jun. 8, 2018 from https://www2.deloitte.com/content/dam/Deloitte/global/Docunments/Governance-Risk-Connpliance/dttl-grc-riskassessmentinpractice.pdf. (Year: 2012).*
(Continued)

*Primary Examiner* — Bruce M Moser
(74) *Attorney, Agent, or Firm* — Active Knowledge Ltd.

(57) ABSTRACT

Some aspects of this disclosure include systems, methods, and/or computer programs that may be used to filter measurements of affective response collected using sensors that measure physiological signals and/or behavioral cues of users. A bias may be tendency, attitude, and/or inclination, which may influence the affective response a user has to an experience. Some embodiments described herein involve learning a model of biases of the user from measurements of affective response of the user and descriptions of events to which the measurements correspond. The model may be used to filter measurements of the user, which may be provided to other entities, if the model indicates that the measurements are likely to contain a certain level and/or type of bias (e.g., bias to certain factors). Such a filtration process can help make results generated based on the measurements more accurate and also may help protect the privacy of the user.

20 Claims, 21 Drawing Sheets

(51) Int. Cl.
*G06F 21/62* (2013.01)
*G06F 16/2457* (2019.01)

(56) References Cited

U.S. PATENT DOCUMENTS

| | | | |
|---|---|---|---|
| 8,126,220 B2 | 2/2012 | Greig | |
| 8,296,172 B2 | 10/2012 | Marci et al. | |
| 8,327,395 B2 | 12/2012 | Lee et al. | |
| 8,332,959 B2 | 12/2012 | Chen et al. | |
| 8,429,758 B2 | 4/2013 | Chen et al. | |
| 8,504,481 B2 | 8/2013 | Motahari et al. | |
| 8,676,230 B2 | 3/2014 | Alexander et al. | |
| 8,700,009 B2 | 4/2014 | Quy | |
| 8,764,652 B2 | 7/2014 | Lee et al. | |
| 8,775,186 B2 | 7/2014 | Shin et al. | |
| 8,781,991 B2 | 7/2014 | Lee | |
| 8,782,681 B2 | 7/2014 | Lee et al. | |
| 9,026,476 B2 | 5/2015 | Bist | |
| 9,165,216 B2 | 10/2015 | Angell et al. | |
| 9,196,173 B2 | 11/2015 | Bak et al. | |
| 9,842,204 B2 * | 12/2017 | Bailey | G06F 21/46 |
| 2007/0150916 A1 * | 6/2007 | Begole | H04H 60/31 |
| | | | 725/10 |
| 2008/0295126 A1 | 11/2008 | Lee et al. | |
| 2009/0131764 A1 | 5/2009 | Lee et al. | |
| 2009/0193344 A1 | 7/2009 | Smyers | |
| 2010/0004977 A1 | 1/2010 | Marci et al. | |
| 2010/0250554 A1 | 9/2010 | Shu | |
| 2010/0303211 A1 * | 12/2010 | Hartig | G06Q 20/24 |
| | | | 379/1.01 |
| 2011/0046502 A1 | 2/2011 | Pradeep et al. | |
| 2011/0106750 A1 | 5/2011 | Pradeep et al. | |
| 2012/0124122 A1 | 5/2012 | el Kaliouby et al. | |
| 2012/0203725 A1 | 8/2012 | Stoica | |
| 2012/0290266 A1 | 11/2012 | Jain et al. | |
| 2012/0316456 A1 | 12/2012 | Rahman et al. | |
| 2013/0019187 A1 | 1/2013 | Hind et al. | |
| 2014/0200463 A1 | 7/2014 | el Kaliouby et al. | |
| 2014/0250200 A1 | 9/2014 | Geurts et al. | |
| 2014/0280529 A1 | 9/2014 | Davis et al. | |
| 2014/0324749 A1 * | 10/2014 | Peters | G09B 7/04 |
| | | | 706/46 |
| 2014/0350349 A1 | 11/2014 | Geurts et al. | |
| 2014/0366049 A1 | 12/2014 | Lehtiniemi et al. | |
| 2015/0058416 A1 | 2/2015 | Felt | |
| 2015/0142553 A1 | 5/2015 | Kodra et al. | |
| 2015/0289800 A1 | 10/2015 | Pacione et al. | |
| 2015/0313530 A1 | 11/2015 | Kodra et al. | |
| 2015/0339496 A1 * | 11/2015 | El Emam | G06F 17/30876 |
| | | | 726/26 |
| 2016/0132607 A1 * | 5/2016 | Skatell | G06F 17/30867 |
| | | | 707/734 |
| 2017/0236407 A1 * | 8/2017 | Rhoads | G08C 17/02 |
| | | | 455/420 |
| 2017/0316182 A1 * | 11/2017 | Blackadar | A61B 5/6828 |

OTHER PUBLICATIONS

"Risk-Based DE-Identification of Health Data," Khaled el Emam, IEEE Security & Privacy (vol. 8, Issue: 3, May-Jun. 2010), pp. 64-67, retrieved Jun. 8, 2018 from https://ieeexplore.ieee.org/document/5470957/. (Year: 2010).*

Baig, et al. "Crowd Emotion Detection Using Dynamic Probabilistic Models", In Proceedings of 13th International Conference on Simulation of Adaptive Behavior, SAB 2014, Jul. 22-25, 2014, pp. 328-337.

Banaee, et al. "Data mining for wearable sensors in health monitoring systems: a review of recent trends and challenges." Sensors 13.12 (2013): 17472-17500.

Chakraborty, Supriyo, et al. "Balancing behavioral privacy and information utility in sensory data flows." *Pervasive and Mobile Computing* 8.3 (2012): 331-345.

Eckstein, Miguel P., et al. "Neural decoding of collective wisdom with multi-brain computing." NeuroImage 59.1 (2012): 94-108.

* cited by examiner

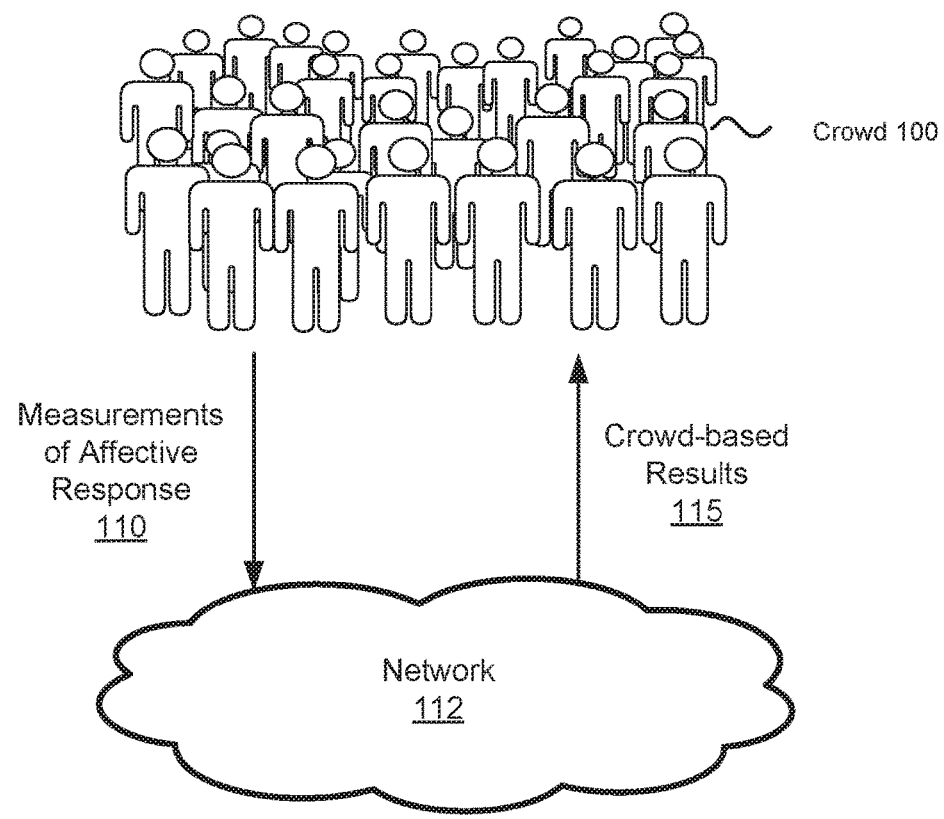
FIG. 19
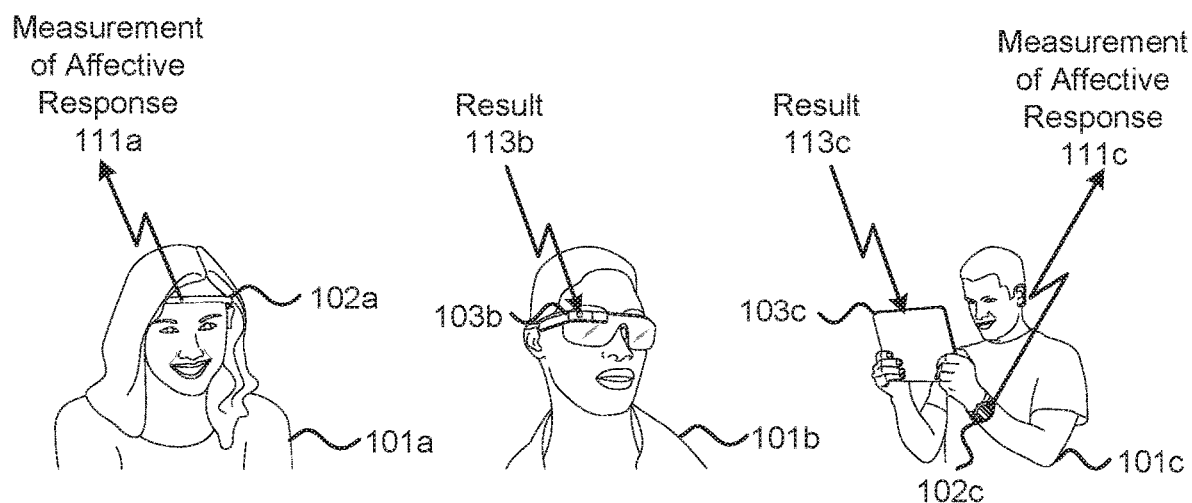
FIG. 20a  FIG. 20b  FIG. 20c

PRIVACY-GUIDED DISCLOSURE OF CROWD-BASED SCORES COMPUTED BASED ON MEASUREMENTS OF AFFECTIVE RESPONSE

BACKGROUND

The growing proliferation of wearable computing devices has brought on the age of affective computing. There is growing number of applications that utilize the wide array of sensors that are now available, in order to leverage measurements of users' affective response.

Measurements of affective response typically involve values representing physiological signals and/or behavioral cues. There are many algorithms that are capable of translating these values into emotional responses. Thus, it is possible to know how a user feels about an experience the user has based on various signals such as heart rate, respiration, galvanic skin response, and even facial images.

Since measurements of affective response can represent, often quite accurately, how users feel, these measurements may comprise in them the effects of various cognitive processes, and in particular they may reflect a wide array of biases the users have. A bias may be considered a tendency, an attitude, an inclination, and/or a world view a person may have. It is natural for a person's reaction to reflect that person's biases, therefore, it is natural to find bias in measurements of affective response. However, there are scenarios in which having bias in measurements may be problematic.

In some scenarios, measurements of affective response may be used for crowd-based applications, such as computing scores for experiences based on measurements of affective response of users. If, for example, measurements containing bias are used to compute a score for a certain experience, then in some cases, the score may reflect, at least to a certain extent, the individual tendencies and inclinations of the users of whom the measurements were taken; this may produce a skewed value for the score, rather than serve as having it be an objective metric of the quality of the experience.

Since a person's measurements reflect the person's biases, enabling other entities to acquire a person's measurements of affective response may enable the entity to learn about a person's biases. In some cases, even providing measurements that are used to compute crowd-based results, such as scores for experiences based on measurements of multiple users, may also be cause for concern. Aggregating such data and employing various "big data" analysis techniques may reveal information about users, such as some of their biases, which they might prefer to keep private.

Thus, as the use of affective computing grows, there is a need to address issues such as bias in measurements of affective response and privacy concerns, in order to improve the user experience and maintain user privacy.

SUMMARY

Some aspects of embodiments described herein involve crowd-based applications such as generation of crowd-based results computed based on measurements of the affective response of users to the experiences. Examples of crowd-based results include scores computed for the experiences and/or rankings of the experiences.

Other aspects of embodiments described herein involve learning about users from measurements of their affective response to experiences. By analyzing the relationship between measurements of affective response of users and characteristics of the events to which the measurements correspond (also referred to herein as "factors of the events"), information may be gained about biases of the users. Such information may be utilized in order to better understand the users. Additionally or alternatively, information about biases may be utilized to remove the effects of certain biases from measurements of affective response of the user (i.e., to correct the measurements with respect to some biases); the corrected measurements may be utilized in order to compute less biased crowd-based results.

Still other aspects of embodiments described herein involve identifying and/or mitigating risks to privacy that may occur due to disclosure of crowd-based results computed from measurements of affective response. Disclosure of such results, such as scores computed for experiences based on measurements of affective response of users, may provide information regarding the values of the measurements of the users and/or other information that may be considered private information of the users, such as values of biases of the users.

BRIEF DESCRIPTION OF THE DRAWINGS

The embodiments are herein described, by way of example only, with reference to the accompanying drawings. In the drawings:

FIG. 19 illustrates a system that includes sensors and user interfaces;

FIG. 20a illustrates a user and a sensor;

FIG. 20b illustrates a user and a user interface;

FIG. 20c illustrates a user, a sensor, and a user interface;

DETAILED DESCRIPTION

Figure 1:
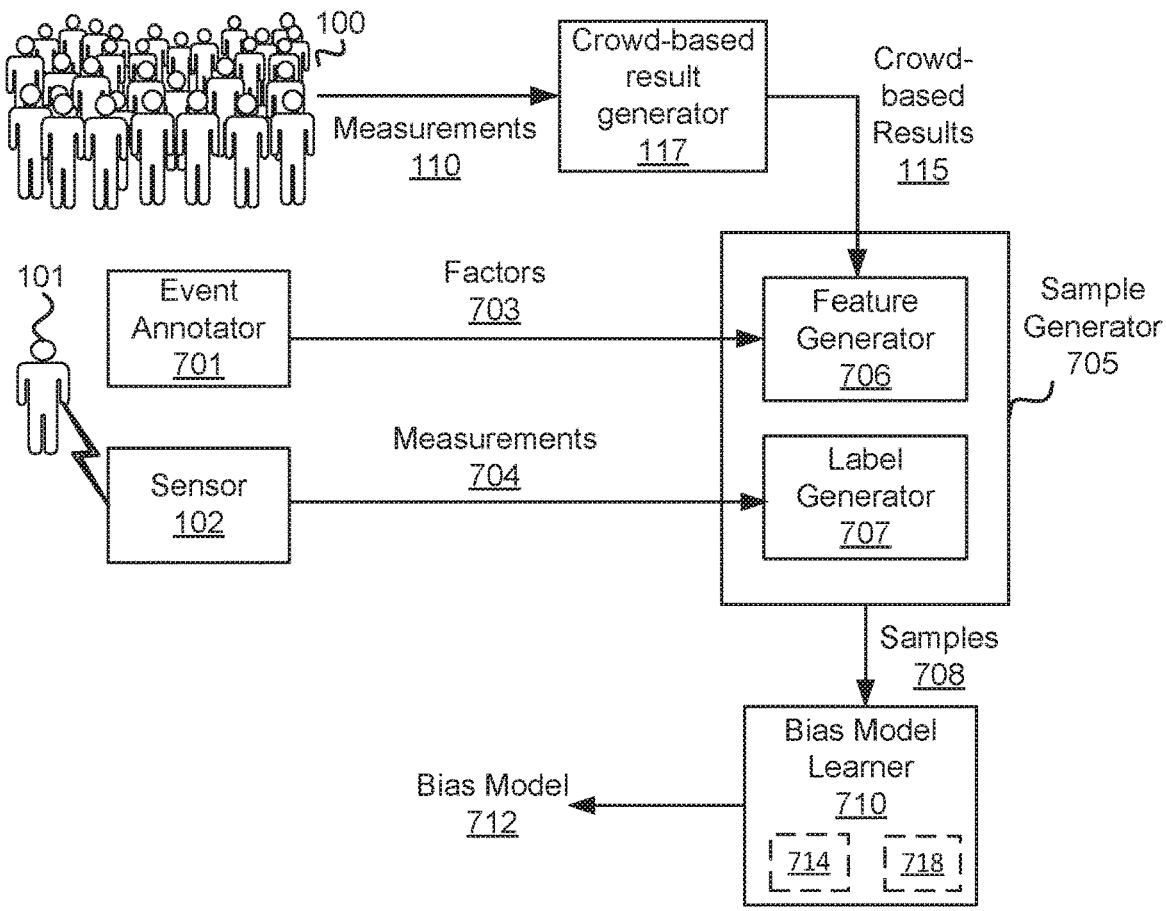
FIG. 1 illustrates a system configured to learn a bias model based on measurements of affective response.

A measurement of affective response of a user is obtained by measuring a physiological signal of the user and/or a behavioral cue of the user. A measurement of affective response may include one or more raw values and/or processed values (e.g., resulting from filtration, calibration, and/or feature extraction). Measuring affective response may be done utilizing various existing, and/or yet to be invented, measurement devices such as sensors. Optionally, any device that takes a measurement of a physiological signal of a user and/or of a behavioral cue of a user, may be considered a sensor. A sensor may be coupled to the body of a user in various ways. For example, a sensor may be a device that is implanted in the user's body, attached to the user's body, embedded in an item carried and/or worn by the user (e.g., a sensor may be embedded in a smartphone, smartwatch, and/or clothing), and/or remote from the user (e.g., a camera taking images of the user). Additional information regarding sensors may be found in this disclosure at least in section 1—Sensors.

Herein, "affect" and "affective response" refer to physiological and/or behavioral manifestation of an entity's emotional state. The manifestation of an entity's emotional state may be referred to herein as an "emotional response", and may be used interchangeably with the term "affective response". Affective response typically refers to values obtained from measurements and/or observations of an entity, while emotional states are typically predicted from models and/or reported by the entity feeling the emotions. For example, according to how terms are typically used herein, one might say that a person's emotional state may be determined based on measurements of the person's affective response. In addition, the terms "state" and "response", when used in phrases such as "emotional state" or "emotional response", may be used herein interchangeably. However, in the way the terms are typically used, the term "state" is used to designate a condition which a user is in, and the term "response" is used to describe an expression of the user due to the condition the user is in, and/or due to a change in the condition the user is in.

It is to be noted that as used herein in this disclosure, a "measurement of affective response" may comprise one or more values describing a physiological signal and/or behavioral cue of a user which were obtained utilizing a sensor. Optionally, this data may also be referred to as a "raw" measurement of affective response. Thus, for example, a measurement of affective response may be represented by any type of value returned by a sensor, such as a heart rate, a brainwave pattern, an image of a facial expression, etc.

Additionally, as used herein a "measurement of affective response" may refer to a product of processing of the one or more values describing a physiological signal and/or behavioral cue of a user (i.e., a product of the processing of the raw measurements data). The processing of the one or more values may involve one or more of the following operations: normalization, filtering, feature extraction, image processing, compression, encryption, and/or any other techniques described further in the disclosure and/or that are known in the art and may be applied to measurement data. Optionally, a measurement of affective response may be a value that describes an extent and/or quality of an affective response (e.g., a value indicating positive or negative affective response such as a level of happiness on a scale of 1 to 10, and/or any other value that may be derived from processing of the one or more values).

It is to be noted that since both raw data and processed data may be considered measurements of affective response, it is possible to derive a measurement of affective response (e.g., a result of processing raw measurement data) from another measurement of affective response (e.g., a raw value obtained from a sensor). Similarly, in some embodiments, a measurement of affective response may be derived from multiple measurements of affective response. For example, the measurement may be a result of processing of the multiple measurements.

In some embodiments, a measurement of affective response may be referred to as an "affective value" which, as used in this disclosure, is a value generated utilizing a module, function, estimator, and/or predictor based on an input comprising the one or more values describing a physiological signal and/or behavioral cue of a user, which are either in a raw or processed form, as described above. As such, in some embodiments, an affective value may be a value representing one or more measurements of affective response. Optionally, an affective value represents multiple measurements of affective response of a user taken over a period of time. An affective value may represent how the user felt while utilizing a product (e.g., based on multiple measurements taken over a period of an hour while using the product), or how the user felt during a vacation (e.g., the affective value is based on multiple measurements of affective response of the user taken over a week-long period during which the user was on vacation).

In some embodiments, measurements of affective response of a user are primarily unsolicited, i.e., the user is not explicitly requested to initiate and/or participate in the process of measuring. Thus, measurements of affective response of a user may be considered passive in the sense the user may not be notified when the measurements are taken, and/or the user may not be aware that measurements are being taken. Additional discussion regarding measurements of affective response and affective values may be found in this disclosure, at least, in section 2—Measurements of Affective Response.

Embodiments described herein may involve computing a representative value from a plurality of measurements of affective response of one or more users who had an experience; such a value may be referred to herein as "a score for an experience", an "experience score", or simply a "score" for short. Optionally, when the score is derived from measurements of multiple users, it may be considered a "crowd-based score" and/or an "aggregate score". Optionally, when a score is computed for a certain user or a certain group of users, such that different users or different groups of users may receive scores with different values, the score may be referred to as a "personalized score", "personal score", and the like. In a similar fashion, in some embodiments, experiences may be ranked and/or compared based on a plurality of measurements of affective response of users who had the experiences. A form of comparison of experiences, such as an ordering of experiences (or a partial ordering of the experiences), may be referred to herein as a "ranking" of the experiences. Optionally, when a ranking is computed for a certain user or a certain group of users, such that different users or different groups of users may receive different rankings, the ranking may be referred to as a "personalized ranking", "personal ranking", and the like.

Additionally, a score and/or ranking computed based on measurements of affective response that involve a certain type of experience may be referred to based on the type of experience. For example, a score for a location may be referred to as a "location score", a ranking of hotels may be referred to as a "hotel ranking", etc. Also, when the score, ranking, and/or function parameters that are computed based on measurements refer to a certain type of affective response, the score, ranking, and/or function parameters may be referred to according to the type of affective response. For example, a score may be referred to as a "satisfaction score" or "comfort score". In another example, a function that describes satisfaction from a vacation may be referred to as "a satisfaction function" or "satisfaction curve".

Herein, when it is stated that a score, ranking, and/or function parameters are computed based on measurements of affective response, it means that the score, ranking, and/or function parameters have their values set based on the measurements and possibly other measurements of affective response, and/or other types of data. For example, a score computed based on a measurement of affective response may also be computed based on other data that is used to set the value of the score (e.g., a manual rating, data derived from semantic analysis of a communication, and/or a demographic statistic of a user). Additionally, computing the score may be based on a value computed from a previous measurement of the user (e.g., a baseline affective response value described further below).

An experience, as used herein, involves something that happens to a user and/or that the user does, which may affect the physiological and/or emotional state of the user in a manner that may be detected by measuring the affective response of the user. Optionally, experiences may belong to different groups and/or types, such as being at a location, consuming certain content, having a social interaction (e.g., in the physical world or a virtual world), exercising, traveling a certain route, consuming a substance, and/or utilizing a product. In some embodiments, experiences may involve activity in the physical world (e.g., spending time at a hotel) and/or activity in virtual environments (e.g., spending time in a virtual world or in a virtual chat room). In some embodiments, an experience is something a user actively chooses and is aware of; for example, the user chooses to take a vacation. While in other embodiments, an experience may be something that happens to the user, of which the user may not be aware. For example, a user may consume food that unbeknownst to the user contains a certain additive; this example may correspond to an experience of consuming the additive even if the user is not aware that he/she is consuming it. A user may have the same experience multiple times during different periods. For example, the experience of being at school may happen to certain users every weekday, except for holidays. Each time a user has an experience, this may be considered an "event". Each event has a corresponding experience and a corresponding user (who had the corresponding experience).

Additionally, an event may be referred to as being an "instantiation" of an experience and the time during which an instantiation of an event takes place, may be referred to herein as the "instantiation period" of the event. That is, the instantiation period of an event is the period of time during which the user corresponding to the event had the experience corresponding to the event. Optionally, an event may have a corresponding measurement of affective response, which is a measurement of the corresponding user to having the corresponding experience (during the instantiation of the event or shortly after it).

Determining whether different events correspond to the same experience or to different experiences may depend on the embodiment that is examined. For example, in one embodiment, an event involving a user that rides a bike in the city is considered to correspond to a different experience than an event in which a user goes mountain biking. However, in another embodiment, these two events may be considered to correspond to the same experience (e.g., the experience of riding a bike). Similarly, in some embodiments, there is a reference to a type of an experience. In this case too, determining the type of an experience may depend on the embodiment. For example, in one embodiment, going to a movie and riding a bike in the park are considered to be different types of experiences (e.g., these may be considered experiences of the types "consuming content" and "exercising", respectively). However, in another embodiment both experiences may be considered to be of the type "recreational activity". Further details regarding experiences and events may be found at least in sections 3—Experiences, 4—Events, and 5—Identifying Events. An event may be characterized according to various aspects of the event called "factors".

Affective response of a user may be viewed, in various embodiments described herein, as being a product of biases of the user. A bias, as used herein, is a tendency, attitude and/or inclination, which may influence the affective response a user has to an experience. Consequently, a bias may be viewed as responsible for a certain portion of the affective response to the experience; a bias may also be viewed as a certain change to the value of a measurement of affective response of a user to the experience, which would have not occurred had the bias not existed. When considering a bias effecting affective response corresponding to an event (i.e., the affective response of the user corresponding to the event to the experience corresponding to the event), the bias may be viewed as being caused by a reaction of a user to one or more factors characterizing the event. Such factors are referred to herein as "factors of an event", "event factors", or simply "factors". Optionally, factors of an event may be determined from a description of the event (e.g., by an event annotator and/or a module that receives the description of the event). Additional details regarding factors of events are given in this disclosure at least in section 12—Factors of Events.

As typically used herein, a factor of an event corresponds to an aspect of an event. The aspect may involve the user corresponding to the event, such as a situation of the user (e.g., that the user is tired, late, or hungry). Additionally or alternatively, the aspect may involve the experience corresponding to the event (e.g., the experience is a social game, involves clowns, or it involves eating spicy food). Additionally or alternatively, the aspect may involve how the experience took place, such as a detail involving the instantiation of the event. For example, a factor may indicate that the event was thirty minutes long, that the event took place outdoors, or something more specific like that it rained lightly while the user corresponding to the event had the experience corresponding to the event, and the user did not have an umbrella.

Factors are typically objective values, often representing essentially the same thing for different users. For example, factors may be derived from analyzing descriptions of events, and as such can represent the same thing for events involving different users. For example, a factor corresponding to "an experience that takes place outdoors" will typically mean the same thing for different users and even different experiences. In another example, a factor corresponding to drinking 16 oz of a soda is typically a factual statement about what a user did.

As opposed to factors of events, which are mostly objective values, as used herein, bias represents how a user responds to a factor (i.e., bias represents the impact of the factor on affective response), and is therefore typically subjective and may vary between users. For example, a first user may like spicy food, while a second user does not. First and second events involving the first and second users may both be characterized by a factor corresponding to eating food that is spicy. However, how the users react (their individual bias) may be completely different; for the first user, the user's bias increases enjoyment from eating the spicy food, while for the second user, the user's bias decreases enjoyment from eating the spicy food.

As mentioned above, a bias may be viewed as having an impact on the value of a measurement of affective response corresponding to an event involving a user who has an experience. This may be due to an incidence in the event of a factor corresponding to the bias, which the user reacts to, and which causes the change in affective response compared to the affective response the user would have had to the experience, had there been no incidence of the factor (or were the factor less dominant in the event).

The effects of biases may be considered, in some embodiments, in the same terms as measurements of affective response (e.g., by expressing bias as the expected change to values of measured affective response). Thus, biases may be represented using units corresponding to values of physiological signals, behavioral cures, and/or emotional responses. Furthermore, biases may be expressed as one or more of the various types of affective values discussed in this disclosure. Though often herein bias is represented as a scalar value (e.g., a change to star rating or a change in happiness or satisfaction expressed on a scale from 1 to 10), similar to affective values, bias may represent a change to a multidimensional value (e.g., a vector representing change to an emotional response expressed in a multidimensional space such as the space of Valence/Arousal/Power). Additionally, herein, biases will often be referred to as being positive or negative. This typically refers to a change in affective response which is usually perceived as being better or worse from the standpoint of the user who is affected by the bias. So for example, a positive bias may lead to an increase in a star rating if measurements are expressed as star ratings for which a higher value means a better experience was had. A negative bias may correspond to a vector in a direction of sadness and/or anxiety when measurements of affective response are represented as vectors in a multi-dimensional space, in which different regions of the space correspond to different emotions the user may feel.

In some embodiments, biases may be represented by values (referred to herein as "bias values"), which quantify the influence of factors of an event on the affective response (e.g., a measurement corresponding to the event). For example, bias values may be random variables (e.g., the bias values may be represented via parameters of distributions). In another example, bias values may be scalar values or multidimensional values such as vectors. As typically used herein, a bias value quantifies the effect a certain factor of an event has on the affective response of the user. In some embodiments, the bias values may be determined from models generated using training data comprising samples describing factors of events and labels derived from measurements of affective response corresponding to the events. In some embodiments, the fact that different users may have a different reaction to individual factors of an event, and/or different combinations of factors of the event, may be represented by the users having different bias values corresponding to certain factors (or combinations thereof). A more detailed discussion of bias values is given at least in section 13—Bias Values.

In other embodiments, biases may be represented via a function (referred to herein as a "bias function"), which may optionally involve a predictor of affective response, such as Emotional Response Predictor (ERP). In this approach, the bias function receives as input feature values that represent factors of an event. Optionally, the factors may describe aspects of the user corresponding to an event, the experience corresponding to the event, and/or aspects of the instantiation of the event. Given an input comprising the factors (or based on the factors), the predictor generates a prediction of affective response for the user. In this approach, a user's biases (i.e., the user's "bias function") may come to play by the way the values of factors influence the value of the predicted affective response. Thus, the predictor may model the bias function of the user, which represents results of various thought processes the user has with respect to factors. These thought processes determine the nature of the affective response of the user. The nature of these thought processes and/or their results may be characteristic of the user's psyche, world view, moral values, past experiences, etc. Therefore, in a typical situation, the predictor described above would not necessarily produce the same results for different users (since typically different individuals have a different psyche, a different world view, etc.) That is, given first and second users, a predictor that models each user's bias function may produce a different prediction of affective response for the first user than it produces for the second user, at least in some of the cases when both users have essentially the same experience and are in essentially the same situation, such that the predictor is presented with essentially the same factors in both cases. A more detailed discussion of bias functions is given at least in section 14—Bias Functions.

When handling measurements of affective response, such as computing a score for an experience based on the measurements, in some embodiments, measurements are considered to be the product of biases. When measurements are assumed to be affected by biases, at least some of these biases may be accounted for, e.g., by using normalization and/or transformations to correct the biases. Optionally, this may produce results that are considered unbiased, at least with respect to the biases being corrected. For example, based on repeated observations, it may be determined that the affective response of a user to eating food is, on average, one point higher than the average of all users (e.g., on a scale of satisfaction from one to ten). Therefore, when computing a score representing how users felt about eating a certain meal, the value of the measurement of the user may be corrected by deducting one point from it, in order to correct the user's positive bias towards food. With such corrections, it is hoped that the resulting score will depend more on the quality of the meal, and less on the composition of users who ate the meal and their varying attitudes towards food.

Following is a description of various embodiments involving biases. Some of the embodiments described below involve systems, methods, and/or computer products in which bias of one or more users is modeled based on measurements of affective response. Some of the embodiments described below involve correction of certain bias in measurements of affective response. Addressing biases may be relevant, in some embodiments, to the generation of the various crowd-based results, such as scores for experiences, rankings of experiences, and other types of results, as discussed in section 8—Crowd-Based Applications.

FIG. 1 illustrates one embodiment of a system configured to learn a bias model based on measurements of affective response. The system includes at least the following modules: sample generator 705, and bias model learner 710. The embodiment illustrated in FIG. 1, like other systems described in this disclosure, may be realized via a computer, such as the computer 400, which includes at least a memory 402 and a processor 401. The memory 402 stores computer executable modules described below, and the processor 401 executes the computer executable modules stored in the memory 402. It is to be noted that the experiences to which the embodiment illustrated in FIG. 1 relates, as well as other embodiments involving experiences in this disclosure, may be any experiences mentioned in this disclosure, or subset of experiences described in this disclosure, (e.g., one or more of the experiences mentioned in section 3—Experiences).

The sample generator 705 is configured to receive input comprising factors 703 and measurements 704, and to generate, based on the input, samples 708. The factors 703 are factors of events; each event involves a user corresponding to the event that has an experience corresponding to the event. The measurements 704, are measurements of affective response corresponding to the events; a measurement of affective response corresponding to the event is a measurement of affective response of the user corresponding to the event, taken with a sensor coupled to the user, while the user has the experience (or shortly thereafter). As such, a measurement may be considered a measurement of affective response of the user (corresponding to the event) to the experience (corresponding to the event). Optionally, a measurement of affective response of a user to an experience is based on at least one of the following values: (i) a value acquired by measuring the user, with the sensor, while the user has the experience, and (ii) a value acquired by measuring the user, with the sensor, at most one hour after the user had the experience. A measurement of affective response of a user to an experience may also be referred to herein as a "measurement of a user who had the experience".

The measurements 704 of affective response are taken with sensors, such as sensor 102, which is coupled to the user 101. A measurement of affective response of a user is indicative of at least one of the following values: a value of a physiological signal of the user, and a value of a behavioral cue of the user. Embodiments described herein may involve various types of sensors, which may be used to collect the measurements 704 and/or other measurements of affective response mentioned in this disclosure. Additional details regarding sensors may be found at least in section 1—Sensors. Additional information regarding how measurements 704, and/or other measurements mentioned in this disclosure, may be collected and/or processed may be found at least in section 2—Measurements of Affective Response. It is to be noted that, while not illustrated in FIG. 1, the measurements 704, and/or other measurements of affective response mentioned in this disclosure, may be provided to the sample generator 705 via another aggregating module, such as collection module 120. Additional information regarding how the collection module 120 may collect, process, and/or forward measurements is given at least in section 9—Collecting Measurements. Optionally, the collection module 120 may be a component of the sample generator 705. It is to be noted that some embodiments of the system illustrated in FIG. 1 may also include one or more sensors that are used to obtain the measurements 704 of affective response, such as one or more units of the sensor 102.

In some embodiments, identifying the events, such as the events to which the factors 703 and/or the measurements 704 correspond, as well as other events mentioned in this disclosure, is done, at least in part, by event annotator 701. Optionally, the event annotator 701 generates descriptions of the events, from which the factors of the events may be determined. Optionally, the event annotator 701 may also select the factors 703 and/or set their values (e.g., assign weights to the factors 703).

Determining factors of events and/or weights of the factors of the events may involve utilization of various sources of information (e.g., cameras and other sensors, communications of a user, and/or content consumed by a user), and involve various forms of analyses (e.g., image recognition and/or semantic analysis). Optionally, each of the factors in a description of an event is indicative of at least one of the following: the user corresponding to the event, the experience corresponding to the event, and the instantiation of the event. Optionally, a description of an event may be indicative of weights of the factors, and a weight of a factor, indicated in a description of an event, is indicative of how relevant the factor is to the event.

Additional information regarding identification of events and/or factors of the events may be found in this disclosure at least in section 5—Identifying Events and section 12—Factors of Events. In some embodiments, the event annotator 701 and/or certain modules utilized by the event annotator 701 may be part of a software agent operating on behalf of the user 101, such as software agent 108.

Each of the samples 708 generated by the sample generator 705 corresponds to an event, and comprises one or more feature values determined based on a description of the event, and a label determined based on the measurement of affective response.

The term "feature values" is typically used herein to represent data that may be provided to a machine learning-based predictor. Thus, a description of an event, which is indicative of the factors 703, may be converted to feature values in order to be used to train a model of biases and/or to predict affective response corresponding to an event (e.g., by an ERP, as described in section 6—Predictors and Emotional State Estimators). Typically, but necessarily, feature values may be data that can be represented as a vector of numerical values (e.g., integer or real values), with each position in the vector corresponding to a certain feature. However, in some embodiments, feature values may include other types of data, such as text, images, and/or other digitally stored information.

In some embodiments, feature values of a sample are generated by feature generator 706, which may be a module that is comprised in the sample generator 705 and/or a module utilized by the sample generator 705. In one example, the feature generator 706 converts a description of an event into one or more values (feature values). Optionally, the feature values generated from the description of the event correspond to the factors of the event (i.e., factors characterizing the event). Optionally, each of the factors characterizing an event corresponds to at least one of the following: the user corresponding to the event, the experience corresponding to the event, and the instantiation of the event. For example, the feature values may have the weights of the factors themselves and/or may be computed based on the weights of the factors. Additional discussion regarding factors of events may be found in this disclosure at least in section 12—Factors of Events.

In some embodiments, labels for samples are values indicative of emotional response corresponding to events to which the samples correspond. For example, a label of a sample corresponding to a certain event is a value indicative of the emotional response of the user corresponding to the certain event, to having the experience corresponding to the certain event. Typically, the emotional response corresponding to an event is determined based on a measurement of affective response corresponding to the event, which is a measurement of the user corresponding to the event, taken while the user has the experience corresponding to the event, or shortly after (as discussed in further detail in section 2—Measurements of Affective Response).

Labels of the samples 708 may be considered affective values. Optionally, the labels are generated by label generator 707, which receives the measurements 704 and converts them to affective values. Optionally, to make this conversion, the label generator 707 utilizes an Emotional State Estimator (ESE), which is discussed in further detail in section 6—Predictors and Emotional State Estimators.

In one example, a label of a sample corresponding to an event is indicative of a level of at least one of the following emotions: happiness, content, calmness, attentiveness, affection, tenderness, excitement, pain, anxiety, annoyance, stress, aggression, fear, sadness, drowsiness, apathy, and anger. In another example, a label of a sample corresponding to an event may be a numerical value indicating how positive or negative was the affective response to the event.

Figure 2:
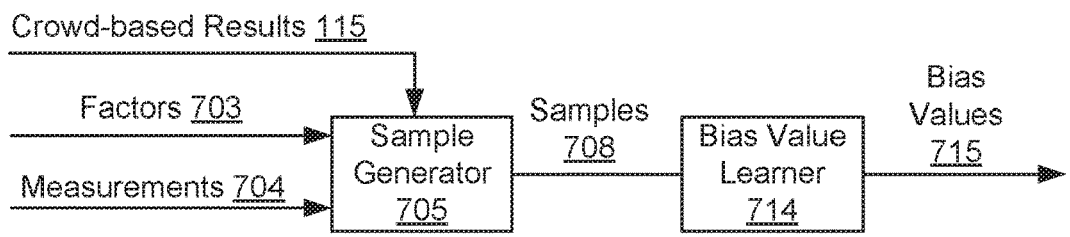
FIG. 2 illustrates a system that utilizes a bias value learner to learn bias values.
Figure 3:
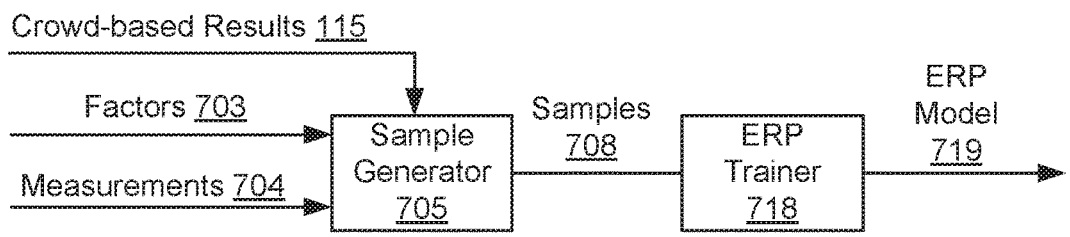
FIG. 3 illustrates a system that utilizes an Emotional Response Predictor trainer (ERP trainer) to learn an ERP model.

The bias model learner 710 is configured to utilize the samples 708 to generate bias model 712. Depending on the type of approach to modeling biases that is utilized, the bias model learner 710 may utilize the samples 708 in different ways, and/or the bias model 712 may comprise different values. One approach that may be used, which is illustrated in FIG. 2, involves utilizing bias value learner 714 to learn bias values 715 from the samples 708. Another approach that may be used, which is illustrated in FIG. 3, involves utilizing Emotional Response Predictor trainer (ERP trainer 718) to learn ERP model 719 from the samples 708. Following is a more detailed description of these two approaches.

It is to be noted that some embodiments of the system illustrated in FIG. 2 and/or FIG. 3 may include one or more sensors that are used to obtain the measurements 704 of affective response, such as one or more units of the sensor 102.

In some embodiments, the bias model learner 710 utilizes the bias value learner 714 to train the bias model 712, which in these embodiments, includes the bias values 715. Optionally, the bias value learner 714 is configured to utilize the samples 708 to learn the bias values 715. Optionally, each bias value corresponds to a factor that characterizes at least one of the events used to generate the samples 708 (i.e., each bias value corresponds to at least one of the factors 703). Optionally, a bias value that corresponds to a factor is indicative of a magnitude of an expected impact of the factor on a measurement corresponding to an event characterized by the factor. Optionally, a bias value may correspond to a numerical value (indicating the expected impact). Additionally or alternatively, the bias value may correspond to a distribution of values, indicating a distribution of impacts of a factor corresponding to the bias value.

Bias values are discussed in much more detail in section 13—Bias Values. That section also discusses the various ways in which bias values may be determined based on samples, e.g., by the bias value learner 714. In particular, the bias value learner may utilize various optimization approaches, discussed in the aforementioned section, in order to find an assignment of the bias values 715 which minimizes some objective function related to the samples, such as described in Eq. (2), Eq. (3), Eq. (5), and/or some general function optimization such as $f(\vec{B},V)$, described in the aforementioned section.

In one embodiment, in which at least some of the bias values are affective values, the bias value learner 714 is configured to utilize a procedure that solves an optimization problem used to find an assignment to the bias values 715 that is a local minimum of an error function (such as the functions mentioned in the equations listed above). Optionally, the value of the error function is proportional to differences between the labels of the samples 708 and estimates of the labels, which are determined utilizing the assignment to the bias values. For example, an estimate of a label of a sample corresponding to an event may be a function of the factors characterizing the event and the assignment of the bias values, such as the linear function described in Eq. (1).

In another embodiment in which at least some of the bias values correspond to distributions of affective values, the bias value learner 714 is configured to utilize a procedure that finds a maximum likelihood estimate of the bias values 715 with respect to the samples 708. Optionally, finding the maximum likelihood estimate is done by maximizing the likelihood expressed in Eq. (5) in section 13—Bias Values.

Depending on the composition of events used to generate the samples 708, the bias values 715 may include various types of values. In one embodiment, the events used to generate the samples 708 are primarily events involving a certain user; consequently, the bias values 715 may be considered bias values of the certain user. In some embodiments, one or more of the samples 708 include a certain factor that corresponds to events of different users; consequently, a bias value corresponding to the certain factor may be considered to represent bias of multiple users. For example, the same factor may represent the outside temperature, in which users have an experience; thus, a corresponding bias value learned based on samples of multiple users may indicate how the temperature affects the multiple users (on average). In some embodiments, the samples 708 may include samples involving different users, but each user may have a set of corresponding factors. Thus, the bias values 715 may be considered a matrix, in which each row includes bias values of a user to one of n possible factors, such that position i,j in the matrix includes the bias value of user i corresponding to the $j^{th}$ factor.

In some embodiments, the bias model learner 710 utilizes the ERP trainer 718, which is configured to train, utilizing the samples 708, the bias model 712, which in these embodiments, includes the ERP model 719 for an ERP. Optionally, the ERP trainer 718 utilizes a machine learning-based training algorithm to train the ERP model 719 on training data comprising the samples 708. Utilizing an ERP may enable, in some embodiments, to model bias as a (possibly non-linear) function of factors. This approach to modeling bias is described in further detail in section 14—Bias Functions.

In one embodiment, the ERP is configured to receive feature values of a sample corresponding to an event, and to utilize the ERP model 719 to make a prediction of a label of the sample based on the feature values. Optionally, the label predicted by the ERP, based on the model and feature values of a sample corresponding to an event, represents an expected affective response of the user. Optionally, the ERP is configured to predict a label for a sample by utilizing the ERP model 719 to compute a non-linear function of feature values of the sample. ERPs and the various training procedures that may be used to learn their models are discussed in more detail in section 6—Predictors and Emotional State Estimators.

In some embodiments, an ERP that utilizes the ERP model does not predict the same values for all samples given to it as query (i.e., query samples). In particular, there are first and second query samples, which have feature values that are not identical, and for which the ERP predicts different labels. For example, if the first and second samples are represented as vectors, there is at least one position in the vectors, for which the value at that position in the vector of the first sample is different from the value at that position in the vector of the second sample. In one example, the first sample corresponds to a first event, involving a first experience, which is different from a second experience, involved in a second event, to which the second sample corresponds. In another example, the first sample corresponds to a first event, involving a first user, which is different from a second user, involved in a second event, to which the second sample corresponds. Optionally, prediction of different labels by the ERP means, e.g., in the two examples given above, that an affective response corresponding to the event to which the first sample corresponds, as predicted by the ERP, is not the same as an affective response corresponding to the event to which the second sample corresponds.

The composition of the samples 708, used to train the bias model 712, may have significant bearing, in some embodiments, on the type of modeling of biases that may be achieved with the bias model 712. Following, are some examples of how the composition of the samples 708 may vary between different embodiments of the systems modeled according to FIG. 1.

In some embodiments, the factors 703 and the measurements 704 correspond to events that primarily involve a certain experience, or a certain type of experience. Consequently, the bias model 712 learned from the samples 708 describes biases corresponding to factors that are related to the certain experience, or certain type of experiences. In other embodiments, the factors 703 and the measurements 704 correspond to events involving various experiences, and/or experiences of various types, which may enable the bias model 712 to reflect biases to a wide range of factors.

Figure 4:
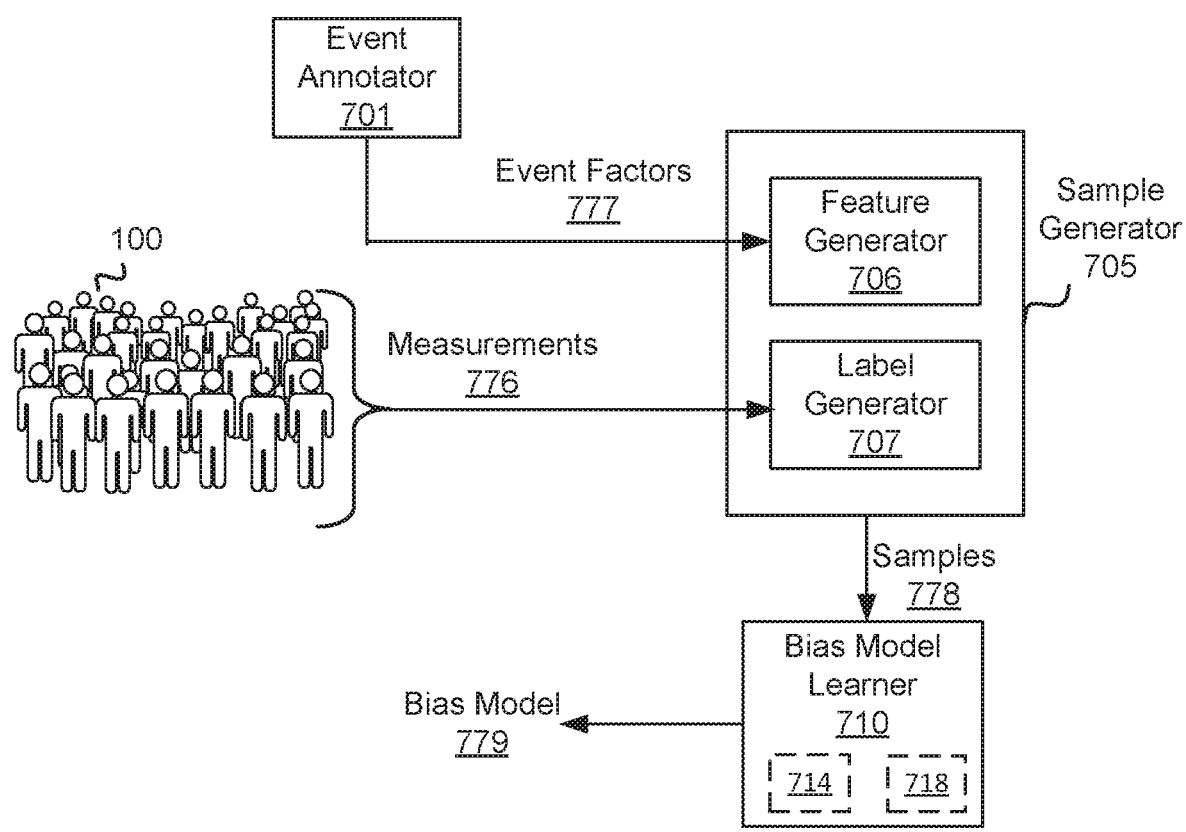
FIG. 4 illustrates a system configured to learn a bias model involving biases of multiple users.

In some embodiments, the events to which the factors 703 and the measurements 704 correspond are related to a certain user (e.g., user 101). Thus, the bias model 712 learned in these embodiments may be considered a model of biases of the certain user. In other embodiments, the events to which the samples 708 correspond involve multiple users. This is illustrated in FIG. 4, in which the sample generator 705 receives measurements 776 of the users belonging to the crowd 100, and factors 777 corresponding to events involving those multiple users.

The samples 778, which are generated based on the measurements 776 and the factors 777, are utilized by the bias model learner 710 to generate bias model 779, which may be considered to model biases of multiple users. This figure is intended to illustrate a scenario in which measurements of multiple users are utilized to train a bias model, however, this does not limit other embodiments described in this disclosure to involve data from a single user. Moreover, in many of the embodiments described herein the measurements received by the sample generator 705 may be of various users (e.g., the users 100), and similarly, the factors 703 may also be factors of events involving multiple users. Thus, in some embodiments, the bias model 712 learned from such data may be considered to model biases of different users, while in other embodiments, the bias model 712 may be considered to model biases of a certain user.

It is to be noted that in different embodiments, different numbers of users may belong to the crowd 100. For example, in some embodiments, the number of users is relatively small, such as at least three, at least five, or at least ten users. But in other embodiments, the number of users can be much larger, e.g., at least one hundred, at least one thousand, or one hundred thousand users, or even more. Similarly, the number of different experiences involved in events to which measurements and factors used to model biases correspond, can be quite different, in embodiments described herein. For example, in some embodiments, the data may include events involving a single experience. In other embodiments, the data may include many events, each involving one of the many experiences described in section 3—Experiences.

In some embodiments, the same factor may be present in descriptions of different events, possibly involving different users and/or different experiences. In one example, a description of a first event involving a first user having a first experience is indicative of a certain factor, and a description of a second event involving a second user having a second experience is indicative of the certain factor. Optionally, the first user and the second user are the same user; alternatively, they may be different users. Optionally, the first experience is different from the second experience, and the instantiation period of the first event does not overlap with the instantiation period of the second event.

The descriptions of the events to which the factors 703 and the measurements 704 correspond, are not necessarily the same, even when involving the same experience. In some embodiments, a description of an event may include a factor corresponding to the user corresponding to the event. Thus, different events, even involving the same exact experience (e.g., viewing of the same segment of digital content), may have different descriptions, and different samples generated from those descriptions, because of different characteristics of the users corresponding to the events.

In one example, the samples 708 comprise a first sample corresponding to a first event in which a first user had a certain experience, and a second sample corresponding to a second event in which a second user had the certain experience. In this example, the feature values of the first sample are not identical to the feature values of the second sample. Optionally, this is because at least some of the factors describing the first user, in a description of the first event (from which the first sample is generated), are not the same as the factors describing the second user in a description of the second event (from which the second sample is generated).

In another example, the samples 708 comprise a first sample corresponding to a first event in which a certain user had a certain experience, and a second sample corresponding to a second event in which the certain user had the certain experience. In this example, the feature values of the first sample are not identical to the feature values of the second sample. Optionally, this is because at least some of the factors describing the instantiation of the first event, in a description of the first event (from which the first sample is generated), are not the same as the factors describing the instantiation of the second event in a description of the second event (from which the second sample is generated). For example, factors describing the length of the certain experience, the environmental conditions, and/or the situation of the certain user may be different for the different instantiations.

The fact that descriptions of events, and the samples generated from them, are not the same for all users and/or experiences, may lead to it that different factors are indicated, in the descriptions of the events, as characterizing the events. Optionally, this may also cause different features in the samples 708 to have different feature values.

In one example, the events to which the factors 703 and the measurements 704 correspond, comprise first, second, third, and fourth events, and the factors 703 comprise first and second factors. In this example, a first description of the first event indicates that the first factor characterizes the first event, and the first description does not indicate that second factor characterizes the first event. Additionally, a second description of the second event indicates that the second factor characterizes the second event, and the second description does not indicate that first factor characterizes the second event. Furthermore, a third description of the third event indicates that the first and second factors characterize the third event. And in addition, a fourth description of the fourth event does not indicate that the first factor characterizes the fourth event nor does the fourth description indicate that the second factor characterizes the fourth event.

In some embodiments, a factor describing a user corresponding to an event may come from a profile of the user, such as one of the profiles 128, utilized for personalization of crowd-based results. Optionally, the profile of the user comprises information that describes one or more of the following: an indication of an experience the user had, a demographic characteristic of the user, a genetic characteristic of the user, a static attribute describing the body of the user, a medical condition of the user, an indication of a content item consumed by the user, and a feature value derived from semantic analysis of a communication of the user.

In some embodiments, a description of and event may be indicative of at least one factor that characterizes the user corresponding to the event, which is obtained from a model of the user. Optionally, the model comprises bias values of the user, such as the bias values 715. Thus, in some embodiments, factors of an event (and/or the weights of the factors), may obtain their values from the bias model 712, and represent the results of a previous analysis of biases of the user corresponding to the event and/or of other users.

In some embodiments, the sample generator 705 (and/or the feature generator 706) is configured to generate one or more feature values of a sample corresponding to an event based on a crowd-based result relevant to the event. In these embodiments, in addition to the factors 703, and the measurements 704, the sample generator 705 may receive crowd-based results 115, which are relevant to the events to which the factors 703 and the measurements 704 correspond. Optionally, the crowd-based result relevant to an event is derived from at least one of the following: a score computed for the experience corresponding to the event based on the measurements of affective response of the users, and a rank of the experience corresponding to the event determined from a ranking of experiences generated based on the measurements of affective response of the users. Additional discussion of crowd-based results may be found at least in section 8—Crowd-Based Applications and section 10—Scoring.

In one example, a crowd-based result relevant to an event is indicative of the value of a score computed for the experience corresponding to the event. For example, the crowd-based result may be the value of the score itself, or an indication derived from the score, such as an indication of whether the score reaches some threshold or whether the score falls within a certain percentile of scores. In another example, a crowd-based result relevant to an event may be a ranking given to the experience corresponding to the event, and/or a value derived from the ranking, such as an indication of whether the rank of the experience reaches a certain threshold.

In one embodiment, measurements of affective response used to compute a crowd-based result that is relevant to an event are taken prior to the instantiation of the event. In another embodiment, the crowd-based result that is relevant to the event is computed based on at least some of the measurements 704. Optionally, a measurement corresponding to the event is utilized to compute the crowd-based result that is relevant to the event. Optionally, the crowd-based result is then used to determine at least one of the factors that characterize the event. For example, the crowd-based result may be indicative of the quality of the experience corresponding to the event, as determined based on measurements of users who had the experience in temporal proximity to the user corresponding to the event (e.g., within a few minutes, a few hours, or a few days from when the user had the experience). Optionally, the crowd-based result is computed based on at least some measurements taken before the instantiation of the event, and at least some measurements taken after the instantiation of the event.

Following are descriptions of steps that may be performed in various methods involving learning bias models. The steps described below may, in some embodiments, be part of the steps performed by an embodiment of a system described above, such as a system modeled according to FIG. 1, FIG. 2, FIG. 3, and/or FIG. 4. In some embodiments, instructions for implementing one or more of the methods described below may be stored on a computer-readable medium, which may optionally be a non-transitory computer-readable medium. In response to execution by a system including a processor and memory, the instructions cause the system to perform operations that are part of the method. Optionally, each of the methods described below may be executed by a computer system comprising a processor and memory, such as the computer illustrated in FIG. 27.

In one embodiment, a method for learning bias values of users includes at least the following steps:

In Step 1, receiving measurements corresponding to events. Optionally, each event involves a user corresponding to the event that has an experience corresponding to the event, and a measurement corresponding to the event is a measurement of affective response of the user, taken with a sensor coupled to the user, while the user has the experience.

In Step 2, receiving, for each event, a description of the event, which is indicative of factors characterizing the event. Optionally, each of the factors characterizing the event corresponds to at least one of the following: the user corresponding to the event, the experience corresponding to the event, and the instantiation of the event.

In Step 3, generating samples corresponding to the events. Optionally, each sample corresponding to an event comprises: feature values determined based on the description of the event, and a label determined based on a measurement corresponding to the event. In one example, the samples comprise a first sample corresponding to a first event in which a first user had a certain experience, and a second sample corresponding to a second event in which a second user had the certain experience. In addition, the feature values of the first sample are not identical to the feature values of the second sample.

And in Step 4, learning the bias values utilizing the samples generated in Step 3. Each bias value corresponds to a factor that characterizes at least one of the events, and is indicative of a magnitude of an expected impact of the factor on a measurement corresponding to an event characterized by the factor.

Learning the bias values in Step 4 may be done in various ways in different embodiments. In one embodiment, learning the bias values may involve solving an optimization problem used to find an assignment to the bias values that is a local minimum of an error function. The value of the error function is proportional to differences between the labels of the samples and estimates of the labels. Optionally, an estimate of a label of a sample corresponding to an event is a function of the factors characterizing the event and the assignment of the bias values. In another embodiment, learning the bias values involves finding a maximum likelihood estimate of the bias values with respect to the samples.

In one embodiment, a method for learning a bias function from events involving multiple users includes at least the following steps:

In Step 1, receiving measurements corresponding to events. Optionally, each event involves a user corresponding to the event that has an experience corresponding to the event, and a measurement corresponding to the event is a measurement of affective response of the user, taken with a sensor coupled to the user, while the user has the experience.

In Step 2, receiving, for each event, a description of the event, which is indicative of factors characterizing the event. Optionally, each of the factors characterizing the event corresponds to at least one of the following: the user corresponding to the event, the experience corresponding to the event, and the instantiation of the event.

In Step 3, generating samples corresponding to the events. Optionally, each sample corresponding to an event comprises: feature values determined based on the description of the event, and a label determined based on a measurement corresponding to the event. The samples generated in this step comprise a first sample corresponding to a first event involving a first user having a certain experience and a second sample corresponding to a second event involving a second user having the certain experience. Additionally, the first and second samples do not comprise the same feature values.

And in Step 4, training, utilizing the samples generated in Step 3, a model for an Emotional Response Predictor (ERP). The ERP is configured to receive feature values of a sample corresponding to an event, and to utilize the model to make a prediction of a label of the sample based on the feature values. Optionally, training the model is done utilizing a machine learning-based training algorithm to train the model on training data comprising the samples.

In one embodiment, a method for learning a bias function of a user utilizing crowd-based results includes at least the following steps:

In Step 1, receiving measurements corresponding to events. Optionally, each event involves the user having an experience corresponding to the event, and a measurement corresponding to the event is a measurement of affective response of the user, taken with a sensor coupled to the user, while the user has the experience.

In Step 2, receiving for each event: a description of the event, which is indicative of factors characterizing the event, and a crowd-based result relevant to the event, which is determined based on measurements of affective response of users who had the experience corresponding to the event.

In Step 3, generating samples corresponding to the events; each sample corresponding to an event comprises: at least one feature value determined based on the factors characterizing the event, at least one feature value determined based on the crowd-based result relevant to the event, and a label determined based on a measurement corresponding to the event.

And in Step 4, training, utilizing the samples, a model for an Emotional Response Predictor (ERP). The ERP is configured to receive feature values of a sample corresponding to an event, and to utilize the model to generate a label for the sample based on the feature values; the label for the sample is indicative of an expected affective response of the user to the event. Optionally, the training in this step involves utilizing a machine learning-based training algorithm to train the model on training data comprising the samples.

In one embodiment, the method described above may optionally include a step involving generating the crowd-based result in the description of the event from September 2. In one example, generating the crowd-based result may involve computing a score for the experience corresponding to the event based on the measurements of affective response of the users who had the experience corresponding to the event. In another example, generating the crowd-based result may involve generating a ranking of experiences based on measurements of affective response comprising the measurements of affective response of the users who had the experience corresponding to the event.

Some of the methods described in this embodiment, such as the methods described above, which involve learning a bias model, e.g., a model comprising bias values and/or a model for an ERP, may include additional optional steps, described below.

In one embodiment, a method for learning a bias model may optionally include a step involving taking measurements of affective response corresponding to events with a sensor. Optionally, each measurement corresponding to an event is indicative of at least one of the following values: a value of a physiological signal of the user corresponding to the event, and a value of a behavioral cue of the user corresponding to the event.

The method for learning a bias model may optionally include a step involving generating a description of an event based on data comprising on or more of the following data: an image taken from a device of the user corresponding to the event, a communication of the user corresponding to the event, and analysis of content consumed by the user corresponding to the event.

In one embodiment, a method for learning a bias model may optionally include a step involving utilizing a profile of a user corresponding to an event to generate the description of the event. Optionally, the description of the event is indicative of at least one factor that characterizes the user corresponding to the event, which is described in the profile of the user. Optionally, the profile of the user comprises information that describes one or more of the following: an indication of an experience the user had, a demographic characteristic of the user, a genetic characteristic of the user, a static attribute describing the body of the user, a medical condition of the user, an indication of a content item consumed by the user, and a feature value derived from semantic analysis of a communication of the user.

As described above, in some embodiments, a measurement of affective response of a user may be considered to reflect various biases the user may have. Such biases may be manifested as a reaction to a corresponding factor, which causes a change (or is expected to cause a change) to the value of the measurement of affective response. In some embodiments, it may be beneficial to remove effects of certain biases from measurements before utilizing the measurements for various purposes, such as training models or computing scores, or other crowd-based results, based on the measurements. Removing the effects of certain biases may also be referred to herein as "correcting" the measurements with respect to the certain biases or "normalizing" the measurements with respect to the certain biases.

It is to be noted that the use of terms such as "correcting" or "corrected" (e.g., "correcting a bias" or a "corrected measurement") is not intended to imply that correction completely removes the effects of the bias from a measurement. Rather, correcting a bias is an attempt, which may or may not be successful, at mitigating the effects of a bias. Thus, a corrected measurement (with respect to a bias), is a measurement that may be somewhat improved, in the sense that the effects of a bias on its value might have been mitigated. Correcting for bias is not guaranteed to remove all effects of the bias and/or to do so in an exact way. Additionally, correcting for a bias (resulting in a corrected measurement), does not mean that other biases (for which the correction was not made) are removed, nor does it mean that other forms of noise and/or error in the measurement are mitigated.

In some embodiments, correcting at least some biases may be warranted since there are biases that may pertain to conditions and/or preferences that are specific to the instantiation of the event at hand, and/or specific to the user corresponding to the event, but are not true in general for most events corresponding to the same experience or for most users. By not correcting such biases, conclusions drawn from measurements of affective response, such as scores for experiences computed based on the measurements or models trained utilizing the measurements, may be incorrect. Following are a few examples of scenarios where correcting measurements with respect to certain biases may be beneficial.

Figure 5:
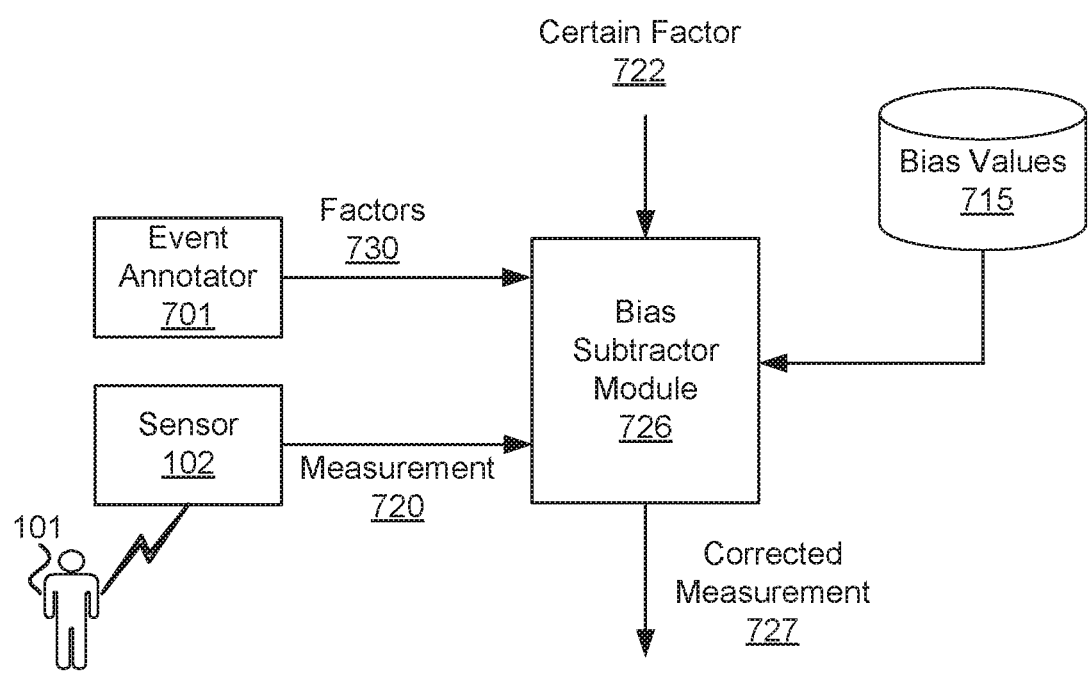
FIG. 5 illustrates a system configured to correct a bias in a measurement of affective response of a user using a bias value.
Figure 6:
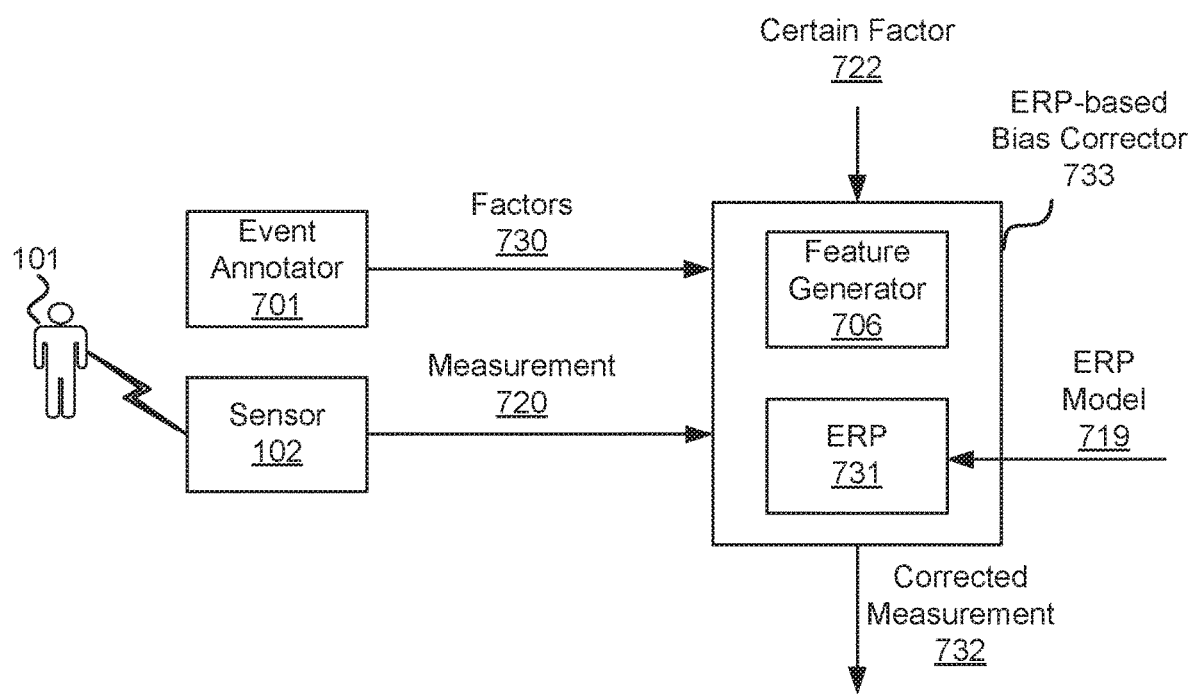
FIG. 6 illustrates a system configured to correct a bias in a measurement of affective response of a user using an ERP.

Some of the embodiments described below involve systems, methods, and/or computer products in which a bias is corrected in a measurement of affective response. The embodiments described below illustrate different approaches to correction of bias, which include both correction using a bias value (as illustrated in FIG. 5) and correction using an ERP (as illustrated in FIG. 6). Both approaches involve receiving a measurement of affective response of a user (e.g., measurement 720 of the user 101 taken with the sensor 102), and correcting the value of that measurement in a certain way.

FIG. 5 illustrates one embodiment of a system configured to correct a bias in a measurement of affective response of a user (e.g., the user 101). The system includes at least the sensor 102 and bias subtractor module 726. The system may optionally include other modules such as the event annotator 701.

The sensor 102 is coupled to the user 101 and is used to take the measurement 720 of affective response of the user 101. Optionally, the measurement 720 is indicative of at least one of the following: a physiological signal of the user 101, and a behavioral cue of the user 101. In one example, the sensor 102 may be embedded in a device of the user 101 (e.g., a wearable computing device, a smartphone, etc.) In another example, the sensor 102 may be implanted in the body of the user 101, e.g., to measure a physiological signal and/or a biochemical signal. In yet another example, the sensor 102 may be remote of the user 101, e.g., the sensor 102 may be a camera that captures images of the user 101, in order to determine facial expressions and/or posture. Additional information regarding sensors and how measurements of affective response may be taken may be found at least in section 1—Sensors and section 2—Measurements of Affective Response.

It is to be noted that some portions of this disclosure discuss measurements 110 of affective response (the reference numeral 110 is used in order to denote general measurements of affective response); the measurement 720 may be considered, in some embodiments, to be one of those measurements, thus, characteristics described herein of those measurements may also be relevant to the measurement 720.

The measurement 720 corresponds to an event in which the user 101 has an experience (which is referred to as "the experience corresponding to the event"). The measurement 720 is taken while the user 101 has the experience, or shortly after that, as discussed in section 2—Measurements of Affective Response. The experience corresponding to the event may be one of the various types of experiences described in this disclosure (e.g., one of the experiences mentioned in section 3—Experiences).

The event to which the measurement 720 corresponds may be considered to be characterized by factors (e.g., factors 730). Optionally, each of the factors is indicative of at least one of the following: the user corresponding to the event, the experience corresponding to the event, and the instantiation of the event. Optionally, the factors may be described in, and/or derived from, a description of the event which is generated by the event annotator 701. Optionally, the factors have associated weights. Additional information regarding identification of events and/or factors of the events may be found in this disclosure at least in section 5—Identifying Events and section 12—Factors of Events.

The bias subtractor module 726 is configured to receive an indication of certain factor 722, which corresponds to the bias that is to be corrected. Thus, the bias that is to be corrected may be considered a reaction of the user 101 to the certain factor 722 being part of the event. Additionally or alternatively, the bias subtractor module 726 is configured to receive a bias value corresponding to the certain factor 722. Optionally, the bias value is indicative of a magnitude of an expected impact of the certain factor 722 on affective response corresponding to the event.

Herein, receiving indication of a factor, such as the indication of the certain factor 722, means that the indication provides information that may be utilized to identify the factor. In one example, this may involve receiving an identifier (e.g., a name, tag, serial number, etc.) In another example, this may involve receiving an index of a dimension in a vector of feature values that correspond to a set of factors describing the event. In this example, the index may identify which position(s) of the vector should be modified as part of the correction of the bias.

In some embodiments, the bias value is received from a model comprising the bias values 715. Optionally, the bias values 715 are learned from data comprising measurements of affective response of the user 101 and/or other users, e.g., as described in the discussion above regarding FIG. 2 and FIG. 4. Optionally, the data from which the bias values 715 are learned includes measurements that correspond to events that are characterized by the certain factor 722. Optionally, at least some of the events involve experiences that are different from the experience corresponding to the event.

It is to be noted that the bias subtractor module 726 does not necessarily need to receive both the indication of the certain factor 722 and the bias value corresponding to the certain factor 722. In some cases, one of the two values may suffice. For example, in some embodiments, the bias subtractor module 726 receives the indication of the certain factor 722, and utilizes the indication to retrieve the appropriate bias value (e.g., from a database comprising the bias values 715). In other embodiments, the bias subtractor module 726 receives the bias value corresponding to the certain factor 722, possibly without receiving an indication of what the certain factor 722 is.

The bias subtractor module 726 is also configured to compute corrected measurement 727 of affective response by subtracting the bias value corresponding to the certain factor 722, from the measurement 720. Optionally, the value of the measurement 720 is different from the value of the corrected measurement 722. Optionally, the corrected measurement 727 is forwarded to another module, e.g., the collection module 120 in order to be utilized for computation of a crowd-based result. The corrected measurement 727 may be forwarded instead of the measurement 720, or in addition to it.

In one embodiment, the indication of the certain factor 722 is indicative of a weight of the certain factor 722, which may be utilized in order to compute the corrected measurement 727. In another embodiment, the weight of the certain factor 722 is determined from the factors 730, which may include weights of at least some of the factors characterizing the event. In still another embodiment, the certain factor 722 may not have an explicit weight (neither in the indication nor in the factors 730), and as such may have an implied weight corresponding to the certain factor 722 being a factor that characterizes the event (e.g., a weight of "1" that is given to all factors that characterize the event).

In one embodiment, correcting the bias involves subtracting the bias value corresponding to the certain factor 722 from the measurement 720. Optionally, the bias value that is subtracted is weighted according to the weight assigned to the certain factor 722. For example, if the weight of the certain factor 722 is denoted f and its corresponding bias value is b, then correcting for the certain bias may be done by subtracting the term f·b from the measurement. Note that doing this corresponds to removing the entire effect of the certain bias (it essentially sets the weight of the certain factor to f=0). However, effects of bias may be partially corrected, for example, by changing the weight of the certain factor 722 by a certain Δf, in which case, the term Δf·b is subtracted from the measurement. Furthermore, correcting a certain bias may involve reducing the effect of multiple factors, in which case the procedure described above may be repeated for the multiple factors. It is to be noted that partial correction (e.g., Δf mentioned above) may be facilitated via a parameter received by the bias subtractor module 726 indicating the extent of desired correction. For example, the bias subtractor module 726 may receive a parameter a and subtract from the measurement 720 a value equal to α·f·b.

In one embodiment, prior to correcting the bias, the bias subtractor module 726 determines whether the certain factor 722 characterizes the event. Optionally, this determination is done based on a description of the event, which is indicative of the factors 730. Optionally, for the bias to be corrected, the certain factor 722 needs to be indicated in the description as a factor that characterizes the event, and/or indicated in the description to have a corresponding weight that reaches a certain (non-zero) threshold. In one embodiment, if the certain factor 722 does not characterize the event or does not have a weight that reaches the threshold, then the corrected measurement 727 is not generated, and/or the value of the corrected measurement 727 is essentially the same as the value of the measurement 720.

In one example, measurements corresponding to first and second events, involving the same experience, are to be corrected utilizing the bias subtractor module 726. A first description of the first event indicates that the first event is characterized by the certain factor 722 and/or that the weight of the certain factor 722 as indicated in the first description reaches a certain threshold. A second description of the second event indicates that the second event is not characterized by the certain factor 722 or that the weight of the certain factor 722 indicated in the second description does not reach the certain threshold. Assuming that the bias value corresponding to the certain factor 722 is not zero, then in this example, a first corrected measurement, computed based on a first measurement corresponding to the first event, will have a different value than the first measurement. However, a second corrected measurement, computed based on a second measurement corresponding to the second event will have the same value as the second measurement.

Following are descriptions of steps that may be performed by methods involving correcting a bias in a measurement of affective response of a user. The steps described below may, in some embodiments, be part of the steps performed by an embodiment of a system described above, such as a system modeled according to FIG. 5. In some embodiments, instructions for implementing one or more of the methods described below may be stored on a computer-readable medium, which may optionally be a non-transitory computer-readable medium. In response to execution by a system including a processor and memory, the instructions cause the system to perform operations that are part of the method. Optionally, each of the methods described below may be executed by a computer system comprising a processor and memory, such as the computer illustrated in FIG. 27.

In one embodiment, a method for correcting a bias in a measurement of affective response of a user includes at least the following steps:

In Step 1, obtaining, utilizing a sensor coupled to the user, a measurement of affective response of the user. Optionally, the measurement corresponds to an event in which the user has an experience corresponding to the event, and the measurement is taken while the user has the experience. Optionally, the measurement is the measurement 720 of the user 101, and is taken utilizing the sensor 102.

In Step 2, receiving: (i) an indication of a certain factor corresponding to the bias to be corrected. The certain factor characterizes the event and corresponds to at least one of the following: the user, the experience corresponding to the event, and the instantiation of the event; and (ii) a bias value corresponding to the certain factor, which is computed based on measurements of affective response of the user. Optionally, the measurements correspond to events that are characterized by the certain factor and to experiences that are different from the experience corresponding to the event.

And in Step 3, computing a corrected measurement of affective response by subtracting the bias value from the measurement of affective response. Optionally, the bias value is indicative of a magnitude of an expected impact of the certain factor on affective response corresponding to the event. Optionally, the value of the measurement is different from the value of the corrected measurement.

In one embodiment, steps 2 and 3 above are performed utilizing the bias subtractor module 726, which corrects the measurement 720 with respect to a bias corresponding to the certain factor 722, and produces the corrected measurement 727.

In one embodiment, the bias value belongs to a model comprising bias values (e.g., the bias values 715), and computing the bias value involves learning the model by performing, at least, the following steps: (i) receiving measurements of affective response corresponding to events and descriptions of the events, which are indicative of factors characterizing the events; (ii) generating samples corresponding to the events, where each sample corresponding to an event comprises: feature values determined based on the description of the event, and a label determined based on a measurement corresponding to the event; and (iii) utilizing the samples to learn the bias values comprised in the model.

In one embodiment, the method described above includes an additional step involving generating a description of the event based on data comprising one or more of the following: an image taken from a device of the user corresponding to the event, a communication of the user corresponding to the event, and analysis of content consumed by the user corresponding to the event. Optionally, the description is indicative of the certain factor being a factor that characterizes the event.

Whether correction of a measurement is performed may depend on whether or not the certain factor 722 characterizes the event to which the measurement corresponds. Thus, given two different measurements, corresponding to two different events, correction of bias may involve execution of different steps for the different measurements, as the following embodiment illustrates.

In one embodiment, a method for correcting a bias in a measurement of affective response of a user includes at least the following steps:

In Step 1, receiving: (i) an indication of a certain factor corresponding to the bias to be corrected; and (ii) a bias value corresponding to the certain factor, which is computed based on measurements of affective response of the user; the measurements correspond to events that are characterized by the certain factor.

In Step 2, obtaining, utilizing a sensor coupled to the user, first and second measurements of affective response of the user; the first and second measurements correspond to first and second events in which the user has first and second experiences, respectively.

In Step 3, receiving a first description of the first event; the first description indicates that the certain factor characterizes the first event.

In Step 4, computing a corrected measurement of affective response by subtracting the bias value from the first measurement of affective response; the bias value is indicative of a magnitude of an expected impact of the certain factor on affective response corresponding to the event. The value of the first measurement is different from the value of the corrected measurement.

In Step 5, forwarding a corrected measurement.

In Step 6, receiving a second description of the second event; the second description does not indicate that the certain factor characterizes the second event.

And in Step 7, forwarding the second measurement.

The forwarding of measurements in Step 5 and/or Step 7 may be to various entities that may utilize the measurements such as the collection module 120 and/or a module that utilizes the measurements to generate a crowd-based result.

Another approach to correcting bias is shown in FIG. 6, which illustrates another embodiment of a system configured to correct a bias in a measurement of affective response of a user (e.g., the user 101). The system includes at least the sensor 102 and an ERP-based Bias Corrector Module (ERP-BCM 733). The system may optionally include other modules such as the event annotator 701.

Similarly to the embodiment illustrated in FIG. 5, in embodiments modeled according to FIG. 6, the sensor 102 is coupled to the user 101, and is configured to take the measurement 720 of affective response of the user 101. In this embodiment too, the measurement 720 corresponds to an event in which the user 101 has an experience corresponding to the event, and the measurement 720 is taken while the user has the experience and/or shortly after that time.

In one embodiment, the system may optionally include the event annotator 701, which is configured to generate a description of the event. Optionally, the description comprises factors characterizing the event which correspond to at least one of the following: the user corresponding to the event, the experience corresponding to the event, and the instantiation of the event.

The Emotional Response Predictor-based Bias Corrector Module (ERP-BCM 733) is configured to receive an indication of the certain factor 722, which corresponds to the bias that is to be corrected. Additionally, the ERP-BCM 733 is configured to receive the measurement 720 and the factors 730, which characterize the event to which the measurement 720 corresponds (therefore, the factors 730 are also considered to correspond to the event).

The ERP-BCM 733 comprises the feature generator 706, which in this embodiment, is configured to generate a first set comprising one or more feature values based on the factors 730. The ERP-BCM 733 is configured to generate a second set of feature values, which is based on the first set. Optionally, the second set of feature values is determined based on a modified version of the factors 730, which corresponds to factors in which the weight of the certain factor 722 is reduced. In one embodiment, generating the second set is done by changing the values of one or more of the feature values in the first set, which are related to the certain factor 722. In another embodiment, generating the second set is done by altering the factors 730. For example, the certain factor 722 may be removed from the factors 730 or its weight may be decreased, possibly to zero, which may render it irrelevant to the event.

The ERP-BCM 733 also comprises ERP 731, which is utilized to generate first and second predictions for first and second samples comprising the first and second sets of features values, respectively. Optionally, to make the first and second predictions, the ERP 731 utilizes the ERP model 719. Optionally, the ERP model 719 is trained on data comprising measurements of affective response corresponding to events that are characterized by the certain factor 722. Optionally, the measurements used to train the model comprise measurements of affective response of the user 101, and at least some of the events to which the measurements correspond involve experiences that are different from the experience corresponding to the event. Optionally, the ERP 731 utilizes the ERP model 719 to compute a non-linear function of feature values. Optionally, the first and second predictions comprise affective values representing expected affective response of the user 101.

In some embodiments, the ERP-BCM 733 utilizes the first and second predictions to compute corrected measurement 732 based on the measurement 720. Optionally, the computation of the corrected measurement 732 involves subtracting a value proportional to a difference between the first and second predictions from the measurement 720. Optionally, the corrected measurement 732 has a different value than the measurement 720. For example, if the first prediction is a value $v_1$ and the second prediction is a value $v_2$, then a value of $\alpha(v_1-v_2)$ is subtracted from the measurement 720 to obtain the corrected measurement 732. Optionally, $\alpha=1$, or has some other non-zero value (e.g., a value greater than 1 or smaller than 1). Optionally, the difference $v_1-v_2$ is indicative of a bias value corresponding to the certain factor 722.

Following are descriptions of steps that may be performed in methods for correcting a bias in a measurement of affective response of a user. The steps described below may, in some embodiments, be part of the steps performed by an embodiment of a system described above, such as a system modeled according to FIG. 6. In some embodiments, instructions for implementing one or more of the methods described below may be stored on a computer-readable medium, which may optionally be a non-transitory computer-readable medium. In response to execution by a system including a processor and memory, the instructions cause the system to perform operations that are part of the method. Optionally, each of the methods described below may be executed by a computer system comprising a processor and memory, such as the computer illustrated in FIG. 27.

In one embodiment, a method for correcting a bias in a measurement of affective response of a user includes at least the following steps:

In Step 1, receiving an indication of a certain factor corresponding to the bias to be corrected. Optionally, the measurement corresponds to an event in which the user has an experience corresponding to the event, and the measurement is taken while the user has the experience. Optionally, the measurement is the measurement 720 of the user 101, and is taken utilizing the sensor 102.

In Step 2, obtaining, utilizing a sensor coupled to the user, a measurement of affective response of the user; the measurement corresponds to an event in which the user has an experience corresponding to the event, and the measurement is taken while the user has the experience.

In Step 3, receiving factors characterizing the event; each factor characterizing the event corresponds to at least one of the following: the user, the experience corresponding to the event, and the instantiation of the event.

In Step 4, generating first and second sets of feature values; the first set of feature values is determined based on the factors, and the second set of feature values is determined based on a modified version of the factors in which the weight of the certain factor is reduced.

In Step 5, receiving a model of an Emotional Response Predictor (ERP), and utilizing the model to make first and second predictions for first and second samples comprising the first and second sets of features values, respectively; each of the first and second predictions comprises an affective value representing expected affective response of the user. Optionally, the model is trained on data comprising measurements of affective response corresponding to events that are characterized by the certain factor.

And in Step 6, computing a corrected measurement of affective response by subtracting from the measurement a value proportional to a difference between the second prediction and the first prediction; the value of the measurement is different from the value of the corrected measurement.

In one embodiment, steps 2 to 6 above are performed utilizing the ERP-BCM 733, which corrects the measurement 720 with respect to a bias corresponding to the certain factor 722, and produces the corrected measurement 732.

In one embodiment, the method described above includes an additional step of generating a description of the event based on data comprising one or more of the following: an image taken from a device of the user corresponding to the event, a communication of the user corresponding to the event, and analysis of content consumed by the user corresponding to the event; optionally, the description is indicative of the certain factor being a factor that characterizes the event.

In one embodiment generating the model of the ERP involves performing the following steps: (i) generating samples corresponding to the events from the measurements and descriptions of the events, which are indicative of factors characterizing the events; each sample corresponding to an event comprises: feature values determined based on the description of the event, and a label determined based on a measurement corresponding to the event; and (ii) training, utilizing the samples, the model for the ERP.

Whether correction of a measurement is performed may depend on whether or not the certain factor 722 characterizes the event to which the measurement corresponds. Thus, given two different measurements, corresponding to two different events, correction of bias may involve execution of different steps for the different measurements, as the following embodiment illustrates.

In one embodiment, a method for correcting a bias in a measurement of affective response of a user includes at least the following steps:

In Step 1, receiving: (i) an indication of a certain factor corresponding to the bias to be corrected, and (ii) a model of an Emotional Response Predictor (ERP); the model is trained on data comprising measurements of affective response corresponding to events that are characterized by the certain factor.

In Step 2, obtaining, utilizing a sensor coupled to the user, first and second measurements of affective response of the user; the first and second measurements correspond to first and second events in which the user has first and second experiences, respectively.

In Step 3, receiving a first description of the first event; the first description indicates that a certain set of factors, which comprises the certain factor, characterizes the first event.

In Step 4, generating first and second sets of feature values; the first set of feature values is determined based on the certain set of factors, and the second set of feature values is determined based on modifying the certain set of factors by reducing the weight the certain factor.

In Step 5, utilizing the model to make first and second predictions for first and second samples comprising the first and second sets of features values, respectively; each of the first and second predictions comprises an affective value representing expected affective response of the user.

In Step 6, computing a corrected measurement of affective response by subtracting from the first measurement a value proportional to a difference between the second prediction and the first prediction; the value of the measurement is different from the value of the corrected measurement.

In Step 7, forwarding the corrected measurement.

In Step 8, receiving a second description of the second event; the second description does not indicate that the certain factor characterizes the second event.

And in Step 9, forwarding the second measurement.

The forwarding of measurements in Step 7 and/or Step 9 may be to various entities that may utilize the measurements such as the collection module 120 and/or a module that utilizes the measurements to generate a crowd-based result.

In some of the embodiments described above (e.g., illustrated in FIG. 5 and FIG. 6), the indication of the certain factor 722, which corresponds to the bias that is to be corrected in the measurement 720 may originate from various sources and/or be chosen for various reasons.

In one embodiment, the certain factor 722 is provided by an entity that intends to utilize the measurement 720. For example, the entity may utilize the measurement 720 in order to compute a crowd-based result. In such a case, the entity may prefer to have the measurement 720 cleansed from certain biases which may render the crow-based result less accurate. In one example, the indication of the certain factor 722 is received from the collection module 120 and/or some other module used to compute a crowd-based result, as described in section 8—Crowd-Based Applications.

In another embodiment, the certain factor 722 is provided by an entity that wishes to protect the privacy of the user 101. For example, the entity may be a software agent operating on behalf of the user 101. In this case, the software agent may provide the indication in order to remove from the measurement 720 the effects of a bias, which may be reflected in the measurement 720 if it is released with its original value.

In yet another embodiment, the certain factor 722 may be a factor to which there is extreme bias (e.g., the bias of the user 101 towards the factor may be considered extreme or the bias of users in general towards the factor may be considered extreme). Optionally, the bias values 715 are examined in order to determine which factors have a corresponding bias value that is extreme, and measurements of affective response are corrected with respect to these biases.

When correcting bias in measurements of affective response utilizing a model, such as a model comprising the bias values 715 and/or the ERP model 719, it may be beneficial to determine whether the model is likely to be accurate in the bias correction. When applied to the correction of a certain bias, the inaccuracy of the model may stem from various reasons. In one example, the model may be trained incorrectly (e.g., they are trained with a training set that is too small and/or contains inaccurate data). Thus, bias values and/or predictions of affective response obtained utilizing the model may be inaccurate. In another example, the model may be provided with inaccurate factors of the event at hand. Thus, correction of bias in the event based on those inaccurate factors may consequently be inaccurate.

In some embodiments, determining whether model is accurate to a desired degree with respect to a certain event is done by comparing the measurement of affective response corresponding to the certain event to a predicted measurement of affective response corresponding to the certain event. Optionally, the predicted measurement of affective response is generated utilizing factors of the certain event and the model. If the difference between the measurement of affective response and the predicted measurement is below a threshold, then the model may be considered accurate (at least with respect to the certain event). Optionally, if the difference is not below the threshold, the model may not be considered accurate.

In the discussion above, the threshold may correspond to various values in different embodiments. For example, in one embodiment where the difference between the measurement and the predicted measurement can be expressed as a percentage, then the threshold may correspond to a certain percentage of difference in values, such as being at most 1%, 5%, 10%, 25%, or 50% different. In another embodiment, the difference may be expressed via a cost function of the form cos t(x,y) that can determine a perceived cost for predicting that the measurement will be x when in practice the measurement is y. Thus, in this embodiment, the threshold may correspond to a certain value returned by the cost function.

In one embodiment, if a model utilized for correcting bias is not considered accurate with respect to a certain event, then it is not utilized for bias correction or is utilized to a lesser extent (e.g., by making a smaller correction than would be done were the model considered accurate). In one example, in a case in which the bias values 715 are not considered accurate with respect to the event to which the measurement 720 corresponds, the correction of the bias corresponding to the certain factor 722 may be less extensive. For example, the corrected measurement 727 may have the same value as the measurement 720, or the difference between the corrected measurement 727 and the measurement 720 is smaller than the difference that would have existed had the model been considered accurate with respect to the event. In another example, in a case in which the ERP model 719 not considered accurate with respect to the event to which the measurement 720 corresponds, the correction of the bias corresponding to the certain factor 722 may be less extensive. For example, the corrected measurement 732 may have the same value as the measurement 720, or the difference between the corrected measurement 732 and the measurement 720 is smaller than the difference that would have existed had the ERP model 719 been considered accurate with respect to the event.

The embodiments described above (e.g., illustrated in FIG. 5 and FIG. 6) may be utilized to correct various forms of biases. The following are a couple of examples in which it may be beneficial to correct bias in measurements of affective response.

In one example, a user may have a positive bias towards the music of a certain band. Consider a case where a commercial (e.g., a car commercial) has as in its soundtrack music by the band that the user recognizes. In this case, a measurement of affective response of the user may reflect the positive bias to the certain band. If the measurement of the user is to be used, e.g., in order to decide how the user feels about the car or to compute a score reflecting how people feel about the car, it may be desirable to correct the measurement for the bias towards the band. By removing this bias, the corrected measurement is likely a better reflection of how the user feels about the car, compared to the uncorrected measurement that included a component related to the band.

In another example, a user may have a bias against people from a certain ethnic group. When an event involves a person of the certain ethnic group the user is likely to have an affective response to the event. For example, a server of a meal the user has at a restaurant belongs to the certain ethnic group. When computing a score for the restaurant, or learning the user's preferences to food, it may be beneficial to normalize the measurement corresponding to the event by removing the unwanted bias towards the server's ethnicity. Having a measurement without such bias better reflects how the user felt towards the meal. It is likely that other people do not share the user's bias towards the server's ethnicity, and therefore, a measurement of the user that is corrected for such a bias better describes the experience those users might have (which will typically not involve a bias towards the server's ethnicity).

The examples given above demonstrate some scenarios in which bias may be corrected. The following are additional examples of what the certain factor 722 may be, and what experiences may be involved in events whose corresponding measurements are corrected with respect to a bias corresponding to the certain factor 722.

In one embodiment, the certain factor 722 is indicative of a value of a certain environmental condition prevailing in the environment in which the user 101 has the experience. In this embodiment, a bias value corresponding to the certain factor 722 may be indicative of an expected impact, on affective response of the user 101, of having an experience in an environment in which the environmental condition prevails. In one example, the certain environmental condition corresponds to an environmental parameter, describing the environment, being in a certain range. Optionally, the parameter is indicative of the temperature of the environment, and the certain range represents temperatures of a certain season of the year (e.g., the winter season).

In another embodiment, the certain factor 722 is indicative of the user 101 being alone while having an experience. In this embodiment, a bias value corresponding to the certain factor 722 may be indicative of an expected impact that having the experience, while the user 101 is alone, has on the affective response of the user 101. Similarly, the certain factor 722 may be indicative of the user 101 being in the presence of a certain person while having the experience. In this case, the bias value corresponding to the certain factor 722 may be indicative of an expected impact that having the experience, while the user 101 is in the presence of the certain person, has on the affective response of the user 101.

In still another embodiment, the event to which the measurement 720 corresponds involves an experience that comprises receiving a service from a person, and the certain factor 722 is indicative of at least one of the following: a demographic characteristic of the person, and a characteristic of the person's appearance. Optionally, the bias value corresponding to the certain factor 722 is indicative of an expected impact that the certain factor 722 has on the affective response of the user 101 when receiving service from a person characterized by the certain factor. In one example, the certain factor 722 is indicative of at least one of the following properties related to the person: the age of the person, the gender of the person, the ethnicity of the person, the religious affiliation of the person, the occupation of the person, the place of residence of the person, and the income of the person. In another example, the certain factor 722 is indicative of at least one of the following properties related to the person: the height of the person, the weight of the person, attractiveness of the person, facial hair of the person, and a type of clothing element worn by the person.

In yet another embodiment, the event to which the measurement 720 corresponds involves an experience that comprises consuming certain content, and the certain factor 722 is indicative of the content containing a certain element. Optionally, the bias value corresponding to the certain factor 722 is indicative of an expected impact that the certain element has on the affective response of the user when consuming content with the certain element. In one example, the certain element is a certain type of music (e.g., the content may be a music video or a commercial). In another example, the certain element is a character (e.g., person), and on object (e.g., a spaceship), or an animal (e.g., a cat). In some case, the certain factor 722 may be an attribute of a content element (e.g., corresponding to the color of a car in an image).

As discussed above, the correction of biases may be done, in different embodiments, by different entities. In one embodiment, correction of a measurement with respect to a certain bias is done by an entity that receives and processes measurements of affective response of different users. Optionally, the entity has access to models that include bias values of users. Additionally or alternatively, the entity may have access to models of ERPs that may be used to predict affective response of the users. In one embodiment, the entity requests from a software agent operating on behalf of a user, a certain bias value of the user, and utilizes the certain bias value it receives from the software agent to correct a measurement of affective response of the user.

In another embodiment, the correction of a measurement with respect to a certain bias is done by a software agent operating on behalf of the user of whom the measurement is taken. Optionally, the software agent has access to a model of the user that includes bias values of the user (e.g., the bias values 715) and/or to a model of an ERP that was trained, at least in part, with samples derived from events involving the user and corresponding measurements of affective response of the user (e.g., the ERP model 719 may be such a model). Optionally, the software agent receives a list of one or more biases that should be corrected. Optionally, the software agent provides a measurement of affective response of the user that is corrected with respect to the one or more biases to an entity that computes a score from measurements of affective response of multiple users, such as a scoring module.

Additional information regarding software agents in general, such as what they may constitute and/or how they may operate in various embodiments may be found in this disclosure at least in section 7—Software Agents.

Figure 7:
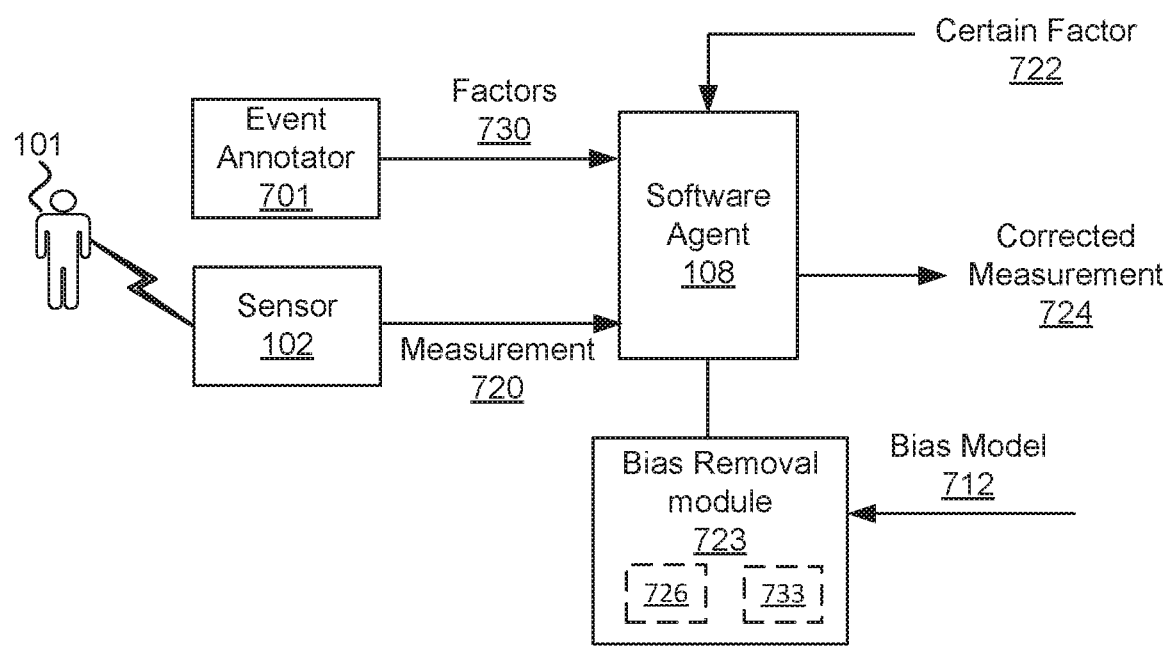
FIG. 7 illustrates a system in which a software agent is involved in correcting a bias in a measurement of affective response of a user.

FIG. 7 illustrates one embodiment of a system configured to correct a bias in a measurement of affective response of a user (e.g., the user 101). The illustrated system is one in which software agent 108 is involved in the correction of the bias. Optionally, the software agent 108 operates on behalf of the user 101. The system includes at least the sensor 102 and bias removal module 723. Optionally, the system includes additional modules such as the event annotator 701. It is to be noted that though, as illustrated in the figure, modules such as the bias removal module 723 and/or the event annotator 701 are separate from the software agent 108. However, in some embodiments, these modules may be considered part of the software agent 108 (e.g., modules that are comprised in the software agent 108).

Similarly to the embodiments illustrated above (e.g., FIG. 5 and FIG. 6), the sensor 102 is coupled to the user 101, and is configured to take the measurement 720 of affective response of the user 101. In this embodiment too, the measurement 720 corresponds to an event in which the user 101 has an experience corresponding to the event, and the measurement 720 is taken while the user has the experience and/or shortly after that time. Optionally, the experience corresponding to the event may be one of the experiences described in section 3—Experiences.

In one embodiment, the system may optionally include the event annotator 701, which is configured to generate a description of the event. Optionally, the description comprises factors characterizing the event which correspond to at least one of the following: the user corresponding to the event, the experience corresponding to the event, and the instantiation of the event.

The bias removal module 723 is configured to identify, based on the description, whether the certain factor 722 characterizes the event. The bias removal module 723 is also configured to compute corrected measurement 724 by modifying the value of the measurement 720 based on at least some values in the bias model 712. Optionally, in this embodiment, the bias model 712 is trained based on data comprising: measurements of affective response of the user 101, corresponding to events involving the user 101 having various experiences, and descriptions of the events. Optionally, the value of the corrected measurement 724 is different from the value of the measurement 720.

In some embodiments, the bias model 712 may be considered private information of the user 101. Optionally, the bias model 712 may not be accessible to entities that receive the measurement 720. Thus, by having the software agent 108 mediate the correction of the bias, there is less risk to the privacy of the user 101, since there is no need to provide the other entities with detailed information about the user 101, such as the information comprised in the bias model 712.

There may be different implementations for the bias removal module 723. In one embodiment, the bias removal module 723 comprises the bias subtractor module 726, which is described in more detail above (e.g., in the discussion regarding FIG. 5). In this embodiment, the bias model 712 may include the bias values 715, and the corrected measurement 724 may be the same as the corrected measurement 727. In another embodiment, the bias removal module 723 comprises the ERP-BCM 733. In this embodiment, the bias model 712 may comprise the ERP model 719, and the corrected measurement 724 may be the same as the corrected measurement 732.

In one embodiment, the software agent 108 receives an indication of the certain factor 722 from an external entity, such as an entity that intends to utilize the corrected measurement 724 to compute to a crowd-based result utilizing the corrected measurement 724 (and other measurements). Optionally, the software agent 108 receives the indication of the certain factor 722 from the collection module 120 or a module that computes a score for experiences, such as the scoring module 150.

In another embodiment, the software agent 108 may have a list of factors corresponding to various biases that it is to correct in measurements of affective response of the user 101. For example, these biases may correspond to tendencies, attitudes, and/or a world view of the user 101 which should preferably not to be reflected in measurements of affective response of the user 101 which are disclosed to other entities. Optionally, the software agent 108 receives such a list of factors from an external entity. Additionally or alternatively, the software agent 108 may examine a model of the user 101 (e.g., the bias model 712) in order to detect factors to which the bias of the user 101 may be considered extreme.

The software agent 108 may, in some embodiments, serve as a repository which has memory (e.g., on a device of the user 101 or remote storage on a cloud-based platform). In these embodiments, the software agent 108 may store various measurements of affective response of the user 101 and/or details regarding the events to which the measurements correspond. For example, the details may be descriptions of the events generated by the event annotator 701 and/or factors of the events (e.g., determined by the event annotator 701). Optionally, storage of such information is done as part of "life logging" of the user 101.

In one embodiment, the software agent 108 may receive a request for a measurement of affective response of the user 101. The request includes an indication of the type of a type of an experience, and/or other details regarding an instantiation of an event (e.g., a certain time frame, environmental conditions, etc.) Additionally, the request may include an indication of one or more factors (which may include the certain factor 722). In this embodiment, responsive to receiving such a request, the software agent 108 may retrieve the measurement 720 from a memory storing the measurements of the user 101 and/or descriptions of events corresponding to the measurements. In one example, the description of the event to which the measurement 720 corresponds may indicate that it fits the request (e.g., it involves an experience of the requested type). The software agent 108 may then utilize the bias removal module 723 to correct the measurement 720 with respect to a bias of the user 101 to the one or more factors, and provide the requesting entity with the corrected measurement 724.

Following are descriptions of steps that may be performed in methods for correcting a bias in a measurement of affective response of a user. The steps described below may, in some embodiments, be part of the steps performed by an embodiment of a system described above, such as a system modeled according to FIG. 7. In some embodiments, instructions for implementing one or more of the methods described below may be stored on a computer-readable medium, which may optionally be a non-transitory computer-readable medium. In response to execution by a system including a processor and memory, the instructions cause the system to perform operations that are part of the method. Optionally, each of the methods described below may be executed by a computer system comprising a processor and memory, such as the computer illustrated in FIG. 27.

In one embodiment, a method for correcting a bias in a measurement of affective response of a user, by a software agent, includes at least the following steps:

In Step 1, obtaining, utilizing a sensor coupled to the user, a measurement of affective response of the user; the measurement corresponds to an event in which the user has an experience corresponding to the event, and the measurement is taken while the user has the experience.

In Step 2, generating a description of the event; the description comprises factors characterizing the event which correspond to at least one of the following: the user corresponding to the event, the experience corresponding to the event, and the instantiation of the event.

And in Step 3, responsive to identifying that the description indicates that the event is characterized by a certain factor, computing a corrected measurement by modifying the value of the measurement based on at least some values in a model that is trained based on data comprising: measurements of affective response of the user corresponding to events involving the user having various experiences, and descriptions of the events. Optionally, the value of the corrected measurement is different from the value of the measurement.

In one embodiment, the model of the user comprises bias values of the user computed based on the data. In this embodiment, the method described above may include additional steps comprising: receiving: (i) an indication of the certain factor; and (ii) a bias value, from the model, corresponding to the certain factor; and computing the corrected measurement by subtracting the bias value from the measurement of affective response. Optionally, the bias value is indicative of a magnitude of an expected impact of the certain factor on a value of a measurement corresponding to the event.

In another embodiment, the model of the user is a model for an Emotional Response Predictor (ERP) trained based on the data. In this embodiment, the method described above may include additional steps comprising: (i) receiving factors characterizing the event; (ii) generating first and second sets of feature values. Optionally, the first set of feature values is determined based on the factors, and the second set of feature values is determined based on a modified version of the factors, in which the weight of the certain factor is reduced; (iii) utilizing the model, by the ERP, to make first and second predictions for first and a second samples comprising the first and second sets of features values, respectively; each of the first and second predictions comprises an affective value representing expected affective response of the user; and (iv) computing the corrected measurement by subtracting from the measurement a value proportional to a difference between the second prediction and the first prediction.

Whether correction of a measurement is performed may depend on whether or not the certain factor 722 characterizes the event to which the measurement corresponds. Thus, given two different measurements, corresponding to two different events, correction of bias may involve execution of different steps for the different measurements, as the following embodiment illustrates.

In one embodiment, a method for correcting a bias in a measurement of affective response of a user, by a software agent, includes at least the following steps:

In Step 1, obtaining, utilizing a sensor coupled to the user, first and second measurements of affective response of the user; the first and second measurements correspond to first and second events in which the user has first and second experiences, respectively.

In Step 2, generating a first description of the first event; the first description indicates that a certain set of factors, which comprises the certain factor, characterizes the first event.

In Step 3, computing a corrected measurement by modifying the value of the measurement based on at least some values in a model that is trained based on data comprising: measurements of affective response of the user corresponding to events involving the user having various experiences, and descriptions of the events. Optionally, the value of the corrected measurement is different from the value of the measurement.

In Step 4, forwarding the corrected measurement.

In Step 5, receiving a second description of the second event; the second description does not indicate that the certain factor characterizes the second event.

And in Step 6, forwarding the second measurement.

The forwarding of measurements in Step 4 and/or Step 6 may be to various entities that may utilize the measurements such as the collection module 120 and/or a module that utilizes the measurements to generate a crowd-based result.

The following figures (FIG. 8 to FIG. 11) describe various embodiments, each involving a specific type of bias that is corrected in the measurement 720. In the embodiments described below, correction of the specific types of biases is done utilizing the bias removal module 723. The bias removal module 723 is provided with the measurement 720 of affective response of the user 101. The measurement 720 is taken with the sensor 102, which is coupled to the user 101. Additionally, the systems described below include the event annotator 701 that generates a description of the event to which the measurement 720 corresponds. Optionally, the description of the event is indicative of one or more factors characterizing the event, each of which corresponds to at least one of the following: the user corresponding to the event, the experience corresponding to the event, and the instantiation of the event.

In some embodiments, the bias removal module 723 and/or the event annotator 701 may be part of the software agent 108. In some embodiments, the bias removal module 723 and/or the event annotator 701 may be utilized to provide corrected measurements to modules such as collection module 120 and/or modules that generate crowd-based results (e.g., crowd-based result generator module 117 described herein).

In some embodiments, the bias removal module 723 may be utilized in different ways, as described, for example, in the discussion involving FIG. 5 and FIG. 6. In one example, the bias removal module 723 may perform a correction utilizing the bias subtractor module 726 (in this example, the bias model 712 may include the bias values 715). In another example, the bias removal module 723 may perform a correction utilizing the ERP-BCM 733 (in this example, the bias model 712 may include the ERP model 719).

In some embodiments, at least some of the data used to train the bias model 712 is data that involves the user 101; for example, the data includes measurements of affective response of the user 101, corresponding to events in which the user 101 had experiences. In other embodiments, at least some of the data used to train the bias model 712 is data that involves users other than the user 101; for example, the data includes measurements of affective response of users who are not the user 101, and these measurements correspond to events in which those users had experiences.

In some embodiments described below, the bias removal module 723 may receive indications of certain factors corresponding to the bias that is to be corrected. These certain factors may be referred by different reference numerals in order to indicate that they correspond to a certain type of factor (corresponding to the specific type of bias corrected in each embodiment). Nonetheless, these factors may all be considered similar to the certain factor 722 (e.g., they may be considered to have similar characteristics and/or a similar role in the systems as the certain factor 722 has). In a similar fashion, the corrected measurements in the embodiments below are referred to with various reference numerals to indicate that they each are corrected for a different type of bias. Additionally, the embodiments described below include the event annotator 701, which generates, in the different embodiments, descriptions of events indicating factors of the events. These factors may be referred to, in the different embodiments, with different reference numerals in order to indicate that the factors include a specific type of factor (corresponding to the specific type of bias corrected in each embodiment). Nonetheless, their characteristics and roles in the system are similar to the characteristics and role of the factors 703 described above.

Figure 8:
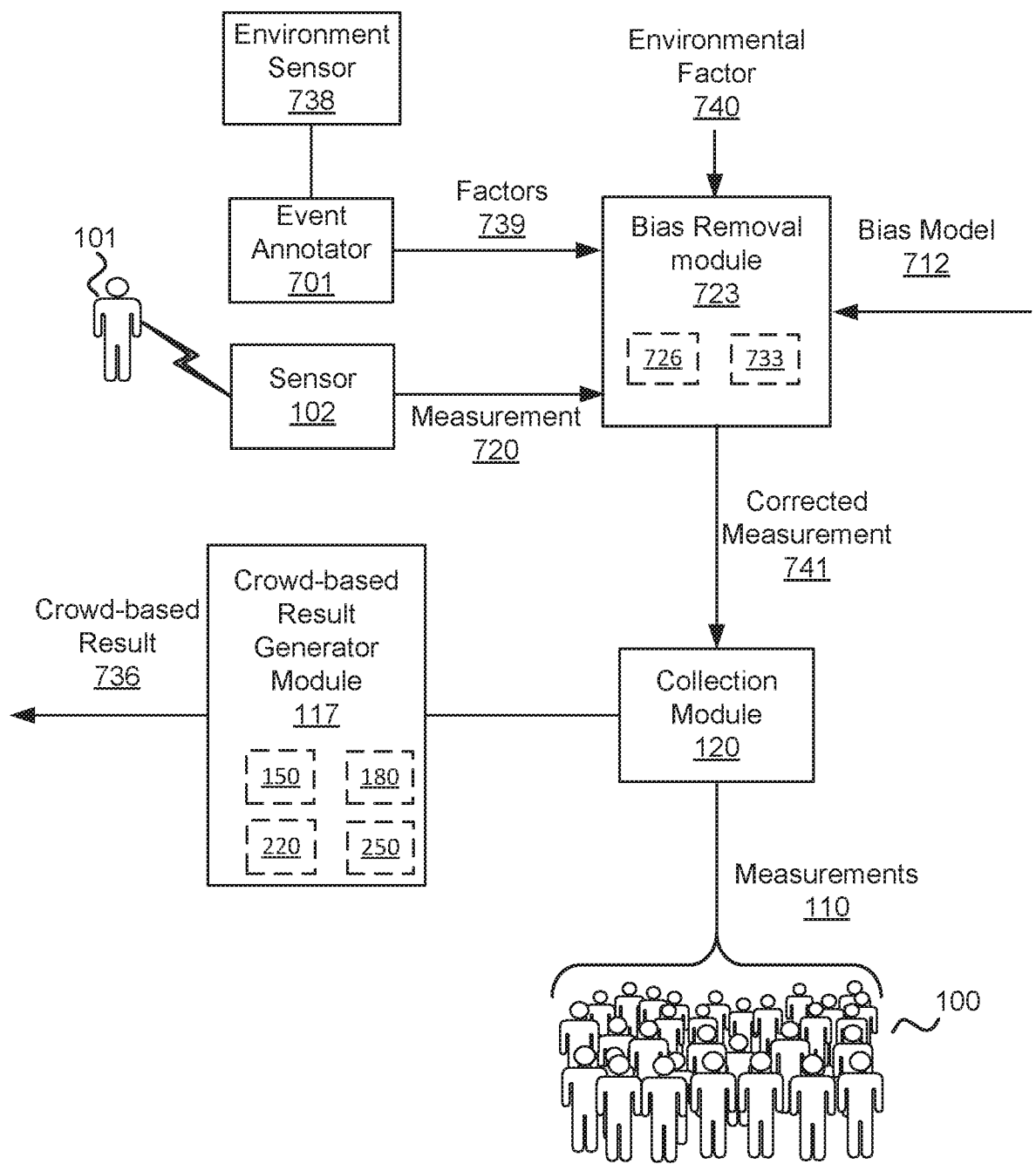
FIG. 8 illustrates a system configured to correct a bias towards an environment in which a user has an experience.

FIG. 8 illustrates one embodiment of a system configured to correct a bias towards an environment in which a user has an experience. The system includes at least the event annotator 701 and the bias removal module 723.

The event annotator 701 is configured to generate a description of the event to which the measurement 720 corresponds. In one embodiment, the description is indicative of the factors 739, which include at least one factor characterizing the environment in which the user has the experience corresponding to the event. In one example, the factor characterizing the environment represents the season of the year during which the user has the experience. In another example, the factor characterizing the environment is indicative of an environmental condition in which a certain parameter that describes the environment has a certain value and/or has a value that falls within a certain range. Optionally, the certain parameter is indicative of one of the following: the temperature in the environment, the humidity level in the environment, extent of precipitation in the environment, the air quality in the environment, a concentration of an allergen in the environment, the noise level in the environment, and level of natural sun light in the environment.

In one embodiment, the event annotator 701 may receive information from environment sensor 738 that measures the value of an environmental parameter during the instantiation of the event. Optionally, the environment sensor 738 is not the sensor 102. Optionally, the environment sensor 738 is in a device of the user 101 (e.g., a sensor in a smartphone or a wearable device). Optionally, the environment sensor 738 is a sensor that provides information to a service that provides environmental data, such as a service that posts environmental data on the Internet.

The bias removal module 723 is configured, in one embodiment, to receive the measurement 720 of affective response corresponding to the event. The bias removal module 723 is also configured to determine whether the description of the event, generated by the event annotator 701, indicates that the instantiation of the event involves the user having the experience corresponding to the event in an environment characterized by a certain environmental condition. Optionally, the environmental factor 740, which may be considered a certain type of the certain factor 722, corresponds to the certain environmental condition. Responsive to determining, based on the description of the event, that the user 101 had the experience corresponding to the event in an environment characterized by the environmental factor 740, the bias removal module 723 computes corrected measurement 741. Optionally, the corrected measurement 741 reflects a correction, at least to a certain extent, of a bias of the user 101 towards the certain environmental condition. Optionally, the value of the corrected measurement 741 is different from the value of the measurement 720.

In one embodiment, the bias model 712 utilized by the bias removal module 723 is trained on certain data comprising: measurements of affective response corresponding to events involving having experiences in environments characterized by various environmental conditions. Optionally, the certain data comprises measurements of affective response of the user 101, corresponding to events involving the user having experiences in environments characterized by different environmental conditions (i.e., some of the events that are represented in the certain data are not characterized by the environmental factor 740).

It is to be noted that not all the events, to which the measurements in the certain data correspond, necessarily involve the user corresponding to the event having an experience in an environment characterized by the certain environmental condition corresponding to the environmental factor 740. In one example, the certain data used to train the bias model 712 comprises: (i) measurements of affective response corresponding to first and second events that involve a certain experience, and (ii) descriptions of the first and second events. In this example, the description of the first event indicates that the user corresponding to the first event had the experience in an environment characterized by the certain environmental condition, and the description of the second event does not indicate that the user corresponding to the second event had the experience in an environment characterized by the certain environmental condition.

Following is a description of steps that may be performed in a method for correcting a bias towards an environment in which a user has an experience. The steps described below may, in some embodiments, be part of the steps performed by an embodiment of a system described above, modeled according to FIG. 8. In some embodiments, instructions for implementing the methods described below may be stored on a computer-readable medium, which may optionally be a non-transitory computer-readable medium. In response to execution by a system including a processor and memory, the instructions cause the system to perform operations that are part of the method. Optionally the method described below may be executed by a computer system comprising a processor and memory, such as the computer illustrated in FIG. 27.

In one embodiment, the method for correcting a bias towards an environment in which a user has an experience includes at least the following steps:

In Step 1, generating, by a system comprising a processor and memory, a description of an event involving the user having an experience; the description is indicative of factors characterizing the event, which comprise at least one factor characterizing the environment in which the user has the experience corresponding to the event. Optionally, the description is generated by the event annotator 701.

In Step 2, receiving a measurement of affective response corresponding to the event, taken with a sensor coupled to the user. Optionally, the measurement is the measurement 720 of the user 101, and is taken utilizing the sensor 102.

In Step 3, determining whether the description of the event indicates that the instantiation of the event involves the user having the experience corresponding to the event in an environment characterized by a certain environmental condition.

And in Step 4, responsive to the description indicating thereof, computing a corrected measurement by modifying the value of the received measurement, with respect to a bias of the user towards the certain environmental condition.

Optionally, the value of the corrected measurement is different from the value of the received measurement.

In one embodiment, the method may include an optional step involving utilizing a model for computing the corrected measurement. Optionally, the model is the bias model 712. Optionally, the model is trained on data comprising: measurements of affective response corresponding to events involving having experiences in environments characterized by different environmental conditions.

In one embodiment, the model comprises bias values (e.g., the bias values 715), which are computed based on the data. Optionally, the method includes an optional step involving computing the corrected measurement by subtracting a bias value, comprised in the model, from the measurement of affective response. Optionally, the bias value is indicative of a magnitude of an expected impact of a certain factor on a value of a measurement corresponding to the event, and the certain factor is indicative of the certain environmental condition prevailing during the instantiation of the event.

In another embodiment, the model is a model for an Emotional Response Predictor (ERP) trained based on the data (e.g., ERP model 719). Optionally, the method includes the following steps involved in computing the corrected measurement: (i) receiving factors characterizing the event and generating first and second sets of feature values based on the factors characterizing the event; the first set of feature values is determined based on the factors, and the second set of feature values is determined based on a modified version of the factors, in which the weight of a certain factor is reduced; the certain factor is indicative of the certain environmental condition prevailing during the instantiation of the event; (ii) utilizing the model to make first and second predictions for first and a second samples comprising the first and second sets of features values, respectively; each of the first and second predictions comprises an affective value representing expected affective response of the user; and (iii) computing the corrected measurement by subtracting from the measurement a value proportional to a difference between the second prediction and the first prediction.

Figure 9:
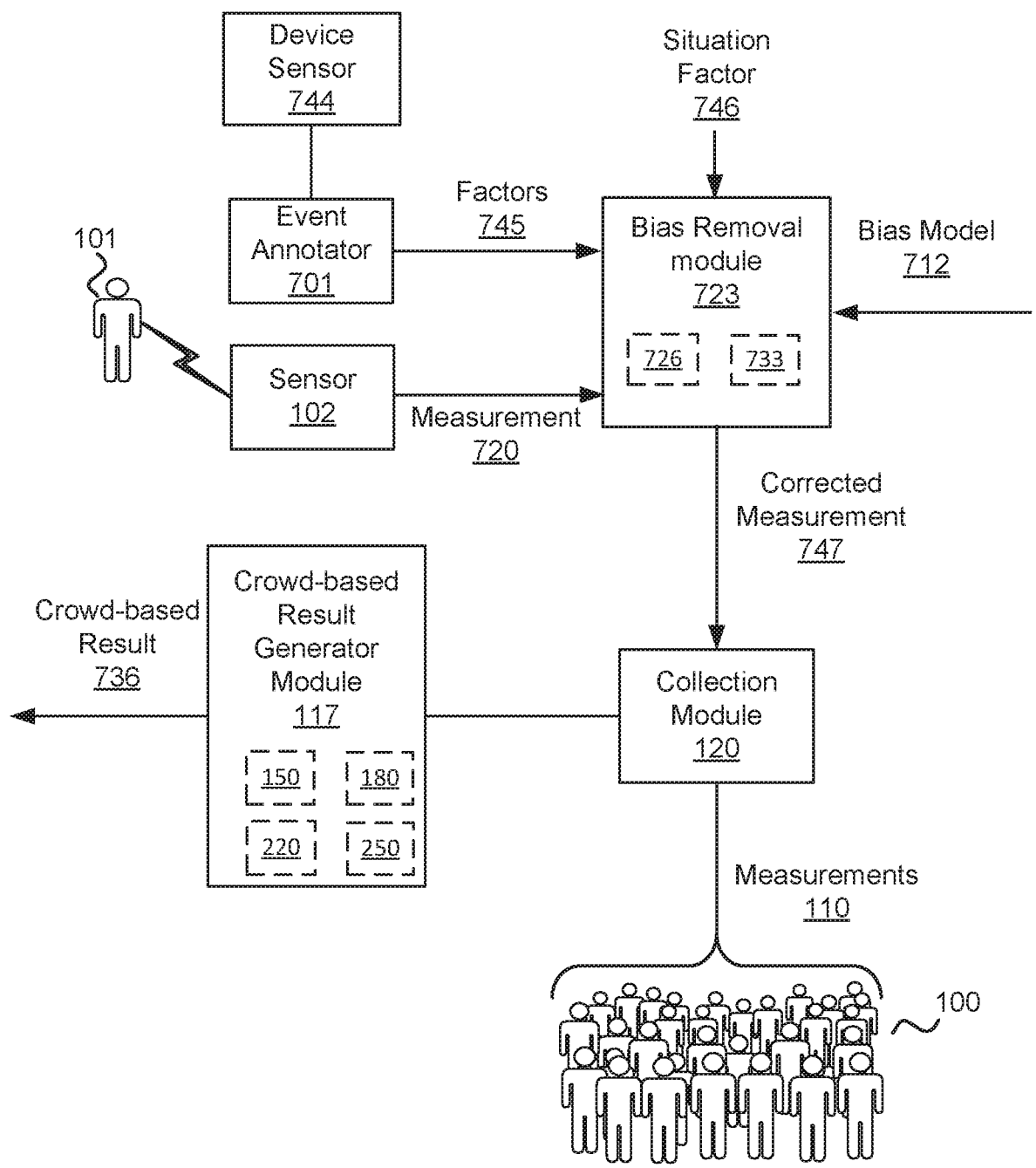
FIG. 9 illustrates a system configured to correct a bias towards a companion to an experience.

FIG. 9 illustrates one embodiment of a system configured to correct a bias towards a companion to an experience. For example, the companion may be a person with which the user 101 has an experience. The system includes at least the event annotator 701 and the bias removal module 723.

In one embodiment, a description of the event to which the measurement 720 corresponds, generated by the event annotator 701, is indicative of factors 745. In this embodiment, the factors 745 include at least one factor that indicates with whom the user corresponding to the event had the experience corresponding to the event. Optionally, the factors 745 include at least one factor that indicates that the user corresponding to the event had the experience corresponding to the event alone.

In one embodiment, the experience corresponding to the event involves at least one of the following experiences: eating in a restaurant, exercising, watching a movie, going to a bar, playing a computer game, and going shopping at a mall. In other embodiments, the experience may involve any of the experiences described in section 3—Experiences.

In one embodiment, the event annotator 701 may receive information from device sensor 744.

Optionally, the device sensor 744 is not the sensor 102, which is used to take the measurement 720. Optionally, the device sensor 744 provides images and/or sound that may be utilized to identify people in the vicinity of the user. Optionally, the device sensor 744 detects devices in the vicinity of the user 101 based on the transmissions of the devices (e.g., Wi-Fi or Bluetooth transmissions). By identifying which devices are in the vicinity of the user 101, the event annotator 701 may determine who had the experience with a user during the instantiation of the event.

The bias removal module 723 is configured, in one embodiment, to receive the measurement 720 of affective response corresponding to the event, and to determine whether the description of the event, generated by the event annotator 701, indicates that the instantiation of the event involves the user having the experience along with a certain person. Optionally, the bias removal module 723 receives an indication of situation factor 746, which corresponds to the certain person (e.g., the situation factor identifies the certain person). Responsive to determining, based on the description of the event, that the user 101 had the experience corresponding to the event along with the certain person, the bias removal module 723 computes corrected measurement 747. Optionally, the corrected measurement 747 reflects a correction, at least to a certain extent, of a bias of the user 101 towards the certain person. Optionally, the value of the corrected measurement 747 is different from the value of the measurement 720.

In one embodiment, the bias model 712 utilized by the bias removal module 723 is trained on certain data comprising: measurements of affective response corresponding to events involving having experiences with the certain person, and measurements of affective response corresponding to events involving having experiences without the certain person. Optionally, at least some of the measurements are measurements of affective response of the user 101.

It is to be noted that not all the events, to which the measurements in the certain data correspond, necessarily involve the user corresponding to the event having an experience with the certain person. In one example, the certain data used to train the bias model 712 comprises: (i) measurements of affective response corresponding to first and second events that involve a certain experience, and (ii) descriptions of the first and second events. In this example, the description of the first event indicates that the user corresponding to the first event had the experience with the certain person, and the description of the second event does not indicate that the user corresponding to the second event had the experience with the certain person.

In one embodiment, the bias removal module 723 is configured to determine whether the description of the event indicates that the user 101 had the experience alone, and responsive to the description indicating thereof, to compute a corrected measurement. Optionally, the corrected measurement is obtained by modifying the value of the measurement 720 with respect to a bias of the user towards having the experience alone. Optionally, the bias model 712 in this embodiment is trained on data comprising: measurements of affective response corresponding to events involving having experiences alone, and measurements of affective response corresponding to events involving having experiences along with other people.

Following is a description of steps that may be performed in a method for correcting a bias towards a companion to an experience. The steps described below may, in some embodiments, be part of the steps performed by an embodiment of a system described above, modeled according to FIG. 9. In some embodiments, instructions for implementing the methods described below may be stored on a computer-readable medium, which may optionally be a non-transitory computer-readable medium. In response to execution by a system including a processor and memory, the instructions cause the system to perform operations that are part of the method. Optionally the method described below may be executed by a computer system comprising a processor and memory, such as the computer illustrated in FIG. 27.

In one embodiment, the method for correcting a bias towards a companion to an experience includes at least the following steps:

In Step 1, generating, by a system comprising a processor and memory, a description of an event involving the user having an experience; the description is indicative of factors characterizing the event, which comprise at least one factor indicating with whom the user had the experience. Optionally, the description is generated by the event annotator 701.

In Step 2, receiving a measurement of affective response corresponding to the event, taken with a sensor coupled to the user. Optionally, the measurement is the measurement 720 of the user 101, and is taken utilizing the sensor 102.

In Step 3, determining whether the description of the event indicates that the user had the experience along with a certain person. Optionally, the situation factor 746 is indicative of the certain person.

And in Step 4, responsive to the description indicating thereof, computing a corrected measurement by modifying the value of the received measurement, with respect to a bias of the user towards the certain person. Optionally, the value of the corrected measurement is different from the value of the received measurement.

In one embodiment, the method may include an optional step involving utilizing a model for computing the corrected measurement. Optionally, the model is the bias model 712. Optionally, the model is trained on data comprising: measurements of affective response corresponding to events involving having experiences with the certain person, and measurements of affective response corresponding to events involving having experiences without the certain person. As described above, depending on whether the model includes bias values or a model of an ERP, various additional steps may be involved in computing the corrected measurement utilizing the model.

Figure 10:
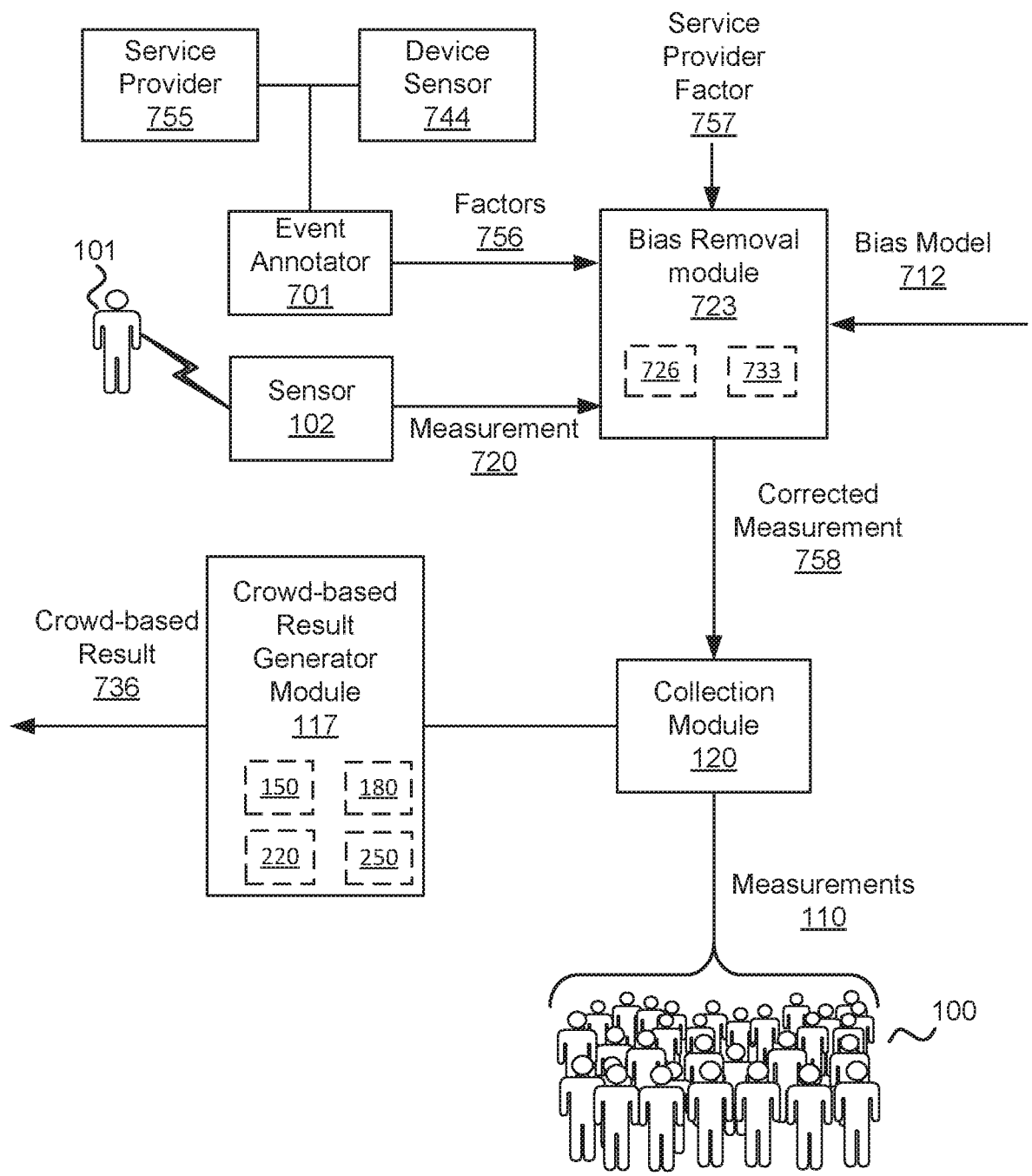
FIG. 10 illustrates a system configured to correct a bias of a user towards a characteristic of a service provider.

FIG. 10 illustrates one embodiment of a system configured to correct a bias of a user towards a characteristic of a service provider. The system includes at least the event annotator 701 and the bias removal module 723.

In one embodiment, a description of the event to which the measurement 720 corresponds, generated by the event annotator 701, is indicative of factors 756. In this embodiment, the event involves the user 101 having an experience that involves receiving a service from a service provider. Optionally, the factors 756 include at least one factor that is indicative of a characteristic of the service provider.

There are various types of service providers and characteristics to which users may have bias. In one example, the service provider is a robotic service provider, and the characteristic relates to at least one of the following aspects: a type of the robotic service provider, a behavior of the robotic service provider, and a degree of similarity of the robotic service provider to a human. In another example, the service provider is a person, and the characteristic corresponds to at least one of the following properties: gender, age, ethnicity, religious affiliation, sexual orientation, occupation, spoken language, and education. In yet another example, the service provider is a person, and the characteristic corresponds to at least one of the following properties: the person's height, the person's weight, the person's attractiveness, the person's build, hair style, clothing style, and eye color.

In one embodiment, the event annotator 701 may receive information from device sensor 744. Optionally, the device sensor 744 is not the sensor 102, which is used to take the measurement 720 of affective response. Optionally, the device sensor 744 provides images and/or sound that may be utilized to identify the service provider and/or the characteristic of the service provider.

The bias removal module 723 is configured, in one embodiment, to receive the measurement 720 of affective response corresponding to the event, and to determine whether the description of the event, generated by the event annotator 701, indicates that, as part of the experience, the user 101 received a service from a service provider having the characteristic. Optionally, the bias removal module 723 receives an indication of service provider factor 757, which corresponds to the characteristic. Responsive to determining, based on the description of the event, that the user 101, as part of the experience corresponding to the event, received service from a service provider that has the characteristic, the bias removal module 723 computes corrected measurement 758. Optionally, the corrected measurement 758 reflects a correction, at least to a certain extent, of a bias of the user 101 towards the characteristic. Optionally, the value of the corrected measurement 758 is different from the value of the measurement 720.

In one embodiment, the bias model 712 utilized by the bias removal module 723 is trained on certain data comprising: measurements of affective response corresponding to events involving a service provider having the characteristic, and measurements of affective response corresponding to events that do not involve a service provider having the characteristic. Optionally, at least some of the measurements are measurements of affective response of the user 101.

It is to be noted that not all the events, to which the measurements in the certain data correspond, necessarily involve the user corresponding to the event receiving service from a service provider having the characteristic. In one example, the certain data used to train the bias model 712 comprises: (i) measurements of affective response corresponding to first and second events involving a certain experience in which the user receives a service from a service provider, and (ii) descriptions of the first and second events. In this example, the description of the first event indicates that the user corresponding to the first event received service from a service provider having the characteristic, and the description of the second event does not indicate that the user corresponding to the second event received service from a service provider having the characteristic.

Following is a description of steps that may be performed in a method for correcting a bias of a user towards a characteristic of a service provider. The steps described below may, in some embodiments, be part of the steps performed by an embodiment of a system described above, modeled according to FIG. 10. In some embodiments, instructions for implementing the methods described below may be stored on a computer-readable medium, which may optionally be a non-transitory computer-readable medium. In response to execution by a system including a processor and memory, the instructions cause the system to perform operations that are part of the method. Optionally the method described below may be executed by a computer system comprising a processor and memory, such as the computer illustrated in FIG. 27.

In one embodiment, the method for correcting a bias of a user towards a characteristic of a service provider includes at least the following steps:

In Step 1, generating, by a system comprising a processor and memory, a description of an event involving the user having an experience; the description is indicative of factors characterizing the event, which comprise at least one factor indicative of the service provider having the characteristic. Optionally, the description is generated by the event annotator 701.

In Step 2, receiving a measurement of affective response corresponding to the event, taken with a sensor coupled to the user. Optionally, the measurement is the measurement 720 of the user 101, and is taken utilizing the sensor 102.

In Step 3, determining whether the description of the event indicates that, as part of the experience, the user received a service from a service provider having the characteristic. Optionally, the service provider factor 757 is indicative of the characteristic.

And in Step 4, responsive to the description indicating thereof, computing a corrected measurement by modifying the value of the received measurement, with respect to a bias of the user towards the characteristic. Optionally, the value of the corrected measurement is different from the value of the received measurement.

In one embodiment, the method may include an optional step involving utilizing a model for computing the corrected measurement. Optionally, the model is the bias model 712. Optionally, the model is trained on data comprising: measurements of affective response corresponding to events involving a service provider having the characteristic, and measurements of affective response corresponding to events that do not involve a service provider having the characteristic. As described above, depending on whether the model includes bias values or a model of an ERP, various additional steps may be involved in computing the corrected measurement utilizing the model.

Figure 11:
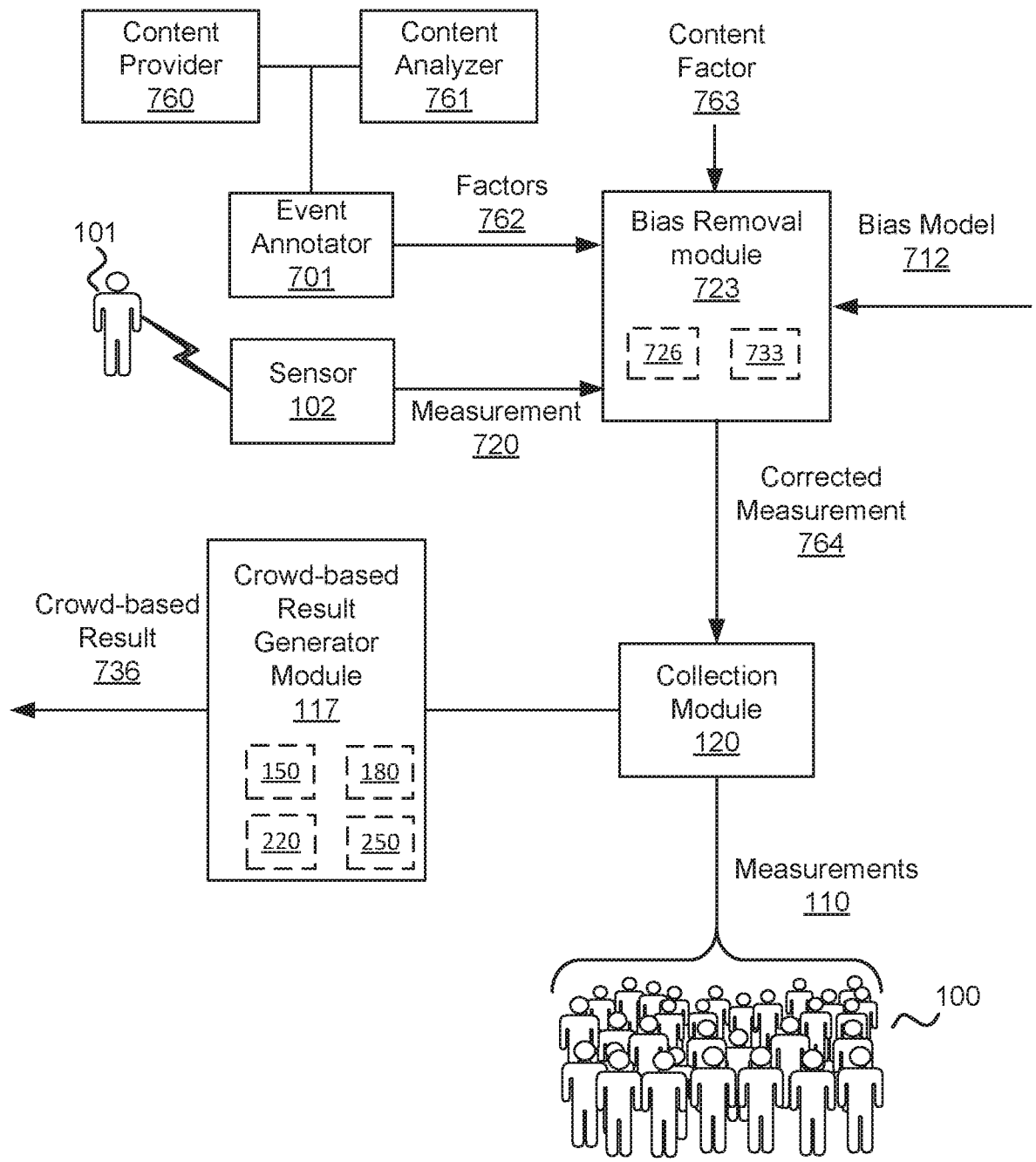
FIG. 11 illustrates a system configured to correct a bias of a user towards an element in content consumed by the user.

FIG. 11 illustrates one embodiment of a system configured to correct a bias of a user towards an element in content consumed by the user. The system includes at least the event annotator 701 and the bias removal module 723.

In one embodiment, a description of the event to which the measurement 720 corresponds, generated by the event annotator 701, is indicative of factors 762. In this embodiment, the event involves the user 101 consuming content. Optionally, the factors 762 include at least one factor that is indicative of an element in the content consumed by the user 101.

There are various forms of content which may be consumed by the user 101 in embodiments described herein. In one embodiment, the content is digital content comprises images presented via one or more of the following displays: a display for video images, an augmented reality display, a mixed reality display, and a virtual reality display. In another embodiment, the content comprises auditory content comprising one or more of the following: speech, music, and digital sound effects. Optionally, there may be various types of elements in the content, towards which the user 101 may have bias (which is to be corrected). In one example, the element, which corresponds to the bias that is to be corrected, relates to a genre of the content. Optionally, the genre involves depiction of at least one of the following in the content: violence, sexual acts, profanity, and sports activity. In another example, the element represents one of the following: a certain character, a character of a certain type. Optionally characters of a certain type are characterized as possessing at least one of the following characteristics in common: the same gender, the same ethnicity, the same age group, the same physical trait, the same type of being.

In one embodiment, the event annotator 701 may receive information from device sensor 744. Optionally, the device sensor 744 is not the sensor 102, which is used to take the measurement 720 of affective response. Optionally, the device sensor 744 provides images and/or sound that may be utilized to identify the element in the content consumed by the user 101.

In one embodiment, the event annotator 701 may receive information from content analyzer 761, which is configured to analyze the content in order to identify elements comprised in the content. Optionally, the content analyzer 761 may utilize various image analysis and/or semantic analysis techniques (examples of some of the techniques are mentioned in this disclosure in section 5—Identifying Events and section 12—Factors of Events).

The bias removal module 723 is configured, in one embodiment, to receive the measurement 720 of affective response corresponding to the event. The bias removal module 723 is also configured to determine whether the description of the event, generated by the event annotator 701, indicates that the content, consumed by the user 101, as part of the event, comprises the element. Optionally, the bias removal module 723 receives an indication of content factor 763, which corresponds to the element (e.g., it represents the element and/or provides information that may assist to ascertain if certain content comprises the element). Responsive to determining, based on the description of the event, the content comprises the element, the bias removal module 723 computes corrected measurement 764. Optionally, the corrected measurement 764 reflects a correction, at least to a certain extent, of a bias of the user 101 towards the element. Optionally, the value of the corrected measurement 764 is different from the value of the measurement 720.

In one embodiment, the bias model 712 utilized by the bias removal module 723 is trained on certain data comprising: measurements of affective response corresponding to events involving consumption of content that comprises the element, and measurements of affective response corresponding to events involving consumption of content that does not comprise the element. Optionally, at least some of the measurements are measurements of affective response of the user 101.

It is to be noted that not all the events, to which the measurements in the certain data correspond, necessarily involve the user corresponding to the event consuming content comprising the element. In one example, the certain data used to train the bias model 712 comprises: (i) measurements of affective response corresponding to first and second events involving consumption of content, and (ii) descriptions of the first and second events. In this example, the description of the first event indicates that the user corresponding to the first event consumed content comprising the element, and the description of the second event does not indicate that the user corresponding to the second event consumed content comprising the element.

Following is a description of steps that may be performed in a method for correcting a bias of a user towards an element in content. The steps described below may, in some embodiments, be part of the steps performed by an embodiment of a system described above, modeled according to FIG. 10. In some embodiments, instructions for implementing the methods described below may be stored on a computer-readable medium, which may optionally be a non-transitory computer-readable medium. In response to execution by a system including a processor and memory, the instructions cause the system to perform operations that are part of the method. Optionally the method described below may be executed by a computer system comprising a processor and memory, such as the computer illustrated in FIG. 27.

In one embodiment, the method for correcting a bias of a user towards an element in content includes at least the following steps:

In Step 1, generating, by a system comprising a processor and memory, a description of an event involving the user having an experience; the description is indicative of factors characterizing the event, which comprise at least one factor indicative of the content comprising the element. Optionally, the description is generated by the event annotator 701.

In Step 2, receiving a measurement of affective response corresponding to the event, taken with a sensor coupled to the user. Optionally, the measurement is the measurement 720 of the user 101, and is taken utilizing the sensor 102.

In Step 3, determining whether the description of the event indicates that the content comprises the element. Optionally, the content factor 763 is indicative of the element.

And in Step 4, responsive to the description indicating thereof, computing a corrected measurement by modifying the value of the received measurement, with respect to a bias of the user towards the element. Optionally, the value of the corrected measurement is different from the value of the received measurement.

In one embodiment, the method may include an optional step involving utilizing a model for computing the corrected measurement. Optionally, the model is the bias model 712. Optionally, the model is trained on data comprising: measurements of affective response corresponding to events involving consumption of content that comprises the element, and measurements of affective response corresponding to events involving consumption of content that does not comprise the element. As described above, depending on whether the model includes bias values or a model of an ERP, various additional steps may be involved in computing the corrected measurement utilizing the model.

When a score for an experience is computed based on measurements of multiple users, it likely reflects properties that correspond to the quality of the experience as perceived by the multiple users. Additionally, the measurements may reflect various biases of the users who contributed measurements to the score, which may not be desired to be reflected in the score. Thus, in some embodiments, certain biases may be corrected in the measurements and/or when the score is computed, in order to obtain a more accurate score.

Figure 12:
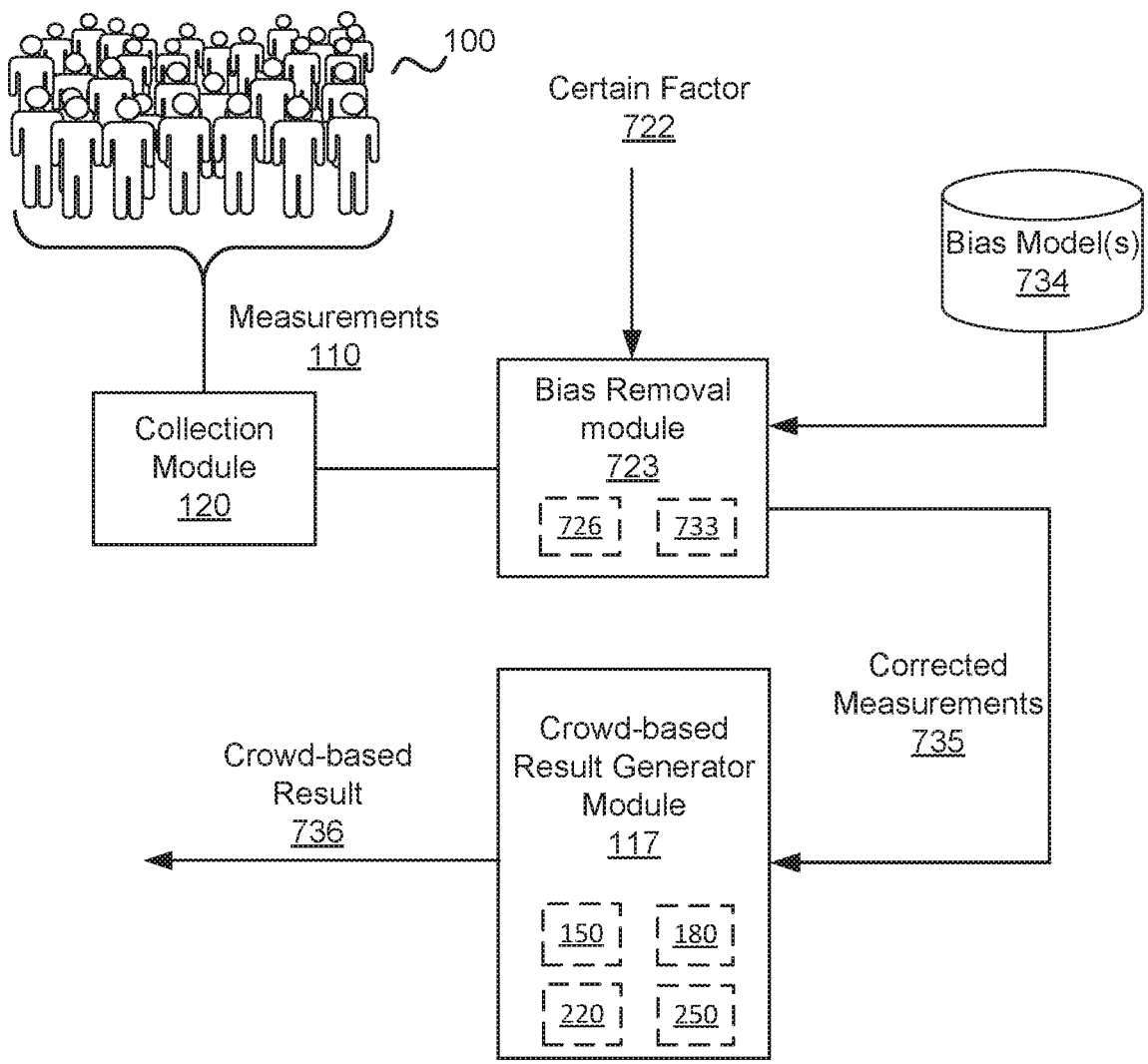
FIG. 12 illustrates a system configured to compute a crowd-based result based on measurements of affective response that are corrected with respect to a bias.

FIG. 12 illustrates one embodiment of a system configured to compute a crowd-based result based on measurements of affective response that are corrected with respect to a bias. The system includes at least the collection module 120, the bias removal module 130, and the crowd-based result generator module 117.

The collection module 120 is configured to receive measurements 110, which comprise measurements of affective response of at least five users. Optionally, each measurement of a user, from among the measurements of the at least five users, corresponds to an event in which the user has an experience, and is taken with a sensor coupled to the user. For example, the sensor may be the sensor 102.

It is to be noted that some embodiments of the system illustrated in FIG. 12 may include one or more sensors that are used to obtain the measurements 110 of affective response, such as one or more units of the sensor 102.

The bias removal module 723 is configured, in this embodiment, to receive an indication of the certain factor 722 corresponding to a bias to be corrected in a measurement corresponding to the event. Optionally, the certain factor 722 corresponds to at least one of the following: the user corresponding to the event, the experience corresponding to the event, and the instantiation of the event. Examples of the certain factor 722 may include the various factors mentioned in this disclosure as factors corresponding to bias that is to be corrected by the bias removal module 723, such as the environmental factor 740, the situation factor 746, the service provider factor 757, and/or the content factor 763.

The bias removal module 723 is also configured to compute, for each measurement from among the measurements of the at least five users, a corrected measurement by modifying the value of the measurement based on at least some values in a model. Optionally, to compute the corrected measurements for the at least five users (corrected measurements 735 in FIG. 12), the bias removal module 723 utilizes descriptions of the events to which the measurements of the at least five users correspond, which are generated by the event annotator 701. Optionally, each of the measurements of the at least five users is corrected, at least to a certain extent, with respect to the bias corresponding to the certain factor 722. Thus, the corrected measurements 735 are not identical to the measurements of affective response of the at least five users.

In one embodiment, the model utilized by the bias removal module 723 is trained based on data comprising measurements of affective response corresponding to events involving various experiences and descriptions of the events. In one example, the model may be the bias model 712. In another example, the model may be selected from one or more bias models 734. Optionally, the bias models belong to a database of bias models corresponding to the users belonging to the crowd 100 (e.g., they were trained on measurements of the users belonging to the crowd 100).

In one embodiment, when correcting a measurement of affective response of a certain user with respect to a bias corresponding to the certain factor 722, the bias removal module 723 utilizes a model from among the bias models 734, which corresponds to the certain user. For example, the model may be trained on data corresponding to a set of events, each of which involves the certain user having an experience. In this example, the data may include descriptions of events belonging to the set and measurements corresponding to the set.

The indication of the certain factor 722 may originate from various sources. In one example, the certain factor 722 is received from one of the users who provide the measurements 110, e.g., as an indication sent by a software agent operating on behalf of one of the users. In another example, the certain factor 722 is received from the collection module 120. And in yet another example, the certain factor 722 is received from the crowd-based result generator module 117.

There may be different implementations for the bias removal module 723 that may be used to compute the corrected measurements 735. In one embodiment, the bias removal module 723 comprises the bias subtractor module 726, which is described in more detail above (e.g., in the discussion regarding FIG. 5). In this embodiment, the bias model utilized by the bias removal module 723 may include bias values. In another embodiment, the bias removal module 723 comprises the ERP-BCM 733. In this embodiment, the bias model utilized by the bias removal module 723 may include one or more models for an ERP.

The crowd-based result generator module 117 is configured to compute crowd-based result 736 based on the corrected measurements 735. The crowd-based result generator module 117, may generate various types of crowd-based results that are mentioned in this disclosure. To this end, the crowd-based result generator module 117 may comprise and/or utilize various modules described in this disclosure. In one example, the crowd-based result 736 is a score for an experience, such as a score computed by the scoring module 150 or the dynamic scoring module 180. In another example, the crowd-based result 736 is a ranking of a plurality of experiences computed by the ranking module 220 or the dynamic ranking module 250.

Due to the correction of the bias corresponding to the certain factor 722, in some embodiments, the crowd-based result 736 is expected to be more accurate than the equivalent result computed based on the (uncorrected) measurements of the at least five users. This is because, the crowd-based result 736 may be assumed to be a more objective value of the quality of the experiences the at least five users had than the uncorrected measurements, and due to the correction, less of a reflection of biases the at least five users have.

Correction of biases need not be applied in all cases. In some embodiments, the requirement to correct biases in measurements of affective response used to compute a score, or some other crowd-based result, depends on the number n of different users whose measurements are used to compute the score. In one example, when n is below a threshold, most of the measurements are corrected with respect to at least one bias, and when n is not below the threshold, most of the measurements are not corrected with respect to any bias. In another example, when n is below a threshold, all of the measurements are corrected with respect to at least one bias, and when n is not below the threshold, none of the measurements are corrected with respect to any bias. The value of the threshold may vary between different embodiments. For example, in different embodiments, the threshold may be at least 3, 10, 25, 100, 1000, 10000, or more.

It is to be noted that correcting biases is typically more important in cases where the number of measurements used to compute a score, or some other crowd-based result, is small. However, in embodiments where a score is computed based on measurements of a large number of users, the sum effect of the biases may be assumed to be a negligible factor. This may be because if the score is computed based on a large number of users (e.g., one thousand users), it is less likely for the users to have a distribution of biases that significantly deviates from the population norm. For example, a likely scenario would be that some users have positive biases related to some factors, while other users will have more negative biases; so due to the large numbers, the effect of the biases on which a population may differ is likely to be mostly canceled out. The canceling out of biases is true for measurements of a random set of users, such that the measurements are assumed to be independent of each other. However, if the measurements are not independent but have correlations, e.g., because the users all belong to a same group of users with a certain bias, then correction of biases may be advisable in some embodiments, even when computing scores from measurements of a large number of users. In some embodiments, a large number of users may correspond to at least 5 users, while in others a "large" number of users may need to be at least 10, 25, 100, 1000, 10000, or more.

An alternative to correction of biases in measurements of affective response, which may be utilized in some embodiments, is filtration of the measurements in order to remove measurements that likely contain an unwanted bias. After the filtration, the remaining measurements may be utilized for various purposes, such as computing a crowd-based result.

Figure 13:
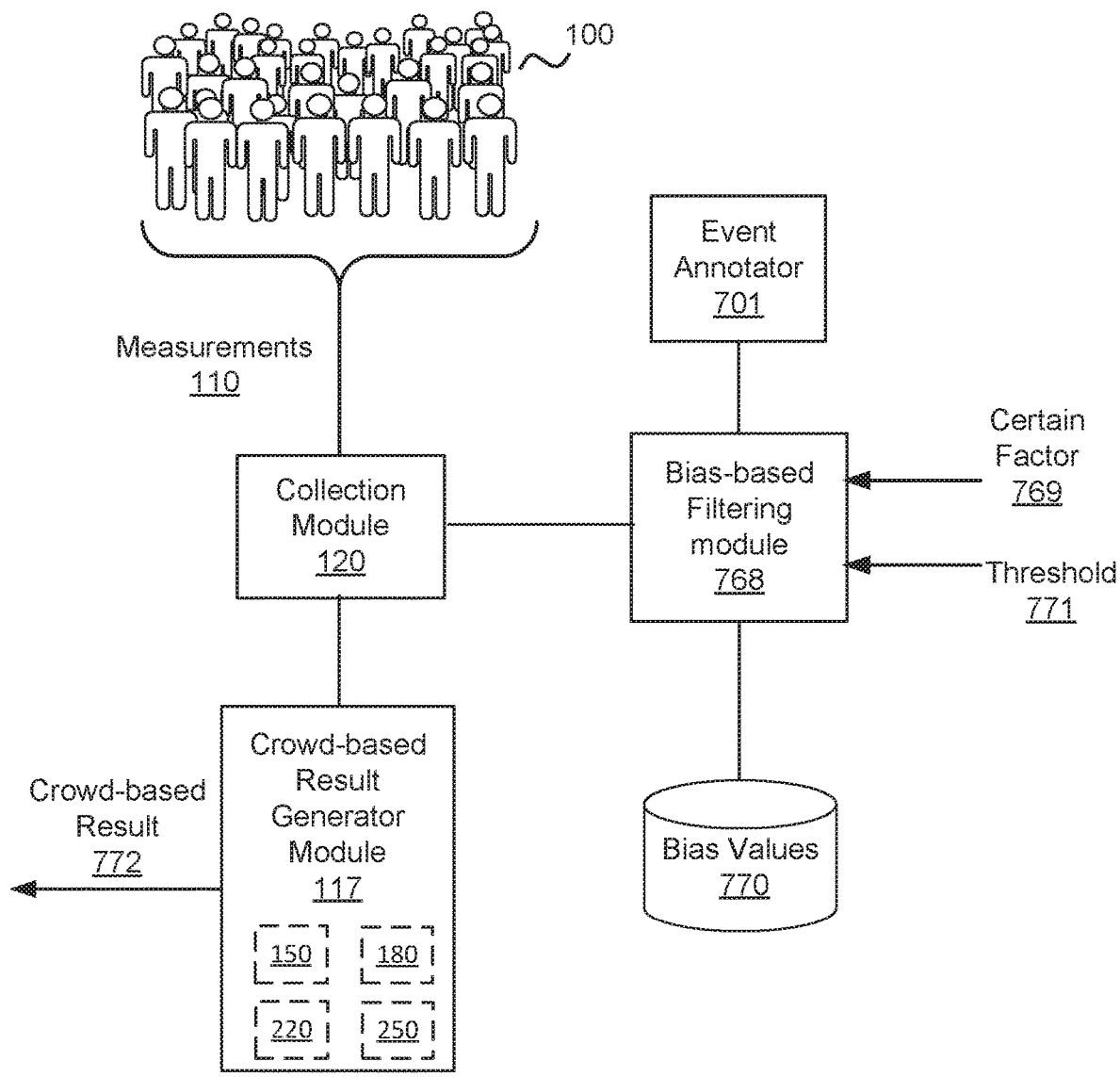
FIG. 13 illustrates a system configured to filter measurements that contain bias to a certain factor.

FIG. 13 illustrates one embodiment of a system configured to filter measurements that contain bias to a certain factor. The system includes at least the collection module 120, the event annotator 701, and bias-based filtering module 768.

It is to be noted that some embodiments of the system illustrated in FIG. 13 may include one or more sensors that are used to obtain the measurements 110 of affective response, such as one or more units of the sensor 102.

The collection module 120 is configured, in one embodiment, to receive the measurements 110 of affective response, which in this embodiment comprise measurements of at least eight users. Each measurement of a user, from among the measurements of the at least eight users, corresponds to an event in which the user (referred to as the user corresponding to the event) had an experience (referred to as the experience corresponding to the event). Optionally, the measurement is taken utilizing a sensor coupled to the user, such as the sensor 102, during the instantiation of the event or shortly thereafter. Additional information regarding sensor and measurements of affective response may be found at least in section 1—Sensors and section 2—Measurements of Affective Response.

The event annotator 701 is configured, in this embodiment, to generate descriptions of the events to which the measurements of the at least eight users correspond. Optionally, the description of each event is indicative of factors that characterize the event, and each factor corresponds to at least one of the following: the user corresponding to the event, the experience corresponding to the event, and the instantiation of the event. Optionally, the event annotator 701 used to create a description of an event is a module utilized by, or is part of, a software agent operating on behalf of the user.

The bias-based filtering module 768 is configured to create a subset of the measurements by excluding at least some of the measurements of the at least eight users from the subset. Optionally, the excluded measurements are measurements for which it is determined that the bias corresponding to a certain factor (the certain factor 769 in FIG. 13) reaches a threshold 771. That is, for each excluded measurement the following is true: (i) a description, generated by the event annotator 701, of a certain event, to which the excluded measurement corresponds, indicates that the certain factor 769 characterizes the certain event, and (ii) a bias value, representing the bias of the user corresponding to the certain event towards the certain factor 769, reaches the threshold 771. Optionally, the bias value, representing the bias of the user corresponding to the certain event towards the certain factor 769, is received from a repository comprising bias models 770, which holds the bias values of each of the at least eight users. Optionally, the bias value, representing the bias of the user corresponding to the certain event towards the certain factor 769, is received from a software agent operating on behalf of the user, which has access to a model comprising bias values of the user and/or a model for an ERP that may be utilized to compute the bias value.

In one embodiment, factors of the certain event may have corresponding weights indicative of their expected dominance and/or impact on the affective response of the user corresponding to the certain event. In such a case, a measurement may be filtered based on the expected (weighted) impact of the certain factor 769. That is, the measurement corresponding to the certain event is excluded from the subset if the product of the weight of the certain factor 769, as indicated in a description of the certain event, and a bias value corresponding to the certain factor 769, reaches the threshold 771.

In one embodiment, the bias value, representing the bias of the user corresponding to the event towards the certain factor 769, is computed based on measurements of affective response of the user corresponding to the event. For example, the bias value may be taken from a model comprising bias values of the user, such as the bias values 715. To obtain the bias values 715, in one embodiment, the sample generator 705 is utilized to generate samples based on data comprising: (i) measurements of affective response corresponding to events that are characterized by the certain factor 769, and (ii) descriptions of the events. The sample generator 705 may generate, based on the data, samples corresponding to the events. Optionally, each sample corresponding to an event comprises: feature values determined based on the description of the event, and a label determined based on a measurement corresponding to the event. The bias value learner 714 may utilize the samples to learn bias values that comprise the bias value corresponding to the certain factor 769.

In another embodiment, the bias value corresponding to the certain factor 769 is obtained utilizing an ERP-based approach. The feature generator 706 receives factors characterizing an event, which are determined based on a description of the event. The feature generator 706 generates first and second sets of feature values, where the first set of feature values is determined based on the factors, and the second set of feature values is determined based on a modified version of the factors, in which the weight of the certain factor 769 is reduced. The ERP 731 receives a model and utilizes the model to make first and second predictions for first and a second samples comprising the first and second sets of features values, respectively. Optionally, each of the first and second predictions comprises an affective value representing expected affective response. The bias value corresponding to the certain factor 769 is set to a value that is proportional to a difference between the second prediction and the first prediction (e.g., it may be the difference itself and/or the difference normalized based on the weight of the certain factor 769 indicated in the description of the event). Optionally, the model utilized to obtain a bias value of a certain user is trained on data comprising measurements of affective response of the certain user, and at least some of those measurements correspond to events that are characterized by the certain factor 769.

The certain factor 769 may correspond to one or more aspects of an event, such as the user corresponding to the event, the experience corresponding to the event, and the instantiation of the event. Examples of the certain factor 769 may include the various factors mentioned in this disclosure as factors corresponding to bias that is to be corrected by the bias removal module 723, such as the environmental factor 740, the situation factor 746, the service provider factor 757, and/or the content factor 763.

The indication of the certain factor 769 and/or the threshold 771 may be received by various entities. In one embodiment, the indication and/or the threshold 771 are sent by the collection module 120. In another embodiment, the indication and/or the threshold 771 are sent by a user from among the at least eight users. For example the indication and/or the threshold 771 may be sent by a software agent operating on behalf of the user. In still another embodiment, the indication and/or the threshold 771 may be sent by an entity that receives and/or computes the crowd-based result 772.

In some embodiments, the threshold 771 is computed based on bias values of users, which correspond to the certain factor 769. Optionally, the threshold 771 is greater than the median of the bias values which correspond to the certain factor 769.

The crowd-based result generator module 117 is configured to compute crowd-based result 772 based on the subset of the measurements. The subset, includes some, but not all, of the measurements of the at least eight users. Optionally, the subset includes measurements of at least five, of the at least eight users. Optionally, the crowd-based result 772 is a score computed for an experience, a ranking of a plurality of experiences, or some other result computed based on the subset of the measurements.

Following is a descriptions of steps that may be performed in a method for filtering measurements that contain bias to a certain factor. The steps described below may, in some embodiments, be part of the steps performed by an embodiment of a system described above, such as a system modeled according to FIG. 13. In some embodiments, instructions for implementing one or more of the methods described below may be stored on a computer-readable medium, which may optionally be a non-transitory computer-readable medium. In response to execution by a system including a processor and memory, the instructions cause the system to perform operations that are part of the method. Optionally, each of the methods described below may be executed by a computer system comprising a processor and memory, such as the computer illustrated in FIG. 27.

In one embodiment, the method for filtering measurements that contain bias to a certain factor includes at least the following steps:

In Step 1, receiving, by a system comprising a processor and memory, measurements of affective response of at least eight users; each of the measurements corresponds to an event in which a user corresponding to the event has an experience corresponding to the event.

In Step 2, generating descriptions of events to which the measurements correspond. Optionally, the descriptions are generated by the event annotator 701. Optionally, a description of an event comprises factors that characterize the event, and each factor corresponds to at least one of the following: the user corresponding to the event, the experience corresponding to the event, and the instantiation of the event.

In Step 3, creating a subset of the measurements by excluding at least some of the measurements; for each excluded measurement: (i) the description of the certain event, to which the excluded measurement corresponds, indicates that the certain factor characterizes the certain event, and (ii) a bias value, representing the bias of the user corresponding to the certain event towards the certain factor, reaches a threshold.

And in Step 4, computing a crowd-based result based on the subset of the measurements. In Step 3, at least some of the measurements are filtered, thus, the subset comprises measurements of at least five users, but not all of the measurements of the at least eight users. Optionally, the crowd-based result is computed by the crowd-based result generator module 117.

In one embodiment, the method described above may optionally include a step involving taking the measurements of affective response in Step 1 with sensors. Optionally, each measurement corresponding to an event is indicative of at least one of the following values: a value of a physiological signal of the user corresponding to the event, and a value of a behavioral cue of the user corresponding to the event.

In one embodiment, the method described above may optionally include a step involving computing the threshold based on bias values of the different users, which correspond to the certain factor. Optionally, the threshold is greater than the median of the bias values corresponding to the certain factor.

The following is an overview of the risk to the privacy of users that may result from disclosing measurements of affective response and/or contributing the measurements to the computation of crowd-based results that are disclosed. A more comprehensive discussion of these issues may be found in section 15—Overview of Risk to Privacy.

Various embodiments described herein involve the collection of large amounts of measurements of affective response. Some embodiments may involve the collection of data from dozens, hundreds, thousands, and even millions of users. Additionally, due to the pervasiveness of sensors in our daily lives (e.g., in wearables, gadgets, and implants), this data may be collected many times during the day and/or with respect to a large number of experiences. Thus, processing affective response data is well within the realm of "big data" analysis (which involves analysis of large-scale datasets). Gaining access to measurements of affective response along with data about the event corresponding to the measurements can yield, using various big data analysis approaches, a vast amount of insight into various attitudes, preferences, inclinations, and biases users may have at various times and/or towards a vast number of different experiences and/or issues. For example, by obtaining both measurements of affective response of a user and descriptions of events to which those measurements correspond, it is possible to learn various models of the user's bias (e.g., a model comprising bias values and/or a model for an ERP).

In order to maintain privacy a user may agree to contribute measurements to computation of a crowd-based result (e.g., a score for an experience). Such a result is typically an "aggregate" result, involving measurements of multiple users. Though it may seem that such a contribution is not risky, there are many real-world scenarios in which repeated contributions of measurements to computation of crowd-based results can enable extensive modeling of users. Various embodiments described herein involve assessing and/or preventing such risks.

As used herein "risk" and "risk to the privacy" refers to gain in information that an adversary may achieve from receiving the values of measurements of affective response and/or scores for experiences computed based on those measurements. It is assumed that a recipient of the measurements and/or the scores being disclosed may be able to obtain certain information regarding the users of whom the measurements were taken and/or information regarding the events to which the measurements correspond (e.g., factors of the events). Such information may be gained from various sources such as cameras on devices and/or CCTV, digital signals emitted by devices carried by users, and/or various accounts and transaction histories (credit cards, internet traffic, etc.). Furthermore, many of the experiences uses have these days are digital and/or in a digital environment, thus a provider of such experiences may often have detailed information of factors corresponding to events in these domains. Often users do not know who is collecting data about their whereabouts, what data is collected, and/or how it is being shared. Additionally, users often do not even have full control over the information they or their devices provide to the outside world. Thus, a prudent precaution is to assume that third parties can gain information about users, their whereabouts, and the experiences they have. This information may be used to identify the users who contributed measurements of affective response to a computation of a score for an experience. Therefore, assessment of the potential risk involved in releasing of even aggregate results, such as scores for experiences, may be required in order to preserve user privacy and reduce the risk that inferences, which are possibly undesired and/or unintended, are made from their measurements of affective response.

Herein, the term "adversary" is used to describe any entity (human or non-human) that may possibly attempt to learn information about users and/or experiences based on one or more disclosed scores. It is to be noted that the use of the term "adversary" herein does not necessarily mean that the entity that is the adversary has malevolent motives and/or acts in an unlawful and/or unauthorized way.

In some embodiments, it is assumed that an adversary may be training a model of one or more users (e.g., a model comprising bias values). This model may be trained using various sources of data. Repeat disclosure of measurements of a user and/or scores computed based on the measurements may improve the model. In such a case, the risk to the privacy of the one or more users relates to a measure of the improvement of such a model after a disclosure (e.g., a disclosure of one or more scores and/or one or more measurements). This improvement may be evaluated in various ways, as the examples below illustrate.

In one example, the risk may refer to the likely accuracy (and/or increase in accuracy) of parameters in an adversary's model of one or more users after the model is learned or updated according to the disclosure. Optionally, the accuracy is determined by comparing likely values of parameters in a model with ground truth values (e.g., values from a model trained on measurements of affective response and not only on their proxies—the scores). Optionally, the ground truth model is trained by an entity that has more complete information than an adversary. For example, a software agent operating on behalf of a user may hold more information about factors of events and/or the measurements corresponding to the events. Thus, in this example, a software agent may be able to have a more accurate model of the user, to which a model of an adversary may be compared.

In another example, the risk may refer to the predictive power (and/or increase in the predictive power) of a predictor that predicts scores for an experience utilizing a model trained and/or updated based on the disclosure.

In yet another example, the risk may refer to the amount of information in a model trained or updated based on the disclosed score (e.g., the risk may correspond to lost entropy due to incorporating the disclosed scores into a model).

In some embodiments, the risk may be expressed as probabilities and/or distributions. For example, a function may return a value corresponding to the probability that a certain value related to risk (e.g., accuracy of parameters, predictive power, or information, described above) is below a certain value.

One aspect of the risk due to disclosure of measurements of affective response, and/or scores computed based on the measurements, is that the disclosure may enable an adversary to learn biases of the users related to the disclosure. One type of factor that is at risk of being learned is a factor corresponding to the experience. Disclosure of multiple measurements and/or scores (or even a single measurement or score) related to a certain experience can help an adversary learn a user's bias towards the certain experience (i.e., what is the user's "personal score" towards the certain experience). However, other factors related to the disclosure may also be learned, such as attitudes of the user towards various environments, people, and even ideas. The more disclosures a user makes, and the more detailed descriptions an adversary may gain about events, the more the adversary will be able to create a detailed and accurate model of the user's biases. The vast amount of data that may be collected about users, and the large number of measurements they may contribute, can pose a serious risk to their privacy if continuous disclosure is made without discretion.

Assessing the risk involved in a disclosure (e.g., of one or more scores) may be done in various ways. One approach is to maintain a model similar to the model of an adversary, and to evaluate how much that model is likely to improve due to the disclosure. Various aspects of this approach are described in sections 16—Independent Inference from Scores to 19—Assessing Risk based on an Adversary's Model. Another approach involves evaluating the disclosed information (and/or characteristics of the disclosed information) using a function that predicts risk. This approach is described in more detail in section 20—Risk Functions.

The risk to privacy due to a disclosure may also depend on how the disclosed information is used by an adversary. A disclosure of even a single score can help learn about the users who contributed measurements to the score, this type of analysis is outlined in section 16—Independent Inference from Scores. Collecting large amounts of data (e.g., multiple scores involving multiple users) can enable joint analysis (referred to as cumulative analysis) of multiple users and/or of multiple biases. This type of "big data" analysis may be more powerful, in some embodiments, then learning from individual scores and/or maintaining a model of an individual user. This type of analysis is discussed in more detail in section 18—Inference from Joint Analysis and in section 19—Assessing Risk based on an Adversary's Model.

Below are descriptions of various embodiments that may be used to assess the risk to privacy due to a disclosure (of measurements and/or scores). Additionally, some embodiments involve various ways in which assessment of the risk to privacy may be utilized in order to reduce the risk. Some embodiments reduce the risk to privacy by curbing the contribution of measurements and/or the disclosure of scores computed based on the measurements when such a contribution and/or disclosure is likely to pose an undesired risk to privacy.

Figure 14:
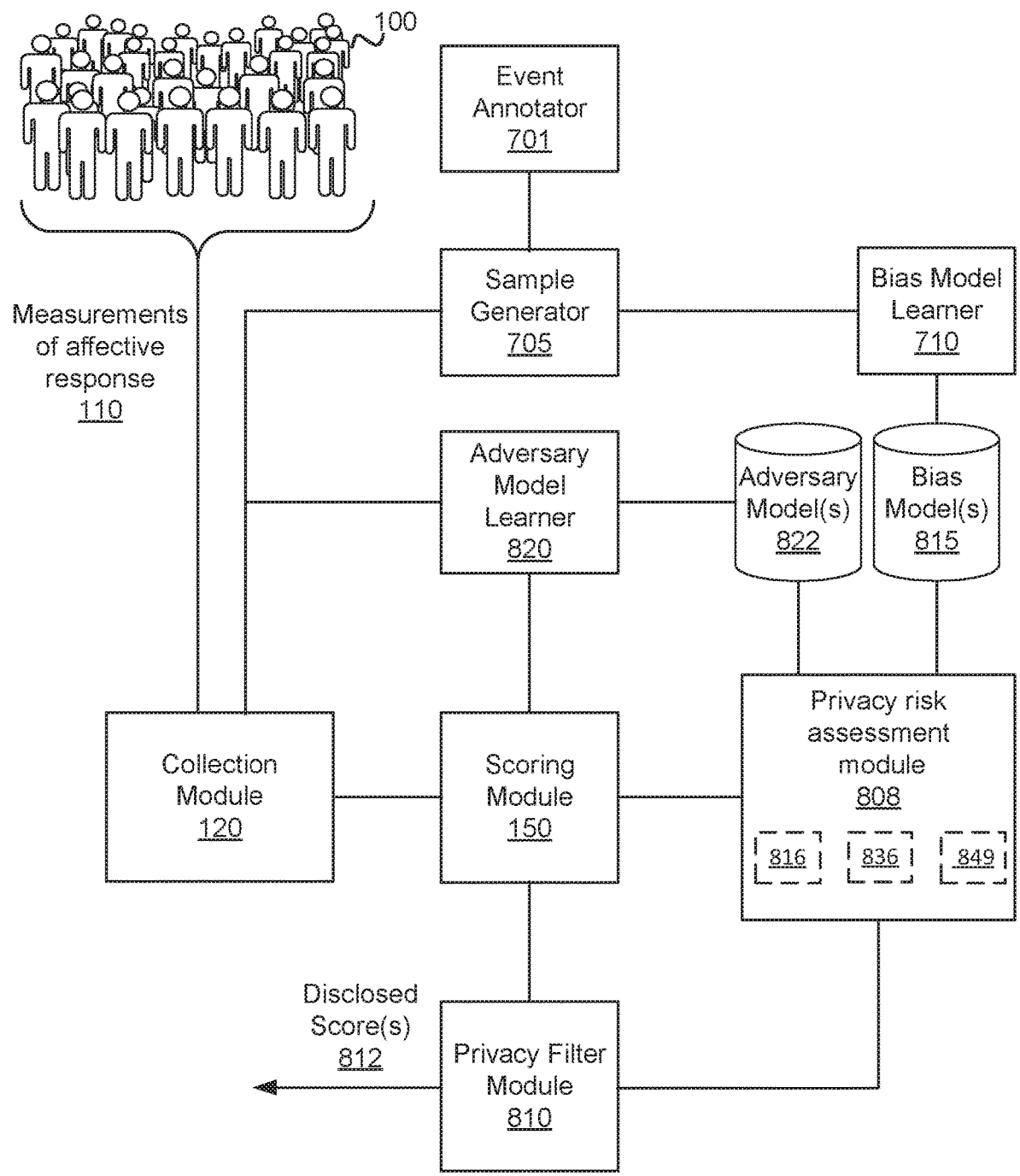
FIG. 14 illustrates a system configured to disclose scores in a manner that reduces risk to privacy of users who contributed measurements of affective response used to compute the scores.

FIG. 14 illustrates one embodiment of a system configured to disclose scores in a manner that reduces risk to privacy of users who contributed measurements of affective response used to compute the scores. The system includes at least the following modules: the collection module 120, the scoring module 150, privacy risk assessment module 808, and privacy filter module 810. The embodiment illustrated in FIG. 14, like other systems described in this disclosure, may be realized via a computer, such as the computer 400, which includes at least a memory 402 and a processor 401. The memory 402 stores computer executable modules described below, and the processor 401 executes the computer executable modules stored in the memory 402.

The collection module 120 is configured, in one embodiment, to receive measurements 110 of affective response of users belonging to the crowd 100. Optionally, each measurement of a user corresponds to an event in which the user had an experience, and the measurement is taken with a sensor coupled to the user (e.g., the sensor 102). Optionally, the measurement is taken while the user has the experience and/or shortly after that time. Additional details regarding sensors may be found at least in section 1—Sensors. Additional information regarding how the measurements 110, and/or other measurements mentioned in this disclosure, may be collected and/or processed may be found at least in section 2—Measurements of Affective Response.

It is to be noted that the experiences to which the embodiment illustrated in FIG. 14 relates, as well as other embodiments involving experiences in this disclosure, may be any experiences mentioned in this disclosure, or subset of experiences described in this disclosure, (e.g., one or more of the experiences mentioned in section 3—Experiences). In some embodiments, having an experience involves doing at least one of the following: spending time at a certain location, consuming certain digital content, having a social interaction with a certain entity in the physical world, having a social interaction with a certain entity in a virtual world, viewing a certain live performance, performing a certain exercise, traveling a certain route, and consuming a certain product.

The scoring module 150 is configured, in one embodiment, to compute scores for experiences. Optionally, each score for an experience is computed based on a subset of the measurements 110 comprising measurements of at least five of the users who had the experience. Optionally, the subset is received from the collection module 120. Various approaches to scoring may be utilized, as discussed in further detail at least in section 10—Scoring. In some embodiments, each score is an affective value that has a numerical value in a certain range (e.g., between 0 and 10).

The privacy risk assessment module 808 is configured, in one embodiment, to make a determination indicative of an expected risk to privacy due to a disclosure of one or more of the scores. Optionally, the determination is made after the scores are computed, and the determination is based on the values of the disclosed scores (as well as other attributes). Alternatively, the determination may be made prior to computation of the scores. Various ways in which the determination may be made are discussed in further detail below.

The privacy filter module 810 is configured to disclose the one or more scores in a manner that is based on the determination. Optionally, the manner belongs to a set comprising first and second manners. In one embodiment, responsive to the determination indicating that the risk does not reach a threshold, the one or more scores are disclosed in the first manner, and responsive to the determination indicating that the risk reaches the threshold, the one or more scores are disclosed in the second manner. Optionally, the second manner of disclosure is less descriptive than the first manner. Thus, the disclosure of the one or more scores in the second manner may be considered less risky to the privacy of at least some of the users who contributed measurements used to compute the one or more scores. Disclosure of the one or more scores in a less descriptive manner may be done in various ways in embodiments described herein.

Herein, a certain value, such as an extent of risk, "reaches" a threshold if the certain value equals or exceeds the value corresponding to the threshold (i.e., the value the threshold represents). Additionally, herein, a user who contributes a measurement to a score is a user whose measurement of affective response is used in the computation of the score. In addition, disclosure of a score involves revealing the value of the score, and/or a value related to the score, to an entity that did not have knowledge of the values of all of the measurements used to compute the score. Additional details regarding the meaning of contributing measurements and disclosing scores may be found in section 10—Scoring.

It is to be noted that some embodiments of the system illustrated in FIG. 14 may also include one or more sensors that are used to obtain the measurements 110 of affective response, such as one or more units of the sensor 102.

In one embodiment, when disclosing the one or more scores in the second manner, the privacy filter module does not provide data describing values of the one or more scores. Thus, in this embodiment, disclosure of a score in the second manner essentially amounts to not disclosing the score.

In another embodiment, when disclosing the one or more scores in the second manner, fewer values associated with the one or more scores are provided, compared to the number of values associated with the one or more scores that are provided when disclosing in the first manner. For example, disclosure of a score in the first manner may provide the numerical value of the score (e.g., on a scale of 1 to 10) along with additional values such as statistics (e.g., the number of contributing users or the variance of the measurements). When disclosing in the second manner, some of the aforementioned values, which are typically provided when disclosing in the first manner, are withheld. For example, disclosing a score in the second manner may involve providing only the numerical value of the score without additional information about the number of contributing users and/or the variance of the measurements.

In yet another embodiment, when disclosing the one or more scores in the second manner, less information describing the users who contributed measurements used to compute the one or more scores is provided, compared to the information provided about those users when disclosing in the first manner. For example, one or more of the following values corresponding to a score may be provided when disclosing it in the first manner: identifiers of users who contributed measurements to computing the score (e.g., their name, phone number, etc.), demographic values about the users (e.g., age, occupation, etc.), and/or statistics of the demographic information about the users (e.g., average age, gender breakdown, age breakdown, etc.) Optionally, at least some of the information described above, which is provided when a score is disclosed in the first manner, is not provided when disclosing the score in the second manner. Optionally, none of the information described above is disclosed when disclosing a score in the second manner.

In still another embodiment, disclosing the one or more scores in the second manner, involves providing fewer bits of information describing the one or more scores, compared to the number of bits of information describing the one or more scores that are provided when disclosing the one or more scores in the first manner.

Disclosing the one or more scores involves providing the values of the one or more scores and/or information related to the one or more scores (as described above) to an entity that did not possess all the measurements of affective response used to compute the one or more scores. Herein, possessing the measurements refers to being able to extract their values. If the measurements are encrypted and the entity that has the values cannot decrypt the measurements, then it may not be considered to possess the measurements.

In some embodiments, disclosing the one or more scores may involve various forms of transmission of data that describes the one or more scores (and/or the related information). Optionally, the transmission involves sending data on a short-range wireless communication channel, a wired communication channel, over the Internet, over an Ethernet, via a USB connection, and/or via network 112, which is described elsewhere in this disclosure. Additionally, in some embodiments, storing the one or more scores in a database that is accessible to entities that do not possess the measurements may be considered disclosing the one or more scores.

In some embodiments, disclosing one or more scores in the first manner involves transmitting of different information than the information transmitted when disclosing the one or more scores in the second manner. Optionally, more bits of information and/or more values are transmitted when disclosing in the first manner.

The privacy risk assessment module 808 may comprise and/or utilize various modules, in different embodiments, in order to enable it to make the determination. The different configurations of the privacy risk assessment module 808 enable it to employ some of the various approaches to the analysis of the risk to privacy that are described in this disclosure.

In some embodiments, the privacy risk assessment module 808 may utilize an adversary model that comprises bias values (in which case it may be referred to as an "adversary bias model"). Optionally, the adversary model is generated by adversary model learner 820 and/or by adversary model learner 838.

In one embodiment, the adversary bias model comprises bias values corresponding to one or more of the users who contributed measurements to the computation of the one or more scores. Optionally, the bias values are determined via a process in which the adversary model is updated based on disclosed scores and/or received measurements of affective response, as discussed in more detail in sections 16—Independent Inference from Scores and 18—Inference from Joint Analysis. Optionally, the determination is indicative of the extent of an improvement to the adversary bias model due to an update of the adversary bias model based on values of the one or more scores.

In one embodiment, the adversary model may be adversary bias model 822. Optionally, the privacy risk assessment module 808 may comprise, and/or utilize, independent risk assessment module 816 in order to make the determination utilizing the adversary bias models 822. In another embodiment, the adversary model may be adversary bias model 835. Optionally, the privacy risk assessment module 808 may comprise, and/or utilize, joint risk assessment module 836 in order to make the determination utilizing the adversary bias model 835. Additional details regarding how the privacy risk assessment module 808 may make the determination in the above embodiments may be found in the description below of embodiments modeled according to FIG. 15 and/or FIG. 16.

The adversary bias model may include a plurality of different bias values corresponding to various factors and/or different users. In particular, in one embodiment, the adversary bias model comprises at least a first bias value of a first user and a second bias value of a second user, which is not the first user, and the values of the first and second bias values change due to the update. Optionally, the first bias value and the second bias value correspond to different factors.

The extent of the improvement to the adversary model due to the disclosure of the one or more scores may be expressed in different ways in embodiments described herein. Following are examples of the types of values according to which the improvement may be evaluated in order to determine whether the risk due to the disclosure of the one or more scores reaches the threshold.

In one embodiment, the improvement corresponds to a reduction, due to the update, in a distance between the adversary bias model and a ground truth model that includes bias values of the user. For example, the ground truth model may include the bias values 715 and/or the ground truth model may be generated by the bias model learner 710. Optionally, the ground truth model is trained on data comprising measurements of affective response of users and factors of events to which the measurements correspond. In one example, the risk to privacy is inversely proportional to the divergence between the ground truth model and the adversary model. Thus, if divergence is below a certain value, the risk to privacy is assumed to reach the threshold. Examples of divergence measures may be various norms or distribution-based metrics such as the Kullback-Leibler divergence. In another example, the divergence may relate to the number of parameters in the adversary model that have a value that is close to their value in the ground truth model (e.g., by close it may mean within ±20% of the ground truth value). Thus, if a large enough number of parameters are close, and/or a large enough proportion of the parameters in the adversary model have values that are close to their values in the ground truth model, the risk to privacy may be assumed to reach the threshold.

In another embodiment, the improvement corresponds to a reduction in entropy of parameters of the adversary bias model. In one example, the adversary bias model includes bias values represented as distributions. In this example, the entropy of the adversary bias model and/or change to the entropy may be determined from the parameters of the distributions. For example, the more certainty in the value of the parameters, the smaller the variance of the distributions, and consequently, the lower the entropy of the adversary bias model (when computed in a parametrized from as a function of the parameters of the distributions). Thus, the larger the improvement, the larger the reduction in the entropy of the model. Optionally, if the risk is proportional to the extent of the reduction in entropy, and the reduction exceeds a certain value, the risk is considered to reach the threshold.

In still another embodiment, the improvement corresponds to the magnitude of the divergence between the adversary bias model before the update based on the disclosure and the updated adversary bias model. Optionally, the divergence may be expressed by various norms and/or metrics, such as Kullback-Leibler divergence, the Mahalanobis distance, and similar measures. Optionally, the risk to privacy is proportional to the divergence such that if the divergence reaches a certain value, the risk to privacy reaches the threshold.

In yet another embodiment, the improvement corresponds to a reduction in a size of a confidence interval related to a certain bias value from the adversary bias model. Alternatively, the improvement may relate to the average size of the confidence intervals of the parameters. Thus, for example, if after the update the confidence interval related to a certain bias value is below a certain size, the risk to privacy is considered to reach the threshold. When the confidence interval is small, it means that there is high certainty in the values of the adversary bias model. Thus, bringing the adversary bias model to a state in which it may be considered accurate is dangerous to the privacy of users since this state means that the adversary bias model likely contains accurate information about the users.

In some embodiments, the privacy risk assessment module 808 may make the determination of the expected risk due to the disclosure of the one or more of the scores utilizing a function that receives one or more values, each indicative of at least one of the following statistics: a statistic of the measurements contributed for the computation of a score from among the one or more of the scores, a statistic regarding the value of a score from among the one or more of the scores, a statistic regarding extent of disclosure of data regarding at least one user from among the users who contributed measurements for the computation of a score from among the one or more of the scores. Optionally, the function returns a value indicative of an expected risk to privacy due to the disclosure. Optionally, the privacy risk assessment module 808 utilizes risk function module 849 to compute the value of the function. Optionally, the risk function module 849 computes the value indicative of the expected risk to privacy utilizing one or more of the following risk models: risk model 847, risk model 855, risk model 873, risk model 881, and risk model 890. Additional details regarding these models may be found further below in this disclosure.

In order to compute the value indicative of the expected risk to privacy the risk function module 849 may receive various values, referred to as statistics, and/or produce values indicative of the statistics. Optionally, the values indicative of the statistics may be computed based on the measurements contributed to the computation of the one or more scores, based on the values of the one or more scores, and/or based on descriptions of the events to which the contributed measurements correspond Optionally, the descriptions of the events describe aspects related to the experiences corresponding to the events, the users corresponding to the events, and/or the instantiations of the events. Following are some examples of the statistics that may be utilized by the risk function module 849.

In one embodiment, the statistic of the measurements contributed for the computation of the one or more scores is indicative of one or more of the following values: the number of users who contributed measurements for the computation of the one or more scores, and the variance of the measurements contributed for the computation of the one or more scores.

In one embodiment, the statistic regarding the value of the score is indicative of one or more of the following values: a probability of the value of a score from among the one or more scores, and a significance of a score from among the one or more scores.

In one embodiment, the statistic regarding the extent of disclosure of data regarding the at least one user is indicative of one or more of the following values: a number of measurements contributed by the at least one user, a frequency at which the at least one user contributes measurements, an entropy of a model of the at least one user, and a volume of data collected about the at least one user.

In some embodiments, the determination made by the privacy risk assessment module 808 may be indicative of an extent of an improvement to an adversary bias model comprising a model of an ERP, due to an update of the adversary bias model based on values of the one or more of the scores. Optionally, the extent of improvement corresponds to a certain improvement in the accuracy of the ERP.

The determination indicative of the expected risk to privacy due to a disclosure of one or more scores may comprise various values in embodiments described in this disclosure. In one example, the determination may be indicative of a binary value, such as a value corresponding to "risky" (which reaches the threshold) and a value corresponding to "not risky" (which does not reach the threshold). In another example, the determination may express one or more of the values used herein to express risk, such as an extent of improvement to a model of an adversary (e.g., in terms of reduction in entropy, reduction of divergence from a ground truth model, etc.) In yet another example, the determination may be indicative of the desired number of users needed to contribute measurements to a score. Optionally, in this example, if the number of users who contributed measurements to the computation of a score is greater than the indicated number, the risk to privacy does not reach the threshold.

It is to be noted that the term "risk to privacy" may refer to a risk to the privacy of different entities in different embodiments. In one embodiment, the privacy risk assessment module 808 receives an indication of a certain user, and the determination is indicative of an extent of a risk to privacy of the certain user (e.g., by evaluating an adversary bias model comprising bias values of the certain user). Optionally, if the determination indicates that the risk to the privacy of the certain user reaches the threshold, then the one or more scores are disclosed in the second manner (and in some cases not disclosed at all). In another embodiment, the determination is indicative of an average extent of a risk to privacy of the users who contributed measurements of affective response to the computation of at least some of the one or more scores. Thus, in this embodiment, the privacy risk assessment module 808 may give assessments of average risks, or risks for an average user, and base the decision on how to disclose the one or more scores, based on that risk. In yet another embodiment, the determination is indicative of a maximal extent of a risk to privacy of a user from among the users who contributed measurements of affective response to the computation of at least some of the one or more scores. In this embodiment, if the risk to the privacy of one of the users is too high (i.e., it reaches the threshold), then the one or more scores are disclosed in the second manner (and in some cases not disclosed at all).

Following are descriptions of steps that may be performed in one embodiment of a method for disclosing scores in a manner that reduces risk to privacy of users who contributed measurements of affective response used to compute the scores. The steps described below may, in some embodiments, be part of the steps performed by an embodiment of a system described above, such as a system modeled according to FIG. 14. In some embodiments, instructions for implementing one or more of the methods described below may be stored on a computer-readable medium, which may optionally be a non-transitory computer-readable medium. In response to execution by a system including a processor and memory, the instructions cause the system to perform operations that are part of the method. Optionally, each of the methods described below may be executed by a computer system comprising a processor and memory, such as the computer illustrated in FIG. 27.

In one embodiment, the method for disclosing scores, in a manner that reduces risk to privacy of users who contributed measurements of affective response used to compute the scores, includes at least the following steps:

In Step 1, receiving measurements of affective response of users who had experiences; each measurement of a user who had an experience is taken with a sensor coupled to the user. Optionally, the received measurements are the measurements 110.

In Step 2, computing scores based on at least the measurements received in Step 1; each score is a score for an experience, and is computed based on a subset of the measurements received in Step 1 comprising measurements of at least five of the users who had the experience. Optionally, the scores are computed by the scoring module 150.

In Step 3, generating a determination indicative of an expected risk to privacy due to a disclosure of one or more of the scores. Optionally, the determination is generated by the privacy risk assessment module 808.

And in Step 4, disclosing the one or more of the scores in a manner that is based on the determination. Responsive to the determination indicating that the risk does not reach a threshold, the one or more of the scores are disclosed in the first manner. And responsive to the determination indicating that the risk reaches the threshold, the one or more of the scores are disclosed in the second manner, which is less descriptive than the first manner.

In one embodiment, generating the determination in Step 3 involves a step of computing an extent of an improvement to an adversary bias model comprising bias values due to an update of the adversary bias model based on values of the one or more of the scores; the determination is indicative of the extent of improvement. Optionally, generating the determination in Step 3 may also involve a step of determining a reduction, due to the update, in a distance between the adversary bias model and a ground truth model that includes bias values. The ground truth model is trained on data comprising measurements of affective response and factors of events to which the measurements correspond. Optionally, generating the determination in Step 3 may also involve a step of determining a reduction in entropy of parameters of the adversary bias model. Optionally, generating the determination in Step 3 may also involve a step of determining an extent of a divergence between values of parameters of the adversary bias model before the update and values of the parameters after the update. Optionally, generating the determination in Step 3 may also involve a step of determining a reduction in a size of a confidence interval related to a certain bias value from the adversary bias model.

In one embodiment, generating the determination in Step 3 involves a step of utilizing a function to make the determination. In this embodiment, the function receives an input comprising one or more values, each indicative of at least one of the following statistics: a statistic of the measurements contributed for the computation of a score from among the one or more of the scores, a statistic regarding the value of a score from among the one or more of the scores, a statistic regarding extent of disclosure of data regarding at least one user from among the users who contributed measurements for the computation of a score from among the one or more of the scores. The function produces a value indicative of the risk to the privacy of one or more of the users who contributed measurements to the one or more of the scores.

Whether the one or more scores are disclosed in the first or second manner may depend on various characteristics of the one or more scores and/or characteristics of the users who contributed measurements to the one or more scores. Thus, given two different sets of scores the method described above may involve performing different steps, as the following embodiment illustrates.

In one embodiment, a method for disclosing scores, in a manner that reduces risk to privacy of users who contributed measurements of affective response used to compute the scores, includes at least the following steps:

In Step 1, receiving measurements of affective response of users who had experiences; each measurement of a user who had an experience is taken with a sensor coupled to the user. Optionally, the received measurements are the measurements 110.

In Step 2, computing a first set of one or more scores; each score in the first set is a score for an experience, and is computed based on a subset of the measurements 110 comprising measurements of at least five of the users who had the experience.

In Step 3, generating a first determination indicative of an expected risk to privacy due to a disclosure of the first set. In this step, the first determination indicates that the risk to privacy does not reach a threshold. Optionally, the first determination is generated by the privacy risk assessment module 808.

In Step 4, disclosing the one or more scores of the first set in the first manner.

In Step 5, computing a second set of one or more scores; each score in the second set is a score for an experience, and is computed based on a subset of the measurements comprising measurements of at least five of the users who had the experience. Additionally, the subsets of measurements used to compute the scores in the first set are not the same as the subsets used to compute the scores in the second set.

In Step 6, generating a second determination indicative of an expected risk to privacy due to a disclosure of the second set. In this step, the second determination indicates that the risk to privacy reaches the threshold. Optionally, the second determination is generated by the privacy risk assessment module 808.

And in Step 9, disclosing the one or more scores of the second set in a second manner, which is less descriptive than the first manner.

It is to be noted that there may be many different reasons why the risk from the first disclosing the first set is lower than the risk from disclosing the second set. In one example, the scores in the first set are computed based on measurements of a larger number of users than the scores in the second set. In another example, the confidence in the scores in the first set is lower than the confidence in the scores of the second set. In yet another example, the users who contributed measurements to the scores in the second set might have made previous contributions of measurements that are much greater than the contributions of the users who contributed to the scores of the first set. Thus, the users who contributed to the second set might be already well modeled, and so their privacy may be at greater risk due to additional disclosures.

As described above, when it comes to making the determination indicative of the expected risk to privacy due to a disclosure of one or more of the scores, the privacy risk assessment module 808 may utilize various approaches. Some of the approaches involve maintaining an adversary model, which attempts to imitate the process of how an adversary can learn models of users based on scores computed based on the users' contributions. Optionally, learning these models may also involve receiving information regarding the measurements of the users and/or factors of the events to which the measurements correspond. When performing analysis involving an adversary model, at least two approaches may be taken with regard to how the parameters of the adversary model are updated.

Figure 15:
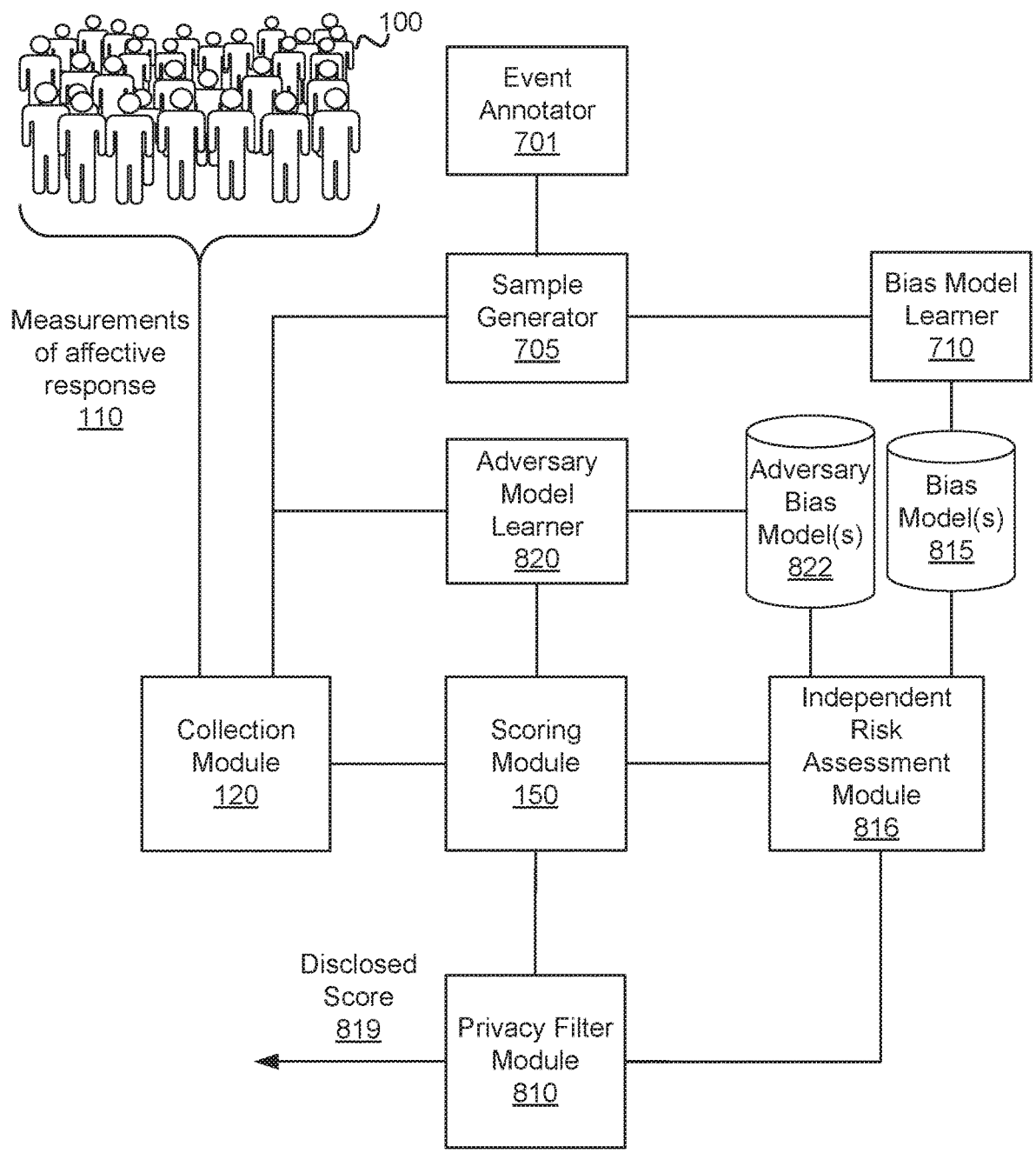
FIG. 15 illustrates a system configured to assess a risk to privacy of a user who contributed a measurement of affective response used to compute a score.

One approach for updating an adversary model based on disclosed scores is to evaluate the effects of each score independently. For example, after receiving a value of a certain score, parameters in the adversary model are updated based on the value of that score. Optionally, each parameter, such as a bias value of a certain user who contributed to the score, is updated independently. Taking this approach may sometimes amount to updating all the parameters in the adversary model, which are related to the score, in a similar fashion. In one example, if the score is significantly higher than the average, the adversary might increase the parameters of bias values in the adversary model for all users who contributed to the score. In this type of analysis, each disclosed score may be evaluated independently and/or each parameter in the adversary model may be updated independently. In some embodiments, this type of analysis is performed by the independent risk assessment module 816, which may be utilized by, and/or comprised in, the privacy risk assessment module 808. An embodiment in which this form of analysis is utilized is illustrated in FIG. 15. It is to be noted that independent analysis of scores may be utilized to learn from disclosure of multiple scores by repeating the update process of an adversary model for each of the multiple scores.

Figure 16:
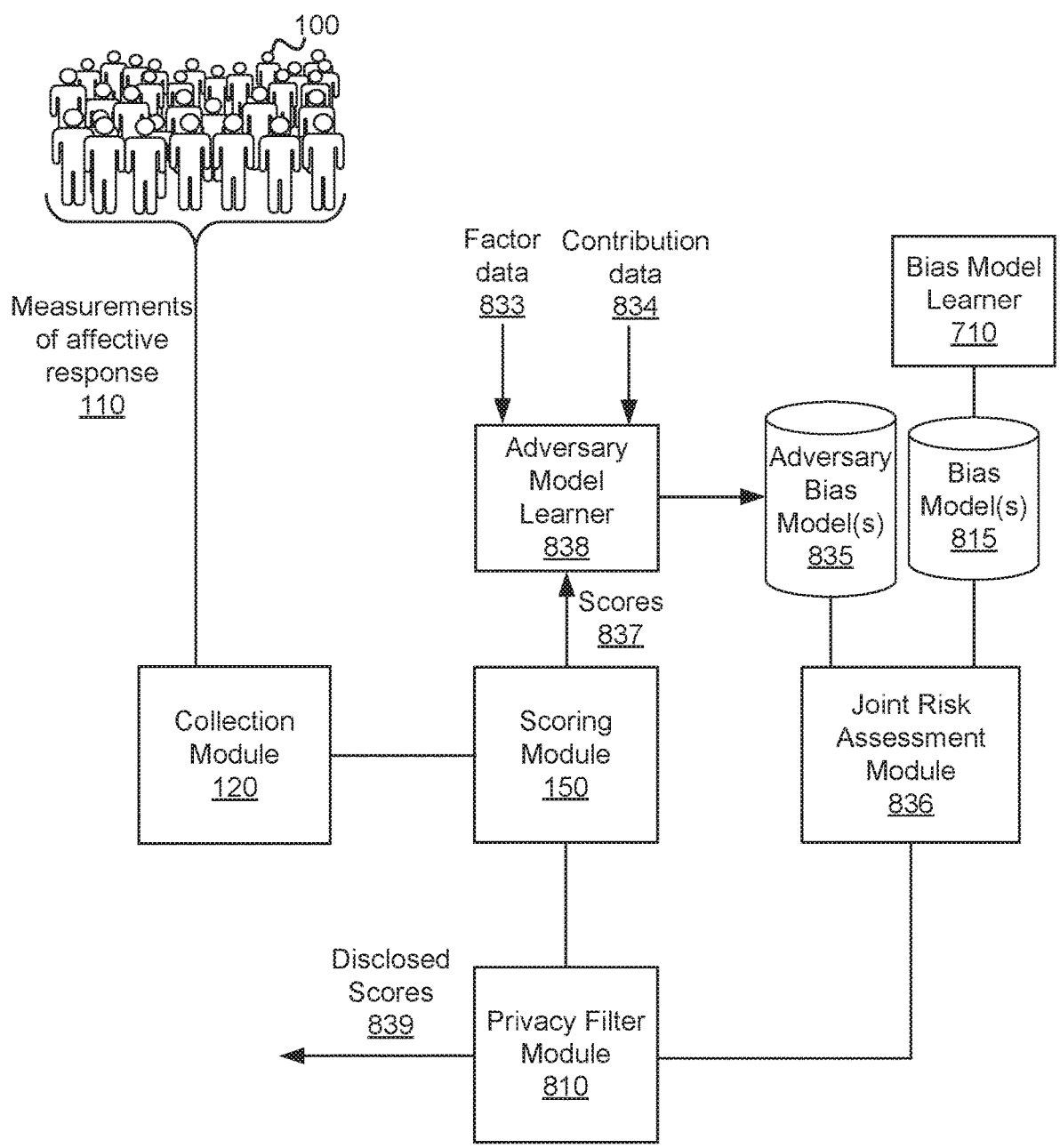
FIG. 16 illustrates a system configured to assess a risk to privacy of users due to disclosure of scores computed based on measurements of affective response of the users.

Another approach for updating an adversary model based on disclosed scores is to jointly evaluate the effects of the scores together. For example, after receiving a set of scores, multiple parameters in the adversary model are updated based on the scores. Optionally, this update is done in a way that maximizes some objective (e.g., likelihood) of the whole adversary model with respect to the set of scores. Taking this approach may sometimes amount to updating all the parameters, or at least multiple parameters, in the adversary model, which involve parameters corresponding to multiple factors and/or multiple users. In some embodiments, this type of analysis is performed by the joint risk assessment module 836, which may be utilized by, and/or comprised in, the privacy risk assessment module 808. An embodiment in which this form of analysis is utilized is illustrated in FIG. 16.

FIG. 15 illustrates one embodiment of a system configured to assess a risk to privacy of a user who contributed a measurement of affective response used to compute a score. The system includes at least the following modules: the collection module 120, the scoring module 150, the independent risk assessment module 816, and, optionally, the privacy filter module 810.

Similarly to embodiments modeled according to FIG. 14, the collection module 120 is configured, in one embodiment, to receive measurements 110 of affective response of users belonging to the crowd 100. Optionally, each measurement of a user corresponds to an event in which the user had an experience, and the measurement is taken with a sensor coupled to the user (e.g., the sensor 102). Additionally, the scoring module 150 is configured, in one embodiment, to compute scores for experiences. Optionally, each score for an experience is computed based on a subset of the measurements 110 comprising measurements of at least five of the users who had the experience. Optionally, the subset is received from the collection module 120.

The independent risk assessment module 816 is configured to make determination indicative of an expected risk to privacy of a certain user due to a disclosure of one or more of the scores. For the sake of brevity, the "one or more of the scores" may also be referred to herein as the "one or more scores". Optionally, the certain user contributed a measurement of affective response to the computation of each of the one or more of the scores. Optionally, the determination is made based on an adversary bias model 822 that is updated based on values of the one or more of the scores. In some embodiments, the determination made by the independent risk assessment module 816 is utilized by the privacy risk assessment module 808 to make its determination. In some embodiments, the determination made by the independent risk assessment module 816 is the determination provided by the privacy risk assessment module 808.

In some embodiments, the independent risk assessment module 816 receives an indication of the certain user.

Optionally, the indication specifically identifies the certain user (e.g., via name, email address, phone number, etc.) Optionally, the indication provides criteria that may be used to select the certain user from among a set of users who contributed measurements of affective response to the computation of the one or more scores that are the subject of the disclosure being assessed.

The indication of the certain user may be forwarded from various entities and/or modules. In one example, a software agent operating on behalf of the certain user provides the indication. In another embodiment, the collection module 120 and/or the scoring module 120 provide the indication. In yet another example, the privacy risk assessment module 808 provides the indication.

It is to be noted that, in some embodiments, the effects of disclosure of one or more scores on multiple users may be evaluated by the independent risk assessment module 816. For example, each user from among the set of users may be considered the certain user in turn. Such analysis involving multiple users can enable a determination to be made for a certain user who may not be known in advance. In one example, the analysis of multiple users can enable the determination to relate to an average user (e.g., the determination is indicative of the average risk to privacy of users who contributed measurements to the one or more scores whose disclosure is evaluated). Thus, in this example the certain user may be the average user—who may not be known in advance, or even exist. In another example, the effects of a disclosure of the one or more scores may be evaluated in order to find the maximal risk to privacy to a user who contributed measurements to the computation of the one or more scores. Optionally, in this example, the determination may relate to the maximal value of risk to any of the user analyzed. Thus, in this example, the certain user may be the user that is to be most at risk from a disclosure of the one or more scores.

The privacy filter module 810 is configured, in one embodiment, to disclose the one or more scores in a manner that is based on the determination. Optionally, the manner belongs to a set comprising first and second manners. In one embodiment, responsive to the determination indicating that the risk does not reach a threshold, the one or more scores are disclosed in the first manner, and responsive to the determination indicating that the risk reaches the threshold, the one or more scores are disclosed in the second manner. Optionally, the second manner of disclosure is less descriptive than the first manner. Thus, the disclosure of the one or more scores in the second manner may be considered less risky to the privacy of at least some of the users who contributed measurements used to compute the one or more scores. Disclosure of the one or more scores in a less descriptive manner may be done in various ways in embodiments described herein, as discussed above in the discussion regarding FIG. 14.

It is to be noted that some embodiments of the system illustrated in FIG. 15 may also include one or more sensors that are used to obtain the measurements 110 of affective response, such as one or more units of the sensor 102.

In one embodiment, the adversary bias model 822 comprises a model of an Emotional Response Predictor (ERP). The ERP, in this embodiment, is configured to receive a sample comprising feature values based on factors of an event and to predict a value indicative of emotional response to the event. In one example, the adversary bias model 822 is the ERP model 719. Optionally, the determination is indicative of extent of improvement of the adversary bias model 822 due to an update of the adversary bias model 822 based on values of the one or more of the scores. The improvement to the adversary bias model 822, in embodiments where the adversary bias model 822 is a model for an ERP, may be evaluated in various ways. In one example, the improvement corresponds to an increase, due to the update, in the accuracy of the ERP when utilizing the adversary bias model 822. In another example, the improvement corresponds to a decrease, due to the update, in the difference between the accuracy of the ERP when utilizing a model trained on measurements of affective response of the certain user (before the update) and the accuracy of the ERP when utilizing the updated adversary bias model.

In another embodiment, the adversary model learner 820 is utilized to train, and/or update, the adversary bias model 822 based on data comprising scores of experiences computed based on measurements corresponding to events and descriptions of the events. Optionally, the adversary bias model 822 comprises bias values of the certain user.

In one embodiment, the determination made by the independent risk assessment module 816 is indicative of extent of improvement of the adversary bias model 822 due to an update of the adversary bias model 822 based on values of the one or more scores that are disclosed. As described above in the discussion regarding the determination of the privacy risk assessment module 808, the improvement to the adversary bias model 822 can be evaluated in various ways. In one example, the improvement corresponds to a reduction, due to the update, in a distance between the adversary bias model 822 and a ground truth model that includes bias values of the certain user. Optionally, the ground truth model is trained on data comprising measurements of affective response of the certain user. In another example, the improvement may correspond to a reduction, due to the update, in entropy of parameters of the adversary bias model 822. In yet another example, the improvement may correspond to an extent of a divergence between values of parameters of the adversary bias model 822 before the update and values of the parameters after the update. In still another example, the improvement may correspond to reduction, due to the update, in a size of a confidence interval related to a certain bias value in the adversary bias model 822.

Updating the adversary bias model 822, when it includes bias values (e.g., represented via distribution parameters) may be performed by updating the distributions according to the value of a disclosed score, as described in section 16—Independent Inference from Scores. When multiple scores are disclosed and/or multiple users are modeled, the updating of parameters may be done to each parameter independently. For example, when updating the adversary model based on a score for a certain experience may involve updating a parameter of a bias value corresponding to a factor of a certain experience. This parameter may exist for each user modeled and represent the bias of each user towards the certain experience. Thus, given that n users contributed measurements to the computation of the score, there may be in the adversary bias model n parameters, corresponding to the bias of the n users towards the certain experience. Each of these parameters may be updated based on the value of the score.

Following are descriptions of steps that may be performed in one embodiment of a method for assessing a risk to privacy of a user who contributed a measurement of affective response used to compute a score. The steps described below may, in some embodiments, be part of the steps performed by an embodiment of a system described above, such as a system modeled according to FIG. 15. In some embodiments, instructions for implementing one or more of the methods described below may be stored on a computer-readable medium, which may optionally be a non-transitory computer-readable medium. In response to execution by a system including a processor and memory, the instructions cause the system to perform operations that are part of the method. Optionally, each of the methods described below may be executed by a computer system comprising a processor and memory, such as the computer illustrated in FIG. 27.

In one embodiment, the method for assessing a risk to privacy of a user who contributed a measurement of affective response used to compute a score includes at least the following steps:

In Step 1, receiving measurements of affective response of users who had experiences; each measurement of a user who had an experience is taken with a sensor coupled to the user. Optionally, the received measurements are the measurements 110.

In Step 2, computing scores based on at least the measurements received in Step 1; each score is a score for an experience, and is computed based on a subset of the measurements received in Step 1 comprising measurements of at least five of the users who had the experience. Optionally, the scores are computed by the scoring module 150.

In Step 3, generating a determination indicative of an expected risk to privacy of a certain user due to a disclosure of one or more of the scores. Optionally, the determination is generated by the independent risk assessment module 816.

And in Step 4, disclosing the one or more of the scores in a manner that is based on the determination. Responsive to the determination indicating that the risk does not reach a threshold, the one or more of the scores are disclosed in the first manner. And responsive to the determination indicating that the risk reaches the threshold, the one or more of the scores are disclosed in the second manner, which is less descriptive than the first manner.

In one embodiment, generating the determination in Step 3 involves a step of computing an extent of an improvement to an adversary bias model comprising bias values of the certain user due to an update of the adversary bias model based on values of the one or more of the scores; the determination is indicative of the extent of improvement. Optionally, generating the determination in Step 3 may also involve a step of determining a reduction, due to the update, in a distance between the adversary bias model and a ground truth model that includes bias values of the certain user. The ground truth model is trained on data comprising measurements of affective response of the certain user and factors of events to which the measurements correspond. Optionally, generating the determination in Step 3 may also involve a step of determining a reduction in entropy of parameters of the adversary bias model. Optionally, generating the determination in Step 3 may also involve a step of determining an extent of a divergence between values of parameters of the adversary bias model before the update and values of the parameters after the update. Optionally, generating the determination in Step 3 may also involve a step of determining a reduction in a size of a confidence interval related to a certain bias value from the adversary bias model.

In one embodiment, generating the determination in Step 3 involves a step of utilizing a function to make the determination. In this embodiment, the function receives an input comprising one or more values, each indicative of at least one of the following statistics: a statistic of the measurements contributed for the computation of a score from among the one or more of the scores, a statistic regarding the value of a score from among the one or more of the scores, a statistic regarding extent of disclosure of data regarding the certain user. The function produces a value indicative of the risk to the privacy of the certain user.

Whether the one or more scores are disclosed in the first or second manner may depend on various characteristics of the one or more scores and/or characteristics of the certain user. Thus, given two different sets of scores the method described above may involve performing different steps, as the following embodiment illustrates.

In one embodiment, a method for assessing a risk to privacy of a user who contributed a measurement of affective response used to compute a score includes at least the following steps, includes at least the following steps:

In Step 1, receiving measurements of affective response of users who had experiences; each measurement of a user who had an experience is taken with a sensor coupled to the user. Optionally, the received measurements are the measurements 110.

In Step 2, computing a first set of one or more scores; each score in the first set is a score for an experience, and is computed based on a subset of the measurements 110 comprising measurements of at least five of the users who had the experience.

In Step 3, generating a first determination indicative of an expected risk to privacy of a certain user due to a disclosure of the first set. In this step, the first determination indicates that the risk to the privacy of the certain user does not reach a threshold. Optionally, the first determination is generated by the independent risk assessment module 816.

In Step 4, disclosing the one or more scores of the first set in the first manner.

In Step 5, computing a second set of one or more scores; each score in the second set is a score for an experience, and is computed based on a subset of the measurements comprising measurements of at least five of the users who had the experience. Additionally, the subsets of measurements used to compute the scores in the first set are not the same as the subsets used to compute the scores in the second set.

In Step 6, generating a second determination indicative of an expected risk to the privacy of the certain user due to a disclosure of the second set. In this step, the second determination indicates that the risk to the privacy of the certain user reaches the threshold. Optionally, the second determination is generated by the independent risk assessment module 816.

And in Step 7, disclosing the one or more scores of the second set in a second manner, which is less descriptive than the first manner.

It is to be noted that there may be many different reasons why the risk from the first disclosing the first set is lower than the risk from disclosing the second set. In one example, the scores in the first set are computed based on measurements of a larger number of users than the scores in the second set. In another example, the confidence in the scores in the first set is lower than the confidence in the scores of the second set.

As discussed above, assessment of the risk to privacy may involve a joint analysis approach, which involves a joint modeling and updating of parameters, in an adversary model, which correspond to multiple users and/or factors. This approach is described in embodiments modeled according to FIG. 16, which illustrates one embodiment of a system configured to assess a risk to privacy of users due to disclosure of scores computed based on measurements of affective response of the users. The system includes at least the following modules: the collection module 120, the scoring module 150, the joint risk assessment module 836, and, optionally, the privacy filter module 810. It is to be noted that some embodiments of the system illustrated in FIG. 16 may also include one or more sensors that are used to obtain the measurements 110 of affective response, such as one or more units of the sensor 102.

Similarly to embodiments modeled according to FIG. 14, the collection module 120 is configured, in one embodiment, to receive measurements 110 of affective response of users belonging to the crowd 100. Optionally, each measurement of a user corresponds to an event in which the user had an experience, and the measurement is taken with a sensor coupled to the user (e.g., the sensor 102). Additionally, the scoring module 150 is configured, in one embodiment, to compute scores for experiences. Optionally, each score for an experience is computed based on a subset of the measurements 110 comprising measurements of at least five of the users who had the experience. Optionally, the subset is received from the collection module 120.

The joint risk assessment module 836 is configured to make determination indicative of an expected risk to privacy due to a disclosure of one or more of the scores. For brevity, these "one or more of the scores" may also be referred to herein as the "one or more scores". Optionally, the privacy filter module 810 discloses the one or more scores in a manner determined based on the determination. For example, the disclosure is done in the first or second manners described above (and the second manner involves a less descriptive disclosure than the first manner).

It is to be noted that similarly to the case of the determination of the privacy risk assessment module 808, the "risk to privacy" may refer to various types of risks, in different embodiments. For example, the risk referred to in the determination may be the risk to the privacy of a certain user, the average risk to the privacy of a user who contributed measurements to the disclosed scores, or the maximal risk to the privacy of a user who contributed measurements to the disclosed scores.

In some embodiments, the determination made by the joint risk assessment module 836 is based on adversary bias model 835, which comprises bias values of the users. Optionally, the adversary bias model 835 is trained based on data comprising: values indicative of factors of events, values indicative of identities of users corresponding to the events, and scores computed based on measurements of affective response corresponding to the events. Optionally, adversary bias model 835 includes a plurality of different bias values corresponding to various factors and/or different users. In particular, in one embodiment, the adversary bias model 835 comprises at least a first bias value of a first user and a second bias value of a second user, which is not the first user, and the values of the first and second bias values change due to the update. Optionally, the first bias value and the second bias value correspond to different factors.

In some embodiments, the adversary bias model 835 is trained and/or updated utilizing adversary model learner 838. Optionally, the adversary model learner 838 is configured to update the adversary bias model 835 based on additional data comprising: values indicative of factors of events to which the measurements correspond, values indicative of identities of users corresponding to the events to which the measurements correspond, and the scores. Optionally, the determination is indicative of extent of improvement of the adversary bias model 835 due to an update of the adversary bias model 835 based on values of the one or more of the scores.

There may be different ways in which the improvement may be considered. In one embodiment, the improvement corresponds to a reduction, due to the update, in a distance between the adversary bias model 835 and a ground truth model that includes bias values of the users (e.g., the bias values 715). Optionally, the ground truth model is trained on data comprising measurements of affective response of the users. In another embodiment, the improvement corresponds to a reduction, due to the update, in entropy of parameters of the adversary bias model 835. In yet another embodiment, the improvement corresponds to an extent of a divergence between values of parameters of the adversary bias model 835 before the update and values of the parameters after the update. In still another embodiment, the improvement corresponds to reduction, due to the update, in a size of a confidence interval related to one or more bias values in the adversary bias model 835.

Learning and/or updating the adversary bias model may be done using various statistical inference techniques. Some of the approaches for learning the adversary bias model are described in section 18—Inference from Joint Analysis. In the approaches described in that section, a model of the data is generally considered to include three types of data: data corresponding to contribution of users to computation of scores, which is represented by the contribution matrix C, data corresponding to factors of events the users may have had, which is represented by the matrix of factor vectors F, and data corresponding to bias values of users, which is represented by the bias matrix B. Full knowledge of the data (e.g., the values of the measurements, factors of each event, and contributions of each user) can enable generation of the ground truth model $\theta$.

The model $\theta$ includes values describing biases of the user (e.g., the bias matrix B described in more detail at least in section 18—Inference from Joint Analysis). Additionally or alternatively, $\theta$ may include values describing the extent of contributions by users to scores (e.g., the contribution matrix C) and/or values corresponding to factors of events (e.g., the matrix of factor vectors F), as further described in the aforementioned section.

In one embodiment, the biases in the model $\theta$ are generated utilizing data corresponding to the events by performing optimizations of an error function, such as approaches described with respect to Eq. (2) and/or Eq. (3), and/or by searching for a maximum likelihood solution, such as approaches described with respect to Eq. (5). More information about biases and learning the values of the parameters in the model $\theta$ may be found in this disclosure at least in section 13—Bias Values. Additional data, such as data corresponding to entries in the matrices C and/or F mentioned above may be derived directly from descriptions of the events.

An adversary does not generally have complete information such as the measurements of affective response used to compute a set S of one or more scores, the matrix C, and the matrix F. Thus, the adversary can try and generate an estimate of the model $\theta$ (typically denoted $\hat{\theta}$) based on incomplete data. Optionally, this estimate is the adversary bias model 835. The incomplete data typically includes the set S and at least some of the entries in C and/or F that correspond to S. That is, the adversary has knowledge, possibly in the form of probabilities, of who contributed measurements to the computation of each score. Additionally, the adversary may have knowledge of at least some of the factors corresponding to the events related to S. These may include some of the various factors discussed in the disclosure, such as factor related to the experience corresponding to an event, the user corresponding to the event, and/or the instantiation of the event.

In order to estimate what knowledge the adversary may have from disclosed information, the adversary model learner 838 may comprise and/or utilize an adversary emulator. The adversary emulator is configured to emulate a process performed by an adversary in which the adversary learns one or more models (which are the adversary bias model 835), from disclosed information such as a set of disclosed scores and/or contribution information represented by a contribution matrix C and/or a matrix of factor vectors F. Optionally, the adversary bias model 835 includes information that may be considered private information of users. Optionally, the adversary bias model 835 includes parameters that are bias values of users. Optionally, training the one or more models may be done under the assumption that an adversary has full information (e.g., the scores S and the correct matrices C and/or F). Alternatively, training the one or more models may be done under the assumption that the adversary has partial information (e.g., only some of the scores in S, only some of the values in C and/or F, and/or values of S and C with only limited accuracy).

In one embodiment, the adversary emulator generates a single model $\hat{\theta}$, such as the adversary bias model 835, based on disclosed data the adversary is assumed to have. Optionally, the disclosed data the adversary is assumed to have comprises a set of scores S, information representing a contribution of measurements of users to the scores in S, represented as a contribution matrix C, and/or information about at least some of the factors, which are values in the matrix F, and are relevant to events corresponding to the measurements used to compute scores in S.

In another embodiment, the adversary emulator generates a set of r models $\hat{\Theta}=\{\hat{\theta}_1, \hat{\theta}_2, \ldots, \hat{\theta}_r\}$, which are comprised in the adversary bias model 835. Optionally, $\hat{\Theta}$ includes multiple models generated according to a prior probability distribution regarding the scores S and the contribution matrix C and/or the matrix of factor vectors F. For example, the prior information may relate to the number of scores S the adversary is likely to have, the proportion of the matrices C and/or F the adversary is likely to have, and/or the accuracy of the values in the matrices C and/or F the adversary is likely to have. Optionally, various approaches may be used to generate datasets based on which the models in $\hat{\Theta}$ are trained, such as subsampling approaches, addition of random noise to S and the matrices C and/or F, and/or resampling. Additionally or alternatively, at least some of the models in $\hat{\Theta}$ may be generated using generative approaches.

In yet another embodiment, the adversary emulator updates one or more models belonging to the adversary bias model 835 (e.g., a model $\hat{\theta}$ or a set of models $\hat{\Theta}$) based on disclosed information represented by S and matrices C and/or F, in order to obtain an updated model $\hat{\theta}'$ or a set of updated models $\hat{\Theta}'$. Optionally, the models that are updated (e.g., the model $\hat{\theta}$ or the set of models $\hat{\Theta}$) were trained based on previously disclosed information (e.g., a set of scores disclosed in the past). Additionally or alternatively, the models that are updated may represent prior beliefs regarding parameters of biases and/or the extent of knowledge an adversary may have about the biases.

To learn the adversary bias model 835 in a manner similar to the adversary, the adversary emulator may utilize various algorithmic approaches. Some examples of approaches include searching parameter spaces, linear programming (see discussion regarding Eq. (11) and Eq. (12)), and/or Generalized Expectation-Maximization (see discussion in more detail in section 18—Inference from Joint Analysis). Additional information regarding various approaches in which the adversary emulator may operate and ways in which models it learns can be used to evaluate risk are also described in more detail elsewhere in this disclosure.

In some embodiments, in order to make the determination, the joint risk assessment module 836 compares one or more models generated by the adversary emulator (i.e., models comprised in the adversary bias model 835), with the ground truth model $\theta$, described above, in order to determine the risk to privacy from the disclosure of the one or more scores. Optionally, the risk is expressed as an extent of accuracy of parameters and/or increase of accuracy in parameters as a result of model learning and/or updating that is likely obtained by the adversary. Optionally, the accuracy of parameters is expressed as a value indicative of a ratio between the estimated values for parameters and the ground truth value of the parameters. Additionally or alternatively, the accuracy may be expressed as a divergence between estimated distributions for parameters and the ground truth distribution for the parameters. Additionally or alternatively, the accuracy may be expressed as a size of confidence bars for the estimated parameter values.

In one example, the joint risk assessment module 836 may make a determination that disclosing a set of scores S along with a contribution matrix C and/or a matrix of factor vectors F (which are known by the adversary) may lead to the adversary being able to model biases (e.g., entries in a bias matrix B) with an average error of less than 20%. In another example, the joint risk assessment module 836 may make a determination that disclosing a set of scores S along with a contribution matrix C and/or a matrix of factor vectors F, of which the adversary has knowledge of a certain proportion of entries and/or with a certain accuracy, may lead to the adversary being able to model bias values with 95% confidence bars that have a size of ±20% (i.e., the ground truth values fall within a margin of 20% from the estimated value for 95% of the parameters).

In one embodiment, multiple models generated by the adversary emulator may be used by the joint risk assessment module 836 to perform a probabilistic analysis of risk. For example, the multiple models may be used to determine the probability that certain values representing risk (e.g., accuracy of parameters) will reach a certain threshold given certain scores. For example, the joint risk assessment module 836 may make a determination that disclosing a set of scores S along with a contribution matrix C and/or a matrix of factor vectors F (which are known by the adversary) may lead with probability greater than 80% to the adversary being able to model certain biases (e.g., entries in a bias matrix B) with an average error of less than 20%.

In another embodiment, the risk determined by the joint risk assessment module 836 corresponds to an inherent risk that users, who contributed measurements to the scores in S, are in after the scores in S are disclosed. That is, the risk expresses an extent of knowledge about the users that is likely known by the adversary. Optionally, this may lead to countermeasures intended to limit future risk, such as limiting the extent of the contribution of certain users to scores and/or limiting the extent of information conveyed by scores (e.g., by increasing the number of users who contribute measurements to the computation of the scores).

In yet another embodiment, the risk determined by the joint risk assessment module 836 corresponds to a potential risk that users are likely to be subjected to, if the scores in S are disclosed. That is, this analysis may be performed before disclosing the scores, and if the risk is too great, certain countermeasures may be taken. For example, certain scores may be kept from disclosure (e.g., disclosed in the second manner). In another example, measurements of certain users may be withheld and not contributed to computing scores. In another example, scores may be computed in a way that provides less information (e.g., by increasing the number of users that contribute measurements to scores). In yet another example, certain scores may be presented in a less descriptive manner, so as to provide less information about users who contributed measurements to the computation of the scores. For example, the scores can be presented in a coarser form (e.g., using fewer bits of information) and/or fewer values related to the scores may be disclosed (e.g., disclosing only a value representing the mean of the measurements of the users, but not a value representing the variance).

Following is a description of steps that may be performed in one embodiment of a method for assessing a risk to privacy of users due to disclosure of scores computed based on measurements of affective response of the users. The steps described below may, in some embodiments, be part of the steps performed by an embodiment of a system described above, such as a system modeled according to FIG. 16. In some embodiments, instructions for implementing one or more of the methods described below may be stored on a computer-readable medium, which may optionally be a non-transitory computer-readable medium. In response to execution by a system including a processor and memory, the instructions cause the system to perform operations that are part of the method.

In one embodiment, the method for assessing a risk to privacy of users, due to disclosure of scores computed based on measurements of affective response of the users, includes at least the following steps:

In Step 1, receiving measurements of affective response of users who had experiences; each measurement of a user who had an experience is taken with a sensor coupled to the user. Optionally, the received measurements are the measurements 110.

In Step 2, computing scores based on at least the measurements received in Step 1; each score is a score for an experience, and is computed based on a subset of the measurements received in Step 1 comprising measurements of at least five of the users who had the experience. Optionally, the scores are computed by the scoring module 150.

And in Step 3, generating a determination indicative of an expected risk to privacy due to a disclosure of one or more of the scores based on an adversary bias model comprising bias values of the users. The adversary bias model is trained based on data comprising: values indicative of factors of events, values indicative of identities of users corresponding to the events, and scores computed based on measurements of affective response corresponding to the events. Optionally, the adversary bias model comprises a first bias value of a first user, which corresponds to a certain factor, and a second bias value of a second user, which corresponds to the certain factor, and the first bias value is different from the second bias value. Optionally, the determination is generated by the joint risk assessment module 836.

In some embodiments, the method may optionally include Step 4, which involves disclosing the one or more of the scores in a manner that is based on the determination. Responsive to the determination indicating that the risk does not reach a threshold, the one or more of the scores are disclosed in the first manner. And responsive to the determination indicating that the risk reaches the threshold, the one or more of the scores are disclosed in the second manner, which is less descriptive than the first manner.

In one embodiment, generating the determination in Step 3 involves a step of computing an extent of an improvement to the adversary bias model due to an update of the adversary bias model based on values of the one or more of the scores. Optionally, the determination is indicative of the extent of improvement. Optionally, generating the determination in Step 3 may also involve a step of determining a reduction, due to the update, in a distance between the adversary bias model and a ground truth model that includes bias values. The ground truth model is trained on data comprising measurements of affective response and factors of events to which the measurements correspond. Optionally, generating the determination in Step 3 may also involve a step of determining a reduction in entropy of parameters of the adversary bias model. Optionally, generating the determination in Step 3 may also involve a step of determining an extent of a divergence between values of parameters of the adversary bias model before the update and values of the parameters after the update. Optionally, generating the determination in Step 3 may also involve a step of determining a reduction in a size of a confidence interval related to a certain bias value from the adversary bias model.

Making a determination regarding a risk to privacy does not necessarily require extensive modeling (e.g., generating a ground truth model and/or the adversary models mentioned above). In some embodiments, information about a disclosure of one or more scores can be utilized in order to make a determination about the risk to privacy associated with the disclosure. Optionally, such a determination may be made using risk functions. Risk functions are discussed in more detail in section 20—Risk Functions. Following are descriptions of some embodiments involving learning and/or utilizing different models for risk functions.

Figure 17A:
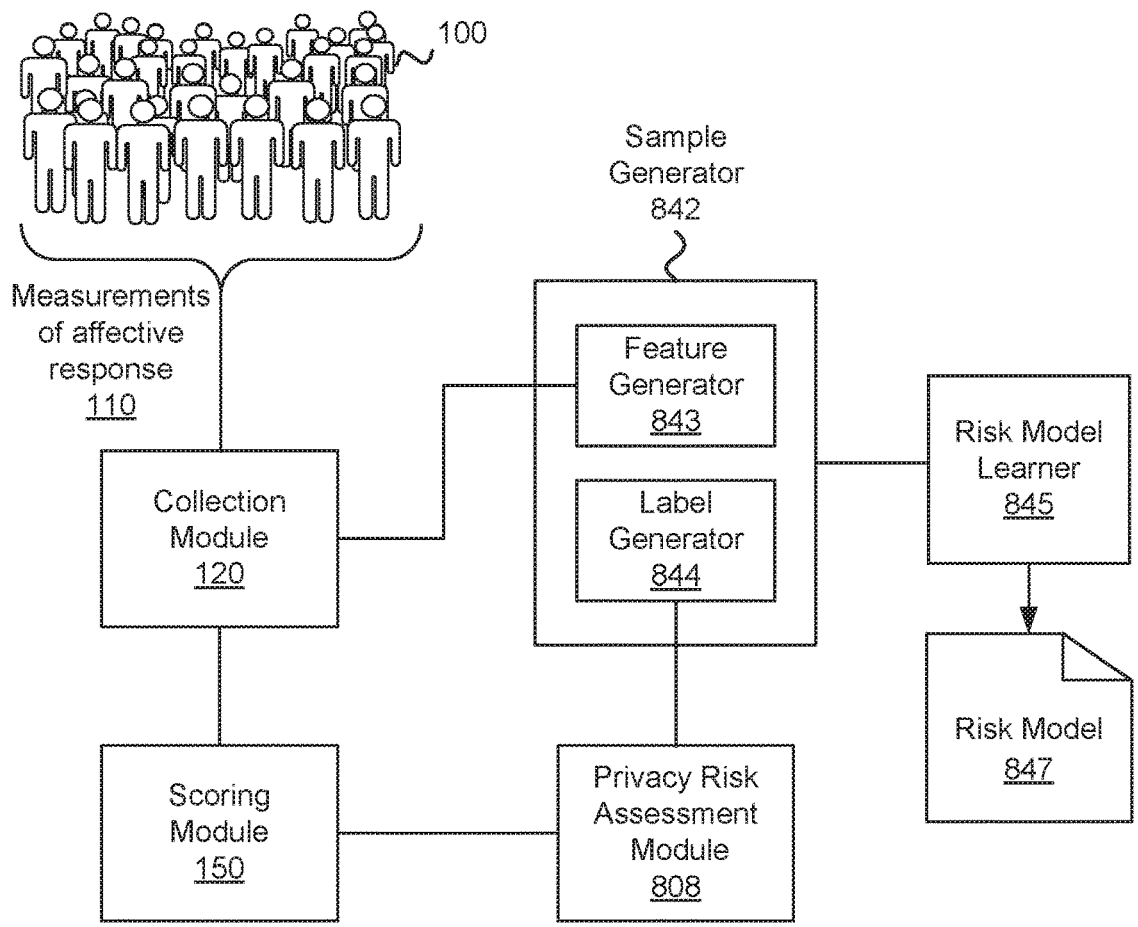
FIG. 17a illustrates a system configured to learn a model used to determine risk to privacy from disclosure of a score computed based on measurements of affective response.

FIG. 17a illustrates one embodiment of a system configured to learn a model (referred to herein as a "risk model"), which is used to determine risk to privacy from disclosure of a score computed based on measurements of affective response. The system includes at least the following modules: the collection module 120, the privacy risk assessment module 808, sample generator 842, and risk model learner 845. The system may optionally include additional modules such as the scoring module 150. In some embodiments of the system illustrated in FIG. 17a may also include one or more sensors that are used to obtain the measurements 110 of affective response, such as one or more units of the sensor 102.

The collection module 120 is configured, in one embodiment, to receive measurements 110 of affective response of users belonging to the crowd 100. Optionally, each measurement of a user corresponds to an event in which the user had an experience, and the measurement is taken with a sensor coupled to the user (e.g., the sensor 102).

The privacy risk assessment module 808 is configured, in one embodiment, to make determinations regarding scores for experiences. Each score for an experience, from among the scores, is computed based on a subset of the measurements comprising measurements of at least five users who had the experience, and a determination regarding the score is indicative of an expected risk to privacy due to a disclosure of the score. Optionally, the determination regarding the score is indicative of an extent of an improvement to an adversary bias model that comprises bias values due to an update of the adversary bias model following the disclosure of the score. Optionally, each of the scores is computed by the scoring module 150.

The determination made by the privacy risk assessment module 808 may refer to various types of risks. In one embodiment, the privacy risk assessment module 808 is configured to receive an indication of a certain user, and the determination regarding the score is indicative of an extent of a risk to privacy of the certain user. In another embodiment, the determination regarding the score is indicative of an average extent of a risk to privacy of the users who contributed measurements of affective response used for the computation of the score. In yet another embodiment, the determination regarding the score is indicative of a maximal extent of a risk to privacy of a user from among the users who contributed measurements of affective response to the computation of the score.

The sample generator 842 is configured to generate samples corresponding to the scores. In one embodiment, each sample corresponding to a score comprises: one or more feature values, and a corresponding label generated based on a determination regarding the score, which is computed by the privacy risk assessment module 808. Optionally, the one or more feature values are generated by feature generator 843, and the label is generated by label generator 844. Optionally, each of the one or more feature values is indicative of at least one of the following properties: a property of the subset of the measurements 110 that was used to compute the score, a property of a user with a measurement in the subset (i.e., a user who contributed a measurement to the computation of the score), and a property related to the experience corresponding to the score.

In some embodiments, samples generated by the sample generator 842 do not include features that are directly indicative of the values of the scores. Thus, the feature generator 843 does not require the value of a score in order to compute feature values for the sample corresponding to the scores.

As described in section 20—Risk Functions, the feature values related to a disclosure of the score can correspond to a diverse set of properties related to the subset of measurements used to compute the score, one or more of the users who contributed the measurements, the experience corresponding to the score, and/or an adversary that may utilize the disclosed score. In one example, the features related to the disclosure of the score include at least one feature that describes a property of the subset of measurements used to compute the score, which is indicative of at least one of the following values: (i) the number of users with a measurement in the subset, (ii) the variance of the measurements in the subset. In another example, the features related to the disclosure of the score include at least one feature that describes a property of a user with a measurement in the subset, which is indicative of at least one of the following values: an identity of the user, a demographic statistic of the user, an extent to which the user contributed measurements in the past. In yet another example, the features related to the disclosure of the score include at least one feature that describes a property related to the experience, which is indicative of at least one of the following values: (i) a type of the experience, (ii) an extent of a description of an event involving the experience, and (iii) a location at which the users had the experience.

In order to generate the feature values related to the disclosure of the score the feature generator 843 may receive information from various sources. In one example, the feature generator 843 receives descriptions of events to which the measurements used to compute the score correspond. Optionally, the descriptions are generated by the event annotator 701. In another example, the feature generator 843 receives information from the collection module 120. In still another example, the feature generator 843 receives information from the users who contributed measurements used to compute the score, e.g., via software agents operating on behalf of the users. And in another example, the feature generator 843 receives information from other entities, such as a provider of the experience to which the score corresponds.

The risk model learner 845 is configured to utilize the samples to generate the risk model 847. The risk model 847 is useful for determining, for a set comprising measurements of affective response of at least five users who had a certain experience, an extent of risk to privacy due to a disclosure of a score for the certain experience, which is computed based on the set. Optionally, the determination of the extent of risk may be generated by the risk function module 849, when given a sample comprising feature values generated for the score for the certain experience by the feature generator 843. The risk model learner 845 may utilize various machine learning-based approaches to train the risk model 847, as discussed in more detail in section 20—Risk Functions.

In some embodiments, the samples used to train the risk model 847 comprise samples corresponding to various experiences (i.e., the samples are generated for scores of different experiences). In particular, in one embodiment, the samples include at least a first sample corresponding to a first score for a first experience and a second sample corresponding to a second score for a second experience, which is of a different type than the first experience. In this embodiment, the first and second experiences are of one of the following types of experiences: spending time at a certain location, consuming certain digital content, logging into a server hosting a virtual world, viewing a certain live performance, performing a certain exercise, traveling a certain route, spending time in an environment characterized by a certain environmental condition, shopping, and going on a social outing with people.

Following is a description of steps that may be performed in one embodiment of a method for learning a model used to determine risk to privacy from disclosure of a score computed based on measurements of affective response. The steps described below may, in some embodiments, be part of the steps performed by an embodiment of a system described above, such as a system modeled according to FIG. 17a. In some embodiments, instructions for implementing one or more of the methods described below may be stored on a computer-readable medium, which may optionally be a non-transitory computer-readable medium. In response to execution by a system including a processor and memory, the instructions cause the system to perform operations that are part of the method.

In one embodiment, a method for learning a model used to determine risk to privacy from disclosure of a score computed based on measurements of affective response includes at least the following steps:

In Step 1, receiving measurements of affective response of users; each of the measurements is a measurement of a user who had an experience belonging to a set comprising one or more experiences, and is taken with a sensor coupled to the user.

In Step 2, generating determinations regarding scores for experiences; each score for an experience is computed based on a subset of the measurements comprising measurements of at least five users who had the experience, and a determination regarding the score is indicative of an expected risk to privacy due to a disclosure of the score. Optionally, the determinations are generated by the privacy risk assessment module 808.

In Step 3, generating samples corresponding to the scores; each sample corresponding to a score comprises: one or more feature values, and a corresponding label generated based on a determination regarding the score. Optionally, each of the one or more feature values is indicative of at least one of the following properties: a property of the subset used to compute the score, a property of a user with a measurement in the subset, and a property related to the experience corresponding to the score. Optionally, the samples are generated by the samples generator 842.

And in Step 4, generating, utilizing the samples, a model useful for determining, for a set comprising measurements of affective response of at least five users who had a certain experience, an extent of risk to privacy due to a disclosure of a score for the certain experience, which is computed based on the set. Optionally, the generated model is the risk model 847. Optionally, the model is generated by the risk model learner 845.

In one embodiment, the method optionally includes a step of computing the scores for the experiences. Optionally, each score for an experience is computed based on measurements of at least five of the users who had the experience. Optionally, the scoring module 150 is utilized to compute the scores.

In one embodiment, generating the determination regarding the score is done by computing an extent of an improvement to an adversary bias model comprising bias values due to an update of the adversary bias model based on the score. Optionally, the determination is indicative of the extent of improvement.

In another embodiment, generating the determination regarding the score is done utilizing a function that receives one or more values, each indicative of at least one of the following statistics: a statistic of the measurements contributed for the computation of the score, a statistic regarding the value of the score, a statistic regarding extent of disclosure of data regarding at least one user from among the users who contributed measurements for the computation of the score.

In one embodiment, the method optionally includes a step of taking the measurements of affective response of the users with sensors. Optionally, each of the measurements is indicative of at least one of the following: a value of a physiological signal of a user, and a value of a behavioral cue of the user.

The risk model 847 may be used to determine the risk associated with the disclosure of a score. Therefore, in some embodiments, the privacy risk assessment module 808 may utilize the risk function module 849 along with the risk model 847 to make a determination regarding the disclosure of the score. However, in some embodiments, generating samples that may be used with the risk model 847 does not require to know the value of the score being disclosed. The risk function module 849 along with the risk model 847 may be utilized in order to determine whether to provide measurements for computing a score (in addition to determining how to disclose the score), as described below. Thus, if disclosure of a score may pose a risk to privacy, the measurements themselves may be withheld from other modules (e.g., the scoring module 150), in order to better preserve the privacy of the users.

Figure 17B:
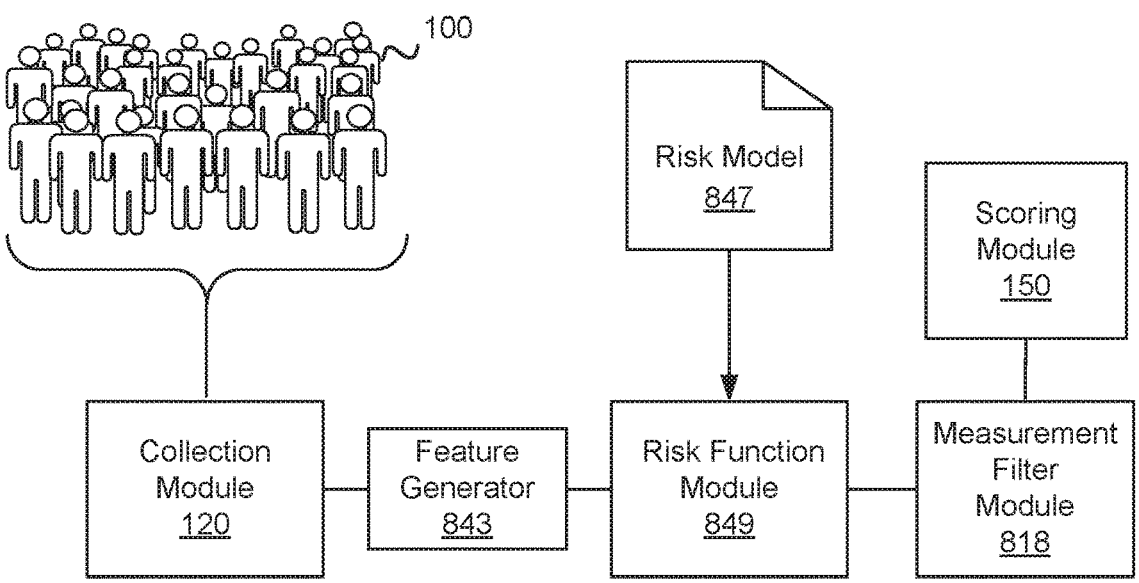
FIG. 17b illustrates a system configured to control forwarding of measurements of affective response based on privacy concerns.

FIG. 17b illustrates one embodiment of a system configured to control forwarding of measurements of affective response based on privacy concerns. The system includes at least the following modules: the collection module 120, the feature generator 843, the risk function module 849, and measurement filter module 818. The system may optionally include additional modules such as the scoring module 150. Some embodiments of the system illustrated in FIG. 17b may also include one or more sensors that are used to obtain the measurements of affective response, such as one or more units of the sensor 102.

The collection module 120 is configured, in one embodiment, to receive a set of measurements of affective response of users who had an experience. Optionally, each measurement of a user is taken with a sensor coupled to the user, such as the sensor 102. Optionally, the set includes measurements of at least five users.

The feature generator 843 is configured to generate one or more feature values related to the set of measurements. Optionally, each feature value is indicative of at least one of the following properties: a property of the set of measurements, a property of a user with a measurement in the set of measurements, and a property related to the experience which the users had. Note that the one or more feature values represent the same type of information (e.g., the same type of feature vectors) that were generated for samples used to train the risk model 847.

The risk function module 849 is configured, in one embodiment, to produce, based on an input comprising the one or more feature values, an output indicative of an extent of a risk to privacy due to a disclosure of a score computed based on the set. Optionally, the risk function module 849 utilizes the risk model 847 to produce the output.

In different embodiments, the output may refer to different types of risk to privacy. In one embodiment, the output may be indicative of an extent of a risk to privacy of a certain user. In another embodiment, the output may be indicative of an average extent of a risk to privacy of the users with a measurement in the set. In yet another embodiment, the output may be indicative of a maximal extent of a risk to privacy of a user from among the users with a measurement in the set.

The measurement filter module 818 is configured to control, based on the output, forwarding of measurements belonging to the set to the scoring module 150 and/or to other modules. Optionally, the measurement filter module 818 enables a larger portion of the measurements belonging to the set to be forwarded when the output indicates that the risk does not reach a threshold, compared to a portion of the measurements belonging to the set that the measurement filter module 818 enables to be forwarded when the output indicates that the risk reaches the threshold.

In one embodiment, when the output indicates that the risk does not reach the threshold, all of the measurements belonging to the set are forwarded to the scoring module 150 and/or to other modules.

In one embodiment, when the output indicates that the risk reaches the threshold, none of the measurements belonging to the set are forwarded to the scoring module 150 and/or to other modules.

In one embodiment, the output may be indicative of a certain user whose privacy is at risk, and a measurement of the certain user is not forwarded to the scoring module 150 and/or to other modules.

In some embodiments, forwarding measurements of affective response involves transmitting data describing the measurements. Optionally, transmitting the data involves sending data on a short-range wireless communication channel, a wired communication channel, over the Internet, over an Ethernet, via a USB connection, and/or via the network 112.

In some embodiments, the output generated by the risk function module 849 is not the same for all sets of measurements. In particular, the collection module 120 receives measurements belonging to first and second sets of measurements of affective response, each comprising measurements of at least five users. A first output produced based on one or more feature values related to the first set indicates that an extent of risk to privacy due to disclosure of a score computed based on the first set does not reach the threshold. However, a second output produced based on one or more feature values related to the second set indicates that an extent of risk to privacy due to disclosure of a score computed based on the second set reaches the threshold.

There may be various reasons why the first and second outputs for the first and second sets are different. These reasons may stem from the feature values generated for each of the sets. Since there may be a large number of different risk functions that may be implemented by the risk function module 849, when it utilizes the risk model 847, then rather than discuss a certain implementation, it is possible to discuss a characterization of the risk function. For example, the risk function may be represented as a function $R(\ )$. Where the value of the function is dependent on risk components, as described in the examples below. It is to be noted that a risk component described below may, in some embodiments, be a feature in samples provided to the risk function module 849. However, in other embodiments, the risk component may be indicated in the feature values of the sample (i.e., the feature values are indicative of the risk component). A more thorough discussion of the characterizations of the risk function and the risk components is given in section 20—Risk Functions.

In one embodiment, the one or more feature values related to the first set include a first feature value indicative of the number of users with a measurement in the first set (denoted $n_1$), and the one or more feature values related to the second set include a second feature value indicative of the number of users with a measurement in the second set (denoted $n_2$). In this embodiment, $n_1 > n_2$. If it is assumed that the number of users is a risk component that characterizes the risk function, then in this embodiment, the risk function may be denoted $R(n)$. The fact that the first output indicates that the risk from disclosure of a score computed based on the first set does not reach the threshold, and that the second output indicates that the risk from disclosure of a computed based on the second set reaches the threshold is indicative that $R(n_2) > R(n_1)$. This type of behavior of the risk function in this embodiment represents the fact that generally, with all other things being equal, the more users contribute measurements to a score, the less risky it is to privacy to disclose the score.

In another embodiment, the one or more feature values related to the first set include a first feature value indicative of the variance of the measurements in the first set (denoted $v_1$), and the one or more feature values related to the second set include a second feature value indicative of the variance of the measurements in the second set (denoted $v_1$). In this embodiment, $v_1 > v_2$. If it is assumed that the variance of the measurements is a risk component that characterizes the risk function, then in this embodiment, the risk function may be denoted $R(v)$. The fact that the first output indicates that the risk from disclosure of a score computed based on the first set does not reach the threshold, and the second output indicates that the risk from disclosure of a score computed based on the second set reaches the threshold, is indicative that $R(v_2) > R(v_1)$. This type of behavior of the risk function in this embodiment represents the fact that generally, with all other things being equal, the larger the variance of measurements used to compute a score, the less risky it is to privacy to disclose the score.

In another embodiment, the one or more feature values related to the first set include a first feature value indicative of the extent to which a user, from among the users with a measurement in the first set, made previous contributions of measurements (denoted $e_1$), and the one or more feature values related to the second set include a second feature value indicative of the extent to which a user, from among the users with a measurement in the second set, made previous contributions of measurements (denoted $e_2$). In this embodiment, $e_1 < e_2$. In one example, the first and second feature values are indicative of the average number of measurements contributed in the past by users with a measurement in the first and second sets, respectively. In another example, the first feature value is indicative of the maximal number of measurements contributed in the past by a user with a measurement in the first set, and the second feature value is indicative of the maximal number of measurements contributed in the past by a user with a measurement in the second set.

If it is assumed that the extent of previous contributions is a risk component that characterizes the risk function, then in this embodiment, the risk function may be denoted $R(e)$. The fact that the first output indicates that the risk from disclosure of a score computed based on the first set does not reach the threshold, and the second output indicates that the risk from disclosure of a score computed based on the second set reaches the threshold, is indicative that $R(e_2) > R(e_1)$. This type of behavior of the risk function, in this embodiment, represents the fact that generally, with all other things being equal, the more users make contributions, the better they are modeled, and disclosing of scores to which they contribute may be more risky to privacy.

In yet another embodiment, the first set comprises measurements of users who had a first experience of a first type, while the second set comprises measurements of users who had a second experience of a second type, which is different from the first type. In this embodiment, the one or more feature values related to the first set include a first feature value indicative of the number of users with a measurement in the first set, and the one or more feature values related to the second set include a second feature value indicative of the number of users with a measurement in the second set, which is not smaller than the number of users with a measurement in the first set. Thus, in this embodiment, the type of experience may influence the risk predicted by the risk function module 849.

Following is a description of steps that may be performed in one embodiment of a method for forwarding of measurements of affective response while taking into account privacy considerations. The steps described below may, in some embodiments, be part of the steps performed by an embodiment of a system described above, such as a system modeled according to FIG. 17b. In some embodiments, instructions for implementing one or more of the methods described below may be stored on a computer-readable medium, which may optionally be a non-transitory computer-readable medium. In response to execution by a system including a processor and memory, the instructions cause the system to perform operations that are part of the method.

In some embodiments of the method, different sets of measurements may have different outputs created for them, indicative of their associated risk. Thus, the sets of data may be forwarded differently. This is illustrated in the following description of an embodiment of the method for forwarding measurements of affective response while taking into account privacy considerations, which includes at least the following steps:

In Step 1, receiving, by a system comprising a computer and processor, first and second sets of measurements of affective response. Optionally, the first set comprises measurements of at least five users who had a first experience, and the second set comprises measurements of at least five users who had a second experience. Optionally, the first experience and second experience are experiences of different types. Alternatively, the first and second experiences may be the same type of experience.

In Step 2, generating a first sample comprising one or more feature values related to the first set. Optionally, each feature value in the first sample is indicative of at least one of the following properties: a property of the first set, a property of a user with a measurement in the first set, and a property related to the first experience. Optionally, the features in the first sample are generated by feature generator 843.

In Step 3, generating, based on the first sample, a first output indicative of a first extent of a risk to privacy due to a disclosure of a score computed based on the first set. Optionally, the first output is generated by providing risk function module 849 with the first sample as input. Optionally, the risk function module 849 utilizes the risk model 847 to generate the first output.

In Step 4, responsive to determining that the risk indicated in the first output does not reach a threshold, forwarding a first portion of the first set to a scoring module. Optionally, the first portion is forwarded to the scoring module 150. Optionally, forwarding the first portion involves forwarding all of the measurements in the first set.

In Step 5, generating a second sample comprising one or more feature values related to the second set. Optionally, each feature value in the second sample is indicative of at least one of the following properties: a property of the second set, a property of a user with a measurement in the second set, and a property related to the second experience. Optionally, the features in the second sample are generated by feature generator 843.

In Step 6, generating, based on the second sample, a second output indicative of a second extent of a risk to privacy due to a disclosure of a score computed based on the second set. Optionally, the second output is generated by providing risk function module 849 with the second sample as input. Optionally, the risk function module 849 utilizes the risk model 847 to generate the second output And in Step 7, responsive to determining that the risk indicated in the second output reaches the threshold, forwarding a second portion of the second set to a scoring module. In this embodiment, the second portion is smaller than the first portion. Optionally, the second portion is zero, and no measurements from the second set are forwarded to the scoring module. Optionally, the second output is indicative of a certain user whose privacy is at risk, and a measurement of the certain user is not forwarded to the scoring module.

In one embodiment, the method may optionally include a step involving taking the first and second sets of measurements of affective response with sensors. Optionally, each of the measurements is indicative of at least one of the following: a value of a physiological signal of a user, and a value of a behavioral cue of the user.

The value of a score may help, in some embodiments, in determining the risk involved in disclosing it. For example, a score that has an extreme value (it has a low probability) may be more revealing about the user who contributed measurements to its computation, than a score that has a value that is typically observed (it has a high probability). In another example, disclosing a score that is determined with high confidence might be more risky than disclosing a score that is determined with low confidence (e.g., with a large confidence interval). Some embodiments, when a score with high confidence is disclosed the value of the score can more accurately be used to infer about the users who contributed measurements to it than a score with a lower confidence.

Figure 18A:
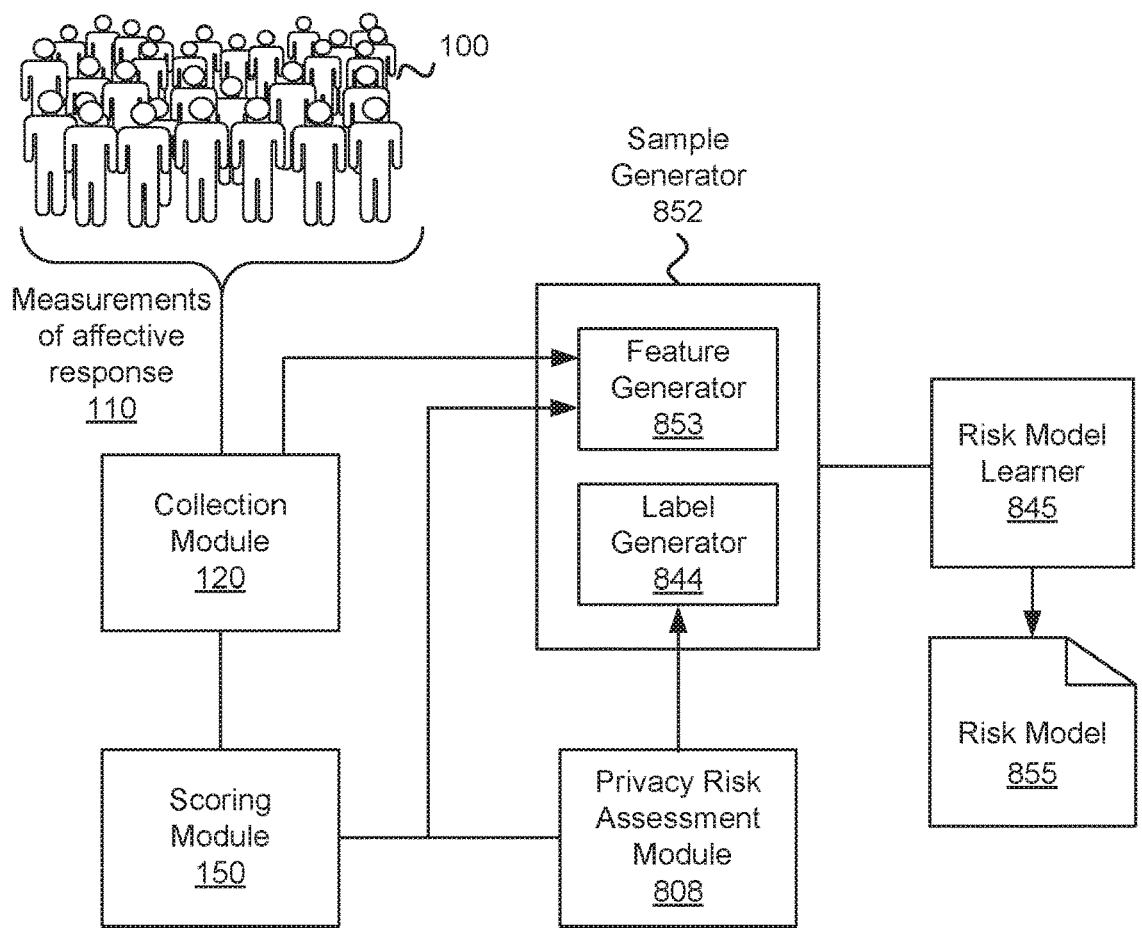
FIG. 18a illustrates a system configured to learn a model that involves features related to a value of a score, which may be used to determine risk to privacy from disclosure of the score.

FIG. 18a illustrates one embodiment of a system configured to learn a model (referred to herein as a "risk model"), which is used to determine risk to privacy from disclosure of a score computed based on measurements of affective response. The system includes at least the following modules: the collection module 120, the privacy risk assessment module 808, the scoring module 150, sample generator 852, and the risk model learner 845. In some embodiments of the system illustrated in FIG. 18a may also include one or more sensors that are used to obtain the measurements 110 of affective response, such as one or more units of the sensor 102.

The collection module 120 is configured, in one embodiment, to receive measurements 110 of affective response of users belonging to the crowd 100. Optionally, each measurement of a user corresponds to an event in which the user had an experience, and the measurement is taken with a sensor coupled to the user (e.g., the sensor 102).

The scoring module 150 is configured, in one embodiment, to compute scores for experiences. Optionally, each score for an experience is computed based on a subset of the measurements comprising measurements of at least five of the users who had the experience.

The privacy risk assessment module 808 is configured, in one embodiment, to make determinations regarding the scores for experiences. Optionally, a determination regarding the score is indicative of an expected risk to privacy due to a disclosure of the score. Optionally, the determination regarding the score is indicative of an extent of an improvement to an adversary bias model that comprises bias values due to an update of the adversary bias model following the disclosure of the score.

The determination made by the privacy risk assessment module 808 may refer to various types of risks. In one embodiment, the privacy risk assessment module 808 is configured to receive an indication of a certain user, and the determination regarding the score is indicative of an extent of a risk to privacy of the certain user. In another embodiment, the determination regarding the score is indicative of an average extent of a risk to privacy of the users who contributed measurements of affective response used for the computation of the score. In yet another embodiment, the determination regarding the score is indicative of a maximal extent of a risk to privacy of a user from among the users who contributed measurements of affective response to the computation of the score.

The sample generator 852 is configured to generate samples corresponding to the scores. In one embodiment, each sample corresponding to a score comprises: one or more feature values, and a corresponding label generated based on a determination regarding the score, which is computed by the privacy risk assessment module 808.

Optionally, the one or more feature values are generated by feature generator 853, and the label is generated by label generator 844. Optionally, each of the one or more feature values is indicative of at least one of the following properties: a property of the score, a property of the subset used to compute the score, a property of a user with a measurement in the subset (i.e., a user who contributed a measurement to the computation of the score), and a property related to the experience corresponding to the score.

As described in section 20—Risk Functions, the feature values related to a disclosure of the score can correspond to a diverse set of properties related to the subset of measurements used to compute the score, one or more of the users who contributed the measurements, the experience corresponding to the score, a property of the score, and/or an adversary that may utilize the disclosed score.

In one embodiment, at least some of the feature values generated by the feature generator 853 relate to a property of the score being disclosed. Optionally, the property of the score is indicative of at least one of the following values: (i) the value of the score, (ii) a probability of the score, and (iii) a significance of the score. Optionally, the probability of the score is indicative of at least one of the following values: a frequency at which the value of the score is observed, the frequency at which scores with values equal to, or greater than, the value of the score, are observed. Optionally, the significance of the score in indicative of at least one of the following values: (i) a p-value of the score, (ii) a q-value of the score, and (iii) a confidence interval of the score.

Following are some example of features that may be generated by the feature generator 853, which are related to the disclosure of the score. In one example, the features related to the disclosure of the score include at least one feature that describes a property of the subset of measurements used to compute the score, which is indicative of at least one of the following values: (i) the number of users with a measurement in the subset, (ii) the variance of the measurements in the subset. In another example, the features related to the disclosure of the score include at least one feature that describes a property of a user with a measurement in the subset, which is indicative of at least one of the following values: an identity of the user, a demographic statistic of the user, an extent to which the user contributed measurements in the past. In yet another example, the features related to the disclosure of the score include at least one feature that describes a property related to the experience, which is indicative of at least one of the following values: (i) a type of the experience, (ii) an extent of a description of an event involving the experience, and (iii) a location at which the users had the experience.

In order to generate the feature values related to the disclosure of the score the feature generator 853 may receive information from various sources. In one example, the feature generator 853 receives information about the score and/or its computation from the scoring module 150. In another example, the feature generator 853 receives descriptions of events to which the measurements used to compute the score correspond. Optionally, the descriptions are generated by the event annotator 701. In yet another example, the feature generator 853 receives information from the collection module 120. In still another example, the feature generator 853 receives information from the users who contributed measurements used to compute the score, e.g., via software agents operating on behalf of the users. And in yet another example, the feature generator 853 receives information from other entities, such as a provider of the experience to which the score corresponds.

The risk model learner 845 is configured to utilize the samples to generate the risk model 857. The risk model 857 is useful for determining, for a certain score, an extent of risk to privacy due to a disclosure of the certain score. Optionally, the determination of the extent of risk may be generated by the risk function module 849, when given a sample comprising feature values generated for the score for the certain experience by the feature generator 853. The risk model learner 845 may utilize various machine learning-based approaches to train the risk model 857, as discussed in more detail in section 20—Risk Functions.

In some embodiments, the samples used to train the risk model 857 comprise samples corresponding to various experiences (i.e., the samples are generated for scores of different experiences). In particular, in one embodiment, the samples include at least a first sample corresponding to a first score for a first experience and a second sample corresponding to a second score for a second experience, which is of a different type than the first experience. In this embodiment, the first and second experiences are of one of the following types of experiences: spending time at a certain location, consuming certain digital content, logging into a server hosting a virtual world, viewing a certain live performance, performing a certain exercise, traveling a certain route, spending time in an environment characterized by a certain environmental condition, shopping, and going on a social outing with people.

Following is a description of steps that may be performed in one embodiment of a method for learning a model used to determine risk to privacy from disclosure of a score computed based on measurements of affective response. The steps described below may, in some embodiments, be part of the steps performed by an embodiment of a system described above, such as a system modeled according to FIG. 18*a*. In some embodiments, instructions for implementing one or more of the methods described below may be stored on a computer-readable medium, which may optionally be a non-transitory computer-readable medium. In response to execution by a system including a processor and memory, the instructions cause the system to perform operations that are part of the method.

In one embodiment, a method for learning a model used to determine risk to privacy from disclosure of a score computed based on measurements of affective response includes at least the following steps:

In Step 1, receiving measurements of affective response of users; each of the measurements is a measurement of a user who had an experience belonging to a set comprising one or more experiences, and is taken with a sensor coupled to the user.

In Step 2, computing scores for experiences. Optionally, each score for an experience is computed based on a subset of the measurements comprising measurements of at least five of the users who had the experience. Optionally, the scores are computed by the scoring module 150.

In Step 3, generating determinations regarding the scores. Optionally, a determination regarding a score is indicative of an expected risk to privacy due to a disclosure of the score. Optionally, the determination is generated by the privacy risk assessment module 808.

In Step 4, generating samples corresponding to the scores; each sample corresponding to a score comprises: one or more feature values, and a corresponding label generated based on a determination regarding the score. Optionally, each of the one or more feature values is indicative of at least one of the following properties: a property of the score, a property of the subset used to compute the score, a property of a user with a measurement in the subset, and a property related to the experience corresponding to the score. Optionally, the samples are generated by the samples generator 852.

And in Step 5, generating, utilizing the samples, a model useful for determining, for a certain score, an extent of risk to privacy due to a disclosure of the certain score. Optionally, the generated model is the risk model 857. Optionally, the model is generated by the risk model learner 845.

In one embodiment, the method optionally includes a step of computing the scores for the experiences. Optionally, each score for an experience is computed based on measurements of at least five of the users who had the experience. Optionally, the scoring module 150 is utilized to compute the scores.

In one embodiment, generating the determination regarding the score is done by computing an extent of an improvement to an adversary bias model comprising bias values due to an update of the adversary bias model based on the score. Optionally, the determination is indicative of the extent of improvement.

In another embodiment, generating the determination regarding the score is done utilizing a function that receives one or more values, each indicative of at least one of the following statistics: a statistic of the measurements contributed for the computation of the score, a statistic regarding the value of the score, a statistic regarding extent of disclosure of data regarding at least one user from among the users who contributed measurements for the computation of the score.

In one embodiment, the method optionally includes a step of taking the measurements of affective response of the users with sensors. Optionally, each of the measurements is indicative of at least one of the following: a value of a physiological signal of a user, and a value of a behavioral cue of the user.

Figure 18B:
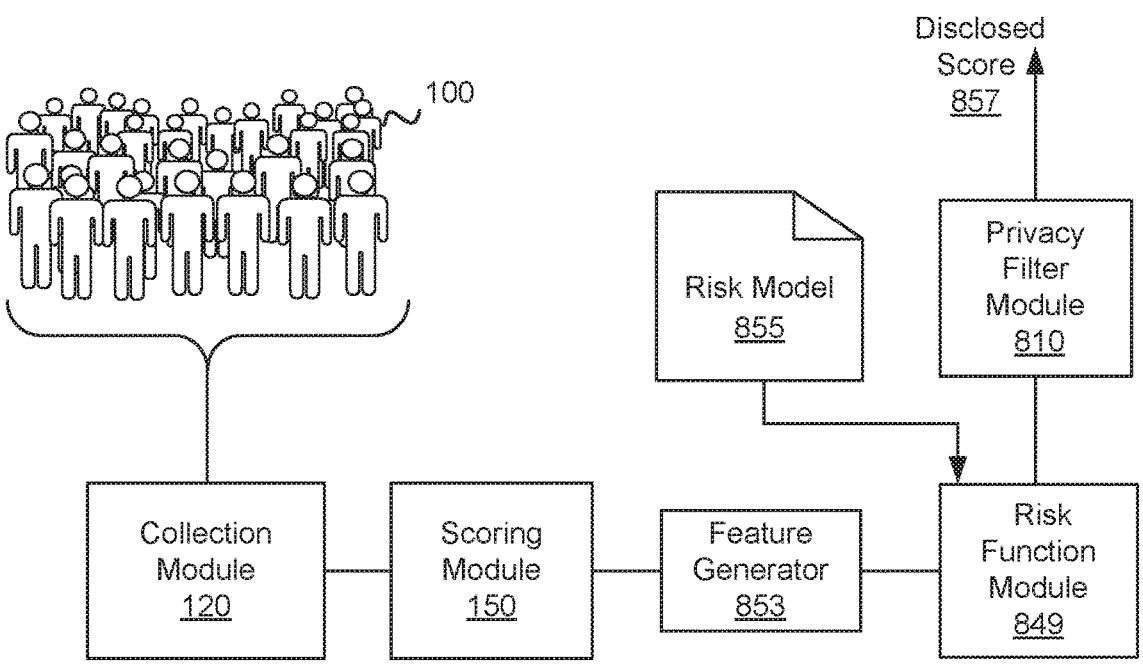
FIG. 18b illustrates a system configured to control disclosure of a score for an experience based on privacy concerns.

The risk model 857 may be used to determine the risk associated with the disclosure of a score. Therefore, in some embodiments, the privacy risk assessment module 808 may utilize the risk function module 849 along with the risk model 857 to make a determination regarding the disclosure of the score. An embodiment in which this happens is shown in FIG. 18*b*, which illustrates one embodiment of a system configured to control disclosure of a score for an experience based on privacy concerns. The system includes at least the following modules: the collection module 120, the scoring module 150, the feature generator 853, the risk function module 849, and the privacy filter module 810. Some embodiments of the system illustrated in FIG. 18*b* may also include one or more sensors that are used to obtain the measurements of affective response, such as one or more units of the sensor 102.

The collection module 120 is configured, in one embodiment, to receive a set of measurements of affective response of users who had an experience. Optionally, each measurement of a user is taken with a sensor coupled to the user, such as the sensor 102. Optionally, the set includes measurements of at least five users.

The scoring module 150 is configured, in one embodiment, to compute the score for the experience based on a subset of the measurements comprising measurements of at least five of the users.

The feature generator 853 is configured to generate one or more feature values related to the score. Optionally, each feature value is indicative of at least one of the following properties: a property of the score, and a property of the subset used to compute the score, a property of a user with a measurement in the subset, and a property related to the experience corresponding to the score. Note that the one or more feature values represent the same type of information (e.g., the same type of feature vectors) that were generated for samples used to train the risk model 857.

The risk function module 849 is configured, in one embodiment, to produce, based on an input comprising the one or more feature values, an output indicative of an extent of a risk to privacy due to a disclosure of the score. Optionally, the risk function module 849 utilizes the risk model 857 to produce the output.

In different embodiments, the output may refer to different types of risk to privacy. In one embodiment, the output may be indicative of an extent of a risk to privacy of a certain user. In another embodiment, the output may be indicative of an average extent of a risk to privacy of the users with a measurement in the set. In yet another embodiment, the output may be indicative of a maximal extent of a risk to privacy of a user from among the users with a measurement in the set.

The privacy filter module 810 is configured, in one embodiment, to disclose the score in a manner that is based on the output. Optionally, responsive to the output indicating that the risk does not reach a threshold, the score is disclosed in a first manner, and responsive to the output indicating that the risk does reach the threshold, the score is disclosed in a second manner, which is less descriptive than the first manner. In one embodiment, the privacy filter module 810 is configured to provide, when disclosing the score in the second manner, fewer values associated with the score, compared to the number of values associated with the score the privacy filter module is configured to provide, when disclosing in the first manner. In another embodiment, the privacy filter module 810 is configured to provide, when disclosing in the second manner, fewer bits of information describing the score, compared to the number of bits of information describing the score the privacy filter module is configured to provide, when disclosing in the first manner. And in another embodiment, when disclosing the score in the second manner, the privacy filter module 810 does not provide data describing a value of the score.

In some embodiments, the output generated by the risk function module 849 is not the same for all sets of measurements. In particular, the collection module 120 receives measurements belonging to first and second sets of measurements of affective response, each comprising measurements of at least five users. A first output produced based on one or more feature values related to a first score computed based on the first set indicates that an extent of risk to privacy due to disclosure of the first score does not reach the threshold. However, a second output produced based on one or more feature values related to a second score computed based on the second set indicates that an extent of risk to privacy due to disclosure of the second score reaches the threshold.

There may be various reasons why the first and second outputs for the first and second scores are different. These reasons may stem from the feature values generated for each of the scores. Since there may be a large number of different risk functions that may be implemented by the risk function module 849, when it utilizes the risk model 857, then rather than discuss a certain implementation, it is possible to discuss a characterization of the risk function. For example, the risk function may be represented as a function R( ). Where the value of the function is dependent on risk components, as described in the examples below. It is to be noted that a risk component described below may, in some embodiments, be a feature in samples provided to the risk function module 849. However, in other embodiments, the risk component may be indicated in the feature values of the sample (i.e., the feature values are indicative of the risk component). A more thorough discussion of the characterizations of the risk function and the risk components is given in section 20—Risk Functions.

In one embodiment, the one or more feature values related to the first score include a first feature value indicative of a probability of the first score (denoted $p_1$), and the one or more feature values related to the second score include a second feature value indicative of a probability of the second score (denoted $p_2$). In this embodiment, $p_1 > p_2$. If it is assumed that the probability of a score is a risk component that characterizes the risk function, then in this embodiment, the risk function may be denoted $R(p)$. The fact that the first output indicates that the risk from disclosure of the first score does not reach the threshold, and the second output indicates that the risk from disclosure of the second score reaches the threshold, is indicative that $R(p_2) > R(p_1)$. This type of behavior of the risk function in this embodiment represents the fact that generally, with all other things being equal, the less probable the score (it is an extreme value), the more risky to the privacy is the disclosure of the score.

In another embodiment, the one or more feature values related to the first score include a first feature value indicative of a confidence in the first score (denoted $c_1$), and the one or more feature values related to the second score include a second feature value indicative of a confidence in the second score (denoted $c_2$). In this embodiment, $c_2 > c_1$. If it is assumed that the confidence in a score is a risk component that characterizes the risk function, then in this embodiment, the risk function may be denoted $R(c)$. The fact that the first output indicates that the risk from disclosure of the first score does not reach the threshold, and the second output indicates that the risk from disclosure of the second score reaches the threshold, is indicative that $R(c_2) > R(c_1)$. This type of behavior of the risk function in this embodiment represents the fact that generally, with all other things being equal, the more confidence in a score (it has small confidence intervals), the more risky to the privacy is the disclosure of the score.

In yet another embodiment, the one or more feature values related to the first score include a first feature value indicative of the number of users with a measurement in the first set (denoted $n_1$), and the one or more feature values related to the second score include a second feature value indicative of the number of users with a measurement in the second set (denoted $n_2$). In this embodiment, $n_1 > n_2$. If it is assumed that the number of users is a risk component that characterizes the risk function, then in this embodiment, the risk function may be denoted $R(n)$. The fact that the first output indicates that the risk from disclosure of the first score does not reach the threshold, and the second output indicates that the risk from disclosure of the second score reaches the threshold, is indicative that $R(n_2) > R(n_1)$. This type of behavior of the risk function in this embodiment represents the fact that generally, with all other things being equal, the more users contribute measurements to a score, the less risky it is to privacy to disclose the score.

In still another embodiment, the one or more feature values related to the first score include a first feature value indicative of the variance of the measurements in the first set (denoted $v_1$), and the one or more feature values related to the second score include a second feature value indicative of the variance of the measurements in the second set (denoted $v_1$). In this embodiment, $v_1 > v_2$. If it is assumed that the variance of the measurements is a risk component that characterizes the risk function, then in this embodiment, the risk function may be denoted $R(v)$. The fact that the first output indicates that the risk from disclosure of the first score does not reach the threshold, and the second output indicates that the risk from disclosure of the second score reaches the threshold, is indicative that $R(v_2) > R(v_1)$. This type of behavior of the risk function in this embodiment represents the fact that generally, with all other things being equal, the larger the variance of measurements used to compute a score, the less risky it is to privacy to disclose the score.

Following is a description of steps that may be performed in one embodiment of a method for controlling disclosure of a score for an experience based on privacy concerns. The steps described below may, in some embodiments, be part of the steps performed by an embodiment of a system described above, such as a system modeled according to FIG. 18b. In some embodiments, instructions for implementing one or more of the methods described below may be stored on a computer-readable medium, which may optionally be a non-transitory computer-readable medium. In response to execution by a system including a processor and memory, the instructions cause the system to perform operations that are part of the method.

In some embodiments of the method, different scores computed based on different sets of measurements may receive different output generated for them, indicative of risk. Thus, the sets of data may be forwarded differently. This is illustrated in the following description of an embodiment of the method for controlling disclosure of a score for an experience based on privacy concerns which includes at least the following steps:

In Step 1, receiving, by a system comprising a computer and processor, first and second subsets of measurements of affective response. Optionally, the first subset comprises measurements of at least five users who had a first experience, and the second subset comprises measurements of at least five users who had a second experience. Optionally, the first experience and second experience are experiences of different types. Alternatively, the first and second experiences may be the same type of experience.

In Step 2, computing a first score based on the first subset.

In Step 3, generating a first sample comprising one or more feature values related to the first score. Optionally, each feature value in the first sample is indicative of at least one of the following properties: a property of the first score, and a property of the first subset, a property of a user with a measurement in the first subset, and a property related to the first experience. Optionally, the features in the first sample are generated by feature generator 853.

In Step 4, generating, based on the first sample, a first output indicative of a first extent of a risk to privacy due to a disclosure of the first score. Optionally, the first output is generated by providing risk function module 849 with the first sample as input. Optionally, the risk function module 849 utilizes the risk model 857 to generate the first output.

In Step 5, responsive to determining that the risk indicated in the first output does not reach a threshold, disclosing the first score in a first manner.

In Step 6, computing a second score based on the second subset.

In Step 7, generating a second sample comprising one or more feature values related to the second score. Optionally, each feature value is indicative of at least one of the following properties: a property of the second score, and a property of the second subset, a property of a user with a measurement in the second subset, and a property related to the second experience. Optionally, the features in the second sample are generated by feature generator 853.

In Step 8, generating, based on the second sample, a second output indicative of a second extent of a risk to privacy due to a disclosure of a score computed based on the second set. Optionally, the second output is generated by providing risk function module 849 with the second sample as input. Optionally, the risk function module 849 utilizes the risk model 857 to generate the second output And in Step 9, responsive to determining that the risk indicated in the second output reaches the threshold, disclosing the second score in a second manner, which is less descriptive than the first manner.

In one embodiment, the method may optionally include a step involving taking the first and second sets of measurements of affective response with sensors. Optionally, each of the measurements is indicative of at least one of the following: a value of a physiological signal of a user, and a value of a behavioral cue of the user.

In one embodiment, a larger number of values associated with the first score are provided compared to the number of values associated with the second score that are provided. In another embodiment, more bits of information describing the first score are provided, compared to the number of bits of information describing the second score that are provided. In yet another embodiment, no data describing the second score is disclosed.

1—Sensors

As used herein, a sensor is a device that detects and/or responds to some type of input from the physical environment. Herein, "physical environment" is a term that includes the human body and its surroundings.

In some embodiments, a sensor that is used to measure affective response of a user may include, without limitation, one or more of the following: a device that measures a physiological signal of the user, an image-capturing device (e.g., a visible light camera, a near infrared (NIR) camera, a thermal camera (useful for measuring wavelengths larger than 2500 nm), a microphone used to capture sound, a movement sensor, a pressure sensor, a magnetic sensor, an electro-optical sensor, and/or a biochemical sensor. When a sensor is used to measure the user, the input from the physical environment detected by the sensor typically originates and/or involves the user. For example, a measurement of affective response of a user taken with an image capturing device comprises an image of the user. In another example, a measurement of affective response of a user obtained with a movement sensor typically detects a movement of the user. In yet another example, a measurement of affective response of a user taken with a biochemical sensor may measure the concentration of chemicals in the user (e.g., nutrients in blood) and/or by-products of chemical processes in the body of the user (e.g., composition of the user's breath).

Sensors used in embodiments described herein may have different relationships to the body of a user. In one example, a sensor used to measure affective response of a user may include an element that is attached to the user's body (e.g., the sensor may be embedded in gadget in contact with the body and/or a gadget held by the user, the sensor may comprise an electrode in contact with the body, and/or the sensor may be embedded in a film or stamp that is adhesively attached to the body of the user). In another example, the sensor may be embedded in, and/or attached to, an item worn by the user, such as a glove, a shirt, a shoe, a bracelet, a ring, a head-mounted display, and/or helmet or other form of headwear. In yet another example, the sensor may be implanted in the user's body, such a chip or other form of implant that measures the concentration of certain chemicals, and/or monitors various physiological processes in the body of the user. And in still another example, the sensor may be a device that is remote of the user's body (e.g., a camera or microphone).

As used herein, a "sensor" may refer to a whole structure housing a device used for detecting and/or responding to some type of input from the physical environment, or to one or more of the elements comprised in the whole structure. For example, when the sensor is a camera, the word sensor may refer to the entire structure of the camera, or just to its CMOS detector.

In some embodiments, a sensor may store data it collects and/processes (e.g., in electronic memory). Additionally or alternatively, the sensor may transmit data it collects and/or processes. Optionally, to transmit data, the sensor may use various forms of wired communication and/or wireless communication, such as Wi-Fi signals, Bluetooth, cellphone signals, and/or near-field communication (NFC) radio signals.

In some embodiments, a sensor may require a power supply for its operation. In one embodiment, the power supply may be an external power supply that provides power to the sensor via a direct connection involving conductive materials (e.g., metal wiring and/or connections using other conductive materials). In another embodiment, the power may be transmitted to the sensor wirelessly.

Examples of wireless power transmissions that may be used in some embodiments include inductive coupling, resonant inductive coupling, capacitive coupling, and magnetodynamic coupling. In still another embodiment, a sensor may harvest power from the environment. For example, the sensor may use various forms of photoelectric receptors to convert electromagnetic waves (e.g., microwaves or light) to electric power. In another example, radio frequency (RF) energy may be picked up by a sensor's antenna and converted to electrical energy by means of an inductive coil. In yet another example, harvesting power from the environment may be done by utilizing chemicals in the environment. For example, an implanted (in vivo) sensor may utilize chemicals in the body of the user that store chemical energy such as ATP, sugars, and/or fats.

In some embodiments, a sensor may receive at least some of the energy required for its operation from a battery. Such a sensor may be referred to herein as being "battery-powered". Herein, a battery refers to an object that can store energy and provide it in the form of electrical energy. In one example, a battery includes one or more electrochemical cells that convert stored chemical energy into electrical energy. In another example, a battery includes a capacitor that can store electrical energy. In one embodiment, the battery may be rechargeable; for example, the battery may be recharged by storing energy obtained using one or more of the methods mentioned above. Optionally, the battery may be replaceable. For example, a new battery may be provided to the sensor in cases where its battery is not rechargeable, and/or does not recharge with the desired efficiency.

In some embodiments, a measurement of affective response of a user comprises, and/or is based on, a physiological signal of the user, which reflects a physiological state of the user. Following are some non-limiting examples of physiological signals that may be measured. Some of the example below include types of techniques and/or sensors that may be used to measure the signals; those skilled in the art will be familiar with various sensors, devices, and/or methods that may be used to measure these signals:

(A) Heart Rate (HR), Heart Rate Variability (HRV), and Blood-Volume Pulse (BVP), and/or other parameters relating to blood flow, which may be determined by various means such as electrocardiogram (ECG), photoplethysmogram (PPG), and/or impedance cardiography (ICG).

(B) Skin conductance (SC), which may be measured via sensors for Galvanic Skin Response (GSR), which may also be referred to as Electrodermal Activity (EDA).

(C) Skin Temperature (ST) may be measured, for example, with various types of thermometers.

(D) Brain activity and/or brainwave patterns, which may be measured with electroencephalography (EEG). Additional discussion about EEG is provided below.

(E) Brain activity determined based on functional magnetic resonance imaging (fMRI).

(F) Brain activity based on Magnetoencephalography (MEG).

(G) Muscle activity, which may be determined via electrical signals indicative of activity of muscles, e.g., measured with electromyography (EMG). In one example, surface electromyography (sEMG) may be used to measure muscle activity of frontalis and corrugator supercilii muscles, indicative of eyebrow movement, and from which an emotional state may be recognized.

(H) Eye movement, e.g., measured with electrooculography (EOG).

(I) Blood oxygen levels that may be measured using hemoencephalography (HEG).

(J) $CO_2$ levels in the respiratory gases that may be measured using capnography.

(K) Concentration of various volatile compounds emitted from the human body (referred to as the Volatome), which may be detected from the analysis of exhaled respiratory gasses and/or secretions through the skin using various detection tools that utilize nanosensors.

(L) Temperature of various regions of the body and/or face may be determined utilizing thermal Infra-Red (IR) cameras. For example, thermal measurements of the nose and/or its surrounding region may be utilized to estimate physiological signals such as respiratory rate and/or occurrence of allergic reactions.

In some embodiments, a measurement of affective response of a user comprises, and/or is based on, a behavioral cue of the user. A behavioral cue of the user is obtained by monitoring the user in order to detect things such as facial expressions of the user, gestures made by the user, tone of voice, and/or other movements of the user's body (e.g., fidgeting, twitching, or shaking). The behavioral cues may be measured utilizing various types of sensors. Some non-limiting examples include an image capturing device (e.g., a camera), a movement sensor, a microphone, an accelerometer, a magnetic sensor, and/or a pressure sensor. In one example, a behavioral cue may involve prosodic features of a user's speech such as pitch, volume, tempo, tone, and/or stress (e.g., stressing of certain syllables), which may be indicative of the emotional state of the user. In another example, a behavioral cue may be the frequency of movement of a body (e.g., due to shifting and changing posture when sitting, laying down, or standing). In this example, a sensor embedded in a device such as accelerometers in a smartphone or smartwatch may be used to take the measurement of the behavioral cue.

In some embodiments, a measurement of affective response of a user may be obtained by capturing one or more images of the user with an image-capturing device, such as a camera. Optionally, the one or more images of the user are captured with an active image-capturing device that transmits electromagnetic radiation (such as radio waves, millimeter waves, or near visible waves) and receives reflections of the transmitted radiation from the user. Optionally, the one or more captured images are in two dimensions and/or in three dimensions. Optionally, the one or more captured images comprise one or more of the following: a single image, sequences of images, a video clip. In one example, images of a user captured by the image capturing device may be utilized to determine the facial expression and/or the posture of the user. In another example, images of a user captured by the image capturing device depict an eye of the user. Optionally, analysis of the images can reveal the direction of the gaze of the user and/or the size of the pupils. Such images may be used for eye tracking applications, such as identifying what the user is paying attention to, and/or for determining the user's emotions (e.g., what intentions the user likely has). Additionally, gaze patterns, which may involve information indicative of directions of a user's gaze, the time a user spends gazing at fixed points, and/or frequency at which the user changes points of interest, may provide information that may be utilized to determine the emotional response of the user.

In some embodiments, a measurement of affective response of a user may include a physiological signal derived from a biochemical measurement of the user. For example, the biochemical measurement may be indicative of the concentration of one or more chemicals in the body of the user (e.g., electrolytes, metabolites, steroids, hormones, neurotransmitters, and/or products of enzymatic activity). In one example, a measurement of affective response may describe the glucose level in the bloodstream of the user. In another example, a measurement of affective response may describe the concentration of one or more stress-related hormones such as adrenaline and/or cortisol. In yet another example, a measurement of affective response may describe the concentration of one or more substances that may serve as inflammation markers such as C-reactive protein (CRP). In one embodiment, a sensor that provides a biochemical measurement may be an external sensor (e.g., a sensor that measures glucose from a blood sample extracted from the user). In another embodiment, a sensor that provides a biochemical measurement may be in physical contact with the user (e.g., contact lens in the eye of the user that measures glucose levels). In yet another embodiment, a sensor that provides a biochemical measurement may be a sensor that is in the body of the user (an "in vivo" sensor). Optionally, the sensor may be implanted in the body (e.g., by a chirurgical procedure), injected into the bloodstream, and/or enter the body via the respiratory and/or digestive system. Some examples of types of in vivo sensors that may be used are given in Eckert et al. (2013), "Novel molecular and nanosensors for in vivo sensing", in Theranostics, 3.8:583.

Sensors used to take measurements of affective response may be considered, in some embodiments, to be part of a Body Area Network (BAN) also called a Body Sensor Networks (BSN). Such networks enable monitoring of user physiological signals, actions, health status, and/or motion patterns. Further discussion about BANs may be found in Chen et al., "Body area networks: A survey" in Mobile networks and applications 16.2 (2011): 171-193.

EEG is a common method for recording brain signals in humans because it is safe, affordable, and easy to use; it also has a high temporal resolution (of the order of milliseconds). EEG electrodes, placed on the scalp, can be either "passive" or "active". Passive electrodes, which are metallic, are connected to an amplifier, e.g., by a cable. Active electrodes may have an inbuilt preamplifier to make them less sensitive to environmental noise and cable movements. Some types of electrodes may need gel or saline liquid to operate, in order to reduce the skin-electrode contact impedance. While other types of EEG electrodes can operate without a gel or saline and are considered "dry electrodes". There are various brain activity patterns that may be measured by EEG. Some of the popular ones often used in affective computing include: Event Related Desynchronization/Synchronization, Event Related Potentials (e.g., P300 wave and error potentials), and Steady State Evoked Potentials. Measurements of EEG electrodes are typically subjected to various feature extraction techniques which aim to represent raw or preprocessed EEG signals by an ideally small number of relevant values, which describe the task-relevant information contained in the signals. For example, these features may be the power of the EEG over selected channels, and specific frequency bands. Various feature extraction techniques are discussed in more detail in Bashashati, et al., "A survey of signal processing algorithms in brain-computer interfaces based on electrical brain signals", in *Journal of Neural Engineering*, 4(2):R32, 2007. Additional discussion about using EEG in affective computing and brain computer interfaces (BCI) can be found in Lotte, et al., "Electroencephalography (EEG)-based Brain Computer Interfaces", in *Wiley Encyclopedia of Electrical and Electronics Engineering*, pp. 44, 2015, and the references cited therein.

The aforementioned examples involving sensors and/or measurements of affective response represent an exemplary sample of possible physiological signals and/or behavioral cues that may be measured. Embodiments described in this disclosure may utilize measurements of additional types of physiological signals and/or behavioral cues, and/or types of measurements taken by sensors, which are not explicitly listed above. Additionally, in some examples given above some of the sensors and/or techniques may be presented in association with certain types of values that may be obtained utilizing those sensors and/or techniques. This is not intended to be limiting description of what those sensors and/or techniques may be used for. In particular, a sensor and/or a technique listed above, which is associated in the examples above with a certain type of value (e.g., a certain type of physiological signal and/or behavioral cue) may be used, in some embodiments, in order to obtain another type of value, not explicitly associated with the sensor and/or technique in the examples given above.

2—Measurements of Affective Response

In various embodiments, a measurement of affective response of a user comprises, and/or is based on, one or more values acquired with a sensor that measures a physiological signal and/or a behavioral cue of the user.

In some embodiments, an affective response of a user to an event is expressed as absolute values, such as a value of a measurement of an affective response (e.g., a heart rate level, or GSR value), and/or emotional state determined from the measurement (e.g., the value of the emotional state may be indicative of a level of happiness, excitement, and/or contentedness). Alternatively, the affective response of the user may be expressed as relative values, such as a difference between a measurement of an affective response (e.g., a heart rate level, or GSR value) and a baseline value, and/or a change to emotional state (e.g., a change to the level of happiness). Depending on the context, one may understand whether the affective response referred to is an absolute value (e.g., heart rate and/or level of happiness), or a relative value (e.g., change to heart rate and/or change to the level of happiness). For example, if the embodiment describes an additional value to which the measurement may be compared (e.g., a baseline value), then the affective response may be interpreted as a relative value. In another example, if an embodiment does not describe an additional value to which the measurement may be compared, then the affective response may be interpreted as an absolute value. Unless stated otherwise, embodiments described herein that involve measurements of affective response may involve values that are either absolute and/or relative.

As used herein, a "measurement of affective response" is not limited to representing a single value (e.g., scalar); a measurement may comprise multiple values. In one example, a measurement may be a vector of co-ordinates, such as a representation of an emotional state as a point on a multidimensional plane. In another example, a measurement may comprise values of multiple signals taken at a certain time (e.g., heart rate, temperature, and a respiration rate at a certain time). In yet another example, a measurement may include multiple values representing signal levels at different times. Thus, a measurement of affective response may be a time-series, pattern, or a collection of wave functions, which may be used to describe a signal that changes over time, such as brainwaves measured at one or more frequency bands. Thus, a "measurement of affective response" may comprise multiple values, each of which may also be considered a measurement of affective response. Therefore, using the singular term "measurement" does not imply that there is a single value. For example, in some embodiments, a measurement may represent a set of measurements, such as multiple values of heart rate and GSR taken every few minutes during a duration of an hour.

In some embodiments, a "measurement of affective response" may be characterized as comprising values acquired with a certain sensor or a certain group of sensors sharing a certain characteristic. Additionally or alternatively, a measurement of affective response may be characterized as not comprising, and/or not being based, on values acquired by a certain type of sensor and/or a certain group of sensors sharing a certain characteristic. For example, in one embodiment, a measurement of affective response is based on one or more values that are physiological signals (e.g., values obtained using GSR and/or EEG), and is not based on values representing behavioral cues (e.g., values derived from images of facial expressions measured with a camera). While in another embodiment, a measurement of affective response is based on one or more values representing behavioral cues and is not based on values representing physiological signals.

Following are additional examples for embodiments in which a "measurement of affective response" may be based only on certain types of values, acquired using certain types of sensors (and not others). In one embodiment, a measurement of affective response does not comprise values acquired with sensors that are implanted in the body of the user. For example, the measurement may be based on values obtained by devices that are external to the body of the user and/or attached to it (e.g., certain GSR systems, certain EEG systems, and/or a camera). In another embodiment, a measurement of affective response does not comprise a value representing a concentration of chemicals in the body such as glucose, cortisol, adrenaline, etc., and/or does not comprise a value derived from a value representing the concentration. In still another embodiment, a measurement of affective response does not comprise values acquired by a sensor that is in contact with the body of the user. For example, the measurement may be based on values acquired with a camera and/or microphone. And in yet another embodiment, a measurement of affective response does not comprise values describing brainwave activity (e.g., values acquired by EEG).

A measurement of affective response may comprise raw values describing a physiological signal and/or behavioral cue of a user. For example, the raw values are the values provided by a sensor used to measure, possibly after minimal processing, as described below. Additionally or alternatively, a measurement of affective response may comprise a product of processing of the raw values. The processing of one or more raw values may involve performing one or more of the following operations: normalization, filtering, feature extraction, image processing, compression, encryption, and/or any other techniques described further in this disclosure, and/or that are known in the art and may be applied to measurement data.

In some embodiments, processing raw values, and/or processing minimally processed values, involves providing the raw values and/or products of the raw values to a module, function, and/or predictor, to produce a value that is referred to herein as an "affective value". As typically used herein, an affective value is a value that describes an extent and/or quality of an affective response. For example, an affective value may be a real value describing how good an affective response is (e.g., on a scale from 1 to 10), or whether a user is attracted to something or repelled by it (e.g., by having a positive value indicate attraction and a negative value indicate repulsion). In some embodiments, the use of the term "affective value" is intended to indicate that certain processing may have been applied to a measurement of affective response. Optionally, the processing is performed by a software agent. Optionally, the software agent has access to a model of the user that is utilized in order to compute the affective value from the measurement. In one example, an affective value may be a prediction of an Emotional State Estimator (ESE) and/or derived from the prediction of the ESE. In some embodiments, measurements of affective response may be represented by affective values.

It is to be noted that, though affective values are typically results of processing measurements, they may be represented by any type of value that a measurement of affective response may be represented by. Thus, an affective value may, in some embodiments, be a value of a heart rate, brainwave activity, skin conductance levels, etc.

In some embodiments, a measurement of affective response may involve a value representing an emotion (also referred to as an "emotional state" or "emotional response"). Emotions and/or emotional responses may be represented in various ways. In some examples, emotions or emotional responses may be predicted based on measurements of affective response, retrieved from a database, and/or annotated by a user (e.g., self-reporting by a user having the emotional response). In one example, self-reporting may involve analyzing communications of the user to determine the user's emotional response. In another example, self-reporting may involve the user entering values (e.g., via a GUI) that describes the emotional state of the user at a certain time and/or the emotional response of the user to a certain event. In the embodiments, there are several ways to represent emotions (which may be used to represent emotional states and emotional responses as well).

In one embodiment, emotions are represented using discrete categories. For example, the categories may include three emotional states: negatively excited, positively excited, and neutral. In another example, the categories may include emotions such as happiness, surprise, anger, fear, disgust, and sadness. In still another example, the emotions may be selected from the following set that includes basic emotions, including a range of positive and negative emotions such as Amusement, Contempt, Contentment, Embarrassment, Excitement, Guilt, Pride in achievement, Relief, Satisfaction, Sensory pleasure, and Shame, as described by Ekman P. (1999), "Basic Emotions", in Dalgleish and Power, *Handbook of Cognition and Emotion*, Chichester, UK: Wiley.

In another embodiment, emotions are represented using a multidimensional representation, which typically characterizes the emotion in terms of a small number of dimensions. In one example, emotional states are represented as points in a two dimensional space of Arousal and Valence. Arousal describes the physical activation, and valence the pleasantness or hedonic value. Each detectable experienced emotion is assumed to fall in a specified region in that two-dimensional space. Other dimensions that are typically used to represent emotions include potency/control (refers to the individual's sense of power or control over the eliciting event), expectation (the degree of anticipating or being taken unaware), and intensity (how far a person is away from a state of pure, cool rationality). The various dimensions used to represent emotions are often correlated. For example, the values of arousal and valence are often correlated, with very few emotional displays being recorded with high arousal and neutral valence. In one example, emotions are represented as points on a circle in a two dimensional space pleasure and arousal, such as the circumplex of emotions. In another example, emotions may be represented as points in a two dimensional space whose axes correspond to positive affect (PA) and negative affect (NA), as described by Watson et al. (1988), "Development and validation of brief measures of positive and negative affect: the PANAS scales", *Journal of Personality and Social Psychology* 54.6: 1063.

In yet another embodiment, emotions are represented using a numerical value that represents the intensity of the emotional state with respect to a specific emotion. For example, a numerical value stating how much the user is enthusiastic, interested, and/or happy. Optionally, the numeric value for the emotional state may be derived from a multidimensional space representation of emotion; for instance, by projecting the multidimensional representation of emotion to the nearest point on a line in the multidimensional space.

In still another embodiment, emotional states are modeled using componential models that are based on the appraisal theory, as described by the OCC model of Ortony, et al. (1988), "The Cognitive Structure of Emotions", Cambridge University Press). According to this theory, a person's emotions are derived by appraising the current situation (including events, agents, and objects) with respect to the person's goals and preferences.

Measurement of affective response may be referred to herein as being positive or negative. A positive measurement of affective response, as typically used herein, reflects a positive emotion indicating one or more qualities such as desirability, happiness, content, and the like, on the part of the user of whom the measurement is taken. Similarly, a negative measurement of affective response, as typically used herein, reflects a negative emotion indicating one or more qualities such as repulsion, sadness, anger, and the like on the part of the user of whom the measurement is taken. Optionally, when a measurement is neither positive nor negative, it may be considered neutral.

In some embodiments, whether a measurement is to be considered positive or negative may be determined with reference to a baseline (e.g., a value determined based on previous measurements to a similar situation and/or experience the user may be having). Thus, if the measurement indicates a value that is above the baseline, e.g., happier than the baseline, it may be considered positive, and if lower it may be considered negative).

In some embodiments, when a measurement of affective response is relative, i.e., it represents a change in a level of a physiological signal and/or a behavioral cue of a user, then the direction of the change may be used to determine whether the measurement is positive or negative. Thus, a positive measurement of affective response may correspond to an increase in one or more qualities such as desirability, happiness, content, and the like, on the part of the user of whom the measurement is taken. Similarly, a negative measurement of affective response may correspond to an increase in one or more qualities such as repulsion, sadness, anger, and the like on the part of the user of whom the measurement is taken. Optionally, when a measurement neither changes in a positive direction nor in a negative direction, it may be considered neutral.

Some embodiments may involve a reference to the time at which a measurement of affective response of a user is taken. Depending on the embodiment, this time may have various interpretations. For example, in one embodiment, this time may refer to the time at which one or more values describing a physiological signal and/or behavioral cue of the user were obtained utilizing one or more sensors. Optionally, the time may correspond to one or more periods during which the one or more sensors operated in order to obtain the one or more values describing the physiological signal and/or the behavioral cue of the user. For example, a measurement of affective response may be taken during a single point in time and/or refer to a single point in time (e.g., skin temperature corresponding to a certain time). In another example, a measurement of affective response may be taken during a contiguous stretch of time (e.g., brain activity measured using EEG over a period of one minute). In still another example, a measurement of affective response may be taken during multiple points and/or multiple contiguous stretches of time (e.g., brain activity measured every waking hour for a few minutes each time). Optionally, the time at which a measurement of affective response is taken may refer to the earliest point in time during which the one or more sensors operated in order to obtain the one or more values (i.e., the time the one or more sensors started taking the measurement of affective response). Alternatively, the time may refer to the latest point in time during which the one or more sensors operated in order to obtain the one or more values (i.e., the time the one or more sensors finished taking the measurement of affective response). Another possibility is for the time to refer to a point of time in between the earliest and latest points in time in which the one or more sensors were operating, such as the average of the two points in time.

Various embodiments described herein involve measurements of affective response of users to having experiences. A measurement of affective response of a user to having an experience may also be referred to herein as a "measurement of affective response of the user to the experience". In order to reflect the affective response of a user to having an experience, the measurement is typically taken in temporal proximity to when the user had the experience (so the affective response may be determined from the measurement). Herein, temporal proximity means nearness in time. Thus, stating that a measurement of affective response of a user is taken in temporal proximity to when the user has/had an experience means that the measurement is taken while the user has/had the experience and/or shortly after the user finishes having the experience. Optionally, a measurement of affective response of a user taken in temporal proximity to having an experience may involve taking at least some of the measurement shortly before the user started having the experience (e.g., for calibration and/or determining a baseline).

What window in time constitutes being "shortly before" and/or "shortly after" having an experience may vary in embodiments described herein, and may depend on various factors such as the length of the experience, the type of sensor used to acquire the measurement, and/or the type of physiological signal and/or behavioral cue being measured. In one example, with a short experience (e.g., and experience lasting 10 seconds), "shortly before" and/or "shortly after" may mean at most 10 seconds before and/or after the experience; though in some cases it may be longer (e.g., a minute or more). However, with a long experience (e.g., an experience lasting hours or days), "shortly before" and/or "shortly after" may correspond even to a period of up to a few hours before and/or after the experience (or more). In another example, when measuring a signal that is quick to change, such as brainwaves measured with EEG, "shortly before" and/or "shortly after" may correspond to a period of a few seconds or even up to a minute. However, with a signal that changes slower, such as heart rate or skin temperature, "shortly before" and/or "shortly after" may correspond to a longer period such as even up to ten minutes or more. In still another example, what constitutes "shortly after" an experience may depend on the nature of the experience and how long the affective response to it may last. For example, in one embodiment, measuring affective response to a short segment of content (e.g., viewing a short video clip) may comprise heart-rate measurements taken up to 30 seconds after the segment had been viewed. However, in another embodiment, measuring affective response to eating a meal may comprise measurements taken even possibly hours after the meal, to reflect the effects digesting the meal had on the user's physiology.

The duration in which a sensor operates in order to measure an affective response of a user may differ depending on one or more of the following factors: (i) the type of event involving the user, (ii) the type of physiological and/or behavioral signal being measured, and (iii) the type of sensor utilized for the measurement. In some cases, the affective response may be measured by the sensor substantially continually throughout the period corresponding to the event (e.g., while the user interacts with a service provider). However, in other cases, the duration in which the affective response of the user is measured need not necessarily overlap, or be entirely contained in, a period corresponding to an event (e.g., an affective response to a meal may be measured hours after the meal).

With some physiological signals, there may be a delay between the time an event occurs and the time in which changes in the user's emotional state are reflected in measurements of affective response. For example, an affective response involving changes in skin temperature may take several seconds to be detected by a sensor. In some cases, the physiological signal might change quickly because of a stimulus, but returning to the pervious baseline value, e.g., a value corresponding to a time preceding the stimulus, may take much longer. For example, the heart rate of a person viewing a movie in which there is a startling event may increase dramatically within a second. However, it can take tens of seconds and even minutes for the person to calm down and for the heart rate to return to a baseline level. The lag in time it takes affective response to be manifested in certain physiological and/or behavioral signals can lead to it that the period in which the affective response is measured extends after an event to which the measurement refers. For example, measuring of affective response of a user to an interaction with a service provider may extend minutes, and even hours, beyond the time the interaction was completed. In some cases, the manifestation of affective response to an event may last an extended period after the instantiation of the event. For example, at least some of the measurements of affective response of a user taken to determine how the user felt about a certain travel destination may be taken days, and even weeks, after the user leaves the travel destination.

In some embodiments, determining the affective response of a user to an event may utilize measurement taking during a fraction of the time corresponding to the event. The affective response of the user may be measured by obtaining values of a physiological signal of the user that in some cases may be slow to change, such as skin temperature, and/or slow to return to baseline values, such as heart rate. In such cases, measuring the affective response does not have to involve continually measuring the user throughout the duration of the event. Since such physiological signals are slow to change, reasonably accurate conclusions regarding the affective response of the user to an event may be reached from samples of intermittent measurements taken at certain periods during the event and/or after it. In one example, measuring the affective response of a user to a vacation destination may involve taking measurements during short intervals spaced throughout the user's stay at the destination (and possibly during the hours or days after it), such as taking a GSR measurement lasting a few seconds, every few minutes or hours.

Furthermore, when a user has an experience over a certain period of time, it may be sufficient to sample values of physiological signals and/or behavioral cues during the certain period in order to obtain the value of a measurement of affective response (without the need to continuously obtain such values throughout the time the user had the experience). Thus, in some embodiments, a measurement of affective response of a user to an experience is based on values acquired by a sensor during at least a certain number of non-overlapping periods of time during the certain period of time during which the user has the experience (i.e., during the instantiation of an event in which the user has the experience). Optionally, between each pair of non-overlapping periods there is a period time during which the user is not measured with a sensor in order to obtain values upon which to base the measurement of affective response. Optionally, the sum of the lengths of the certain number of non-overlapping periods of time amounts to less than a certain proportion of the length of time during which the user had the experience. Optionally, the certain proportion is less than 50%, i.e., a measurement of affective response of a user to an experience is based on values acquired by measuring the user with a sensor during less than 50% of the time the user had the experience. Optionally, the certain proportion is some other value such as less than 25%, less than 10%, less than 5%, or less than 1% of the time the user had the experience. The number of different non-overlapping periods may be different in embodiments. In one example, a measurement of affective response of a user to an experience may be based on values obtained during three different non-overlapping periods within the period during which a user had the experience. In other examples, a measurement may be based values obtained during a different number of non-overlapping periods such as at least five different non-overlapping periods, at least ten different non-overlapping periods, or some other number of non-overlapping periods greater than one.

In some embodiments, the number of non-overlapping periods of time during which values are obtained, as described above, may depend on how long a user has an experience. For example, the values may be obtained periodically, e.g., every minute or hour during the experience; thus, the longer the user has the experience, the more non-overlapping periods there are during which values are obtained by measuring the user with a sensor. Optionally, the non-overlapping periods may be selected at random, e.g., every minute there may be a 5% chance that the user will be measured with a sensor.

In some embodiments, a measurement of affective response of a user to an experience may be based on values collected during different non-overlapping periods which represent different parts of the experience. For example, a measurement of affective response of a user to an experience of dining at a restaurant may be based on values obtaining by measuring the user during the following non-overlapping periods of time: waiting to be seated, ordering from the menu, eating the entrées, eating the main course, eating dessert, and paying the bill.

Measurements of affective response of users may be taken, in the embodiments, at different extents and/or frequency, depending on the characteristics of the embodiments.

In some embodiments, measurements of affective response of users are routinely taken; for example, measurements are taken according to a preset protocol set by the user, an operating system of a device of the user that controls a sensor, and/or a software agent operating on behalf of a user. Optionally, the protocol may determine a certain frequency at which different measurements are to be taken (e.g., to measure GSR every minute). Optionally, the protocol may dictate that certain measurements are to be taken continuously (e.g., heart rate may be monitored throughout the period the sensor that measures it is operational). Optionally, continuous and/or periodical measurements of affective response of a user are used in order to determine baseline affective response levels for the user.

In some embodiments, measurements may be taken in order to gauge the affective response of users to certain events. Optionally, a protocol may dictate that measurements to certain experiences are to be taken automatically. For example, a protocol governing the operation of a sensor may dictate that every time a user exercises, certain measurements of physiological signals of the user are to be taken throughout the exercise (e.g., heart rate and respiratory rate), and possibly a short duration after that (e.g., during a recuperation period). Alternatively or additionally, measurements of affective response may be taken "on demand". For example, a software agent operating on behalf of a user may decide that measurements of the user should be taken in order to establish a baseline for future measurements. In another example, the software agent may determine that the user is having an experience for which the measurement of affective response may be useful (e.g., in order to learn a preference of the user and/or in order to contribute the measurement to the computation of a score for an experience). Optionally, an entity that is not a user or a software agent operating on behalf of the user may request that a measurement of the affective response of the user be taken to a certain experience (e.g., by defining a certain window in time during which the user should be measured). Optionally, the request that the user be measured is made to a software agent operating on behalf of the user. Optionally, the software agent may evaluate whether to respond to the request based on an evaluation of the risk to privacy posed by providing the measurement and/or based on the compensation offered for the measurement.

When a measurement of affective response is taken to determine the response of a user to an experience, various aspects such as the type of experience and/or duration of the experience may influence which sensors are to be utilized to take the measurement. For example, a short event may be measured by a sensor that requires a lot of power to operate, while a long event may be measured by a sensor that takes less power to operate. The type of expected response to the experience measured may also be a factor in selecting which sensor to use. For example, in one embodiment, if the measurement is taken to determine an emotion (e.g., detecting whether the user is sad, depressed, apathetic, happy, or elated etc.), then a first sensor that may give a lot of information about the user is used (e.g., an EEG headset). However, if the measurement involves determining a level of exertion (e.g., how hard the user is exercising), then another sensor may be used (e.g., a heart rate monitor).

Various embodiments described herein utilize measurements of affective response of users to learn about the affective response of the users. In some embodiments, the measurements may be considered as being obtained via a process that is more akin to an observational study than to a controlled experiment. In a controlled experiment, a user may be told to do something (e.g., go to a location), in order for a measurement of the user to be obtained under a certain condition (e.g., obtain a measurement of the user at the location). In such a case, the experience the user has is often controlled (to limit and/or account for possible variability), and the user is often aware of participating in an experiment. Thus, both the experience and the response of the user may not be natural. In contrast, an observational study assumes a more passive role, in which the user is monitored and not actively guided. Thus, both the experience and response of the user may be more natural in this setting.

As used herein, a "baseline affective response value of a user" (or "baseline value of a user" when the context is clear) refers to a value that may represent a typically slowly changing affective response of the user, such as the mood of the user. Optionally, the baseline affective response value is expressed as a value of a physiological signal of the user and/or a behavioral cue of the user, which may be determined from a measurement taken with a sensor. Optionally, the baseline affective response value may represent an affective response of the user under typical conditions. For example, typical conditions may refer to times when the user is not influenced by a certain event that is being evaluated. In another example, baseline affective response values of the user are typically exhibited by the user at least 50% of the time during which affective response of the user may be measured. In still another example, a baseline affective response value of a user represents an average of the affective response of the user, such as an average of measurements of affective response of the user taken during periods spread over hours, days, weeks, and possibly even years. Herein, a module that computes a baseline value may be referred to herein as a "baseline value predictor".

In one embodiment, normalizing a measurement of affective response utilizing a baseline involves subtracting the value of the baseline from the measurement. Thus, after normalization with respect to the baseline, the measurement becomes a relative value, reflecting a difference from the baseline. In one example, if the measurement includes a certain value, normalization with respect to a baseline may produce a value that is indicative of how much the certain value differs from the value of the baseline (e.g., how much is it above or below the baseline). In another example, if the measurement includes a sequence of values, normalization with respect to a baseline may produce a sequence indicative of a divergence between the measurement and a sequence of values representing the baseline.

In one embodiment, a baseline affective response value may be derived from one or more measurements of affective response taken before and/or after a certain event that may be evaluated to determine its influence on the user. For example, the event may involve visiting a location, and the baseline affective response value is based on a measurement taken before the user arrives at the location. In another example, the event may involve the user interacting with a service provider, and the baseline affective response value is based on a measurement of the affective response of the user taken before the interaction takes place. In yet another example, the event may involve consuming a substance, and a baseline affective response value is based on a measurement taken before consuming the substance.

In another embodiment, a baseline affective response value may correspond to a certain event, and represent an affective response the user corresponding to the event would typically have to the certain event. Optionally, the baseline affective response value is derived from one or more measurements of affective response of a user taken during previous instantiations of events that are similar to the certain event (e.g., involve the same experience and/or similar conditions of instantiation). For example, the event may involve visiting a location, and the baseline affective response value is based on measurements taken during previous visits to the location. In another example, the event may involve the user interacting with a service provider, and the baseline affective response value may be based on measurements of the affective response of the user taken while interacting with other service providers. In yet another example, the event may involve consuming a substance, and a baseline affective response value is based on measurements taken after previous consumptions of the substance. Optionally, a predictor may be used to compute a baseline affective response value corresponding to an event. For example, such a baseline may be computed utilizing an Emotional State Estimator (ESE), as described in further detail in section 6—Predictors and Emotional State Estimators. Optionally, an approach that utilizes a database storing descriptions of events and corresponding values of measurements of affective response, such as approaches outlined in the patent publication U.S. Pat. No. 8,938,403 titled "Computing token-dependent affective response baseline levels utilizing a database storing affective responses", may also be utilized to compute a baseline corresponding to an event.

In yet another embodiment, a baseline affective response value may correspond to a certain period in a periodic unit of time (also referred to as a recurring unit of time). Optionally, the baseline affective response value is derived from measurements of affective response taken during the certain period during the periodic unit of time. For example, a baseline affective response value corresponding to mornings may be computed based on measurements of a user taken during the mornings. In this example, the baseline will include values of an affective response a user typically has during the mornings.

As used herein, a periodic unit of time, which may also be referred to as a recurring unit of time, is a period of time that repeats itself. For example, an hour, a day, a week, a month, a year, two years, four years, or a decade. A periodic unit of time may correspond to the time between two occurrences of a recurring event, such as the time between two world cup tournaments. Optionally, a certain periodic unit of time may correspond to a recurring event. For example, the recurring event may be the Cannes film festival, Labor Day weekend, or the NBA playoffs.

In still another embodiment, a baseline affective response value may correspond to a certain situation in which a user may be (in this case, the baseline may be referred to as being "situation-specific"). Optionally, the situation-specific baseline affective response value is derived from measurements of affective response of the user and/or of other users, taken while in the certain situation. For example, a baseline affective response value corresponding to being inebriated may be based on measurements of affective response of a user taken while the user is inebriated. In another example, a baseline affective response value corresponding to a situation of "being alone" may be based on measurements of a user taken while the user was alone in a room, while a baseline affective response value corresponding to a situation of "being with company" may be based on measurements of a user taken while the user was with other people in a room. In one embodiment, a situation-specific baseline for a user in a certain situation is computed using one or more of the various approaches described in patent publication U.S. Pat. No. 8,898,091 titled "Computing situation-dependent affective response baseline levels utilizing a database storing affective responses".

As used herein, a situation refers to a condition of a user that may change the affective response of the user. In one example, monitoring the user over a long period may reveal variations in the affective response that are situation-dependent, which may not be revealed when monitoring the user over a short period or in a narrow set of similar situations. Optionally, a situation may refer to a mindset of the user, such as knowledge of certain information, which changes the affective response of the user. For example, waiting for a child to come home late at night may be considered a different situation for a parent, than knowing the child is at home safe and sound. Other examples of different situations may involve factors such as: presence of other people in the vicinity of the user (e.g., being alone may be a different situation than being with company), the user's mood (e.g., the user being depressed may be considered a different situation than the user being elated), and the type of activity the user is doing at the time (e.g., watching a movie, participating in a meeting, driving a car, may all be different situations). In some examples, different situations may be characterized by a user exhibiting a noticeably different affective response to certain stimuli. Additionally or alternatively, different situations may be characterized by the user having noticeably different baseline affective response values.

In embodiments described herein, a baseline affective response value may be derived from one or more measurements of affective response in various ways. Additionally, the baseline may be represented by different types of values. For example, the baseline may be the value of a single measurement, a result of a function of a single measurement, or a result of a function of multiple measurements. In one example, a measurement of the heart-rate of a user taken before the user has an experience may be used as the baseline affective response value of the user. In another example, an emotional response predicted from an EEG measurement of the user may serve as a baseline affective response value. In yet another example, a baseline affective response value may be a function of multiple values, for example, it may be an average, mode, or median of multiple measurements of affective response.

In some embodiments, a baseline affective response value is a weighted average of a plurality of measurements of affective response. For example, a weighted average of measurements taken over a period of a year may give measurements that are more recent a higher weight than measurements that are older.

In some embodiments, measurements of affective response of a user are stored in a database. Optionally, the measurements correspond to certain periods in a recurring unit of time, and/or situations the user is in. Optionally, the stored measurements and/or values derived from at least some of the stored measurements may be retrieved from the database and utilized as baseline affective response values.

In some embodiments, a baseline affective response value may be derived from measurements of multiple users, and represent an average affective response of the multiple users. While in other embodiments, the baseline affective response value may be derived from measurements of a single user, and represent an affective response of the single user.

There are various ways, in different embodiments described herein, in which data comprising measurements of affective response, and/or data on which measurements of affective response are based, may be processed. The processing of the data may take place before, during, and/or after the data is acquired by a sensor (e.g., when the data is stored by the sensor and/or transmitted from it). Optionally, at least some of the processing of the data is performed by the sensor that measured it. Additionally or alternatively, at least some of the processing of the data is performed by a processor that receives the data in a raw (unprocessed) form, or in a partially processed form. Following are examples of various ways in which data obtained from a sensor may be processed in some of the different embodiments described herein.

In some embodiments, at least some of the data may undergo signal processing, such as analog signal processing, and/or digital signal processing.

In some embodiments, at least some of the data may be scaled and/or normalized. For example, measured values may be scaled to be in the range [−1, +1]. In another example, some measured values are normalized to z-values, which bring the mean of the values to 0, with a variance of 1. In yet another example, statistics are extracted from some values, such as statistics of the minimum, maximum, and/or various moments of the distribution, such as the mean, variance, or skewness. Optionally, the statistics are computed for data that includes time-series data, utilizing fixed or sliding windows.

In some embodiments, at least some of the data may be subjected to feature extraction and/or reduction techniques. For example, data may undergo dimensionality-reducing transformations such as Fisher projections, Principal Component Analysis (PCA), and/or techniques for the selection of subsets of features like Sequential Forward Selection (SFS) or Sequential Backward Selection (SBS). Optionally, dimensions of multi-dimensional data points, such as measurements involving multiple sensors and/or statistics, may be evaluated in order to determine which dimensions are most relevant for identifying emotion. For example, Godin et al. (2015), "Selection of the Most Relevant Physiological Features for Classifying Emotion" in Emotion 40:20, describes various feature selection approaches that may be used to select relevant dimensionalities with multidimensional measurements of affective response.

In some embodiments, data that includes images and/or video may undergo processing that may be done in various ways. In one example, algorithms for identifying cues like movement, smiling, laughter, concentration, body posture, and/or gaze, are used in order to detect high-level image features. Additionally, the images and/or video clips may be analyzed using algorithms and/or filters for detecting and/or localizing facial features such as the location of the eyes, the brows, and/or the shape of the mouth. Additionally, the images and/or video clips may be analyzed using algorithms for detecting facial expressions and/or micro-expressions. In another example, images are processed with algorithms for detecting and/or describing local features such as Scale-Invariant Feature Transform (SIFT), Speeded Up Robust Features (SURF), scale-space representation, and/or other types of low-level image features.

In some embodiments, processing measurements of affective response involves compressing and/or encrypting portions of the data. This may be done for a variety of reasons, for instance, in order to reduce the volume of measurement data that needs to be transmitted. Another reason to use compression and/or encryption is that it helps protect the privacy of a measured user by making it difficult for unauthorized parties to examine the data. Additionally, the compressed data may be preprocessed prior to its compression.

In some embodiments, processing measurements of affective response of users involves removal of at least some of the personal information about the users from the measurements prior to measurements being transmitted (e.g., to a collection module) or prior to them be utilized by modules to generate crowd-based results. Herein, personal information of a user may include information that teaches specific details about the user such as the identity of the user, activities the user engages in, and/or preferences, account information of the user, inclinations, and/or a worldview of the user.

The literature describes various algorithmic approaches that can be used for processing measurements of affective response. Some embodiments may utilize these known, and possibly other yet to be discovered, methods for processing measurements of affective response. Some examples include: (i) a variety of physiological measurements may be preprocessed according to the methods and references listed in van Broek, E. L., et al. (2009), "Prerequisites for Affective Signal Processing (ASP)", in *Proceedings of the International Joint Conference on Biomedical Engineering Systems and Technologies*", INSTICC Press; (ii) a variety of acoustic and physiological signals may be preprocessed and have features extracted from them according to the methods described in the references cited in Tables 2 and 4, Gunes, H., & Pantic, M. (2010), "Automatic, Dimensional and Continuous Emotion Recognition", *International Journal of Synthetic Emotions,* 1 (1), 68-99; (iii) preprocessing of audio and visual signals may be performed according to the methods described in the references cited in Tables 2-4 in Zeng, Z., et al. (2009), "A survey of affect recognition methods: audio, visual, and spontaneous expressions", *IEEE Transactions on Pattern Analysis and Machine Intelligence,* 31 (1), 39-58; and (iv) preprocessing and feature extraction of various data sources such as images, physiological measurements, voice recordings, and text based-features, may be performed according to the methods described in the references cited in Tables 1, 2, 3, 5 in Calvo, R. A., & D'Mello, S. (2010) "Affect Detection: An Interdisciplinary Review of Models, Methods, and Their Applications", *IEEE Transactions on Affective Computing* 1(1), 18-37.

As part of processing measurements of affective response, the measurements may be provided, in some embodiments, to various modules for making determinations according to values of the measurements. Optionally, the measurements are provided to one or more various functions that generate values based on the measurements. For example, the measurements may be provided to estimators of emotional states from measurement data (ESEs described below) in order to estimate an emotional state (e.g., level of happiness). The results obtained from the functions and/or predictors may also be considered measurements of affective response.

As discussed above, a value of a measurement of affective response corresponding to an event may be based on a plurality of values obtained by measuring the user with one or more sensors at different times during the event's instantiation period or shortly after it. Optionally, the measurement of affective response is a value that summarizes the plurality of values. It is to be noted that, in some embodiments, each of the plurality of values may be considered a measurement of affective response on its own merits. However, in order to distinguish between a measurement of affective response and the values it is based on, the latter may be referred to in the discussion below as "a plurality of values" and the like. Optionally, when a measurement of affective response is a value that summarizes a plurality of values, it may, but not necessarily, be referred to in this disclosure as an "affective value".

In some embodiments, having a value that summarizes the plurality of values enables easier utilization of the plurality of values by various modules in embodiments described herein. For example, computing a score for a certain experience based on measurements of affective response corresponding to a set of events involving the certain experience may be easier if the measurement corresponding to each event in the set is a single value (e.g., a value between 0 and 10) or a small set of values (e.g., a representation of an emotional response in a multidimensional space). If, on the other hand, each measurement of affective response is represented by a large set of values (e.g., measurements obtained with EEG, GSR, and heart rate taken over a period of a few hours), it might be more difficult to compute a score for the certain experience directly from such data.

There are various ways, in embodiments described herein, in which a plurality of values, obtained utilizing sensors that measure a user, can be used to produce the measurement of affective response corresponding to the event. It is to be noted that in some embodiments, the measurement of affective response simply comprises the plurality of values (e.g., the measurement may include the plurality of values in raw or minimally-processed form). However, in other embodiments, the measurement of affective response is a value that is a function of the plurality of values. There are various functions that may be used for this purpose. In one example, the function is an average of the plurality of values. In another example, the function may be a weighted average of the plurality of values, which may give different weights to values acquired at different times. In still another example, the function is implemented by a machine learning-based predictor.

In one embodiment, a measurement of affective response corresponding to an event is a value that is an average of a plurality of values obtained utilizing a sensor that measured the user corresponding to the event. Optionally, each of the plurality of values was acquired at a different time during the instantiation of the event (and/or shortly after it). In one example, the plurality of values include all the values measured by the sensor, and as such, the measurement of affective response is the average of all the values. In another example, the measurement of affective response corresponding to an event is an average of a plurality of values that were acquired at certain points of time, separated by approximately equal intervals during the instantiation of the event (and/or shortly after it). For example, the plurality of values may have been taken every second, minute, hour, or day, during the instantiation. In yet another example, the measurement of affective response corresponding to an event is an average of a plurality of values that were acquired at random points of time during the instantiation of the event (and/or shortly after it). For example, the measurement of affective response may be an average of a predetermined number of values measured with the sensor. Optionally, the predetermined number is proportional to the duration of the instantiation. Optionally, the predetermined number is 2, 3, 5, 10, 25, 100, 1000, 10000, or more than 10000.

In another embodiment, a measurement of affective response corresponding to an event is a value that is a weighted average of a plurality of values obtained utilizing a sensor that measured the user corresponding to the event. Herein, a weighted average of values may be any linear combination of the values. Optionally, each of the plurality of values was acquired at a different time during the instantiation of the event (and/or shortly after it), and may be assigned a possible different weight for the computing of the weighted average.

In one example, the weights of values acquired in the middle or towards the end of the instantiation of the event may be given a higher weight than values acquired just the start of the instantiation of the event, since they might better reflect the affective response to the whole experience.

In another example, the weights assigned to values from among the plurality of values may depend on the magnitude of the values (e.g., the magnitude of their absolute value). In some embodiments, it may be the case that extreme emotional response is more memorable than less extreme emotional response (be it positive or negative). The extreme emotional response may be more memorable even if it lasts only a short while compared to the duration of an event to which a measurement of affective response corresponds. Thus, when choosing how to weight values from a plurality of values measured by one or more sensors at different times during the event's instantiation period or shortly after it, it may be beneficial to weight extreme values higher than non-extreme values. Optionally, the measurement of affective response corresponding to an event is based on the most extreme value (e.g., as determined based on its distance from a baseline) measured during the event's instantiation (or shortly after it).

In yet another example, an event to which a measurement of affective response corresponds may be comprised of multiple "mini-events" instantiated during its instantiation (the concept of mini-events is discussed in more detail in section 4—Events). Optionally, each mini-event may have a corresponding measurement of affective response. Optionally, the measurement corresponding to each mini-event may be derived from one or more values measured with a sensor. Thus, combining the measurements corresponding to the mini-events into the measurement of affective response corresponding to the event may amount to weighting and combining the multiple values mentioned above into the measurement of affective response that corresponds to the event.

In some embodiments, an event $\tau$ may include, and/or be partitioned to, multiple "mini-events" $\tau_1, \tau_2, \ldots, \tau_k$ that are derived from the event $\tau$, such that the instantiation period of each $\tau_i$, $1 \leq i \leq k$, falls within the instantiation period of $\tau$. Furthermore, it may be assumed that each mini-event has an associated measurement of affective response $m_{\tau_i}$ such that if $i \neq j$ it may be that $m_{\tau_i} \neq m_{\tau_j}$. In these embodiments, $m_\tau$, the measurement of affective response corresponding to the event $\tau$ is assumed to be a function of the measurements corresponding to the mini-events $m_{\tau_1}, m_{\tau_2}, \ldots, m_{\tau_k}$. It is to be noted that the measurements $m_{\tau_i}$ may in themselves each comprise multiple values and not necessarily consist of a single value. For example, a measurement $m_{\tau_i}$ may comprise brainwave activity measured with EEG over a period of minutes or hours.

In one example, $m_\tau$ may be a weighted average of the measurements corresponding to the mini-events, that is computed according to a function $$m_\tau = \frac{1}{\sum_{i=1}^{k} w_i} \cdot \sum_{i=1}^{k} w_i \cdot m_{\tau_i},$$

where $w_i$ is a weight corresponding to mini-event $\tau_i$. In another example, combining measurements corresponding to mini-events may be done in some other way, e.g., to give more emphasis on measurements of events with a high weight, such as $$m_\tau = \frac{1}{\sum_{i=1}^{k} w_i^2} \cdot \sum_{i=1}^{k} (w_i^2 \cdot m_{\tau_i}).$$

In another example, the measurement $m_\tau$ may be selected as the measurement of the mini-event with the largest weight. In yet another example, the measurement $m_\tau$ may be computed as an average (or weighted average) of the $j \geq 2$ measurements having the largest weights.

The weights $w_i$, $1 \leq i \leq k$, corresponding to measurements of each mini-event may be computed in different ways, in different embodiments, and depend on various attributes. In one embodiment, a weight $w_i$, $1 \leq i \leq k$, corresponding to a measurement of mini-event $m_{\tau_i}$ may be proportional to the duration of the instantiation of the event $\tau_i$. Optionally, for most mini-events the weight $w_i$ increases with the duration of the instantiation of $\tau_i$. For example, the weight may be linear in the duration, or have some other form of function relationship with the duration, e.g., the weight may be proportional to a logarithm of the duration, the square root of the duration, etc. It is to be noted that one reason for considering setting weights based on the duration may be that in some cases, the longer people have a certain emotional response during an event, the more they tend to associate that emotional response with an event. In another embodiment, the weight of a mini-event based on an aspect of the type of experience the mini-event involves (e.g., indoors or outdoors, work vs. recreation, etc.) In yet another embodiment, mini-events may be weighted based on aspects such as the location where the experience takes place, and/or the situation the user is in.

In other embodiments, the weight of a mini-event is based on its associated dominance level. An event's dominance level is indicative of the extent affective response expressed by the user corresponding to the event should be associated with the event. Additional details about dominance levels are given at least in section 4—Events.

In some embodiments, weights of event or mini-events may be computed utilizing various functions that take into account multiple weighting techniques described in embodiments above. Thus, for example, in one embodiment, a weight $w_i$, $1 \le i \le k$, corresponding to a measurement of mini-event $m_{\tau_j}$ may be proportional both to certain attributes characterizing the experience (e.g., indicative of the type of experience), and to the duration of the mini-event, as described in the examples above. This can lead to cases where a first measurement $m_{\tau_1}$ corresponding to a first mini-event $\tau_1$ may have a weight $w_1$ that is greater than a weight $w_2$ given to a second measurement $m_{\tau_2}$ corresponding to a second mini-event $\tau_2$, despite the duration of the instantiation of $\tau_1$ being shorter than the duration of the instantiation of $\tau_2$.

Combining a plurality of values obtained utilizing a sensor that measured a user in order to a measurement of affective response corresponding to an event, as described in the examples above, may be performed, in some embodiments, by an affective value scorer. Herein, an affective value scorer is a module that computes an affective value based on input comprising a measurement of affective response. Thus, the input to an affective value scorer may comprise a value obtained utilizing a sensor that measured a user and/or multiple values obtained by the sensor. Additionally, the input to the affective value scorer may include various values related to the user corresponding to the event, the experience corresponding to the event, and/or to the instantiation corresponding to the event. In one example, input to an affective value scorer may comprise a description of mini-events comprises in the event (e.g., their instantiation periods, durations, and/or corresponding attributes). In another example, input to an affective value scorer may comprise dominance levels of events (or mini-events). Thus, the examples given above describing computing a measurement of affective response corresponding to an event as an average, and/or weighted average of a plurality of values, may be considered examples of function computed by an affective value scorer.

In some embodiments, input provided to an affective value scorer may include private information of a user. For example, the information may include portions of a profile of the user. Optionally, the private information is provided by a software agent operating on behalf of the user. Alternatively, the affective values scorer itself may be a module of a software agent operating on behalf of the user.

In some embodiments, an affective value scorer may be implemented by a predictor, which may utilize an Emotional State Estimator (ESE) and/or itself be an ESE. Additional information regarding ESEs is given at least in section 6—Predictors and Emotional State Estimators.

Computing a measurement of affective response corresponding to an event utilizing a predictor may involve, in some embodiments, utilizing various statistics derived from the plurality of values obtained by the sensor and/or from a description of the event (and/or descriptions of mini-events comprised in the event). Optionally, some of the statistics may be comprised in input provided to the affective value scorer. Additionally or alternatively, some of the statistics may be computed by the affective value scorer based on input provided to the affective value scorer. Optionally, the statistics may assist the predictor by providing context that may assist in interpreting the plurality of values and combining them into the measurement of affective response corresponding to the event.

In one embodiment, the statistics may comprise various averages, such as averages of measurement values. Optionally, the averages may be with respect to various characteristics of the events. For example, a statistic may indicate the average heart rate in the morning hours, the average skin conductance when eating, and/or the average respiratory rate when sleeping. In another example, a statistic may refer to the number of times an hour the user smiled during an event.

In another embodiment, the statistics may refer to a function of the plurality of values and/or a comparison of the plurality of values to typical affective values and/or baseline affective values. For example, a statistic may refer to the number of times and/or percent of time a certain value exceeded a certain threshold. For example, one statistic may indicate the number of times the heart rate exceeds 80 beats-per-minute. Another statistic may refer to the percent of time the systolic blood pressure was above 140. In another example, statistics may refer to baseline values and/or baseline distributions corresponding to the user. For example, a statistic may indicate the percent of time the user's heart rate was more than two standard deviations above the average observed for the user over a long period.

In yet another embodiment, statistics may summarize the emotional state of a user during a certain event. For example, statistics may indicate what percent of the time, during an event, the user corresponding to the event had an emotional state corresponding to a certain core emotion (e.g., happiness, sadness, anger, etc.) In another example, statistics may indicate the average intensity the user felt each core emotion throughout the duration of the instantiation of the event. Optionally, determining an emotional state of a user and/or the intensity of emotions felt by a user may be done using an ESE that receives the plurality of values obtained by the sensor that measured the user.

Training an affective value scorer with a predictor involves obtaining a training set comprising samples and corresponding labels, and utilizing a training algorithm for one or more of the machine learning approaches described in section 6—Predictors and Emotional State Estimators. Optionally, each sample corresponds to an event and comprises feature values derived from one or more measurements of the user (i.e., the plurality of values mentioned above) and optionally other feature values corresponding to the additional information and/or statistics mentioned above. The label of a sample is the affective value corresponding to the event. The affective value used as a label for a sample may be generated in various ways.

In one embodiment, the user may provide an indication of an affective value that corresponds to an event. For example, the user may voluntarily rank the event (e.g., this video clip was 4/5, or this meal was 9/10). In another example, the user may be prompted to provide an affective value to an event, e.g., by a software agent.

In another embodiment, the affective value corresponding to the event may be provided by an external labeler (e.g., a human and/or algorithm) that may examine measurements of the user (e.g., images of the user taken during the event) and/or actions of the user during the event to determine how the user likely felt during the event (and give a corresponding numerical ranking).

In still another embodiment, the affective value corresponding to the event may be derived from a communication of the user regarding the event. Optionally, deriving the affective value may involve using semantic analysis to determine the user's sentiment regarding the event from a conversation (voice and/or video), comment on a forum, post on social media, and/or a text message.

Affective values may have various meanings in different embodiments. In some embodiments, affective values may correspond to quantifiable measures related to an event (which may take place in the future and/or not always be quantifiable for every instance of an event). In one example, an affective value may reflect expected probability that the user corresponding to the event may have the event again (i.e., a repeat customer). In another example, an affective value may reflect the amount of money a user spends during an event (e.g., the amount of money spent during a vacation). Such values may be considered affective values since they depend on how the user felt during the event. Collecting such labels may not be possible for all events and/or may be expensive (e.g., since it may involve purchasing information from an external source). Nonetheless, it may be desirable, for various applications, to be able to express a measurement of affective response to an event in these terms, and be able to predict such an affective value from measurements taken with a sensor. This may enable, for example, to compute a score that represents the average amount of money users spend during a night out based on how they felt (without needing access to their financial records).

In some embodiments, labels corresponding to affective values may be acquired when the user is measured with an extended set of sensors. This may enable the more accurate detection of the emotional state of the user. For example, a label for a user may be generated utilizing video images and/or EEG, in addition to heart rate and GSR. Such a label is typically more accurate than using heart rate and GSR alone (without information from EEG or video). Thus, an accurate label may be provided in this case and used to train a predictor that is given an affective value based on heart rate and GSR (but not EEG or video images of the user).

An affective value scorer may be trained from data obtained from monitoring multiple users, and as such in some embodiments, may be considered a general affective value scorer. In other embodiments, an affective value scorer may be trained primarily on data involving a certain user, and as such may be considered a personalized affective value scorer for the certain user.

3—Experiences

Some embodiments described herein may involve users having "experiences". In different embodiments, "experiences" may refer to different things. In some embodiments, there is a need to identify events involving certain experiences, and/or to characterize them. For example, identifying and/or characterizing what experience a user has may be needed in order to describe an event in which a user has the experience. Having such a description is useful for various tasks. In one example, a description of an event may be used to generate a sample provided to a predictor for predicting affective response to the experience, as explained in more detail at least in section 6—Predictors and Emotional State Estimators. In another example, descriptions of events may be used to group events into sets involving the same experience (e.g., sets of events described further below in this disclosure). A grouping of events corresponding to the same experience may be useful for various tasks such as for computing a score for the experience from measurements of affective response, as explained in more detail at least in section 10—Scoring. Experiences are closely tied to events; an instance in which a user has an experience is considered an event. As such additional discussion regarding experiences is also given at least in section 4—Events.

An experience is typically characterized as being of a certain type. Below is a description comprising non-limiting examples of various categories of types of experiences to which experiences in different embodiments may correspond. This description is not intended to be a partitioning of experiences; e.g., various experiences described in embodiments may fall into multiple categories listed below. This description is not comprehensive; e.g., some experiences in embodiments may not belong to any of the categories listed below.

Location.

Various embodiments described herein involve experiences in which a user is in a location. In some embodiments, a location may refer to a place in the physical world. A location in the physical world may occupy various areas in, and/or volumes of, the physical world. For example, a location may be a continent, country, region, city, park, or a business (e.g., a restaurant). In one example, a location is a travel destination (e.g., Paris). In another example, a location may be a portion of another location, such as a specific room in a hotel or a seat in a specific location in a theatre. For example, is some embodiments, being in the living room of an apartment may be considered a different experience than being in a bedroom.

Virtual Location.

In some embodiments, a location may refer to a virtual environment such as a virtual world, with at least one instantiation of the virtual environment stored in a memory of a computer. Optionally, a user is considered to be in the virtual environment by virtue of having a value stored in the memory indicating the presence of a representation of the user in the virtual environment. Optionally, different locations in virtual environment correspond to different logical spaces in the virtual environment. For example, different rooms in an inn in a virtual world may be considered different locations. In another example, different continents in a virtual world may be considered different locations. In one embodiment, a user interacts with a graphical user interface in order to participate in activities within a virtual environment. In some examples, a user may be represented in the virtual environment as an avatar. Optionally, the avatar of the user may represent the presence of the user at a certain location in the virtual environment. Furthermore, by seeing where the avatar is, other users may determine what location the user is in, in the virtual environment.

A virtual environment may also be represented by a server hosting it. Servers hosting instantiations of the virtual environment may be located in different physical locations and/or may host different groups of users from various locations around the world. This leads to the phenomenon that different users may be provided a different experience when they connect to different servers (despite hosting the same game and/or virtual world). Thus, in some embodiments, users connected to different servers are considered to be in different locations (even if the servers host the same world and/or game).

Route.

In some embodiments, an experience may involve traversing a certain route. Optionally, a route is a collection of two or more locations that a user may visit. Optionally, at least some of the two or more locations in the route are places in the physical world. Optionally, at least some of the two or more locations in the route are places in a virtual world. In one embodiment, a route is characterized by the order in which the locations are visited. In another embodiment, a route is characterized by a mode of transportation used to traverse it.

Content.

Consuming content is considered an experience in some embodiments. Optionally, the content that is consumed is digital content, and consuming it involves a user interface that presents the content (e.g., a display and/or speakers). In some embodiments, an experience involving consuming content is characterized by the type of medium involved in consuming the content. For example, the experience may be referred to as "watching a movie", "surfing the Internet", and/or "listening to music". In other embodiments, an experience involving consuming content is characterized by content itself. For example, the experience may be referred to as "watching Star Trek 3", "browsing Facebook", and/or "listening to Wish You Were Here" by Pink Floyd.

Activity.

In some embodiments, an experience may involve an activity that a user does. In one example, an experience involves a recreational activity (e.g., traveling, going out to a restaurant, visiting the mall, or playing games on a gaming console). In another example, an experience involves a day-to-day activity (e.g., getting dressed, driving to work, talking to another person, sleeping, and/or making dinner). In yet another example, an experience involves a work related activity (e.g., writing an email, boxing groceries, or serving food). In still another example, an experience involves a mental activity such as studying and/or taking an exam. In still another example, an experience may involve a simple action like sneezing, kissing, or coughing.

Social Interaction.

In some embodiments, an experience may involve some sort of social interaction a user has. Optionally, the social interaction may be between the user and another person and/or between the user and a software-based entity (e.g., a software agent or physical robot). The scope of an interaction may vary between different experiences. In one example, an experience may involve an interaction that lasts minutes and even hours (e.g., playing a game or having a discussion). In another example, an interaction may be as short as exchanging a smile, a handshake, or being rudely interrupted. It is to be noted that the emotional state of a person a user is interacting with may change the nature of the experience the user is having. For example, interacting with a happy smiling person may be a completely different experience than interacting with a sobbing person.

Service Provider—

In some embodiments, a social interaction a user has is with a service provider providing a service to the user. Optionally, a service provider may be a human service provider or a virtual service provider (e.g., a robot, a chatbot, a web service, and/or a software agent). In some embodiments, a human service provider may be any person with whom a user interacts (that is not the user). Optionally, at least part of an interaction between a user and a service provider may be performed in a physical location (e.g., a user interacting with a waiter in a restaurant, where both the user and the waiter are in the same room). Optionally, the interaction involves a discussion between the user and the service provider (e.g., a telephone call or a video chat). Optionally, at least part of the interaction may be in a virtual space (e.g., a user and insurance agent discuss a policy in a virtual world). Optionally, at least part of the interaction may involve a communication, between the user and a service provider, in which the user and service provider are not in physical proximity (e.g., a discussion on the phone).

Substance—

Various embodiments described herein involve experiences in which a user consumes a substance and/or a combination of substances. Optionally, a substance is something that the user consumes by having it absorbed in the body of the user. In one example, "substances" may refer to various forms of food and drink that are consumed by eating and drinking. In another example, "substances" may refer to various forms of drugs and/or chemicals that may be consumed by swallowing, injecting, inhaling, and/or by absorption through the skin.

Product—

Utilizing a product may be considered an experience in some embodiments. A product may be any object that a user may utilize. Examples of products include appliances, clothing items, footwear, wearable devices, gadgets, jewelry, cosmetics, cleaning products, vehicles, sporting gear and musical instruments. Optionally, with respect to the same product, different periods of utilization and/or different periods of ownership of the product may correspond to different experiences. For example, wearing a new pair of shoes for the first time may be considered an event of a different experience than an event corresponding to wearing the shoes after owning them for three months.

Environment—

Spending time in an environment characterized with certain environmental conditions may also constitute an experience in some embodiments. Optionally, different environmental conditions may be characterized by a certain value or range of values of an environmental parameter. In one example, being in an environment in which the temperature is within a certain range corresponds to a certain experience (e.g., being in temperatures lower than 45° F. may be considered an experience of being in the cold and being in temperatures higher than 90° F. may be considered being in a warm environment). In another example, environments may be characterized by a certain range of humidity, a certain altitude, a certain level of pressure (e.g., expressed in atmospheres), and/or a certain level of felt gravity (e.g., a zero-G environment). In yet another example, being in an environment that is exposed to a certain level of radiation may be considered an experience (e.g., exposure to certain levels of sun light, Wi-Fi transmissions, electromagnetic fields near power lines, and/or cellular phone transmissions). In still another example, being in an environment in which there is a certain level of noise (e.g., city traffic or desert quiet), and/or noise of a certain type (e.g., chirping birds, or sounds of the sea) may be considered an experience. In yet another example, being in an environment in which there is a certain odor may be considered an experience (e.g., being in a place where there is a smell of Jasmine flowers or an unpleasant odor associated with refuse). And in yet another example, being in an environment in which there is a certain amount of pollutants and/or allergens (e.g., a certain range of particles-per-million) may be considered an experience. It is to be noted that a user having one of the above experiences may not be aware of the extent of the respective environmental parameter and thus may not be aware of having the corresponding experience. Optionally, being in the same environment for a different period of time and/or under different conditions, may be considered a different experience.

In different embodiments described herein, measurements of affective response of users are utilized in computations involving experiences, such as scoring experiences, ranking experiences, comparing experiences, and/or computing time-dependent trends for experiences. Optionally, the experiences involved in such computations all belong to a set of experiences that includes certain types of experiences. Additionally, in embodiments, there may be one or more types of experiences that are explicitly excluded from the set of experiences, and thus measurements of affective response users utilized in the computations do not include measurements of users corresponding to events involving experiences of the one or more types of experiences.

Below are some examples of embodiments that involve certain types of experiences, such that the set of experiences may include experiences of one or more of the following types. In one embodiment, the set of experiences includes experiences in which the user is in a location (in the physical world). In one embodiment, the set of experiences includes experiences in which the user is in a virtual location. In one embodiment, the set of experiences includes experiences that involve traversing a certain route. In one embodiment, the set of experiences includes experiences in which the user consumes content (e.g., a movie or a computer game). In one embodiment, the set of experiences includes experiences in which the user partakes in a recreational activity. In another embodiment, the set of experiences includes experiences in which the user partakes in a work-related activity. In one embodiment, the set of experiences includes experiences in which the user has a social interaction. In one embodiment, the set of experiences includes experiences in which the user receives a service from a service provider. In one embodiment, the set of experiences includes experiences in which the user utilizes a certain product. In one embodiment, the set of experiences includes experiences in which the user spends time in an environment characterized with a certain environmental condition.

Below are some examples of embodiments that exclude certain types of experiences, such that the set of experiences does not include experiences of at least a certain type. In one embodiment, the set of experiences does not include experiences in which the user is in a location (in the physical world). In one embodiment, the set of experiences does not include experiences in which the user is in a virtual location. In one embodiment, the set of experiences does not include experiences that involve traversing a certain route. In one embodiment, the set of experiences does not include experiences in which the user consumes content (e.g., a movie or a computer game). In one embodiment, the set of experiences does not include experiences in which the user partakes in a recreational activity. In another embodiment, the set of experiences does not include experiences in which the user partakes in a work-related activity. In one embodiment, the set of experiences does not include experiences in which the user has a social interaction. In one embodiment, the set of experiences does not include experiences in which the user receives a service from a service provider. In one embodiment, the set of experiences does not include experiences in which the user utilizes a certain product. In one embodiment, the set of experiences does not include experiences in which the user spends time in an environment characterized with a certain environmental condition.

The examples given above illustrate some of the different types of experiences users may have in embodiments described herein. In addition to a characterization according to a type of experience, and in some embodiments instead of such a characterization, different experiences may be characterized according to other attributes. In one embodiment, experiences may be characterized according to the length of time in which a user has them. For example, "short experiences" may be experiences lasting less than five minutes, while "long experiences" may take more than an hour (possibly with a category of "intermediate experiences" for experiences lasting between five minutes and an hour). In another embodiment, experiences may be characterized according to an expense associated with having them. For example, "free experiences" may have no monetary expense associated with them, while "expensive experiences" may be experiences that cost at least a certain amount of money (e.g., at least a certain portion of a budget a user has). In yet another embodiment, experiences may be characterized according to their age-appropriateness. For example, certain experiences may be considered for the general public (including children), while others may be deemed for a mature audience only. It is to be noted that the examples given in the above embodiment may be used to characterize experiences without reference to a type of experience (e.g., R-rated experiences vs. PG-rated experiences) or in conjunction with a type of experience (e.g., an R-rated movie vs. a PG-rated movie).

Characterizations of experiences may be done in additional ways. In some embodiments, experiences may be considered to by corresponding attributes (e.g., type of experience, length, cost, quality, etc.) Depending on the embodiments, different subsets of attributes may be considered, which amount to different ways in which experiences may be characterized. Thus, for example, in one embodiment, two events may be considered corresponding to the same experience (when a first set of attributes is used to characterize experiences), while in another embodiment, the same two events may be considered corresponding to different experiences (when a second set of attributes is used to characterize experiences. For example, in one embodiment, biking for 15 minutes may be considered a different experience than biking for 2 hours; they may be considered as the experiences "short bike ride" and "long bike ride", respectively. However, in another embodiment they may both be considered the same experience "riding a bike". In another example, in one embodiment, eating a burger at McDonald's may be considered a different experience than eating a burger at In-N-Out (e.g., when considering an attribute involving the quality of food), while in another embodiment, both would be considered examples of the experience "eating a burger".

Characterizing experiences based on attributes may involve certain combinations of pairs of attributes. These attributes may describe properties such as the location the experience takes place, an activity the experience involves, the duration of the experience, and/or a period of time in a recurrent unit time during which the experience happens (e.g., the hour of the day, the day of week, the season in the year, etc.) Following are examples of characterizing experiences via combinations of the attributes described above.

In one embodiment, an experience a user has may involve engaging in a certain activity at a certain location. Optionally, the certain activity belongs to a set of activities that includes the following: exercise activities, recreational activities, shopping related activities, dining related activities, consuming digital content, resting, playing games, visiting a location in the physical world, interacting in a virtual environment, receiving a medical treatment, and receiving services. Optionally, the certain location belongs to a set that includes locations that may be characterized as being of one or more of the following types: countries of the world, cities in the world, neighborhoods in cities, parks, beaches, stadiums, hotels, restaurants, theaters, night clubs, bars, shopping malls, stores, theme parks, museums, zoos, spas, health clubs, exercise clubs, clinics, hospitals, banks, and other places of business.

In another embodiment, an experience a user has may involve visiting a certain location during a certain period of time. In one example, the certain location belongs to a set that includes locations that may be characterized as being of one or more of the following types: cities, neighborhoods, parks, beaches, restaurants, theaters, night clubs, bars, shopping malls, stores, theme parks, museums, zoos, spas, health clubs, exercise clubs, clinics, hospitals, banks and other places of business. In this example, the certain period of time during which the certain location is visited, is a recurring period of time that includes at least one of the following: a certain hour during the day, a certain day of the week, a certain day of the month, and a certain holiday. In another example, the certain location belongs to a set that includes locations that may be characterized as being of one or more of the following types: continents, countries, cities, parks, beaches, theme parks, museums, resorts, and zoos. In this example, the certain period of time during which the certain location is visited is a recurring period of time that involves at least one of the following periods: a season of the year, a month of the year, and a certain holiday.

In yet another embodiment, an experience a user has may involve visiting a certain location for a certain duration. In one example, the certain location belongs to a set that includes locations that may be characterized as being of one or more of the following types: cities, neighborhoods, parks, beaches, restaurants, theaters, night clubs, bars, shopping malls, stores, theme parks, museums, zoos, spas, health clubs, and exercise clubs. In this example, the certain duration is longer than five minutes and shorter than a week. In another example, the certain location belongs to a set that includes locations that may be characterized as being of one or more of the following types: continents, countries, cities, parks, hotels, cruise ships, and resorts. In this example, the certain duration is longer than an hour and shorter than two months.

In still another embodiment, an experience a user has may involve engaging in a certain activity during a certain period of time. Optionally, the certain activity belongs to a set of activities that includes exercise activities, recreational activities, work related activities, household related activities, shopping related activities, dining related activities, consuming digital content, playing games, studying, resting, visiting a location in the physical world, interacting in a virtual environment, receiving a medical treatment, and receiving services. Optionally, the certain period of time is a recurring period of time that includes at least one of the following: a certain hour during the day, a certain day of the week, a certain day of the month, and a certain holiday.

And in yet another embodiment, an experience a user has may involve engaging in a certain activity for a certain duration. Optionally, the certain activity belongs to a set of activities that includes exercise activities, recreational activities, work related activities, household related activities, shopping related activities, dining related activities, consuming digital content, playing games, studying, resting, visiting a location in the physical world, interacting in a virtual environment, receiving a medical treatment, and receiving services. Optionally, the certain duration is longer than one minute and shorter than one day.

The possibility to characterize experiences with subsets of corresponding attributes may lead to the fact that depending on the embodiment, the same collection of occurrences (e.g., actions by a user at a location) may correspond to different experiences and/or a different number of experiences. For example, when a user takes a bike ride in the park, it may correspond to multiple experiences, such as "exercising", "spending time outdoors", "being at the park", "being exposed to the sun", "taking a bike ride", and possibly other experience. Thus, the decision on which of the above are to be recognized as experiences based on the set of actions involving riding the bike in the park would depend on specifics of the embodiment involved.

In different embodiments, experiences may be characterized according to attributes involving different levels of specificity. The level of specificity, according to which it may be judged whether two events correspond to the same experience, may depend on the embodiment. For example, when considering an experience involving being in a location, in one embodiment, the location may be a specific location such as room 1214 in the Grand Budapest Hotel, or seat 10 row 4 in the Left Field Pavilion 303 at Dodger Stadium. In another embodiment, the location may refer to multiple places in the physical world. For example, the location "fast food restaurant" may refer to any fast food restaurant, while the location "hotel" may refer to any hotel. Similarly, for example, the location "In-N-Out Burger" may refer to any branch of the franchise, and not necessarily a certain address. In one example, a location may refer to designated place in a vehicle, such as a specific seat on an airplane (e.g., seat 34A), or a cabin in a ship (e.g., cabin 212). In another example, the location may refer to a specific seat in a vehicle travelling on a certain route (e.g., window seat flying through the Grand Canyon).

In some embodiments, attributes used to characterize experiences may be considered to belong to hierarchies. Thus, at the same time, something that happens to the user and/or something the user does may be associated with multiple related experiences of an increasing scope. For example, when a user rides a bike in the park, this may be associated with multiple experiences that have a hierarchical relationship between them. For example, riding the bike may correspond to an experience of "riding a bike in Battery park on a weekend", which belongs to a group of experiences that may be described as "riding a bike in Battery park", which belongs to a larger group of experiences that may be characterized as "riding a bike in a park", which in turn may belong to a larger group "riding a bike", which in turn may belong to an experience called "exercising". Which of the hierarchical representations gets used and/or what level in a hierarchy gets used, would be a detail specific to the embodiment at hand.

Additionally, in some embodiments, an experience may comprise multiple ("smaller") experiences, and depending on the embodiment, the multiple experiences may be considered jointly (e.g., as a single experience) or individually. For example, "going out to a movie" may be considered a single experience that is comprised of multiple experiences such as "driving to the theatre", "buying a ticket", "eating popcorn", "going to the bathroom", "watching the movie", and "driving home".

4—Events

When a user has an experience, this defines an "event". An event may be characterized according to certain attributes. For example, every event may have a corresponding experience and a corresponding user (who had the corresponding experience). An event may have additional corresponding attributes that describe the specific instantiation of the event in which the user had the experience. Examples of such attributes may include the event's duration (how long the user had the experience in that instantiation), the event's starting and/or ending time, and/or the event's location (where the user had the experience in that instantiation).

An event may be referred to as being an "instantiation" of an experience and the time during which an instantiation of an event takes place may be referred to herein as the "instantiation period" of the event. This relationship between an experience and an event may be considered somewhat conceptually similar to the relationship in programming between a class and an object that is an instantiation of the class. The experience may correspond to some general attributes (that are typically shared by all events that are instantiations of the experience), while each event may have attributes that correspond to its specific instantiation (e.g., a certain user who had the experience, a certain time the experience was experienced, a certain location the certain user had the experience, etc.) Therefore, when the same user has the same experience but at different times, these may be considered different events (with different instantiations periods). For example, a user eating breakfast on Sunday, Feb. 1, 2015 is a different event than the user eating breakfast on Monday, Feb. 2, 2015.

In some embodiments, an event may have a corresponding measurement of affective response, which is a measurement of the user corresponding to the event, to having the experience corresponding to the event. The measurement corresponding to an event is taken during a period corresponding to the event; for example, during the time the user corresponding to the event had the experience corresponding to the event, or shortly after that. Optionally, a measurement corresponding to an event reflects the affective response corresponding to the event, which is the affective response of the user corresponding to the event to having the experience corresponding to the event. Thus, a measurement of affective response corresponding to an event typically comprises, and/or is based on, one or more values measured during the instantiation period of the event and/or shortly after it, as explained in more detail at least in section 2—Measurements of Affective Response.

An event is often denoted in this disclosure with the letter $\tau$. An event involving a user u corresponding to the event who has an experience e corresponding to the event, may be represented by a tuple $t=(u,e)$. Similarly, an event $\tau$ may have a corresponding measurement of affective response m which is a measurement of the user u corresponding to the event to having the experience e corresponding to the event (as taken during the instantiation period of the event or shortly after it). In this case, the event $\tau$ may be represented by a tuple $\tau=(u,e,m)$. It is to be noted that the same user may have the same experience at multiple different times. These may be represented by multiple different events having possibly different measurement values. For example, two different events in which the same user had the same experience, but with possibly different corresponding measurements of affective response may be denoted herein as events $\tau_1=(u,e,m_1)$ and $\tau_2=(u,e,m_2)$. In some cases herein, to emphasize that a measurement m corresponds to an event $\tau$, the measurement will be denoted $m_\tau$. Similarly, the user corresponding to an event $\tau$ may be denoted $u_\tau$ and the experience corresponding to $\tau$ may be denoted $e_\tau$.

In some embodiments, a tuple $\tau$ may correspond to additional information related to the specific instantiation of the event, such as a time t of the event (e.g., the time the measurement m is taken), in which case, the tuple may be of the form $\tau=(u,e,m,t)$. Additionally or alternatively, a tuple $\tau$ may further correspond to a weight parameter w, which may represent the importance of the measurement and be indicative of the weight the measurement should be given when training models. In this case, the tuple may be of the form $\tau=(u,e,m,w)$. Additionally or alternatively, a tuple $\tau$ may correspond to other factors related to the user (e.g., demographic characteristics) or the instantiation of the experience (e.g., duration and/or location of the event corresponding to the measurement).

When discussing events, it may be stipulated that the measurement of affective response corresponding to an event is taken in temporal proximity to the user corresponding to the event having the experience corresponding to the event. Thus, when discussing an event represented by a tuple $\tau=(u,e,m)$, where m is a measurement of the affective response of the user u to having the experience e, it may be assumed that m is taken in temporal proximity to when the user u had the experience e.

It is to be noted that in the above notation, $\tau=(u,e,m)$ is typically assumed to involve a single user u, a single experience e, and a measurement m. However, this is not necessarily true in all embodiments. In some embodiments, u may represent multiple users, e may represent multiple experiences, and/or m may represent multiple measurements. For example, when the experience e may represent multiple experiences that the user u had, such as in a case where e is an experience that involves a set of "smaller" experiences $e_1, e_2, \ldots, e_n$, the measurement m may be assumed to correspond to each experience $e_1, e_2, \ldots, e_n$. Thus in this example, to account for multiple experiences, the event $\tau$ may be substituted by multiple events, e.g., $\tau_1=(u,e_1,m), \ldots, \tau_n=(u,e_n,m)$. Similarly, if the user u represents multiple users, the measurement m may be considered an average and/or representative measurement of those users. Additionally, as described elsewhere herein, the use of a singular "measurement" in this disclosure may refer to multiple values (e.g., from the same sensor, different sensor, and/or acquired at multiple times).

Similar to how a "larger" experience may comprise multiple "smaller" experiences, in some embodiments, an event may comprise a plurality of smaller events instantiated during the instantiation period of the "larger" event. Optionally, the smaller events may be referred to as "mini-events". For example, an event corresponding to an experience of being at a location (e.g., a mall), may include multiple mini-events, such as an event in which a user traveled to the location, an event in which the user spoke to someone at the location, an event in which the user bought a present at the location, and an event in which the user ate food at the location. In some embodiments, some of the mini-events may have overlapping instantiation periods (e.g., a user exercising and speaking to someone else simultaneously), while in others, the events comprised in a "larger" event may have non-overlapping instantiation periods. It is to be noted that the herein the term "mini-event" is used only to distinguish a larger event from smaller events it comprises; each mini-event is an event, and may have all the characteristics of an event as described in this disclosure.

In some embodiments, an event $\tau$ may include, and/or be partitioned to, multiple "mini-events" $\tau_1, \tau_2, \ldots, \tau_k$ that are derived from the event $\tau$, such that the instantiation period of each $\tau_i$, $1 \leq i \leq k$, falls within the instantiation period of $\tau$. Furthermore, it may be assumed that each mini-event has an associated measurement of affective response $m_{\tau_i}$ such that if $i \neq j$ it may be that $m_{\tau_i} \neq m_{\tau_j}$. In this embodiment, $m_\tau$, the measurement of affective response corresponding to the event $\tau$ is assumed to be a function of the measurements corresponding to the mini-events $m_{\tau_1}, m_{\tau_2}, \ldots, m_{\tau_k}$. For example, $m_\tau$ may be a weighted average of the measurements corresponding to the mini-events, that is computed according to a function $$m_\tau = \frac{1}{\sum_{i=1}^{k} w_i} \cdot \sum_{i=1}^{k} w_i \cdot m_{\tau_i},$$

where the $w_i$ are weight corresponding to each mini-event $\tau_1$. Additional discussion regarding the computation of the measurement of affective response corresponding to an event from measurements corresponding to mini-events comprised in the event is given in section 2—Measurements of Affective Response.

In one embodiment, the instantiation periods of the k mini-events do not overlap. Alternatively, the instantiation periods of some of the k mini-events may overlap. In one embodiment, the instantiation periods of the k mini-events may cover the entire instantiation period of the event $\tau$. Alternatively, the instantiation periods of the k mini-events may cover only a portion of the instantiation of the event $\tau$. Optionally, the portion of $\tau$ that is covered by instantiations of mini-events involves at least a certain percent of the instantiation period of $\tau$, such as at least 1%, 5%, 10%, 25%, or at least 50% of the instantiation period of $\tau$. In another embodiment, the duration covered by instantiations of the k mini-events may comprise at least a certain period of time. For example, the certain period may be at least 1 second, 10 second, 1 minute, 1 hour, 1 day, 1 week, or more.

In one embodiment, k≥1 "mini-events" are derived from an event $\tau$, in such a way that each mini-event has an instantiation period having a certain duration. For example, the certain duration may be one second, five seconds, one minute, one hour, one day, one week, or some other duration between one second and one week. In another embodiment, each of the k mini-events derived from an event $\tau$ has an initiation period falling within a certain range. Examples of the certain range include 0.01 seconds to one second, 0.5 seconds to five seconds, one second to one minute, one minute to five minutes, one minute to one hour, one hour to one day, and between one day and one week.

In some embodiments, mini-events are generated from a larger event because they reflect different types of events. For example, an event involving going out may be represented by the mini-events corresponding to getting dressed, driving down-town, finding parking, going to a restaurant, taking a stroll, and driving back home. In another example, different scenes in a movie may be considered mini-events, and similarly different levels in a game, different rooms in a virtual world, etc., may also each be considered a different mini-event.

In other embodiments, mini-events are generated when a description of involving factors of an event changes to a certain extent (factors of events are discussed in more detail at least in section 12—Factors of Events). For example, the factors affecting a user may be evaluated periodically (e.g., every second). When a certain vector of factors is sufficiently different from a preceding vector of factors (or a certain number of factors is different from a preceding number of factors), this may be a signal to generate a new mini-event. In one example, the difference between vectors of factors is determined based on a similarity measure such as Mahalanobis distance, Manhattan distance, or an edit distance. In another example, the distance between vectors of factors is based on a Euclidean distance or a dot product between the vectors.

In some embodiments, a measurement of affective response corresponding to a certain event may be based on values that are measured with one or more sensors at different times during the certain event's instantiation period or shortly after it (this point is discussed further in section 2—Measurements of Affective Response). It is to be noted that in the following discussion, the values may themselves be considered measurements of affective response. However, for the purpose of being able to distinguish, in the discussion below, between a measurement of affective response corresponding to an event, and values upon which the measurement is based, the term "measurement of affective response" is not used when referring to the values measured by the one or more sensors. However, this distinction is not meant to rule out the possibility that the measurement of affective response corresponding to the certain event comprises the values.

When there are no other events overlapping with the certain event, the values measured with the one or more sensors may be assumed to represent the affective response corresponding to the certain event. However, when this is not the case, and there are one or more events with instantiation periods overlapping with the instantiation of the certain event, then in some embodiments, that assumption may not hold. For example, if for a certain period during the instantiation of the certain event, there may be another event with an instantiation that overlaps with the instantiation of the certain event, then during the certain period, the user's affective response may be associated with the certain event, the other event, and/or both events. In some cases, if the other event is considered part of the certain event, e.g., the other event is a mini-event corresponds to an experience that is part of a "larger" experience to which the certain event corresponds, then this fact may not matter much (since the affective response may be considered to be directed to both events). However, if the other event is not a mini-event that is part of the certain event, then associating the affective response measured during the certain period with both events may produce an inaccurate measurement corresponding to the certain event. For example, if the certain event corresponds to an experience of eating a meal, and during the meal the user receives an annoying phone call (this is the "other event"), then it may be preferable not to associate the affective response expressed during the phone call with the meal.

It is to be noted that in some embodiments, the fact that unrelated events may have overlapping instantiation periods may be essentially ignored when computing measurements of affective response corresponding to the events. For example, a measurement of affective response corresponding to the certain event may be an average of values acquired by a sensor throughout the instantiation of the certain event, without regard to whether there were other overlapping events at the same time. One embodiment, for example, in which such an approach may be useful is an embodiment in which the certain event has a long instantiation period (e.g., going on a vacation), while the overlapping events are relatively short (e.g., intervening phone calls with other people). In this embodiment, filtering out short periods in which the user's attention was not focused on the experience corresponding to the certain event may not lead to significant changes in the value of the measurement of affective response corresponding to the certain event (e.g., because most of the values upon which the measurement is based still correspond to the certain event and not to other events).

However, in other embodiments, it may be desirable to treat values acquired by a sensor during periods of overlapping instantiations differently than values acquired when only the certain event is considered to be instantiated. For example, some of the values acquired during periods of overlapping instantiations may receive a different weight than values acquired when there is only a single instantiation to consider or be filtered out entirely.

In some embodiments, an event may be associated with a dominance level indicative of the extent affective response expressed by the user corresponding to the event should be associated with the event. Based on such dominance levels, when an event with a higher dominance level overlaps with an event with a lower dominance level, the affective response, measured during the overlap, is associated to a higher degree with the event with the higher dominance level. Optionally, the affective response is associated entirely with the event with the higher dominance level, such that a value acquired by a sensor during the time of the overlap between the events having the lower and higher dominance levels is essentially not utilized to compute the measurement of affective response corresponding to the event with the lower dominance level. In some embodiments, this may amount to filtration of values from periods in which an event's instantiation overlaps with other events having higher dominance levels. Alternatively, a value acquired by the sensor during the time of the overlap may be given a lower weight when used to compute the measurement of affective response corresponding to the event with the lower dominance level, compared to the weight given to a value acquired by the sensor during a time in which the event with the higher dominance level does not overlap with the event with the lower dominance level.

In one embodiment, an event may have a certain dominance level associated with it based on the type of the experience corresponding to the event. For example, an event that involves having a phone conversation may have a higher dominance level than an event involving watching TV. Thus, if a user is doing both simultaneously, in this embodiment, it may be assumed that affective response the user has at the time of the conversation is more dominantly related to the phone conversation and to a lesser extent (or not at all) to what is playing on the TV.

In another embodiment, an event may have a certain dominance level associated with it based on its length, such that a shorter event is typically given a higher dominance level than a longer event. For example, the shorter event may be assumed to interrupt the user's experience corresponding to the longer event; thus, during the instantiation of the shorter event, it may be assumed that the user pays more attention to the experience corresponding to the shorter event.

Determining dominance levels of events may involve, in some embodiments, tracking users during the events. Tracking a user may be done utilizing various sensors that may detect movements and/or other actions performed by the user. Optionally, tracking the user is done at least in part by a software agent operating on behalf of the user. Additionally, the software agent may also be the entity that assigns dominance levels to at least some events involving the user on behalf of whom it operates.

In one example, eye tracking may be used to determine what the user is focusing on when measurements are taken with a sensor. Based on the eye tracking data, objects that are the target of attention of the user can be identified, and events involving those objects may receive a higher dominance level than events that do not involve those objects. In another example, a camera and/or other sensors may identify certain actions a user does, like typing a text message on a phone, in order to determine that an event involving composition of a text message should receive a higher dominance level than some other events instantiated at the same time (e.g., an event involving listening to a certain song). In yet another example, semantic analysis of what a user is saying may be used to determine whom the user is addressing (another person, a software agent, or an operating system), in order to determine what experience the user is focusing on at the time. In still another example, software systems with which a user interacts may provide indications of when such interaction takes place. When such an interaction takes place, it may be assumed that the focus of the user is primarily on the experience involved in the interaction (e.g., an operating system of an entertainment system) and to a lesser extent with other experiences happening at the same time.

Other information that may be used to determine dominance levels of events, in some embodiments, may come from other users who were faced with similar overlapping events. Optionally, the other users were monitored at the time, and the dominance levels assigned to their corresponding events are based on monitoring, such as in the examples given above.

In some embodiments, when the user experiences different consecutive dominant events, a certain time margin may be used when using values measured by a sensor to compute measurements of affective response corresponding to the events. The certain time margin may span a few seconds, to a few minutes or even more, depending on the type of sensors used. Optionally, the certain time margin may be used in order to try and avoid associating the affective response of a user to a first experience with the affective response of the user to a second experience that came before and/or after it. For example, if a user is eating in a restaurant (a first event) and the user receives a phone call that excites the user (a second event), it may be prudent not to use values measured by a sensor during the first minute or two after the call to compute a measurement of affective response corresponding to the meal. This is because the affective response of the user shortly after the phone call may be still related to the conversation the user had, and not so much to the meal. After a certain amount of time (e.g., a couple of minutes), the effects of the conversation may have diminished, and the affective response of the user is more likely to represent how the user feels about the meal.

In one embodiment, the certain time margin described above does not have a fixed duration, rather, it represents the time needed to return to a baseline or to return to at least a certain distance from a baseline. For example, if measurements of a user up to a certain event are at a certain level, and an intervening event causes the measurements to jump significantly, then after the intervening event, the margin in which measurements are not associated with the certain event may extend until the measurements return at least a certain distance to their prior level (e.g., at least 50% of the difference).

Descriptions of events are used in various embodiments in this disclosure. Typically, a description of an event may include values related to a user corresponding to the event, an experience corresponding to the event, and/or details of the instantiation of the event (e.g., the duration, time, location, and/or conditions of the specific instantiation of the event). Optionally, a description of an event may be represented as feature vector comprising feature values. Additionally or alternatively, a description of an event may include various forms of data such as images, audio, video, transaction records, and/or other forms of data that describe aspects of the user corresponding to the event, the experience corresponding to the event, and/or the instantiation of the event. Additionally, in some embodiments, a description of an event includes, and/or may be used to derive, factors of events, as discussed in more detail at least in section 12—Factors of Events. A description of a user includes values describing aspects of the user. Optionally, the description may be represented as a vector of feature values. Additionally or alternatively, a description of a user may include data such as images, audio, and/or video that includes the user. In some embodiments, a description of a user contains values that relate to general attributes of the user, which are often essentially the same for different events corresponding to the same user, possibly when having different experiences. Examples of such attributes may include demographic information about the user (e.g., age, education, residence, etc.). Additionally or alternatively, the description may include portions of a profile of the user. The profile may describe various details of experiences the user had, such as details of places in the real world or virtual worlds the user visited, details about activities the user participated in, and/or details about content the user consumed. Optionally, the description of the user may include values obtained from modeling the user, such as bias values corresponding to biases the user has (bias values are discussed in more detail in section 13—Bias Values).

A description of an experience includes values describing aspects of the experience. Optionally, the description of the experience may be represented as a vector of feature values. Typically, the description of the experience contains values that relate to general attributes of the experience, which are often essentially the same for different events corresponding to the same experience, possibly even when it is experienced at different times and/or by different users. Examples of such information may include attributes related to the type of experience, such as its typical location, cost, difficulty, etc.

The description of an event $\tau$ may include feature values obtained from a description of the user corresponding to the event $\tau$ and/or a description of the experience corresponding to the event $\tau$.

Additionally, the description of the event $\tau$ may include values that may vary between different events corresponding to the same experience as $\tau$. These values include values corresponding to the instantiation of the event $\tau$ during the specific time corresponding to $\tau$, when the user u had the experience e. Examples of such values may include the location corresponding to $\tau$ (where the user u had the experience e in the specific instantiation $\tau$), the duration corresponding to $\tau$ (how long the user u had the experience e in the specific instantiation $\tau$), and/or the time frame of $\tau$ (e.g., when $\tau$ started and/or ended). Optionally, the description of the event $\tau$ may include values related to situations the user was in during the time frame of $\tau$ (e.g., the user's mood, alertness, credit status, relationship status, and other factors that may influence the user's state of mind). Optionally, the description of $\tau$ may include values related to experiences the user had, such as the size of portion the user was served, the noise and/or cleanliness level in the user's room, how long it took to deliver a product to the user, and/or other attributes that may differ depending on the embodiment being considered.

In some embodiments, the description of an event $\tau$ may include information derived from monitoring of the user corresponding to $\tau$, such as actions the user is performing, things the user is saying, and/or what objects are capturing the attention of the user (e.g., as determined from eye tracking). Optionally, this information may be used to determine a dominance level of $\tau$, which may be used to determine to what extent the affective response of the user corresponding to $\tau$ is to be associated with the experience corresponding to $\tau$.

In some embodiments, a description of an event may include information pertaining to a measurement of affective response m corresponding to the event $\tau$ (also denoted $m_\tau$). Optionally, the information pertaining to the measurement includes information about one or more sensors used to measure the user corresponding to the event, such as operating parameters of the one or more sensors (e.g., settings used and/or durations of operation) and/or details regarding the processing of the data acquired by the one or more sensors. Additionally, the information in the description of the event $\tau$ may include the measurement $m_\tau$ itself or a product of it.

It is to be noted that the description of an event may include various types of values. The choice of which values to include in the description of the event may vary between embodiments and depend on the task at hand. In one example, a description of an event may include values represented as indicator values indicating whether certain aspects of an event are relevant to the event or not. Optionally, the description of an event may include values represented as real values indicative of the magnitude of certain aspects (where irrelevant aspects may be represented by a fixed value such as 0).

It is also to be noted that when a description of an event is represented by a feature vector, in different embodiments, there may be different ways to represent the same type of data. For example, in some embodiments, events involving corresponding experiences of different types may be all described as feature vectors in the same feature space (i.e., they all have the same dimensionality and features at a certain dimension related to the same attribute in all events). In other embodiments, each type of experience may have its own feature space (i.e., its own set of attributes). In such a case, processing events represented in different feature spaces may involve converting their representation into a representation involving a common feature space.

Various embodiments described herein involve collecting measurements of affective response of users to experiences (i.e., collecting measurements corresponding to events). Though in some embodiments it may be easy to determine who the users corresponding to the events are (e.g., via knowledge of which sensors, devices, and/or software agents provide the data), it may not always be easy to determine what are the corresponding experiences the users had. Thus, in some embodiments, it is necessary to identify the experiences users have and to be able to associate measurements of affective response of the users with respective experiences to define events. However, this may not always be easily done. In one example, it may not be clear to a system that monitors a user (e.g., a software agent) when the user has an experience and/or what the experience is. In another example, the identity of a user who has an experience may not be known (e.g., by a provider of an experience), and thus, it may be necessary to identify the user too. In general, determining who the user corresponding to an event and/or the experience corresponding to an event are referred to herein as identifying the event.

Identifying an event may also involve, in some embodiments, identifying details describing aspects of the event. Thus, the term "identifying an event" may also refer to determining one or more details related to an event, and as such, in some embodiments, "identifying an event" may be interpreted as "describing an event", and may be used with that term interchangeably. In one example, the one or more details may relate to the user corresponding to the event. In another example, the one or more details may relate to the experience corresponding to the event. And in yet another example, the one or more details may relate to the instantiation of the event. Optionally, the one or more details related to the event may be factors of the event, and/or may comprise values from which factors of the event are derived.

In some embodiments, events are identified by a module referred to herein as an event annotator. Optionally, an event annotator is a predictor, and/or utilizes a predictor, to identify events. Optionally, the event annotator generates a description of an event, which may be used for various purposes such as assigning factors to an event, as described in section 12—Factors of Events. Identifying an event, and/or factors of an event, may involve various computational approaches applied to data from various sources, which are both elaborated on further in section 12—Factors of Events.

In some embodiments, identifying events of a user is done, at least in part, by a software agent operating on behalf of the user (for more details on software agents see section 7—Software Agents). Optionally, the software agent may monitor the user and/or provide information obtained from monitoring the user to other parties. Optionally, the software agent may have access to a model of the user (e.g., a model comprising biases of the user), and utilize the model to analyze and/or process information collected from monitoring the user (where the information may be collected by the software agent or another entity). Thus, in some embodiments, an event annotator used to identify events of a user may be a module of a software agent operating on behalf of the user and/or an event annotator may be in communication with a software agent operating on behalf of the user.

In some embodiments, in order to gather this information, a software agent may actively access various databases that include records about the user on behalf of whom the software agent operates. For example, such databases may be maintained by entities that provide experiences to users and/or aggregate information about the users, such as content providers (e.g., search engines, video streaming services, gaming services, and/or hosts of virtual worlds), communication service providers (e.g., internet service providers and/or cellular service providers), e-commerce sites, and/or social networks.

In one embodiment, a first software agent acting on behalf of a first user may contact a second software agent, acting on behalf of a second user, in order to receive information about the first user that may be collected by the second software agent (e.g., via a device of the second user). For example, the second software agent may provide images of the first user that the first software agent may analyze in order to determine what experience the first user is having.

Events can have multiple measurements associated with them that are taken during various times. For example, a measurement corresponding to an event may comprise, and/or be based on, values measured when the user corresponding to the event starts having the experience corresponding to the event, throughout the period during which the user has the experience, and possibly sometime after having the experience. In another example, the measurement may be based on values measured before the user starts having the experience (e.g., in order to measure effects of anticipation and/or in order to establish a baseline value based on the measurement taken before the start). Various aspects concerning how a measurement of affective response corresponding to an event is computed are described in more detail at least in section 2—Measurements of Affective Response.

In some embodiments, measurements of affective response corresponding to an event, which are taken at different times and/or are based on values measured by sensors over different time frames, may be used to capture different aspects of the event. For example, when considering an event involving eating a meal, the event may have various corresponding measurements capturing different aspects of the experience of having the meal. A measurement of affective response based on values acquired while the meal is being brought to the table and before a user starts eating may capture an affective response to how the food looks, how it smells, and/or the size of the portion. A measurement of affective response based on values acquired while the user is eating may be associated with how the food tastes, its texture, etc. And a measurement of affective response based on values acquired after the user is done eating may express how the meal influences the body of the user (e.g., how it is digested, whether it causes the user to be lethargic or energetic, etc.).

Events may belong to one or more sets of events. Considering events in the context of sets of events may be done for one or more various purposes, in embodiments described herein. For example, in some embodiments, events may be considered in the context of a set of events in order to compute a crowd-based result, such as a score for an experience, based on measurements corresponding to the events in the set. In other embodiments, events may be considered in the context of a set of events in order to evaluate a risk to the privacy of the users corresponding to the events in the set from disclosing a score computed based on measurements of the users. Optionally, events belonging to a set of events may be related in some way, such as the events in the set of events all taking place during a certain period of time or under similar conditions. Additionally, it is possible in some embodiments, for the same event to belong to multiple sets of events, while in other embodiments, each event may belong to at most a single set of events.

In one embodiment, a set of events may include events corresponding to the same certain experience (i.e., instances where users had the experience). Measurements of affective response corresponding to the set of events comprise measurements of affective response of the users corresponding to the events to having the certain experience, which were taken during periods corresponding to the events (e.g., during the instantiation periods of the events or shortly after them).

In another embodiment, a set of events may be defined by the fact that the measurements corresponding to the set of events are used to compute a crowd-based result, such as a score for an experience. In one example, a set of events may include events involving users who ate a meal in a certain restaurant during a certain day. From measurements of the users corresponding to the events, a score may be derived, which represents the quality of meals served at the restaurant that day. In another example, a set of events may involve users who visited a location, such as a certain hotel, during a certain month, and a score generated from measurements of the affective response corresponding to the set of events may represent the quality of the experience of staying at the hotel during the certain month.

In yet another embodiment, a set of events may include an arbitrary collection of events that are grouped together for a purpose of a certain computation and/or analysis.

There are various ways in which events corresponding to an experience may be assigned to sets of events. In one example, all the events corresponding to an experience are assigned to a single set of events. In another example, events may be assigned to multiple sets of events based on various criteria, such as based on the time the events occurred (e.g., in the example above involving a stay at a hotel, each month may have its own set of events). Optionally, when a set of events includes events happening during a specific period of time, the period is not necessarily a single contiguous period. For example, one set of events may include events of a certain experience that happen on weekends while another set of events may include events of the experience that happen on weekdays.

In embodiments described herein, V often denotes the set of all events (e.g., all events that may be evaluated by a system). In some embodiments, the events in V may be assigned to various sets of events $V_i$, $1 \le i \le k$. Optionally, each event in V belongs to at least one set of events, such that $V = \cup_{i=1}^{k} V_i$. Optionally, each set of events $V_i$ includes events sharing one or more similar characteristics, such as events corresponding to the same experience that was experienced during a certain period of time. In some embodiments, each set of events $V_i$ contains distinct events, such that each event belongs to at most one set of events, while in other embodiments, the sets of events do not necessarily contain distinct events, such that there may be an event belonging to sets of events $V_i$ and $V_j$, where $i \ne j$. Additionally, it is possible in some embodiments for a measurement of affective response to correspond to multiple events (e.g., events belonging to different sets of events). For example, a measurement of affective response taken while a user is jogging in a park may correspond to a first set of events corresponding to an experience of being in the park, and it may also correspond to a second set of events corresponding to an experience of jogging.

In some embodiments, a user may provide multiple measurements of affective response that correspond to events in the same set of events; that is, $V_i$, for some $1 \le i \le k$, may include two tuples $\tau_1 = (u, e, m_1)$ and $\tau_2 = (u, e, m_2)$, for which $m_1$ may or may not equal $m_2$. Multiple measurements of the same user that correspond to the same set of events may occur for various reasons. In one embodiment, multiple measurements may be taken of a user corresponding to the same event. For example, a measurement of a user is taken every minute while the event lasts one hour. In another embodiment, there may be multiple events corresponding to the same user in the same set of events. For example, the set of events may include events in which users visit an establishment during a certain week, and in that week, a certain user visited the establishment multiple times, and each time one or more measurements of the user were taken.

Having users provide different numbers of measurements that correspond to events in a certain set of events may bias a score that is based on the corresponding set of events (i.e., the measurements corresponding to events belonging to the set). In particular, the score may be skewed towards users who provided a larger number of measurements and reflect values of their measurements in a possibly disproportionate way. Such cases in which a certain user provides multiple measurements that correspond to multiple events in the same set of events may be handled in various ways. In one example, the same weight is assigned to each of the multiple measurements, which may amount to ignoring the possible effects of using multiple measurements of the same user. In another example, each measurement of the multiple measurements of a user are weighted such that the sum of the weights of the multiple measurements of each user reaches a certain fixed weight; this enables each user who provided measurements corresponding to a set of events to make an equal contribution to a score computed based on the measurements corresponding to the set of events. In yet another example, multiple measurements of the certain user may be replaced by a single representative measurement, such as a measurement that has a value that is the average of the multiple measurements (which effectively reduces the multiple measurements to a single measurement).

In some embodiments, a set of events $V_i$, $1 \le i \le k$, may include no events corresponding to certain users. This is often the case when the measurements of affective response are taken over a long period, each with respect to one or more of multiple experiences. In such cases, it is not likely that every user has every experience corresponding to each set of events $V_i$ during a period of time corresponding to the set of events, or that every user will even have each of the experiences at all. For example, if V includes events involving eating meals at restaurants, and each set of events corresponds to meals eaten at a certain restaurant on a certain day, then it is not likely that a single user ate at all the restaurants on a particular day. Therefore, it is not likely to have a user who corresponds to each and every one of the sets of events. Furthermore, there may be one or more restaurants that the user never ate at, so that user will not correspond to any sets of events that involve an experience of eating at the one or more restaurants.

In some embodiments, a set of events $V_i$, $1 \le i \le k$, may include events corresponding to a single user (i.e., all events in the set involve the same user). However, in cases where the set of events is used to compute a crowd-based score, the number of users corresponding to events in the set of events is typically at least three, and often at least a larger number such as $\kappa$, 10, 25, 100, 1000, or more than 1000.

5—Identifying Events

In some embodiments, an event annotator, such as the event annotator 701, is used to identify an event, such as determining who the user corresponding to the event is, what experience the user had, and/or certain details regarding the instantiation of the event. Optionally, the event annotator generates a description of the event.

Identifying events may involve utilizing information of one or more of various types of information and/or from one or more of various sources of information, as described below. This information may be used to provide context that can help identify at least one of the following: the user corresponding to the event, the experience corresponding to the event, and/or other properties corresponding to the event (e.g., characteristics of the instantiation of the experience involved in the event and/or situations of the user that are relevant to the event). Optionally, at least some of the information is collected by a software agent that monitors a user on behalf of whom it operates (as described in detail elsewhere in this disclosure). Optionally, at least some of the information is collected by a software agent that operates on behalf of an entity that is not the user corresponding to the event, such as a software agent of another user that shares the experience corresponding to the event with the user, is in the vicinity of the user corresponding to the event when the user has the experience corresponding to the event, and/or is in communication with the user corresponding to the event. Optionally, at least some of the information is collected by providers of experiences. Optionally, at least some of the information is collected by third parties that monitor the user corresponding to the event and/or the environment corresponding to the event. Following are some examples of types of information and/or information sources that may be used; other sources may be utilized in some embodiments in addition to, or instead of, the examples given below.

Location Information.

Data about a location a user is in and/or data about the change in location of the user (such as the velocity of the user and/or acceleration of the user) may be used in some embodiments to determine what experience the user is having. Optionally, the information may be obtained from a device of the user (e.g., the location may be determined by GPS). Optionally, the information may be obtained from a vehicle the user is in (e.g., from a computer related to an autonomous vehicle the user is in). Optionally, the information may be obtained from monitoring the user; for example, via cameras such as CCTV and/or devices of the user (e.g., detecting signals emitted by a device of the user such as Wi-Fi, Bluetooth, and/or cellular signals). In some embodiments, a location of a user may refer to a place in a virtual world, in which case, information about the location may be obtained from a computer that hosts the virtual world and/or may be obtained from a user interface that presents information from the virtual world to the user.

Images and Other Sensor Information.

Images taken from a device of a user, such as a smartphone or a wearable device such as a smart watch or a head-mounted augmented or virtual reality glasses may be analyzed to determine various aspects of an event. For example, the images may be used to determine what experience the user is having (e.g., exercising, eating a certain food, watching certain content). Additionally or alternatively, images may be used to determine where a user is, and a situation of the user, such as whether the user is alone and/or with company. Additionally or alternatively, detecting who the user is with may be done utilizing transmissions of devices of the people the user is with (e.g., Wi-Fi or Bluetooth signals their devices transmit).

There are various ways in which camera based systems may be utilized to identify events and/or factors of events. In one example, camera based systems such as OrCam (http://www.orcam.com/) may be utilized to identify various objects, products, faces, and/or recognizes text. In some embodiments, images may be utilized to determine the nutritional composition of food a user consumes. In another example, photos of meals may be utilized to generate estimates of food intake and meal composition, such as the approach described in Noronha, et al., "Platemate: crowdsourcing nutritional analysis from food photographs", *Proceedings of the 24th annual ACM symposium on User interface software and technology*, ACM, 2011.

In some embodiments, other sensors may be used to identify events, in addition to, or instead of, cameras. Examples of such sensors include microphones, accelerometers, thermometers, pressure sensors, and/or barometers may be used to identify aspects of users' experiences, such as what they are doing (e.g., by analyzing movement patterns) and/or under what conditions (e.g., by analyzing ambient noise, temperature, and/or pressure).

Time.

Temporal information may be used to determine what experience a user is having. The temporal information may be expressed in various ways, such as an absolute time (e.g., 8:22 PM on Jan. 10, 2015), a relative time (e.g., 25 minutes after getting up), or a time portion of a recurring unit of time (e.g., Sunday, the last week of school, or breakfast time). Optionally, knowing the time period may assist in determining what certain experiences are possible and/or change beliefs about what experience the user had (e.g., by changing prior probabilities for certain experiences based on the time the user potentially had the experiences).

Motion Patterns.

The growing number of sensors (e.g., accelerometers, sensor pressures, or gyroscopes) embedded in devices that are worn, carried, and/or implanted in users, may provide information that can help identify experiences the users are having (e.g., what activity a user is doing at the time). Optionally, this data may be expressed as time series data in which characteristic patterns for certain experiences may be sought. Optionally, the patterns are indicative of certain repetitive motion (e.g., motion patterns characteristic of running, biking, typing, eating, or drinking). Various approaches for inferring an experience from motion data are known in the art. For example, US patent application US20140278219 titled "System and Method for Monitoring Movements of a User", describes how motion patterns may be used to determine an activity the user is engaged in.

Measurements of Affective Response.

In some embodiments, measurements of affective response of a user may provide information about what experience the user is having. In one example, the measurements may indicate an emotional state of the user (e.g., a mood the user is in), which may help identify what experience the user had (e.g., the user may be more likely to have certain experiences when in a certain mood, and/or certain experiences are likely to cause the user to be in a certain mood). In another example, the measurements of affective response may be used to determine a change in the physiological state of the user (e.g., a change in heart rate and respiration). These changes may be correlated with certain experiences the user might have had. In another example, the measurements of affective response may provide a time series of values, which may include certain patterns that can be compared with previously recorded patterns corresponding to known experiences.

Measurements of the Environment.

Information that is indicative of the environment a user is in may also provide information about an experience the user is having. Optionally, at least some of the measurements of the environment are performed using a device of the user that contains one or more sensors that are used to measure or record the environment. Optionally, at least some of the measurements of the environment are received from sensors that do not belong to devices of the user (e.g., CCTV cameras, or air quality monitors). In one example, measurements of the environment may include taking sound bites from the environment (e.g., to determine whether the user is in a club, restaurant, or in a mall). In another example, images of the environment may be analyzed using various image analysis techniques such as object recognition, movement recognition, and/or facial recognition to determine where the user is, what the user is doing, and/or who the user is with. In yet another example, various measurements of the environment such as temperature, pressure, humidity, and/or particle counts for various types of chemicals or compounds (e.g. pollutants and/or allergens) may be used to determine where the user is, what the user is doing, and/or what the user is exposed to.

Objects/Devices with the User.

Information about objects and/or devices in the vicinity of a user may be used to determine what experience a user is having. Knowing what objects and/or devices are in the vicinity of a user may provide context relevant to identifying the experience. For example, if a user packs fishing gear in the car, it means that the user will likely be going fishing while if the user puts a mountain bike on the car, it is likely the user is going biking. Information about the objects and/or devices in the vicinity of a user may come from various sources. In one example, at least some of this information is provided actively by objects and/or devices that transmit information identifying their presence. For example, the objects or devices may transmit information via Wi-Fi or Bluetooth signals. Optionally, some of the objects and/or devices may be connected via the Internet (e.g., as part of the Internet of Things). In another example, at least some of this information is received by transmitting signals to the environment and detecting response signals (e.g., signals from RFID tags embedded in the objects and/or devices). In yet another example, at least some of the information is provided by a software agent that monitors the belongings of a user. In still another example, at least some of the information is provided by analyzing the environment in which a user is in (e.g., image analysis and/or sound analysis). Optionally, image analysis may be used to gain specific characteristics of an experience. For example, a system of Noronha et al., described in "Platemate: crowdsourcing nutritional analysis from food photographs" in *Proceedings of the 24th annual ACM symposium on User interface software and technology* (2011), enables a user to identify and receive nutritional information involving food the user is about to eat based on images of the food.

Communications of the User.

Information derived from communications of a user (e.g., email, text messages, voice conversations, and/or video conversations) may be used, in some embodiments, to provide context and/or to identify experiences the user has, and/or other aspects of events. These communications may be analyzed, e.g., using semantic analysis in order to determine various aspects corresponding to events, such as what experience a user has, a situation of a user (e.g., the user's mood and/or state of mind). In one embodiment, certain patterns of communications that are identified may correspond to certain experiences. Optionally, the patterns may involve properties such as the device or medium used to communicate, the recipient of communications, and/or the extent of the communications (e.g., duration, frequency, and/or amount of information communicated).

User Calendar/Schedule.

A user's calendar that lists activities the user had in the past and/or will have in the future may provide context and/or to identify experiences the user has. Optionally, the calendar includes information such as a period, location, and/or other contextual information for at least some of the experiences the user had or will have. Optionally, at least some of the entries in the calendar are entered by the user. Optionally, at least some of the entries in the calendar are entered automatically by a software agent, possibly without prompting by the user or even knowledge of the user. Optionally, analysis of a calendar may be used to determine prior probabilities for having certain experiences at certain times and/or places.

Account Information.

Information in various accounts maintained by a user (e.g., digital wallets, bank accounts, or social media accounts) may be used to provide context, identify events, and/or certain aspects of the events. Information on those accounts may be used to determine various aspects of events such as what experiences the user has (possibly also determining when, where, and with whom), situations the user is in at the time (e.g., determining that the user is in a new relationship and/or after a breakup). For example, transactions in a digital wallet may provide information of venues visited by a user, products purchased, and/or content consumed by the user. Optionally, the accounts involve financial transactions such as a digital wallet, or a bank account. Optionally, the accounts involve content provided to the user (e.g., an account with a video streaming service and/or an online game provider). In some embodiments, an account may include medical records including genetic records of a user (e.g., a genetic profile that includes genotypic and/or phenotypic information). Optionally, the genetic information may be used to determine certain situations the user is in which may correspond to certain genetic dispositions (e.g., likes or dislikes of substances, a tendency to be hyperactive, or a predisposition for certain diseases).

Robotic Servers.

In some embodiments, a robotic helper may provide information about experiences a user it is interacting with has. For example, a smart refrigerator may provide information about what food a user consumed. A masseuse robot may provide information of periods when it operated to give a massage, and identify whose user settings were used. In another example, an entertainment center may provide information regarding what content it provided the user and at what time (e.g., the name and time certain songs were streamed in a user's home audio system).

Experience Providers.

An experience provider may provide information about an experience a user is having, such as the type of experience and/or other related information (e.g., specific details of attributes of events and/or attributes that are relevant). For example, a game console and/or system hosting a virtual world may provide information related to actions of the user and/or other things that happen to the user in the game and/or the virtual world (e.g., the information may relate to virtual objects the user is interacting with, the identity of other characters, and the occurrence of certain events such as losing a life or leveling up). In another example, a system monitoring and/or managing the environment in a "smart house" house may provide information regarding the environment the user is in.

There are various approaches known in the art for identifying, indexing, and/or searching events of one or more users, which may be utilized in embodiments described herein (e.g., to create event annotators described below). In one example, identifying events may be done according to the teachings described in U.S. Pat. No. 9,087,058 titled "Method and apparatus for enabling a searchable history of real-world user experiences", which describes a searchable history of real-world user experiences of a user utilizing data captured by a mobile computing device. In another example, identifying events may be done according to the teachings described in U.S. Pat. No. 8,762,102 titled "Methods and systems for generation and rendering interactive events having combined activity and location information", which describes identification of events based on sensor data of mobile devices.

To determine what events users have, and in particular what are the experiences corresponding to events, some embodiments may involve one or more event annotators to perform this task. In one embodiment, an event annotator receives information of one or more of the types or sources described above. For example, this information may include information about the location, time, movement patterns, measurements of affective response of a user, measurements of the environment, objects in the vicinity of a user, communications of a user, calendar entries of a user, account information of a user, and/or information obtained from a software agent and/or robotic server. Optionally, the information is analyzed and used to generate a sample comprising a vector of feature values that may describe an event. Optionally, the feature values describe characteristics of the user corresponding to the event and/or identify the user corresponding to the event. Optionally, the feature values describe characteristics of the experience corresponding to the event (e.g., describe characteristics determined from the information received by the event annotator), but do not explicitly identify the experience corresponding to the event. Optionally, the sample describes details of the event concerning aspects of the instantiation of the experience corresponding to the event, such as the location, duration, and/or other conditions in which the user corresponding to the event was in while having the experience corresponding to the event.

The term "feature values" is typically used herein to represent data that may be provided to a machine learning-based predictor. Thus, a description of an event may be converted to feature values in order to be used to identify events, as described in this section. Typically, but necessarily, feature values may be data that can be represented as a vector of numerical values (e.g., integer or real values), with each position in the vector corresponding to a certain feature. However, in some embodiments, feature values may include other types of data, such as text, images, and/or other digitally stored information.

In some embodiments, the event annotator 701 utilizes the sources of information mentioned above in order to identify events users have (e.g., identify the type of experience). Additionally or alternatively, the event annotator 701 may be utilized to identify aspects of events, referred to herein as "factors of events". Each of these aspects may relate to the user corresponding to the event, the experience corresponding to the event, and/or the instantiation of the event. Factors of the events are described in more detail at least in section 12—Factors of Events. It is to be noted that the feature values mentioned in this section, which may be utilized to identify events, may themselves be factors of events and/or derived from factors of events (e.g., when factors of events appear in a description of an event).

Given an unlabeled sample, the event annotator may assign the unlabeled sample one or more corresponding labels, each label identifying an experience the user had. Optionally, the event annotator may provide values corresponding to the confidence and/or probability that the user had the experiences identified by at least some of the one or more labels.

In one embodiment, the one or more labels assigned by the event annotator are selected from a subset of a larger set of possible labels. Thus, the event annotator only considers a subset of the experiences for a certain sample. Optionally, the subset is selected based on some of the information received by the event annotator. In one example, a location described in the sample may be used to determine a subset of likely experiences for that location. Similarly, the time of the day or the day of the week may be used to determine a certain subset of likely experiences. In another example, a situation of the user corresponding to a sample (e.g., alone vs. with company, in a good mood vs. bad mood) may also be used to select a subset of the experiences that are most relevant. In yet another example, the objects and/or devices with the user may be used to select the subset. In still another example, external information such as billing information or a user's calendar may be used to select the subset (e.g., the information may indicate that the user had a certain experience on a given day, but not the exact time).

In some embodiments, generating a vector of feature values involves analyzing some of the information received by the event annotator using various predictors (e.g., classifiers). Optionally, the results of the analysis may be used as feature values in the vector of feature values. Optionally, the use of multiple predictors to generate feature values may simplify the event annotator's task (e.g., by reducing the feature space and/or generating more meaningful features), and in addition, it may enable the use of various ensemble based methods known in the art. In one example, time series data comprising measurements of affective response of a user is classified in order to determine a corresponding activity level profile (e.g., rest, moderate activity, or intense activity), or a mental activity profile (e.g., concentrating, relaxing, or sleeping). In another example, a measurement of affective response corresponding to an event is provided to an ESE in order to determine the emotional state of the user corresponding to the event, and the emotional state is represented as a feature value.

In some embodiments, certain feature values may represent a prediction with respect to a certain experience. For example, a feature value may include a predicted value indicating how well the set of objects with the user corresponding to the sample fits a certain experience. Optionally, the prediction may be based on combinations of objects observed in events from historical data. In another example, a feature value may represent how well a certain location and/or time of day may fit a certain experience. Optionally, such values may be determined based on historical data. For example, the historical data may be used to compute various probabilities of having experiences given the set of objects, time of day, and/or location by using Bayes' rule.

In some embodiments, certain feature values may represent a difference between a measurement value corresponding to the sample and a predicted measurement value for a certain experience. Optionally, the predicted measurement value is determined based on previous measurements of the user to the certain experience and/or to experiences of the same type (e.g., exercising or viewing content). Optionally, the predicted measurement value is determined based on measurements of users to the certain experience and/or to experiences of the same type (e.g., exercising or viewing content). Optionally, the predicted measurement value is obtained from an ESE.

To train one or more models used by a predictor utilized by an event annotator, in some embodiments, a training module utilizes training data comprising a collection of labeled samples as input to a machine learning-based model training algorithm. Optionally, the collection of labeled samples comprises samples with vectors of feature values describing events and each label corresponding to a sample represents an experience corresponding to the event described by the sample. Optionally, the event annotator selects as a label the experience whose corresponding predictor gave the highest value. In some embodiments, various types of machine learning-based predictors may be utilized by an event annotator. In one example, the predictor may be a multi-class classification algorithm (e.g., a neural network, a maximum entropy model, or a naive Bayes classifier) that assigns a sample with one or more labels corresponding to experiences. In another example, the event annotator may use multiple predictors, each configured to generate a value representing the probability that a sample corresponds to a certain experience. Optionally, the machine learning approaches that may be used to train the one or more models may be parametric approaches (e.g., maximum entropy models) or nonparametric (e.g., Multivariate kernel density estimation or histograms).

In some embodiments, an event annotator is trained with data comprising samples involving multiple users. Optionally, each sample includes feature values describing characteristics of the user corresponding to the sample. By having samples of multiple users, it is possible to leverage the wisdom of the crowd and use the event annotator to annotate events for users who never had the experiences corresponding to the events.

In other embodiments, an event annotator is trained with data comprising samples that primarily involve a certain user, and such may be considered a personalized event annotator for the certain user. Optionally, by primarily it is meant that most of the training weight of samples in the training data is attributed to samples corresponding to the certain user (i.e., they correspond to events involving the certain user). Optionally, by primarily it is meant that in the training data, the samples of no other user have a higher training weight than the training weight of the samples of the certain user. Herein, training weight of samples refers to the degree at which the samples influence the values of parameters in the model being trained on the samples. If all samples in the training data have the same weight, then the training weight of a set of samples may be considered equivalent to a proportion that equals the number of samples in the set divided by the total number of samples.

To identify what experiences a user has, in some embodiments, an event annotator may utilize personalized event annotators of other users. Thus, the event annotator may identify a certain experience that the certain user had, even if the event annotator was not trained on data comprising samples corresponding to the certain user and the certain experience, and/or even if the certain user never even had the certain experience before.

In one embodiment, an event annotator combines predictions of multiple personalized event annotators. Optionally, each personalized event annotator makes a vote for an experience corresponding to a sample, and the event annotator assigns the sample to the experience with the largest number of votes. Optionally, the results of the multiple personalized event annotators are combined using an ensemble learning method such as boosting.

In one embodiment, a personalized predictor is trained to predict a certain set of experiences. Optionally, one or more candidate labels for sample correspond to experiences for which the personalized predictor is trained. In such a case, the personalized event annotator may utilize prediction of other event annotators (e.g., personalized event annotators of other users) in order to make a prediction regarding what experience the user had.

6—Predictors and Emotional State Estimators

In some embodiments, a module that receives a query that includes a sample (e.g., a vector including one or more feature values) and computes a label for that sample (e.g., a class identifier or a numerical value), is referred to as a "predictor" and/or an "estimator". Optionally, a predictor and/or estimator may utilize a model to assign labels to samples. In some embodiments, a model used by a predictor and/or estimator is trained utilizing a machine learning-based training algorithm. Optionally, when a predictor and/or estimator return a label that corresponds to one or more classes that are assigned to the sample, these modules may be referred to as "classifiers".

The terms "predictor" and "estimator" may be used interchangeably in this disclosure. Thus, a module that is referred to as a "predictor" may receive the same type of inputs as a module that is called an "estimator", it may utilize the same type of machine learning-trained model, and/or produce the same type of output. However, as commonly used in this disclosure, the input to an estimator typically includes values that come from measurements, while a predictor may receive samples with arbitrary types of input. For example, a module that identifies what type of emotional state a user was likely in based on measurements of affective response of the user, is referred to herein as an Emotional State Estimator (ESE), while a module that predicts the likely emotional response of a user to an event is referred to herein as an Emotional Response Predictor (ERP). Additionally, a model utilized by an ESE and/or an ERP may be referred to as an "emotional state model" and/or an "emotional response model".

A sample provided to a predictor and/or an estimator in order to receive a label for it may be referred to as a "query sample" or simply a "sample". A value returned by the predictor and/or estimator, which it computed from a sample given to it as an input, may be referred to herein as a "label", a "predicted value", and/or an "estimated value". A pair that includes a sample and a corresponding label may be referred to as a "labeled sample". A sample that is used for the purpose of training a predictor and/or estimator may be referred to as a "training sample" or simply a "sample". Similarly, a sample that is used for the purpose of testing a predictor and/or estimator may be referred to as a "testing sample" or simply a "sample". In typical embodiments, samples used by the same predictor and/or estimator for various purposes (e.g., training, testing, and/or a query) are assumed to have a similar structure (e.g., similar dimensionality) and are assumed to be generated in a similar process (e.g., they undergo the same type of preprocessing).

In some embodiments, a sample for a predictor and/or estimator includes one or more feature values. Optionally, at least some of the feature values are numerical values (e.g., integer and/or real values). Optionally, at least some of the feature values may be categorical values that may be represented as numerical values (e.g., via indices for different categories). Optionally, the one or more feature values comprised in a sample may be represented as a vector of values. Various preprocessing, processing, and/or feature extraction techniques known in the art may be used to generate the one or more feature values comprised in a sample. Additionally, in some embodiments, samples may contain noisy or missing values. There are various methods known in the art that may be used to address such cases.

In some embodiments, a label that is a value returned by a predictor and/or an estimator in response to receiving a query sample, may include one or more types of values. For example, a label may include a discrete categorical value (e.g., a category), a numerical value (e.g., a real number), a set of categories and/or numerical values, and/or a multidimensional value (e.g., a point in multidimensional space, a database record, and/or another sample).

Predictors and estimators may utilize, in various embodiments, different types of models in order to compute labels for query samples. A plethora of machine learning algorithms is available for training different types of models that can be used for this purpose. Some of the algorithmic approaches that may be used for creating a predictor and/or estimator include classification, clustering, function prediction, regression, and/or density estimation. Those skilled in the art can select the appropriate type of model and/or training algorithm depending on the characteristics of the training data (e.g., its dimensionality or the number of samples), and/or the type of value used as labels (e.g., a discrete value, a real value, or a multidimensional value).

In one example, classification methods like Support Vector Machines (SVMs), Naive Bayes, nearest neighbor, decision trees, logistic regression, and/or neural networks can be used to create a model for predictors and/or estimators that predict discrete class labels. In another example, methods like SVMs for regression, neural networks, linear regression, logistic regression, and/or gradient boosted decision trees can be used to create a model for predictors and/or estimators that return real-valued labels, and/or multidimensional labels. In yet another example, a predictor and/or estimator may utilize clustering of training samples in order to partition a sample space such that new query samples can be placed in one or more clusters and assigned labels according to the clusters to which they belong. In a somewhat similar approach, a predictor and/or estimator may utilize a collection of labeled samples in order to perform nearest neighbor classification (in which a query sample is assigned a label according to one or more of the labeled samples that are nearest to it when embedded in some space).

In some embodiments, semi-supervised learning methods may be used to train a model utilized by a predictor and/or estimator, such as bootstrapping, mixture models with Expectation Maximization, and/or co-training. Semi-supervised learning methods are able to utilize as training data unlabeled samples in addition to labeled samples.

In one embodiment, a predictor and/or estimator may return as a label one or more other samples that are similar to a given query sample. For example, a nearest neighbor approach method may return one or more samples that are closest in the data space to the query sample (and thus in a sense, are most similar to it.)

In another embodiment, a predictor and/or estimator may return a value representing a probability of a sample according to a model utilized by the predictor and/or estimator. For example, the value may represent a probability of the sample according to a probability density function, which is described and/or defined by the model, and assigns probability values to at least some of the samples in the space of all possible samples. In one example, such a predictor may be a single class support vector machine, a naïve Bayes classifier, a graphical model (e.g., Bayesian network), or a maximum entropy model.

In addition to a label predicted for a query sample, in some embodiments, a predictor and/or an estimator may provide a value describing a level of confidence in the label computed for the query sample. In some cases, the value describing the confidence level may be derived directly from the computation process itself. For example, a predictor that is a classifier that selects a label for a given query sample may provide a probability or score according to which the specific label was chosen (e.g., a naïve Bayes' posterior probability of the selected label or a probability derived from the distance of the sample from the hyperplane when using an SVM).

In one embodiment, a predictor and/or estimator returns a confidence interval as a label or in addition to the label. Optionally, a confidence interval is a range of values and an associated probability that represents the chance that the true value corresponding to the label falls within the range of values. For example, if a prediction of a label is made according to an empirically determined normal distribution with a mean m and variance $\sigma^2$, the range $[m-2\sigma, m+2\sigma]$ corresponds approximately to a 95% confidence interval surrounding the mean value m.

Samples provided to a predictor and/or estimator, and/or that are used for training the predictor and/or estimator, may be generated from data that may be received from various sources and have various characteristics (e.g., the data may comprise numerical values, text, images, audio, video, and/or other types of data). In some embodiments, at least part of the data may undergo various forms of preprocessing in order to obtain the feature values comprised in the samples. Following are some non-limiting and non-exhaustive examples of preprocessing that data may undergo as part of generating a sample. Other forms of preprocessing may also be used in different embodiments described herein.

In some embodiments, data used to generate a sample may undergo filtration (e.g., removal of values that are below a threshold) and/or normalization. In one embodiment, normalization may include converting a value from the data into a binary value (e.g., the normalized value is zero if the original value is below a threshold and is one otherwise). In another embodiment, normalization may involve transforming and/or projecting a value from the data to a different set of co-ordinates or to a certain range of values. For example, real values from the data may be projected to the interval [0,1]. In yet another example, normalization may involve converting values derived from the data according to a distribution, such as converting them to z-values according to certain parameters of a normal distribution.

In some embodiments, data used to generate a sample may be provided to feature generation functions. Optionally, a feature generation function is a function that receives an input comprising one or more values comprised in the data and generates a value that is used as a feature in the sample.

In one embodiment, a feature generation function may be any form of predictor and/or estimator that receives at least some of the values comprised in the data used to generate the sample, and produces a result from which a feature value, comprised in the sample, is derived. For example, feature generation functions may involve various image analysis algorithms (e.g., object recognition algorithms, facial recognition algorithms, action recognition algorithms, etc.), audio analysis algorithms (e.g., speech recognition), and/or other algorithms. Additional examples of data sources and computation approaches that may be used to generate features are described in section 5—Identifying Events.

In another embodiment, a feature generation function may be a function that generates one or more feature values based on the value of a datum it is provided. For example, a feature generation function may receive a datum comprised in the data that has a value that belongs to a certain range (e.g., 0-10000 mg of sodium in food), and based on that value, the function will generate a certain indicator feature that has a value of one if the value of the datum is in a certain range, and zero otherwise. In this example, the feature generation function may select one of three features that will receive the value one: a first feature if the value of the datum is in the range 0-150, which may correspond to "low sodium", a second feature if the value of the datum is in the range 150-300, which may correspond to "medium sodium", and a third feature if the value of the datum is above 300, which may correspond to "high sodium".

In some embodiments, data used to generate a sample may be extensive and be represented by many values (e.g., high-dimensionality data). Having samples that are high-dimensional can lead, in some cases, to a high computational load and/or reduced accuracy of predictors and/or estimators that handle such data. Thus, in some embodiments, as part of preprocessing, samples may undergo one or more forms of dimensionality reduction and/or feature selection. For example, dimensionality reduction may be attained utilizing techniques such as principal component analysis (PCA), linear discriminant analysis (LDA), and/or canonical correlation analysis (CCA). In another example, dimensionality reduction may be achieved using random projections and/or locality-sensitive hashing. In still another example, a certain subset of the possible features may be selected to be used by a predictor and/or estimator, such as by various filter, wrapper, and/or embedded feature selection techniques known in the art.

In some embodiments, predictors and/or estimators may be described as including and/or utilizing models. A model that is included in a predictor and/or an estimator, and/or utilized by a predictor and/or an estimator, may include parameters used by the predictor and/or estimator to compute a label. Non-limiting examples of such parameters include: support vectors (e.g., used by an SVM), points in a multidimensional space (e.g., used by a Nearest-Neighbor predictor), regression coefficients, distribution parameters (e.g., used by a graphical model), topology parameters, and/or weight parameters (e.g., used by a neural network). When a model contains parameters that are used to compute a label, such as in the examples above, the terms "model", "predictor", and/or "estimator" (and derivatives thereof) may at times be used interchangeably herein. Thus, for example, language reciting "a model that predicts" or "a model used for estimating" is acceptable. Additionally, phrases such as "training a predictor" and the like may be interpreted as training a model utilized by the predictor. Furthermore, when a discussion relates to parameters of a predictor and/or an estimator, this may be interpreted as relating to parameters of a model used by the predictor and/or estimator.

The type and quantity of training data used to train a model utilized by a predictor and/or estimator can have a dramatic influence on the quality of the results they produce. Generally speaking, the more data available for training a model, and the more the training samples are similar to the samples on which the predictor and/or estimator will be used (also referred to as test samples), the more accurate the results for the test samples are likely to be. Therefore, when training a model that will be used with samples involving a specific user, it may be beneficial to collect training data from the user (e.g., data comprising measurements of the specific user). In such a case, a predictor may be referred to as a "personalized predictor", and similarly, an estimator may be referred to as a "personalized estimator".

Training a predictor and/or an estimator, and/or utilizing the predictor and/or the estimator, may be done utilizing various computer system architectures. In particular, some architectures may involve a single machine (e.g., a server) and/or single processor, while other architectures may be distributed, involving many processors and/or servers (e.g., possibly thousands or more processors on various machines). For example, some predictors may be trained utilizing distributed architectures such as Hadoop, by running distributed machine learning-based algorithms. In this example, it is possible that each processor will only have access to a portion of the training data. Another example of a distributed architecture that may be utilized in some embodiments is a privacy-preserving architecture in which users process their own data. In this example, a distributed machine learning training algorithm may allow a certain portion of the training procedure to be performed by users, each processing their own data and providing statistics computed from the data rather than the actual data itself. The distributed training procedure may then aggregate the statistics in order to generate a model for the predictor.

In some embodiments, when an ERP and/or ESE is trained on data from multiple users, which includes information describing specific details in the sample, such as details about a user, an experience, and/or an instantiation of an event related to a sample, it may be considered a "generalizable" ERP and/or ESE. Herein, generalizability in the context of ERPs and ESEs may be interpreted as being able to learn from data regarding certain users and/or experiences, and apply those teachings to other users and/or experiences (not encountered in training data). Thus, for example, a generalizable ERP may be able to make "generalized" predictions for samples were not encountered in the training data ("general" samples).

In some embodiments, when a predictor and/or an estimator (e.g., an ESE), is trained on data collected from multiple users, its predictions of emotional states and/or response may be considered predictions corresponding to a representative user. It is to be noted that the representative user may in fact not correspond to an actual single user, but rather correspond to an "average" of a plurality of users.

It is to be noted that in this disclosure, referring to a module (e.g., a predictor, an estimator, an event annotator, etc.) and/or a model as being "trained on" data means that the data is utilized for training of the module and/or model. Thus, expressions of the form "trained on" may be used interchangeably with expressions such as "trained with", "trained utilizing", and the like.

In other embodiments, when a model used by a predictor and/or estimator (e.g., an ESE and/or an ERP), is trained primarily on data involving a certain user, the predictor and/or estimator may be referred to as being a "personalized" or "personal" for the certain user. Herein, being trained primarily on data involving a certain user means that at least 50% of the training weight is given to samples involving the certain user and/or that the training weight given to samples involving the certain user is at least double the training weight given to the samples involving any other user. Optionally, training data for training a personalized ERP and/or ESE for a certain user is collected by a software agent operating on behalf of the certain user. Use by the software agent may, in some embodiments, increase the privacy of the certain user, since there is no need to provide raw measurements that may be more revealing about the user than predicted emotional responses. Additionally or alternatively, this may also increase the accuracy of predictions for the certain user, since a personalized predictor is trained on data reflecting specific nature of the certain user's affective responses.

In some embodiments, a label returned by an ERP and/or ESE may represent an affective value. In particular, in some embodiments, a label returned by an ERP and/or ESE may represent an affective response, such as a value of a physiological signal (e.g., skin conductance level, a heart rate) and/or a behavioral cue (e.g., fidgeting, frowning, or blushing). In other embodiments, a label returned by an ERP and/or ESE may be a value representing a type of emotional response and/or derived from an emotional response. For example, the label may indicate a level of interest and/or whether the response can be classified as positive or negative (e.g., "like" or "dislike"). In another example, a label may be a value between 0 and 10 indicating a level of how much an experience was successful from a user's perspective (as expressed by the user's affective response).

A predictor that predicts affective response to an event based on attributes of the event is referred to herein as an Emotional Response Predictor (ERP). Samples used for training an ERP and/or provided to an ERP for prediction may include feature values derived from descriptions of events (descriptions of events are described in further detail at least in section 4—Events). For example, in some embodiments, each sample corresponding to an event τ=(u, e) is derived from a description of the event τ, and the label for the sample is derived from a measurement m corresponding to τ (i.e., a measurement of the user u to having the experience e). Optionally, a sample corresponding to an event τ=(u, e) includes feature values describing the user u corresponding to the event, the experience e corresponding to the event, and/or conditions related to the instantiation of the event τ. In some embodiments, at least some of the feature values that are part of the samples provided to an ERP may be factors of events, and/or are derived from the factors of the events (factors of events are discussed in more detail at least in section 12—Factors of Events).

Various machine learning-based predictors may be used by ERPs, in embodiments described herein. Examples include nearest neighbor predictors, support vector regression (SVR), regression models, neural networks, and/or decision trees, to name a few. Furthermore, training these predictors may be done using various supervised or semi-supervised methods, where at least some or all of the training data includes samples comprising feature values derived from event descriptions, and labels derived from measurements of affective response corresponding to the events. Additional information regarding training predictors such as ERPs is given above in the discussion about predictors.

In some embodiments, the space of features (e.g., factors of events) that may be included in samples provided to an ERP may be large and/or sparse. For example, a large set of features may be utilized, each describing a certain aspect of an event (e.g., a property of an object, an element of content, an image property, etc.). In order to improve computation efficiency and/or accuracy of predictions of the ERP, some embodiments, involve utilization of one or more feature selection and/or dimensionality reduction techniques that are applicable to predictors.

In various embodiments, the number of events that are monitored may be quite large, bringing ERPs into the realm of what is often called "big data". For example, training an ERP may involve collecting data from many users, over a long period, and involving many experiences; possibly dozens or hundreds of experiences a day—if not many more. Coupled with the fact that descriptions of events may be rich (e.g., they may include many feature values), this makes it possible for ERPs to employ both sophisticated learning algorithms (e.g., involving deep learning architectures) and may enable them to be generalizable ERPs. The generalizability of the ERP may enable these modules to train models and make generalized predictions that are relatively accurate for other samples that were not in the training data. In one example, the other samples may correspond to events involving users who do not have samples involving them in the training data. In another example, the other samples may correspond to events involving experiences that do not have samples involving them in the training data. And in still another example, the generalization capability of an ERP may be further extended to cases involving events in which neither the corresponding user, nor the corresponding experience, was encountered in training data.

In some embodiments, a sample for an ERP may include one or more feature values that describe a baseline value of the user corresponding to the event to which the sample corresponds. Optionally, the baseline affective response value may be derived from a measurement of affective response of the user (e.g., an earlier measurement taken before the instantiation of the event) and/or it may be a predicted value (e.g., computed based on measurements of other users and/or a model for baseline affective response values). Optionally, the baseline is a situation-specific baseline, corresponding to a certain situation the user corresponding to the event is in when having the experience corresponding to the event.

In some embodiments, the baseline value may be utilized to better predict the affective response of the user corresponding to the event to the experience corresponding to the event. For example, knowing an initial (baseline) state of the user can assist in determining the final state of the user after having the experience corresponding to the event. Furthermore, a user may react differently to an experience based on his/her state when having the experience. For example, when calm, a user may react favorably to certain experiences (e.g., speaking to a certain person or doing a certain chore). However, if the user is agitated even before having an experience, the user's response might be quite different to the experience. For example, the user may get extremely upset from dealing with the person (whom he reacts favorably to when calm) or be very impatient and angry when performing the chore (which does not happen when the user is calm). Such differences in the response to the same experience may depend on the emotional and/or physiological state of the user, which may be determined, at least to some extent from a baseline value.

In some embodiments, an ERP may serve as a predictor of measurement values corresponding to events, such as a predictor of a baseline affective response value corresponding to an event. Optionally, a sample received by the ERP may comprise certain feature values that describe general attributes of the event. For example, such general attributes may include features related to the user, a situation of the user, and/or attributes related to the experience corresponding to the event in general (e.g., the type of experience). Optionally, the sample does not contain certain feature values that describe specifics of the instantiation of the event (e.g., details regarding the quality of the experience the user had). Thus, a prediction made based on general attributes, and not specific attributes, may describe an expected baseline level; specific details of the instantiation (e.g., related to the quality of the experience in the instantiation of the event) may cause a deviation from the predicted baseline level.

A predictor and/or an estimator that receives a query sample that includes features derived from a measurement of affective response of a user, and returns a value indicative of an emotional state corresponding to the measurement, may be referred to as a predictor and/or estimator of emotional state based on measurements, an Emotional State Estimator, and/or an ESE. Optionally, an ESE may receive additional values as input, besides the measurement of affective response, such as values corresponding to an event to which the measurement corresponds. Optionally, a result returned by the ESE may be indicative of an emotional state of the user that may be associated with a certain emotion felt by the user at the time such as happiness, anger, and/or calmness, and/or indicative of level of emotional response, such as the extent of happiness felt by the user. Additionally or alternatively, a result returned by an ESE may be an affective value, for example, a value indicating how well the user feels on a scale of 1 to 10.

In some embodiments, when a predictor and/or an estimator (e.g., an ESE), is trained on data collected from multiple users, its predictions of emotional states and/or response may be considered predictions corresponding to a representative user. It is to be noted that the representative user may in fact not correspond to an actual single user, but rather correspond to an "average" of a plurality of users.

In some embodiments, a label returned by an ESE may represent an affective value. In particular, in some embodiments, a label returned by an ESE may represent an affective response, such as a value of a physiological signal (e.g., skin conductance level, a heart rate) and/or a behavioral cue (e.g., fidgeting, frowning, or blushing). In other embodiments, a label returned by an ESE may be a value representing a type of emotional response and/or derived from an emotional response. For example, the label may indicate a level of interest and/or whether the response can be classified as positive or negative (e.g., "like" or "dislike"). In another example, a label may be a value between 0 and 10 indicating a level of how much an experience was successful from a user's perspective (as expressed by the user's affective response).

There are various methods that may be used by an ESE to estimate emotional states from a measurement of affective response. Examples of general purpose machine learning algorithms that may be utilized are given above in the general discussion about predictors and/or estimators. In addition, there are various methods specifically designed for estimating emotional states based on measurements of affective response. Some non-limiting examples of methods described in the literature, which may be used in some embodiments include: (i) physiological-based estimators as described in Table 2 in van den Broek, E. L., et al. (2010) "Prerequisites for Affective Signal Processing (ASP)—Part II." in: *Third International Conference on Bio Inspired Systems and Signal Processing, Biosignals* 2010; (ii) Audio- and image-based estimators as described in Tables 2-4 in Zeng, Z., et al. (2009) "A Survey of Affect Recognition Methods: Audio, Visual, and Spontaneous Expressions." in *IEEE Transaction on Pattern Analysis and Machine Intelligence*, Vol. 31(1), 39-58; (iii) emotional state estimations based on EEG signals may be done utilizing methods surveyed in Kim et al. (2013) "A review on the computational methods for emotional state estimation from the human EEG" in Computational and mathematical methods in medicine, Vol. 2013, Article ID 573734; (iv) emotional state estimations from EEG and other peripheral signals (e.g., GSR) may be done utilizing the teachings of Chanel, Guillaume, et al. "Emotion assessment from physiological signals for adaptation of game difficulty" in *IEEE Transactions on Systems, Man and Cybernetics, Part A: Systems and Humans,* 41.6 (2011): 1052-1063; and/or (v) emotional state estimations from body language (e.g., posture and/or body movements), may be done using methods described by Dael, et al. (2012), "Emotion expression in body action and posture", in *Emotion,* 12(5), 1085.

In some embodiments, an ESE may make estimations based on a measurement of affective response that comprises data from multiple types of sensors (often referred to in the literature as multiple modalities). This may optionally involve fusion of data from the multiple modalities. Different types of data fusion techniques may be employed, for example, feature-level fusion, decision-level fusion, or model-level fusion, as discussed in Nicolaou et al. (2011), "Continuous Prediction of Spontaneous Affect from Multiple Cues and Modalities in Valence-Arousal Space", *IEEE Transactions on Affective Computing*. Another example of the use of fusion-based estimators of emotional state may be found in Schels et al. (2013), "Multi-modal classifier-fusion for the recognition of emotions", Chapter 4 in *Coverbal Synchrony in Human Machine Interaction*. The benefits of multimodal fusion typically include more resistance to noise (e.g., noisy sensor measurements) and missing data, which can lead to better affect detection when compared to affect detection from a single modality. For example, in meta-analysis described in D'mello and Kory (2015) "A Review and Meta-Analysis of Multimodal Affect Detection Systems" in ACM Computing Surveys (CSUR) 47.3: 43, multimodal affect systems were found to be more accurate than their best unimodal counterparts in 85% of the systems surveyed.

In one embodiment, in addition to a measurement of affective response of a user, an ESE may receive as input a baseline affective response value corresponding to the user. Optionally, the baseline affective response value may be derived from another measurement of affective response of the user (e.g., an earlier measurement) and/or it may be a predicted value (e.g., based on measurements of other users and/or a model for baseline affective response values). Accounting for the baseline affective response value (e.g., by normalizing the measurement of affective response according to the baseline), may enable the ESE, in some embodiments, to more accurately estimate an emotional state of a user based on the measurement of affective response.

In some embodiments, an ESE may receive as part of the input (in addition to a measurement of affective response), additional information comprising feature values related to the user, experience and/or event to which the measurement corresponds. Optionally, additional information is derived from a description of an event to which the measurement corresponds.

In one embodiment, the additional information is used to provide context for the measurement with respect to the user, experience, and/or event to which the measurement corresponds. For example, the context may relate to specific characteristics of the user, experience, and/or event to which the measurement corresponds, which when considered by the ESE, may make its estimated emotional state more accurate with respect to the user, experience, and/or event to which the measurement corresponds. Knowing context related to a measurement may be helpful since depending on the sensors used, in some embodiments, it may be the case that in different conditions the same signal values may correspond to different emotions (e.g., extreme excitement or high stress). Knowing the context (e.g., playing a difficult level in a game or hearing a noise when alone in a dark parking lot) can assist in deciding which emotion the user is having.

Context may be given by identifying a situation the user was in when the measurement was taken. Examples of situations may include a mood of the user, a health state of the user, the type of activity the user is partaking in (e.g., relaxing, exercising, working, and/or shopping), the location the user is at (e.g., at home, in public, or at work), and/or the alertness level of the user. The additional situation information may be used by the ESE to improve the estimation of the emotional state of the user from the measurement. In one example, the ESE may normalize values according to the situation (e.g., according to situation-specific baselines). In another example, the ESE may select certain models to use based on the additional information (e.g., selecting a situation-specific model according with which the measurement of affective response is processed). For example, separate models may be used by an ESE for different situations a user is in, such as being at home vs. outside, or for when the user is alone vs. in a group. In still another example, separate models may be used for different types of experiences. For example, a first model may be used for determining emotional states from measurements of affective response to experiences that are considered primarily physical activities (e.g., cycling or jogging), while a second model may be used for experiences that may be considered primarily mental activities (e.g., consuming digital content).

In one embodiment, additional information received by an ESE may include information derived from semantic analysis of communications of a user. The choice of words a user uses to communicate (in addition to the way the user says the words), may be indicative of the emotion being expressed. For example, semantic analysis may help determine whether a user is very excited or very angry. It is to be noted that semantic analysis is interpreted as determining the meaning of a communication based on its content (e.g., a textual representation of a communication), and not from features related to how a user makes the communication (e.g., characteristics of the user's voice which may be indicative of an emotional state).

In another embodiment, additional information received by an ESE may include information derived from tracking actions of the user, and/or from eye tracking data of the user that indicates what the user is doing and/or to what the user is paying attention.

In still another embodiment, additional information received by an ESE may include information derived from measurements of the environment the user is in. For example, the additional information may include values that are indicative of one or more of the following environmental parameters: the temperature, humidity, precipitation levels, noise level, air pollution level, allergen levels, time of day, and ambient illumination level.

In some embodiments, an ESE may be utilized to evaluate, from measurements of affective response of one or more users, whether the one or more users are in an emotional state that may be manifested via a certain affective response. Optionally, the certain affective response is manifested via changes to values of at least one of the following: measurements of physiological signals of the one or more users, and measurements of behavioral cues of the one or more users. Optionally, the changes to the values are manifestations of an increase or decrease, to at least a certain extent, in a level of at least one of the following emotions: pain, anxiety, annoyance, stress, aggression, aggravation, fear, sadness, drowsiness, apathy, anger, happiness, content, calmness, attentiveness, affection, and excitement. Optionally, an ESE is utilized to detect an increase, to at least a certain extent, in the level of at least one of the aforementioned emotions.

In one embodiment, determining whether a user experiences a certain affective response is done utilizing a model trained on data comprising measurements of affective response of the user taken while the user experienced the certain affective response (e.g., measurements taken while the user was happy or sad). Optionally, determining whether a user experiences a certain affective response is done utilizing a model trained on data comprising measurements of affective response of other users taken while the other users experienced the certain affective response.

In some embodiments, certain values of measurements of affective response, and/or changes to certain values of measurements of affective response, may be universally interpreted as corresponding to being in a certain emotional state. For example, an increase in heart rate and perspiration (e.g., measured with GSR) may correspond to an emotional state of fear. Thus, in some embodiments, any ESE may be considered "generalized" in the sense that it may be used successfully for estimating emotional states of users who did not contribute measurements of affective response to the training data. In other embodiments, the context information described above, which an ESE may receive, may assist in making the ESE generalizable and useful for interpreting measurements of users who did not contribute measurements to the training data and/or for interpreting measurements of experiences that are not represented in the training data.

In one embodiment, a personalized ESE for a certain user may be utilized to interpret measurements of affective response of the certain user. Optionally, the personalized ESE is utilized by a software agent operating on behalf of the certain user to better interpret the meaning of measurements of affective response of the user. For example, a personalized ESE may better reflect the personal tendencies, idiosyncrasies, unique behavioral patterns, mannerisms, and/or quirks related to how a user expresses certain emotions. By being in position in which it monitors a user over long periods of time, in different situations, and while having different experiences, a software agent may be able to observe affective responses of "its" user (the user on behalf of whom it operates) when the user expresses various emotions. Thus, the software agent can learn a model describing how the user expresses emotion, and use that model for personalized ESE that might, in some cases, "understand" its user better than a "general" ESE trained on data obtained from multiple users.

Training a personalized ESE for a user may require acquiring appropriate training samples. These samples typically comprise measurements of affective response of the user (from which feature values may be extracted) and labels corresponding to the samples, representing an emotional response the user had when the measurements were taken. Inferring what emotional state the user was in, at a certain time measurements were taken, may be done in various ways.

In one embodiment, labels representing emotional states may be self-reported by a user stating how the user feels at the time (e.g., on a scale of 1 to 10). For example, a user may declare how he or she is feeling, select an image representing the emotion, and/or provide another form of rating for his or her feelings. Optionally, the user describes his or her emotional state after being prompted to do so by the software agent.

In another embodiment, labels representing emotional states may be determined by an annotator that observes the user's behavior and/or measurements of affective response of the user. Optionally, the annotator may be a human (e.g., a trained professional and/or a person who is part of a crowd-sourced workforce such as Amazon's Mechanical Turk). Optionally, the annotator may be a software agent that utilizes one or more predictors and/or estimators, such as ESEs.

In still another embodiment, labels representing emotional states may be derived from communications of the user. For example, semantic analysis may be used to determine the meaning of what the user says, writes, and/or communicates in other ways (e.g., via emojis and/or gestures).

In yet another embodiment, labels representing emotional states may be derived from actions of the user. For example, US patent application publication US 2014/0108309, describes various approaches for determining emotional response from actions such as voting on a social network site or interacting with a media controller.

One approach, which may be used in some embodiments, for addressing the task of obtaining labeled samples for training a personalized predictor and/or estimator is to use a form of bootstrapping. In one example, a software agent (or another module) that is tasked with training a personalized ESE for a certain user may start off by utilizing a general ESE to determine emotional states of the user. These labeled samples may be added to a pool of training samples used to train the personalized ESE. As the body of labeled samples increases in size, the estimator trained on them will begin to represent the particular characteristics of how the user expresses emotions. Eventually, after a sufficiently large body of training samples is generated, it is likely that the personalized ESE will perform better than a general ESE on the task of identifying the emotional state of the user based on measurements of the affective response of the user.

7—Software Agents

As used herein, "software agent" may refer to one or more computer programs that operate on behalf of an entity. For example, an entity may be a person, a group of people, an institution, a computer, and/or computer program (e.g., an artificial intelligence). Software agents may be sometimes referred to by terms including the words "virtual" and/or "digital", such as "virtual agents", "virtual helpers", "digital assistants", and the like. In this disclosure, software agents are typically referred to by the reference numeral 108, which may be used to represent the various forms of software agents described below.

In some embodiments, a software agent acting on behalf of an entity is implemented, at least in part, via a computer program that is executed with the approval of the entity. The approval to execute the computer program may be explicit, e.g., a user may initiate the execution of the program (e.g., by issuing a voice command, pushing an icon that initiates the program's execution, and/or issuing a command via a terminal and/or another form of a user interface with an operating system). Additionally or alternatively, the approval may be implicit, e.g., the program that is executed may be a service that is run by default for users who have a certain account and/or device (e.g., a service run by an operating system of the device). Optionally, explicit and/or implicit approval for the execution of the program may be given by the entity by accepting certain terms of service and/or another form of contract whose terms are accepted by the entity.

In some embodiments, a software agent operating on behalf of an entity is implemented, at least in part, via a computer program that is executed in order to advance a goal of the entity, protect an interest of the entity, and/or benefit the entity. In one example, a software agent may seek to identify opportunities to improve the well-being of the entity, such as identifying and/or suggesting activities that may be enjoyable to a user, recommending food that may be a healthy choice for the user, and/or suggesting a mode of transportation and/or route that may be safe and/or time saving for the user. In another example, a software agent may protect the privacy of the entity it operates on behalf of, for example, by preventing the sharing of certain data that may be considered private data with third parties. In another example, a software agent may assess the risk to the privacy of a user that may be associated with contributing private information of the user, such as measurements of affective response, to an outside source. Optionally, the software agent may manage the disclosure of such data, as described in more detail elsewhere in this disclosure.

A software agent may operate with at least some degree of autonomy, in some of the embodiments described herein, and may be capable of making decisions and/or taking actions in order to achieve a goal of the entity of behalf of whom it operates, protect an interest of the entity, and/or benefit the entity. Optionally, a computer program executed to implement the software agent may exhibit a certain degree of autonomous behavior; for example, it may perform certain operations without receiving explicit approval of the entity on behalf of whom it operates each time it performs the certain operations. Optionally, these actions fall within the scope of a protocol and/or terms of service that are approved by the entity.

A software agent may function as a virtual assistant and/or "virtual wingman" that assists a user by making decisions on behalf of a user, making suggestions to the user, and/or issuing warnings to the user. Optionally, the software agent may make the decisions, suggestions, and/or warnings based on a model of the users' biases. Optionally, the software agent may make decisions, suggestions, and/or warnings based on crowd-based scores for experiences. In one example, the software agent may suggest to a user certain experiences to have (e.g., to go biking in the park), places to visit (e.g., when on a vacation in an unfamiliar city), and/or content to select. In another example, the software agent may warn a user about situations that may be detrimental to the user or to the achievement of certain goals of the user. For example, the agent may warn about experiences that are bad according to crowd-based scores, suggest the user take a certain route to avoid traffic, and/or warn a user about excessive behavior (e.g., warn when excessive consumption of alcohol is detected when the user needs to get up early the next day). In still another example, the software agent may make decisions for the user on behalf of whom it operates and take actions accordingly, possibly without prior approval of the user. For example, the software agent may make a reservation for a user (e.g., to a restaurant), book a ticket (e.g., that involves traveling a certain route that is the fastest at the time), and/or serve as a virtual secretary, which filters certain calls to the user (e.g., sending voicemail) and allows others to get through to the user.

In some embodiments, a software agent may assist a user in "reading" certain situations. For example, a software agent may indicate to a user affective response of other people in the user's vicinity and/or people the user is communicating with. This type of feature may be especially helpful for users who may have difficulties detecting social cues, such as users who have a condition on the autistic spectrum. In another example, the software agent may suggest an alternative phrasing to one selected by a user and/or warn the user about a phrasing the user intends to use in a communication in order to better advance a goal of the user, such as social acceptance of the user, and/or avoiding the offending others. In still another example, a software agent may suggest to a user to change a demeanor of the user, such as a tone of voice, facial expression, use of body language, and/or maintaining of a certain distance from other people the user is conversing with. Optionally, the suggestion is made by detecting the affective response of a person the user is communicating with.

In some embodiments, depending on settings and/or a protocol that governs the operation of the software agent, the software agent may be active (i.e., autonomous) or passive when it comes to interacting with a user on behalf of whom it operates. For example, the software agent may be passive and typically require activation in order to interact with a user, e.g., by making a suggestion and/or issuing a warning. Examples of different activations of a software agent include making a certain gesture, pushing a button, and/or saying a certain catchphrase like "OK Google", "Hey Cortana", or "Hey Sin". Optionally, even when being passive, the software agent may still monitor the user and/or perform other operations on behalf of the user. Optionally, a software agent may be active and interact with a user without necessarily being prompted to do so by the user. Optionally, the software agent may be active for some purposes and interact with a user based on an autonomous decision (e.g., the software agent issues a warning about a situation that compromises the user's safety when it is detected). However, the software agent may be passive in other situations that involve interaction with the user (e.g., the software agent suggests experiences for the user only when prompted to do so by the user).

Communication between a software agent and a user on behalf of whom the software agent operates may take various forms in different embodiments described herein. Following is a non-limiting and non-exhaustive list of examples; in some embodiments other forms of communication may be used in addition to, or instead of these examples. In one example, communication between a software agent and a user on behalf of whom it operates involves sending textual messages such as emails, SMSs, social media messages, and/or other forms of text content. In another example, communication between a software agent and a user on behalf of whom it operates involves displaying a message on display of the user, such as a monitor, a handheld device, a wearable device with a screen, an augmented reality and/or virtual reality display, and/or another form of device that may convey visual data to the user's brain (e.g., neural implants). Optionally, the message may include 2D and/or 3D images. Optionally, the message may include 2D and/or 3D videos. Optionally, the messages may include sound that is provided via a speaker that emits sound waves and/or vibrational signals (e.g., involving bone conduction). In another example, communication between a software agent and a user on behalf of whom it operates may involve haptic signals, such as applying pressure, heat, electrical current, and/or vibrations by a device or garment worn by the user, and/or a device implanted in the user. In yet another example, communication between a software agent and a user on behalf of whom it operates may involve exciting areas in the brain of the user in order to generate electrical signals in the user (e.g., involving synaptic signaling), which are interpreted by the user as information.

There are also various ways in which a user may communicate with a software agent in embodiments described herein. Following is a non-limiting and non-exhaustive list of examples; in some embodiments other forms of communication may be used in addition to, or instead of these examples. In one example, a user may communicate with a software agent via a user interface that involves providing a textual message such as by typing a message (e.g., on a keyboard or touchscreen) and/or writing a message (e.g., that is interpreted using a camera, touch screen, or a smart pen that tracks movements of the pen). Additionally or alternatively, the user interface may involve pointing and/or selecting objects presented on a screen (e.g., via touching the screen or using a pointing device such as a computer mouse). In another example, a user may communicate with a software agent by tracing (e.g., by tracing a finger on a touchscreen or in the air). In yet another example, a user may communicate with a software agent by making sounds, e.g., by speaking, whistling, clapping and/or making other sounds that may be detected using a microphone. In still another example, a user may communicate by making gestures, such as pointing or moving hands, making facial expressions, sign language, and/or making other movements that may be detected using a camera, a motion sensor, an accelerometer, and/or other sensors that may detect movement. Optionally, the gestures may involve movements the user's tongue in the user's mouth, the clicking of teeth, and/or various forms of subvocalization that may be detected by sensors such as movement sensors, microphones, and/or pressure sensors. And in another example, a user may communicate with a software agent by thinking certain thoughts that may be detected by a device that reads electrical signals in the brain. Optionally, the certain thoughts correspond to electrical signals in the brain that have characteristic patterns (e.g., certain amplitudes and/or excitation in certain areas of the brain). Optionally, the electrical signals are read via EEG, and interpreted using signal processing algorithms in order to determine the meaning of the user's thought (e.g., a desire of the user for a certain object, a certain action, and/or to move in a certain direction).

In some embodiments, communication between a software agent and a user may be done in such a way that the content exchanged between the software agent and the user (and/or vice versa) may not be known to an entity that is not the user or the software agent, even if the entity is in the vicinity of the user at the time of communication. For example, the software agent may send a message displayed on augmented reality glasses and/or play message via headphones. In another example, a user may communicate with a software agent via subvocalization and/or selecting of options by pointing at a virtual menu seen using augmented reality glasses. Optionally, the communication may take place in such a way that an entity that is in the vicinity of the user is not likely to identify that such a communication is taking place.

In some embodiments, a software agent, and/or one or more of the programs it may comprise, may simultaneously operate on behalf of multiple entities. In one example, a single process running on a CPU or even a single execution thread, may execute commands that represent actions done on behalf of multiple entities. In another example, a certain running program, such as a server that responds to queries, may be considered comprised in multiple software agents operating on behalf of multiple entities.

In some embodiments, a single service, which in itself may involve multiple programs running on multiple servers, may be considered a software agent that operates on behalf of a user or multiple users. Optionally, a software agent may be considered a service that is offered as part of an operating system. Following are some examples of services that may be considered software agents or may be considered to include a software agent. In one example, a service simply called "Google", "Google Now", or some other variant such as "Google Agent" may be services that implement software agents on behalf of users who have accounts with Google™. Similarly, Siri® or "Proactive Assistant" may be considered software agents offered by Apple™. In another example, "Cortana" may be considered a software agent offered by Microsoft™. And in another example, "Watson" may be considered a software agent offered by IBM™.

Implementation of a software agent may involve executing one or more programs on a processor that belongs to a device of a user, such as a processor of a smartphone of the user or a processor of a wearable and/or implanted device of the user. Additionally or alternatively, the implementation of a software agent may involve execution of at least one or more programs on a processor that is remote of a user, such as a processor belonging to a cloud-based server.

As befitting this day and age, users may likely have interaction with various devices and/or services that involve computers. A non-limiting list of examples may include various computers (e.g., wearables, handled devices, and/or servers on the cloud), entertainment systems (e.g., gaming systems and/or media players), appliances (e.g., connected via Internet of Things), vehicles (e.g., autonomous vehicles), and/or robots (e.g., service robots). Interacting with each of the services and/or devices may involve programs that communicate with the user and may operate on behalf of the user. As such, in some embodiments, a program involved in such an interaction is considered a software agent operating on behalf of a user. Optionally, the program may interact with the user via different interfaces and/or different devices. For example, the same software agent may communicate with a user via a robot giving the user a service, via a vehicle the user is traveling in, via a user interface of an entertainment system, and/or via a cloud-based service that utilizes a wearable display and sensors as an interface.

In some embodiments, different programs that operate on behalf of a user and share data and/or have access to the same models of the user may be considered instantiations of the same software agent. Optionally, different instantiations of a software agent may involve different methods of communication with the user. Optionally, different instantiations of a software agent may have different capabilities and/or be able to obtain data from different sources.

Various embodiments described herein require monitoring of users. This may be done for various purposes, such as computing crowd-based scores and/or modeling users. Optionally, monitoring users may involve identifying events in which the users are involved (e.g., as described in section 5—Identifying Events) and/or determining factors of such events (e.g., as described in section 12—Factors of Events). In some embodiments, such monitoring may involve a central entity that receives measurements of affective response of one or more users (and in some cases many users) to one or more experiences (possibly many experiences, such as dozens, hundreds, thousands or more). Collecting this information on a large scale may be challenging since it is typically done automatically, possibly without active intervention by users. This may require extensive monitoring of users, not only in order to acquire measurements of affective response, but also to identify other aspects of an event. In some embodiments, in order to identify an event, there is a need to identify the users who contribute the measurements and also the experiences to which the measurements correspond. In some embodiments, identifying an experience may be relatively easy since it may be based on digital transactions, for example, identifying that a user flew on an airplane may be done based on booking data, financial transactions, and/or electromagnetic transmission of a device of a user. However, in other embodiments it may be more difficult (e.g., if the experience involves chewing a piece of gum). Additionally, information about the situation a user is in, which may be needed in some embodiments, such as when considering biases and/or situation-dependent baselines, may also be difficult to come by (e.g., detecting various aspects such as a mood of the user, whether the user is with other people, or whether the user is late to an activity).

Coming by the diverse information described above may be difficult for a central entity since it may require extensive monitoring of users, which may be difficult for a central entity to perform and/or undesirable from a user's standpoint (e.g., due to security and privacy concerns). Therefore, in some embodiments, information about events that may be used to compute scores and/or model users is provided, at least in part, by software agents operating on behalf of the users. Optionally, the software agents may operate according to a protocol set by the users and/or approved by the users. Such a protocol may govern various aspects that involve user privacy, such as aspect concerning what data is collected about a user and the user's environment, under what conditions and limitations the data is collected, how the data is stored, and/or how the data is shared with other parties and for what purposes.

By operating on behalf of users, and possibly receiving abundant information from the users, e.g., from devices of the users and/or activity of the users, software agents may be able to determine various aspects concerning events such as identifying experiences the users are having, situations the users are in, and/or other attributes such as factors of events, as described in more detail in section 12—Factors of Events. This information may come from a wide range of different sources, as mentioned in section 5—Identifying Events.

In some embodiments, at least some of the data collected from monitoring users is collected as part of life logging of the users, which involves recording various aspects of the users' day to day life. Optionally, a software agent may participate in performing life logging of a user on behalf it operates and/or the software agent may have access to data collected through life logging of the user.

In some cases, providing a central entity with some, or all, of the aforementioned information may not be feasible (e.g., it may involve excessive transmission) and/or may not be desirable from data security and/or privacy perspectives. For example, if the central entity is hacked, this may jeopardize the privacy of many users. In addition, monitoring users to the extent described in some of the embodiments described above may make some users uncomfortable. Thus, a software agent that operates on behalf of a user and monitors the user may be a feasible solution that can make some users feel more at ease, especially if the user can control some, or all, aspects of the software agent's actions regarding data collection, retention, and/or sharing.

Thus, in some embodiments, a software agent may provide an entity that computes scores for experiences from measurements of affective response with information related to events. Optionally, information related to an event, which is provided by the software agent, identifies at least one of the following values: the user corresponding to the event, the experience corresponding to the event, a situation the user was in when the user had the experience, and a baseline value of the user when the user had the experience. Additionally or alternatively, the software agent may provide a measurement of affective response corresponding to the event (i.e., a measurement of the user corresponding to the event to having an experience corresponding to the event, taken during the instantiation of the event or shortly after that). In some embodiments, information provided by a software agent operating on behalf of a user, which pertains to the user, may be considered part of a profile of the user.

In some embodiments, a software agent may operate based on a certain protocol that involves aspects such as the type of monitoring that may be performed by the software, the type of data that is collected, how the data is retained, and/or how it is utilized. Optionally, the protocol is determined, at least in part, by a user on behalf of whom the software agent operates. Optionally, the protocol is determined, at least in part, by an entity that is not a user on behalf of whom the software agent operates (e.g., the entity is a recipient of the measurements that computes a crowd-based result such as a score for an experience). Optionally, the protocol is approved by a user on behalf of whom the software agent operates (e.g., the user accepted certain terms of use associated with the software agent).

The protocol according to which a software agent operates may dictate various restrictions related to the monitoring of users. For example, the restrictions may dictate the identity of users that may be monitored by a software agent. In one example, an agent may be restricted to provide information only about users that gave permission for this action. Optionally, these users are considered users on behalf of whom the software agent operates. In another example, the protocol may dictate that no identifying information about users, who are not users on behalf of whom the software agent operates, may be collected. In another example, the protocol may dictate certain conditions for collecting information about users. For example, the protocol may dictate that certain users may be monitored only in public areas. In another example, the protocol may dictate that certain users may be monitored at certain times. In still another example, the protocol may dictate that certain users may be monitored when having certain experiences. In one embodiment, a protocol may dictate what type of information may be collected with respect to certain users, locations, and/or experiences. For example, the protocol may dictate that when a user is in private surroundings (e.g., a bedroom or bathroom), the software agent may not collect data using cameras and/or microphones.

The protocol may dictate what type of information may be provided by the software agent to another entity, such as an entity that uses the information to compute crowd-based results such as scores for experiences. For example, the software agent may be instructed to provide information related to only certain experiences. Optionally, the extent of the information the software agent monitors and/or collects might be greater than the extent of the information the software agent provides. For example, in order to perform better modeling of the user on behalf of whom it operates, a software agent may collect certain data (e.g., private data), that does not get passed on to other parties. Additionally, a protocol may dictate the extent of information that may be provided by limiting the frequency and/or number of measurements that are provided, limiting the number of experiences to which the measurements correspond, and/or restricting the recipients of certain types of data.

In some embodiments, the protocol may dictate what use may be made with the data a software agent provides. For example, what scores may be computed (e.g., what type of values), and what use may be made with the scores (e.g., are they disclosed to the public or are they restricted to certain entities such as market research firms). In other embodiments, the protocol may dictate certain policies related to data retention. In one example, the protocol may relate to the location the data is stored (e.g., in what countries servers storing the data may reside and/or what companies may store it). In another example, the protocol may dictate time limits for certain types of data after which the data is to be deleted. In yet another example, the protocol may dictate what type of security measures must be implemented when storing certain types of data (e.g., usage of certain encryption algorithms).

In some embodiments, the protocol may dictate certain restrictions related to a required reward and/or compensation that a user is to receive for the information provided by the software agent. Optionally, the reward and/or compensation may be in a monetary form (e.g., money and/or credits that may be used to acquire services and/or products). Optionally, the reward may be in the form of services provided to the user. Optionally, the reward may be in the form of information (e.g., a user providing a measurement to an experience may receive information such as the score computed for the experience based on the measurement and measurements of other users).

The risk to privacy associated with contributing measurements directly to an entity that may model the user and/or for the computation of scores may also be a factor addressed by the protocol. For example, the protocol may require a certain number of users to provide measurements for the computation of a certain score and/or that the measurements have a certain minimal variance. In another embodiment, the protocol may dictate that the risk, as computed by a certain function, may be below a certain threshold in order for the software agent to provide a measurement for computation of a score. Optionally, the extent of information (e.g., number of measurements and/or number of experiences for which measurements are provided) may depend on the results of a risk function. Analysis of risk, including different types of risks that may be evaluated, is discussed in further detail elsewhere in this embodiment.

The discussion above described examples of aspects involved in a software agents operation that may be addressed by a protocol. Those skilled in the art will recognize that there may be various other aspects involving collection of data by software agents, retention of the data, and/or usage of data, that were not described above, but may be nonetheless implemented in various embodiments.

In one embodiment, the software agent provides information as a response to a request. For example, the software agent may receive a request for a measurement of the user on behalf whom it operates. In another example, the request is a general request sent to multiple agents, which specifies certain conditions. For example, the request may specify a certain type of experience, time, certain user demographics, and/or a certain situation which the user is in. Optionally, the software responds to the request with the desired information if doing so does not violate a restriction dictated by a policy according to which the software agent operates. For example, the software agent may respond with the information if the risk associated with doing so does not exceed a certain threshold and/or the compensation provided for doing so is sufficient.

In one embodiment, the software agent may provide information automatically. Optionally, the nature of the automatic providing of information is dictated by the policy according to which the software agent operates. In one example, the software agent may periodically provide measurements along with context information (e.g., what experience the user was having at the time and/or information related to the situation of the user at the time). In another example, the software agent provides information automatically when the user has certain types of experiences (e.g., when consuming content, eating, or exercising).

A software agent may be utilized for training a personalized ESE of a user on behalf of whom the software agent operates. For example, the software agent may monitor the user and at times query the user to determine how the user feels (e.g., represented by an affective value on a scale of 1 to 10). After a while, the software agent may have a model of the user that is more accurate at interpreting "its" user than a general ESE. Additionally, by utilizing a personalized ESE, the software agent may be better capable of integrating multiple values (e.g., acquired by multiple sensors and/or over a long period of time) in order to represent how the user feels at the time using a single value (e.g., an affective value on a scale of 1 to 10). For example, a personalized ESE may learn model parameters that represent weights to assign to values from different sensors and/or weights to assign to different periods in an event (e.g., the beginning, middle or end of the experience), in order to be able to produce a value that more accurately represents how the user feels (e.g., on the scale of 1 to 10). In another example, a personalized ESE may learn what weight to assign to measurements corresponding to mini-events in order to generate an affective value that best represents how the user felt to a larger event that comprises the mini-events.

Modeling users (e.g., learning various user biases) may involve, in some embodiments, accumulation of large quantities of data about users that may be considered private. Thus, some users may be reluctant to provide such information to a central entity in order to limit the ability of the central entity to model the users. Additionally, providing the information to a central entity may put private information of the users at risk due to security breaches like hacking. In such cases, users may be more comfortable, and possibly be more willing to provide data, if the modeling is done and/or controlled by them. Thus, in some embodiments, the task of modeling the users, such as learning biases of the users, may be performed, at least in part, by software agents operating on behalf of the users. Optionally, the software agent may utilize some of the approaches described above in this disclosure, to model user biases.

In some embodiments, modeling biases involves utilizing values of biases towards the quality of an experience, which may be used to correct for effects that involve the quality of the experience at a certain time. Optionally, such values are computed from measurements of affective response of multiple users (e.g., they may be crowd-based scores). Thus, in some embodiments, a software agent operating on behalf of a user may not be able to learn the user's biases towards experience quality with sufficient accuracy on its own, since it may not have access to measurements of affective response of other users.

Optionally, in these embodiments, the software agent may receive values describing quality of experience from an external source, such as entity that computes scores for experiences. Optionally, the values received from the external source may enable an agent to compute a normalized measurement value from a measurement of affective response of a user to an experience. Optionally, the normalized value may better reflect the biases of the user (which are not related to the quality of the experience). Therefore, learning biases from normalized measurements may produce more accurate estimates of the user's biases. In these embodiments, knowing the score given to an experience may help to interpret the user's measurements of affective response.

The scenario described above may lead to cooperative behavior between software agents, each operating on behalf of a user, and an entity that computes scores for experiences based on measurements of affective response of the multiple users on behalf of whom the agents operate. In order to compute more accurate scores, it may be preferable, in some embodiments, to remove certain biases from the measurements of affective response used to compute the score. This task may be performed by a software agents, which can utilize a model of a user on behalf of whom it operates, in order to generate an unbiased measurement of affective response for an experience. However, in order to better model the user, the software agent may benefit from receiving values of the quality of experiences to which the measurements correspond. Thus, in some embodiments, there is a "give and take" reciprocal relationship between software agents and an entity that computes scores, in which the software agents provide measurements of affective response from which certain (private) user biases were removed. The entity that computes the score utilizes those unbiased measurements to produce a score that is not affected by some of the users' biases (and thus better represents the quality of the experience). This score, which is computed based on measurements of multiple users is provided back to the agents in the form of an indicator of the quality of the experience the user had, which in turn may be used by the software agents to better model the users. Optionally, this process may be repeated multiple times in order to refine the user models (e.g., to obtain more accurate values of user biases held by the agents), and in the same time compute more accurate scores. Thus, the joint modeling of users and experiences may be performed in a distributed way in which the private data of individual users is not stored together and/or exposed to a central entity.

8—Crowd-Based Applications

Various embodiments described herein utilize systems whose architecture includes a plurality of sensors and a plurality of user interfaces. This architecture supports various forms of crowd-based recommendation systems in which users may receive information, such as suggestions and/or alerts, which are determined based on measurements of affective response collected by the sensors. In some embodiments, being crowd-based means that the measurements of affective response are taken from a plurality of users, such as at least three, ten, one hundred, or more users. In such embodiments, it is possible that the recipients of information generated from the measurements may not be the same users from whom the measurements were taken.

FIG. 19a illustrates one embodiment of an architecture that includes sensors and user interfaces, as described above. The crowd 100 of users comprises sensors coupled to at least some individual users. For example, FIG. 20a and FIG. 20c illustrate cases in which a sensor is coupled to a user. The sensors take the measurements 110 of affective response, which are transmitted via network 112. Optionally, the measurements 110 are sent to one or more servers that host modules belonging to one or more of the systems described in various embodiments in this disclosure (e.g., systems that compute scores for experiences, rank experiences, generate alerts for experiences, and/or learn parameters of functions that describe affective response).

A plurality of sensors may be used, in various embodiments described herein, to take the measurements of affective response of the plurality of users. Each of the plurality of sensors (e.g., the sensor 102a) may be a sensor that captures a physiological signal and/or a behavioral cue. Optionally, a measurement of affective response of a user is typically taken by a specific sensor related to the user (e.g., a sensor attached to the body of the user and/or embedded in a device of the user). Optionally, some sensors may take measurements of more than one user (e.g., the sensors may be cameras taking images of multiple users). Optionally, the measurements taken of each user are of the same type (e.g., the measurements of all users include heart rate and skin conductivity measurements). Optionally, different types of measurements may be taken from different users. For example, for some users, the measurements may include brainwave activity captured with EEG and heart rate, while for other users the measurements may include only heart rate values.

The network 112 represents one or more networks used to carry the measurements 110 and/or crowd-based results 115 computed based on measurements. It is to be noted that the measurements 110 and/or crowd-based results 115 need not be transmitted via the same network components. Additionally, different portions of the measurements 110 (e.g., measurements of different individual users) may be transmitted using different network components or different network routes. In a similar fashion, the crowd-based results 115 may be transmitted to different users utilizing different network components and/or different network routes.

Herein, a network, such as the network 112, may refer to various types of communication networks, including, but not limited to, a local area network (LAN), a wide area network (WAN), Ethernet, intranet, the Internet, a fiber communication network, a wired communication network, a wireless communication network, and/or a combination thereof.

In some embodiments, the measurements 110 of affective response are transmitted via the network 112 to one or more servers. Each of the one or more servers includes at least one processor and memory. Optionally, the one or more servers are cloud-based servers. Optionally, some of the measurements 110 are stored and transmitted in batches (e.g., stored on a device of a user being measured). Additionally or alternatively, some of the measurements are broadcast within seconds of being taken (e.g., via Wi-Fi transmissions). Optionally, some measurements of a user may be processed prior to being transmitted (e.g., by a device and/or software agent of the user). Optionally, some measurements of a user may be sent as raw data, essentially in the same form as received from a sensor used to measure the user. Optionally, some of the sensors used to measure a user may include a transmitter that may transmit measurements of affective response, while others may forward the measurements to another device capable of transmitting them (e.g., a smartphone belonging to a user).

Depending on the embodiment being considered, the crowd-based results 115 may include various types of values that may be computed by systems described in this disclosure based on measurements of affective response. For example, the crowd-based results 115 may refer to scores for experiences (e.g., score 164), notifications about affective response to experiences (e.g., notification 188 or notification 210), recommendations regarding experiences (e.g., recommendation 179), and/or various rankings of experiences.

In some embodiments, the crowd-based results 115 that are computed based on the measurements 110 include a single value or a single set of values that is provided to each user that receives the results 115. In such a case, the crowd-based results 115 may be considered general crowd-based results, since each user who receives a result computed based on the measurements 110 receives essentially the same thing. In other embodiments, the crowd-based results 115 that are computed based on the measurements 110 include various values and/or various sets of values that are provided to users that receive the crowd-based results 115. In this case, the results 115 may be considered personalized crowd-based results, since a user who receives a result computed based on the measurements 110 may receive a result that is different from the result received by another user. Optionally, personalized results are obtained utilizing an output produced by personalization module 130.

An individual user 101, belonging to the crowd 100, may contribute a measurement of affective response to the measurements 110 and/or may receive a result from among the various types of the crowd-based results 115 described in this disclosure. This may lead to various possibilities involving what users contribute and/or receive in an architecture of a system such as the one illustrated in FIG. 19.

In some embodiments, at least some of the users from the crowd 100 contribute measurements of affective response (as part of the measurements 110), but do not receive results computed based on the measurements they contributed. An example of such a scenario is illustrated in FIG. 20a, where a user 101a is coupled to a sensor 102a (which in this illustration measures brainwave activity via EEG) and contributes a measurement 111a of affective response, but does not receive a result computed based on the measurement 111a.

In a somewhat reverse situation to the one described above, in some embodiments, at least some of the users from the crowd 100 receive a result from among the crowd-based results 115, but do not contribute any of the measurements of affective response used to compute the result they receive. An example of such a scenario is illustrated in FIG. 20b, where a user 101b is coupled to a user interface 103b (which in this illustration are augmented reality glasses) that presents a result 113b, which may be, for example, a score for an experience. However, in this illustration, the user 101b does not provide a measurement of affective response that is used for the generation of the result 113b.

And in some embodiments, at least some of the users from the crowd 100 contribute measurements of affective response (as part of the measurements 110), and receive a result, from among the crowd-based results 115, computed based on the measurements they contributed. An example of such a scenario is illustrated in FIG. 20c, where a user 101c is coupled to a sensor 102c (which in this illustration is a smartwatch that measures heart rate and skin conductance) and contributes a measurement 111c of affective response. Additionally, the user 101c has a user interface 103c (which in this illustration is a tablet computer) that presents a result 113c, which may be for example a ranking of multiple experiences generated utilizing the measurement 111c that the user 101c provided.

A "user interface", as the term is used in this disclosure, may include various components that may be characterized as being hardware, software, and/or firmware. In some examples, hardware components may include various forms of displays (e.g., screens, monitors, virtual reality displays, augmented reality displays, hologram displays), speakers, scent generating devices, and/or haptic feedback devices (e.g., devices that generate heat and/or pressure sensed by the user). In other examples, software components may include various programs that render images, video, maps, graphs, diagrams, augmented annotations (to appear on images of a real environment), and/or video depicting a virtual environment. In still other examples, firmware may include various software written to persistent memory devices, such as drivers for generating images on displays and/or for generating sound using speakers. In some embodiments, a user interface may be a single device located at one location, e.g., a smartphone and/or a wearable device. In other embodiments, a user interface may include various components that are distributed over various locations. For example, a user interface may include both certain display hardware (which may be part of a device of the user) and certain software elements used to render images, which may be stored and run on a remote server.

It is to be noted that, though FIG. 20a to FIG. 20c illustrate cases in which users have a single sensor device coupled to them and/or a single user interface, the concepts described above in the discussion about FIG. 20a to FIG. 20c may be naturally extended to cases where users have multiple sensors coupled to them (of the various types described in this disclosure or others) and/or multiple user interfaces (of the various types described in this disclosure or others).

Additionally, it is to be noted that users may contribute measurements at one time and receive results at another (which were not computed from the measurements they contributed). Thus, for example, the user 101a in FIG. 20a might have contributed a measurement to compute a score for an experience on one day, and received a score for that experience (or another experience) on her smartwatch (not depicted) on another day. Similarly, the user 101b in FIG.

20b may have sensors embedded in his clothing (not depicted) and might be contributing measurements of affective response to compute a score for an experience the user 101b is having, while the result 113b that the user 101b received, is not based on any of the measurements the user 101b is currently contributing.

In this disclosure, a crowd of users is often designated by the reference numeral 100. The reference numeral 100 is used to designate a general crowd of users. Typically, a crowd of users in this disclosure includes at least three users, but may include more users. For example, in different embodiments, the number of users in the crowd 100 falls into one of the following ranges: 3 to 9, 10 to 24, 25-99, 100-999, 1000-9999, 10000-99999, 100000-1000000, and more than one million users. Additionally, the reference numeral 100 is used to designate users having a general experience, which may involve one or more instances of the various types of experiences described in this disclosure. For example, the crowd 100 may include users that are at a certain location, users engaging in a certain activity, users utilizing a certain product, and/or users consuming a certain substance.

When a crowd is designated with another reference numeral (other than 100), this typically signals that the crowd has a certain characteristic. A different reference numeral for a crowd may be used when describing embodiments that involve specific experiences. For example, in an embodiment that describes a system that ranks experiences, the crowd may be referred to by the reference numeral 100. However, in an embodiment that describes ranking of locations, the crowd may be designated by another reference numeral, since in this embodiment, the users in the crowd have a certain characteristic (they are at locations), rather than being a more general crowd of users who are having one or more experiences, which may be any of the experiences described in this disclosure.

In a similar fashion, measurements of affective response are often designated by the reference numeral 110. The reference numeral 110 is used to designate measurements of affective response of users belonging to the crowd 100. Thus, the reference numeral 110 is typically used to designate measurements of affective response in embodiments that involve users having one or more experiences, which may possibly be any of the experiences described in this disclosure.

Unless indicated otherwise when describing a certain embodiment, the one or more experiences may be of various types of experiences described in this disclosure. In one example, an experience from among the one or more experiences may involve one or more of the following: spending time at a certain location, consuming certain digital content, having a social interaction with a certain entity in the physical world, having a social interaction with a certain entity in a virtual world, viewing a certain live performance, performing a certain exercise, traveling a certain route, spending time in an environment characterized by a certain environmental condition, shopping, and going on a social outing with people. In another example, an experience from among the one more experiences may be characterized via various attributes and/or combinations of attributes such as an experience involving engaging in a certain activity at a certain location, an experience involving visiting a certain location for a certain duration, and so on. Additional information regarding the types of experiences users may have may be found at least in section 3—Experiences.

In various embodiments described herein, measurements of affective response, such as the measurements 110 and/or measurements referred to by other reference numerals, may include measurements of multiple users, such as at least ten users, but in some embodiments may include measurements of other numbers of users (e.g., less than ten). Optionally, the number of users who contribute measurements to the measurements 110 may fall into one of the following ranges: 3-9, 10-24, 25-99, 100-999, 1000-9999, 10000-99999, 100000-1000000, or more than one million users.

In different embodiments, measurements of affective response, such as the measurements 110 and/or measurements referred to by other reference numerals, may be taken during different periods of time. In one embodiment, measurements may be taken over a long period, such as at least a day, at least a week, at least a month, and/or a period of at least a year. When it is said that measurements were taken over a certain period such as at least a day, it means that the measurements include at least a first measurement and a second measurement such that the first measurement was taken at least a day before the second measurement. In another embodiment, measurements may be taken within a certain period of time, and/or a certain portion of the measurements may be taken within a certain period of time. For example, the measurements may all be taken during a certain period of six hours. In another example, at least 25% of the measurements are taken within a period of an hour.

In embodiments described herein, measurements of affective response, such as the measurements 110 and/or measurements referred to by other reference numerals, are taken utilizing sensors coupled to the users. A measurement of affective response of a user, taken utilizing a sensor coupled to the user, includes at least one of the following: a value representing a physiological signal of the user, and a value representing a behavioral cue of the user. Optionally, a measurement of affective response corresponding to an event in which a user has an experience is based on values acquired by measuring the user with the sensor during at least three different non-overlapping periods while the user has the experience corresponding to the event. Additional information regarding how measurements of affective response may be obtained from values captured by sensors may be found in this disclosure at least in section 2—Measurements of Affective Response.

When measurements of affective response are designated with a reference numeral that is different from 110, this typically signals that the measurements have a certain characteristic, such as being measurements of users having a specific experience. For example, in an embodiment that describes a system that scores experiences, the measurements of affective response used to compute scores may be referred to by the reference numeral 110. However, in an embodiment that describes scoring hotels, the measurements may be designated by another reference numeral, since in this embodiment, the measurements are of users that have a certain characteristic (they are at a hotel), rather than being measurements of a general crowd of users who are having one or more experiences that may be any of the experiences described in this disclosure. Despite the use of a different reference numeral, because in this disclosure they represent a general form of measurements of affective response (to possibly any experience described in this disclosure), properties of the measurements 110 as described in this disclosure may be typically assumed to be true for measurements of affective response designated by other reference numerals, unless indicated otherwise.

Results obtained based on measurements of affective response may also be designated with different reference numerals in different embodiments. When the embodiment involves a non-specific experience, which may be any of the experiences described in this disclosure, the results may be designated with certain reference numerals (e.g., the score 164, the notification 188, or the recommendation 179). When other reference numerals are used to designate the same type of results, this typically signals that the results have a certain characteristic, such as being a score for a location, rather than a score for a non-specific experience. When a result has a certain characteristic, such as corresponding to a certain type of experience, it may be referred to according to the type of experience. Thus, for example, the score for the location may be referred to as a "location score" and may optionally be designated with a different reference numeral than the one used for a score for a non-specific experience.

Figure 21:
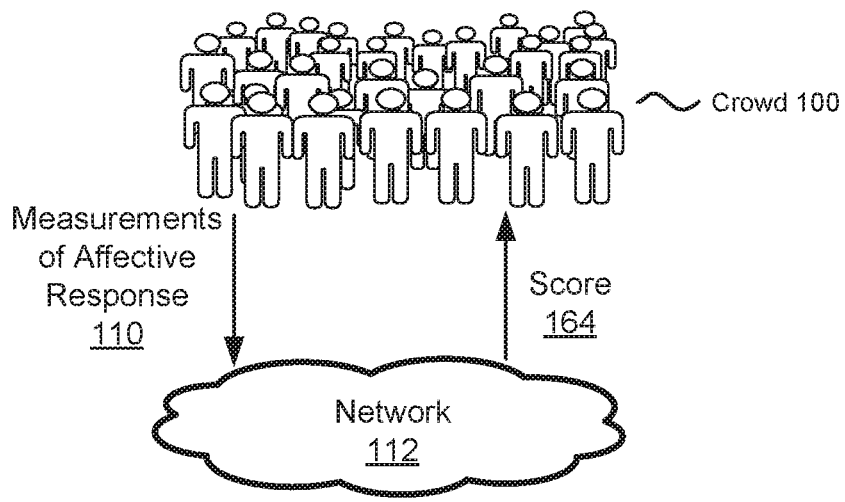
FIG. 21 illustrates a system configured to compute a score for a certain experience.

FIG. 19 illustrates an architecture that may be utilized for various embodiments involving acquisition of measurements of affective response and reporting of results computed based on the measurements. One example of a utilization of such an architecture is given in FIG. 21, which illustrates one embodiment of a system configured to compute score 164 for a certain experience. The system computes the score 164 based on measurements 110 of affective response utilizing at least sensors and user interfaces. The sensors are utilized to take the measurements 110, which include measurements of at least ten users from the crowd 100, each of which is coupled to a sensor such as the sensors 102a and/or 102c. Optionally, at least some of the sensors are configured to take measurements of physiological signals of the at least ten users. Additionally or alternatively, at least some of the sensors are configured to take measurements of behavioral cues of the at least ten users.

Each measurement of the user is taken by a sensor coupled to the user, while the user has the certain experience or shortly after. Optionally, "shortly after" refers to a time that is at most ten minutes after the user finishes having the certain experience. Optionally, the measurements may be transmitted via network 112 to one or more servers that are configured to compute a score for the certain experience based on the measurements 110. Optionally, the servers are configured to compute scores for experiences based on measurements of affective response, such as the system illustrated in FIG. 22.

The user interfaces are configured to receive data, via the network 112, describing the score computed based on the measurements 110. Optionally, the score 164 represents the affective response of the at least ten users to having the certain experience. The user interfaces are configured to report the score to at least some of the users belonging to the crowd 100. Optionally, at least some users who are reported the score 164 via user interfaces are users who contributed measurements to the measurements 110 which were used to compute the score 164. Optionally, at least some users who are reported the score 164 via user interfaces are users who did not contribute to the measurements 110.

It is to be noted that stating that a score is computed based on measurements, such as the statement above mentioning "the score computed based on the measurements 110", is not meant to imply that all of the measurements 110 are used in the computation of the score. When a score is computed based on measurements it means that at least some of the measurements, but not necessarily all of the measurements, are used to compute the score. Some of the measurements may be irrelevant for the computation of the score for a variety of reasons, and therefore, are not used to compute the score. For example, some of the measurements may involve experiences that are different from the experience for which the score is computed, may involve users not selected to contribute measurements (e.g., filtered out due to their profiles being dissimilar to a profile of a certain user), and/or some of the measurements may have been taken at a time that is not relevant for the score (e.g., older measurements might not be used when computing a score corresponding to a later time). Thus, the above statement "the score computed based on the measurements 110" should be interpreted as the score computed based on some, but not necessarily all, of the measurements 110.

As discussed in further detail in section 1—Sensors, various types of sensors may be utilized in order to take measurements of affective response, such as the measurements 110 and/or measurements of affective response designated by other numeral references. Following are various examples of sensors that may be coupled to users, which are used to take measurements of the users. In one example, a sensor used to take a measurement of affective response of a user is implanted in the body of a user. In another example, a sensor used to take a measurement of affective response of a user is embedded in a device used by the user. In yet another example, a sensor used to take a measurement of a user may be embedded in an object worn by the user, which may be at least one of the following: a clothing item, footwear, a piece of jewelry, and a wearable artifact. In still another example, a sensor used to take a measurement of a user may be a sensor that is not in physical contact with the user, such as an image capturing device used to take a measurement that includes one or more images of the user.

In some embodiments, some of the users who contribute to the measurements 110 may have a device that includes both a sensor that may be used to take a measurement of affective response and a user interface that may be used to present a result computed based on the measurements 110, such as the score 164. Optionally, each such device is configured to receive a measurement of affective response taken with the sensor embedded in the device, and to transmit the measurement. The device may also be configured to receive data describing a crowd-based result, such as a score for an experience, and to forward the data for presentation via the user interface.

Reporting a result computed based on measurements of affective response, such as the score 164, via a user interface may be done in various ways in different embodiments. In one embodiment, the score is reported by presenting, on a display of a device of a user (e.g., a smartphone's screen, augmented reality glasses) an indication of the score 164 and/or the certain experience. For example, the indication may be a numerical value, a textual value, an image, and/or video. Optionally, the indication is presented as an alert issued if the score reaches a certain threshold. Optionally, the indication is given as a recommendation generated by a recommender module such as recommender module 178. In another embodiment, the score 164 may be reported via a voice signal and/or a haptic signal (e.g., via vibrations of a device carried by the user). In some embodiments, reporting the score 164 to a user is done by a software agent operating on behalf of the user, which communicates with the user via a user interface.

In some embodiments, along with presenting information, e.g. about a score such as the score 164, the user interfaces may present information related to the significance of the information, such as a significance level (e.g., p-value, q-value, or false discovery rate), information related to the number of users and/or measurements (the sample size) which were used for determining the information, and/or confidence intervals indicating the variability of the data.

Figure 22:
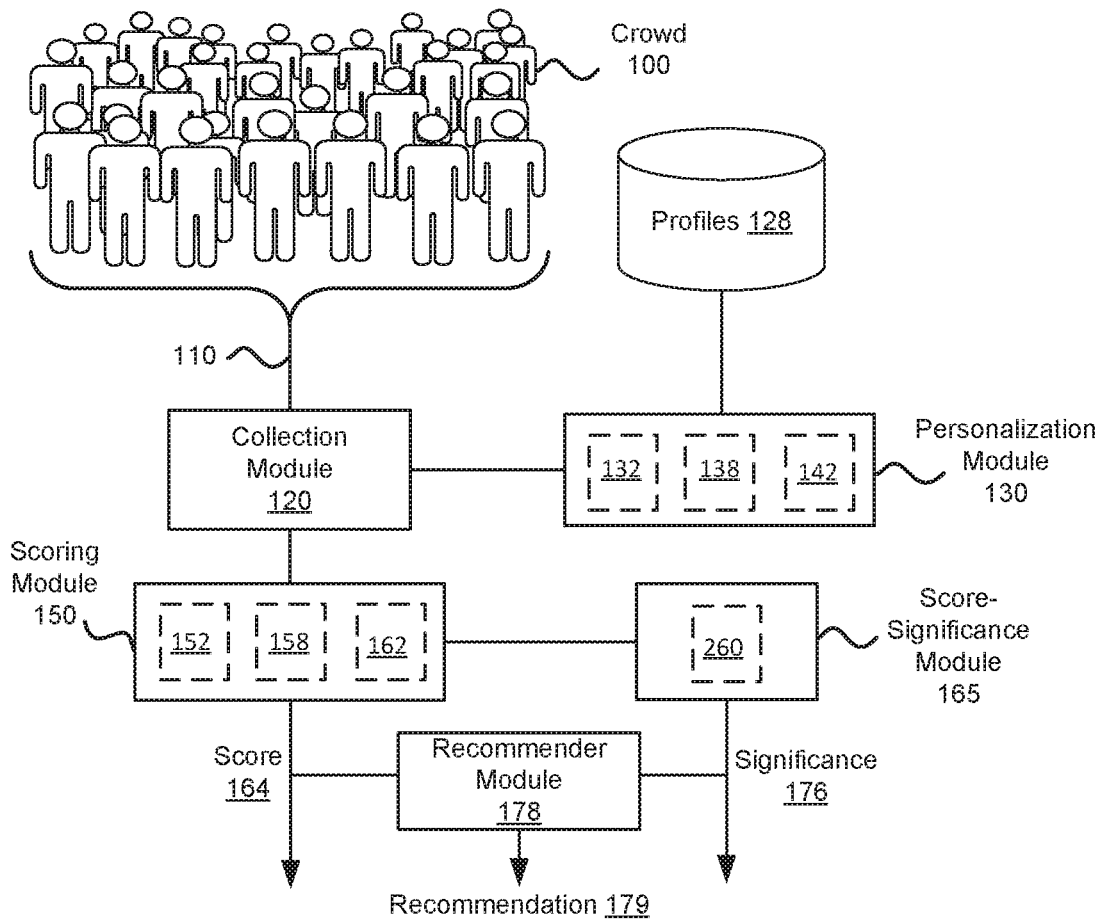
FIG. 22 illustrates a system configured to compute scores for experiences.

FIG. 22 illustrates one embodiment of a system configured to compute scores for experiences. The system illustrated in FIG. 22 is an exemplary embodiment of a system that may be utilized to compute crowd-based results 115 from the measurements 110, as illustrated in FIG. 19. While the system illustrated in FIG. 22 describes a system that computes scores for experiences, the teachings in the following discussion, in particular the roles and characteristics of various modules, may be relevant to other embodiments described herein involving generation of other types of crowd-based results (e.g., ranking, alerts, and/or learning parameters of functions).

In one embodiment, a system that computes a score for an experience, such as the one illustrated in FIG. 22, includes at least a collection module (e.g., collection module 120) and a scoring module (e.g., scoring module 150). Optionally, such a system may also include additional modules such as the personalization module 130, score-significance module 165, and/or recommender module 178. The illustrated system includes modules that may optionally be found in other embodiments described in this disclosure. This system, like other systems described in this disclosure, includes at least a memory 402 and a processor 401. The memory 402 stores computer executable modules described below, and the processor 401 executes the computer executable modules stored in the memory 402.

The collection module 120 is configured to receive the measurements 110. Optionally, at least some of the measurements 110 may be processed in various ways prior to being received by the collection module 120. For example, at least some of the measurements 110 may be compressed and/or encrypted.

The collection module 120 is also configured to forward at least some of the measurements 110 to the scoring module 150. Optionally, at least some of the measurements 110 undergo processing before they are received by the scoring module 150. Optionally, at least some of the processing is performed via programs that may be considered software agents operating on behalf of the users who provided the measurements 110.

The scoring module 150 is configured to receive at least some of the measurements 110 of affective response from the crowd 100 of users, and to compute a score 164 based on the measurements 110. At least some of the measurements 110 may correspond to a certain experience, i.e., they are measurements of at least some of the users from the crowd 100 taken in temporal proximity to when those users had the certain experience and represent the affective response of those users to the certain experience. Herein, "temporal proximity" means nearness in time. For example, at least some of the measurements 110 are taken while users are having the certain experience and/or shortly after that. Additional discussion of what constitutes "temporal proximity" may be found at least in section 2—Measurements of Affective Response.

A scoring module, such as scoring module 150, may utilize one or more types of scoring approaches that may optionally involve one more other modules. In one example, the scoring module 150 utilizes modules that perform statistical tests on measurements in order to compute the score 164, such as statistical test module 152 and/or statistical test module 158. In another example, the scoring module 150 utilizes arithmetic scorer 162 to compute the score 164.

In one embodiment, a score computed by a scoring module, such as scoring module 150, may be considered a personalized score for a certain user and/or for a certain group of users. Optionally, the personalized score is generated by providing the personalization module 130 with a profile of the certain user (or a profile corresponding to the certain group of users). The personalization module 130 compares a provided profile to profiles from among the profiles 128, which include profiles of at least some of the users belonging to the crowd 100, in order to determine similarities between the provided profile and the profiles of at least some of the users belonging to the crowd 100. Based on the similarities, the personalization module 130 produces an output indicative of a selection and/or weighting of at least some of the measurements 110. By providing the scoring module 150 with outputs indicative of different selections and/or weightings of measurements from among the measurements 110, it is possible that the scoring module 150 may compute different scores corresponding to the selections and/or weightings of the measurements 110.

In one embodiment, the score 164 may be provided to the recommender module 178, which may utilize the score 164 to generate recommendation 179, which may be provided to a user (e.g., by presenting an indication regarding the experience on a user interface used by the user). Optionally, the recommender module 178 is configured to recommend the experience for which the score 164 is computed, based on the value of the score 164, in a manner that belongs to a set comprising first and second manners, as described below. When the score 164 reaches a threshold, the experience is recommended in the first manner, and when the score 164 does not reach the threshold, the experience is recommended in the second manner, which involves a weaker recommendation than a recommendation given when recommending in the first manner.

References to a "threshold" herein typically relate to a value to which other values may be compared. For example, in this disclosure scores are often compared to a threshold in order to determine certain system behavior (e.g., whether to issue a notification or not based on whether a threshold is reached). When a threshold's value has a certain meaning it may be given a specific name based on the meaning. For example, a threshold indicating a certain level of satisfaction of users may be referred to as a "satisfaction-threshold" or a threshold indicating a certain level of well-being of users may be referred to as "wellness-threshold", etc.

Usually, a threshold is considered to be reached by a value if the value equals the threshold or exceeds it. Similarly, a value does not reach the threshold (i.e., the threshold is not reached) if the value is below the threshold. However, some thresholds may behave the other way around, i.e., a value above the threshold is considered not to reach the threshold, and when the value equals the threshold, or is below the threshold, it is considered to have reached the threshold. The context in which the threshold is presented is typically sufficient to determine how a threshold is reached (i.e., from below or above). In some cases when the context is not clear, what constitutes reaching the threshold may be explicitly stated. Typically, but not necessarily, if reaching a threshold involves having a value lower than the threshold, reaching the threshold will be described as "falling below the threshold".

Herein, any reference to a "threshold" or to a certain type of threshold (e.g., satisfaction-threshold, wellness-threshold, and the like), may be considered a reference to a "predetermined threshold". A predetermined threshold is a fixed value and/or a value determined at any time before performing a calculation that compares a score with the predetermined threshold. Furthermore, a threshold may also be considered a predetermined threshold when the threshold involves a value that needs to be reached (in order for the threshold to be reached), and logic used to compute the value is known before starting the computations used to determine whether the value is reached (i.e., before starting the computations to determine whether the predetermined threshold is reached). Examples of what may be considered the logic mentioned above include circuitry, computer code, and/or steps of an algorithm.

In one embodiment, the manner in which the recommendation 179 is given may also be determined based on a significance computed for the score 164, such as significance 176 computed by score-significance module 165. Optionally, the significance 176 refers to a statistical significance of the score 164, which is computed based on various characteristics of the score 164 and/or the measurements used to compute the score 164. Optionally, when the significance 176 is below a predetermined significance level (e.g., a p-value that is above a certain value) the recommendation is made in the second manner.

A recommender module, such as the recommender module 178 or other recommender modules described in this disclosure (e.g., recommender modules designated by reference numerals 214, 235, 267, 343, or others), is a module that is configured to recommend an experience based on the value of a crowd-based result computed for the experience. For example, recommender module 178 is configured to recommend an experience based on a score computed for the experience based on measurements of affective response of users who had the experience.

Depending on the value of the crowd-based result computed for an experience, a recommender module may recommend the experience in various manners. In particular, the recommender module may recommend an experience in a manner that belongs to a set including first and second manners. Typically, in this disclosure, when a recommender module recommends an experience in the first manner, the recommender provides a stronger recommendation for the experience, compared to a recommendation for the experience that the recommender module provides when recommending in the second manner. Typically, if the crowd-based result indicates a sufficiently strong (or positive) affective response to an experience, the experience is recommended the first manner. Optionally, if the result indicates a weaker affective response to an experience, which is not sufficiently strong (or positive), the experience is recommended in the second manner.

In some embodiments, a recommender module, such as recommender module 178, is configured to recommend an experience via a display of a user interface. In such embodiments, recommending an experience in the first manner may involve one or more of the following: (i) utilizing a larger icon to represent the experience on a display of the user interface, compared to the size of the icon utilized to represent the experience on the display when recommending in the second manner; (ii) presenting images representing the experience for a longer duration on the display, compared to the duration in which images representing the experience are presented when recommending in the second manner; (iii) utilizing a certain visual effect when presenting the experience on the display, which is not utilized when presenting the experience on the display when recommending the experience in the second manner; and (iv) presenting certain information related to the experience on the display, which is not presented when recommending the experience in the second manner.

In some embodiments, a recommender module, such as recommender module 178, is configured to recommend an experience to a user by sending the user a notification about the experience. In such embodiments, recommending an experience in the first manner may involve one or more of the following: (i) sending the notification to a user about the experience at a higher frequency than the frequency the notification about the experience is sent to the user when recommending the experience in the second manner; (ii) sending the notification to a larger number of users compared to the number of users the notification is sent to when recommending the experience in the second manner; and (iii) on average, sending the notification about the experience sooner than it is sent when recommending the experience in the second manner.

In some embodiments, significance of a score, such as the score 164, may be computed by the score-significance module 165. Optionally, significance of a score, such as the significance 176 of the score 164, may represent various types of values derived from statistical tests, such as p-values, q-values, and false discovery rates (FDRs). Additionally or alternatively, significance may be expressed as ranges, error-bars, and/or confidence intervals.

Following is a brief description of some other modules that may be mentioned in this disclosure.

In one embodiment, the dynamic scoring module 180 is configured to compute scores for an experience based on the measurements 110. The dynamic scoring module may utilize similar modules to the ones utilizes by scoring module 150. For example, the dynamic scoring module may utilize the statistical test module 152, the statistical test module 158, and/or the arithmetic scorer 162. The scores 183 may comprise various types of values, similarly to scores for experiences computed by other modules in this disclosure, such as scoring module 150.

When a scoring module is referred to as being "dynamic", it is done to emphasize a temporal relationship between a score computed by the dynamic scoring module 180 and when the measurements used to compute the score were taken. For example, each score computed by the dynamic scoring module 180 corresponds to a time t. The score is computed based on measurements that were taken at a time that is no later than t. The measurements also include a certain number of measurements that were taken not long before t. For example, the certain number of measurements were taken at a time that is after a first period before t (i.e., the certain number of measurements are taken at a time that is not earlier than the time that is t minus the first period). Depending on the embodiment, the first period may be one day, twelve hours, four hours, two hours, one hour, thirty minutes, or some other period that is shorter than a day. Having measurements taken not long before t may make the score computed by the dynamic scoring module 180 reflect affective response of users to the experience as it was experienced not long before t. Thus, for example, if the quality of the experience changes over time, this dynamic nature of the scores may be reflected in the scores computed by the dynamic scoring module 180.

In one embodiment, measurements received by the ranking module 220 include measurements of affective response of users to the experiences. Optionally, for each experience from among the experiences, the measurements received by the ranking module 220 include measurements of affective response of at least five users to the experience. That is, the measurements include for each experience measurements of affective response of at least five users who had the experience, and the measurements of the at least five users were taken while the users had the experience or shortly after that time (e.g., within one minute, one hour, and/or one day of finishing the experience, depending on the embodiment).

The ranking module 220 is configured to rank the experiences based on the received measurements, such that, a first experience is ranked higher than a second experience.

The dynamic ranking module 250 is a ranking module similar to the ranking module 220. It too is configured to generate rankings of the experiences. However, each ranking generated by the ranking module 250 is assumed to correspond to a time t and is generated based on a subset of the measurements 110 of affective response of the users that comprises measurements taken at a time that is after a certain period before t, but is not after t. That is, if the certain period is denoted Δ, measurements used to generate a ranking corresponding to a time t are taken sometime between the times t-Δ and t. Optionally, the certain period of time is between one minute and one day. Optionally, the certain period of time is at least one of the following periods of time: one minute, one hour, one day, one week, or one month. Optionally, the measurements used to compute the ranking corresponding to the time t include measurements of at least five different users. Optionally, the measurements used to compute the ranking corresponding to the time t include measurements of a different minimal number of users, such as at least ten different users, or at least fifty different users. Optionally, computing the ranking corresponding to the time t may be done utilizing additional measurements taken earlier than t-Δ. Optionally, when computing a ranking corresponding to the time t, for each experience being ranked, the measurements used to compute the ranking corresponding to the time t include measurements of at least five different users that were taken between t-Δ and t.

9—Collecting Measurements

Various embodiments described herein include a collection module, such as the collection module 120, which is configured to receive measurements of affective response of users. In embodiments described herein, measurements received by the collection module, which may be the measurements 110 and/or measurements of affective response designated by another reference numeral (e.g., the measurements 501), are typically forwarded to other modules to produce a crowd-based result (e.g., scoring module 150 or ranking module 220). The measurements received by the collection module need not be the same measurements provided to the modules. For example, the measurements provided to the modules may undergo various forms of processing prior to being received by the modules. Additionally, the measurements provided to the modules may not necessarily include all the measurements received by the collection module 120. For example, the collection module may receive certain measurements that are not required for computation of a certain crowd-based result (e.g., the measurements may involve an experience that is not being scored or ranked at the time).

In addition to the measurements 110 and/or as part of the measurements 110, the collection module 120 may receive information regarding the measurements such as information about the events corresponding to the measurements. For example, information about an event to which a measurement of affective response corresponds may pertain to the experience corresponding to the event, the users corresponding to the event, and/or details about the instantiation of the event. Additional details about information about events is provided in this disclosure at least in section 4—Events. In some embodiments, the collection module 120 may utilize the information about events in order to determine how to process the measurements 110, which portions of the measurements 110 to forward to other system modules, and/or to which of the other system modules to forward at least some of the measurements 110. Additionally or alternatively, information about events may be forwarded by the collection module 120 to other system modules in addition to, or instead of, measurements of affective response.

The collection module 120 may receive and/or provide to other modules measurements collected over various time frames. For example, in some embodiments, measurements of affective response provided by the collection module to other modules (e.g., scoring module 150, ranking module 220, etc.), are taken over a certain period that extends for at least an hour, a day, a month, or at least a year. For example, when the measurements extend for a period of at least a day, they include at least a first measurement and a second measurement, such that the first measurement is taken at least 24 hours before the second measurement is taken. In other embodiments, at least a certain portion of the measurements of affective response utilized by one of the other modules to compute crowd-based results are taken within a certain period of time. For example, the certain portion may include times at which at least 25%, at least 50%, or at least 90% of the measurements were taken. Furthermore, in this example, the certain period of time may include various windows of time, spanning periods such as at most one minute, at most 10 minutes, at most 30 minutes, at most an hour, at most 4 hours, at most a day, or at most a week.

In some embodiments, a collection module, such as collection module 120, may be considered a module that organizes and/or pre-processes measurements to be used for computing crowd-based results. Optionally, the collection module 120 has an interface that allows other modules to request certain types of measurements, such as measurements involving users who had a certain experience, measurements of users who have certain characteristics (e.g., certain profile attributes), measurements taken during certain times, and/or measurements taken utilizing certain types of sensors and/or operation parameters.

In embodiments described herein, the collection module 120 may be implemented in various ways. In some embodiments, the collection module 120 may be an independent module, while in other modules it may be a module that is part of another module (e.g., it may be a component of scoring module 150). In one example, the collection module 120 includes hardware, such as a processor and memory, and includes interfaces that maintain communication routes with users (e.g., via their devices, in order to receive measurements) and/or with other modules (e.g., in order to receive requests and/or provide measurements). In another example, the collection module 120 may be implemented as, and/or be included as part of, a software module that can run on a general purpose server and/or in a distributed fashion (e.g., the collection module 120 may include modules that run on devices of users).

There are various ways in which the collection module may receive the measurements of affective response. Following are some examples of approaches that may be implemented in embodiments described herein.

In one embodiment, the collection module receives at least some of the measurements directly from the users of whom the measurements are taken. In one example, the measurements are streamed from devices of the users as they are acquired (e.g., a user's smartphone may transmit measurements acquired by one or more sensors measuring the user). In another example, a software agent operating on behalf of the user may routinely transmit descriptions of events, where each event includes a measurement and a description of a user and/or an experience the user had.

In another embodiment, the collection module is configured to retrieve at least some of the measurements from one or more databases that store measurements of affective response of users. Optionally, the one or more databases are part of the collection module. In one example, the one or more databases may involve distributed storage (e.g., cloud-based storage). In another example, the one or more databases may involve decentralized storage (e.g., utilizing blockchain-based systems). Optionally, the collection module submits to the one or more databases queries involving selection criteria which may include: a type of an experience, a location the experience took place, a timeframe during which the experience took place, an identity of one or more users who had the experience, and/or one or more characteristics corresponding to the users or to the experience. Optionally, the measurements comprise results returned from querying the one or more databases with the queries.

In yet another embodiment, the collection module is configured to receive at least some of the measurements from software agents operating on behalf of the users of whom the measurements are taken. In one example, the software agents receive requests for measurements corresponding to events having certain characteristics. Based on the characteristics, a software agent may determine whether the software agent has, and/or may obtain, data corresponding to events that are relevant to the query. In one example, a characteristic of a relevant event may relate to the user corresponding to the event (e.g., the user has certain demographic characteristics or is in a certain situation of interest). In another example, a characteristic of a relevant event may relate to the experience corresponding to the event (e.g., the characteristic may indicate a certain type of experience). In yet another example, a characteristic of a relevant event may relate to the measurement corresponding to the event (e.g., the measurement is taken utilizing a certain type of sensor and/or is taken at least for a certain duration). And in still another example, a characteristic of a relevant event may relate to a duration corresponding to the event, e.g., a certain time window during which the measurement was taken, such as during the preceding day or week.

After receiving a request, a software agent operating on behalf of a user may determine whether to provide information to the collection module and/or to what extent to provide information to the collection module.

When responding to a request for measurements, a software agent may provide data acquired at different times. In one example, the software agent may provide data that was previously recorded, e.g., data corresponding to events that transpired in the past (e.g., during the day preceding the request, the month preceding the request, and even a year or more preceding the request). In another example, the software agent may provide data that is being acquired at the time, e.g., measurements of the user are streamed while the user is having an experience that is relevant to the request. In yet another example, a request for measurements may be stored and fulfilled in the future when the software agent determines that an event relevant to the request has occurred.

A software agent may provide data in various forms. In one embodiment, the software agent may provide raw measurement values. Additionally or alternatively, the software agent may provide processed measurement values, processed in one or more ways as explained above. In some embodiments, in addition to measurements, the software agent may provide information related to events corresponding to the measurements, such as characteristics of the user corresponding to an event, characteristics of the experience corresponding to the event, and/or specifics of the instantiation of the event.

In one embodiment, providing measurements by a software agent involves transmitting, by a device of the user, measurements and/or other related data to the collection module. For example, the transmitted data may be stored on a device of a user (e.g., a smartphone or a wearable computer device). In another embodiment, providing measurements by a software agent involves transmitting an address, an authorization code, and/or an encryption key that may be utilized by the collection module to retrieve data stored in a remote location, and/or with the collection module. In yet another embodiment, providing measurements by the software agent may involve transmitting instructions to other modules or entities that instruct them to provide the collection module with the measurements.

One of the roles the collection module 120 may perform in some embodiments is to organize and/or process measurements of affective response. Section 2—Measurements of Affective Response describes various forms of processing that may be performed, which include, in particular, computing affective values (e.g., with an emotional state estimator) and/or normalizing the measurements with respect to baseline affective response values.

Figure 23A:
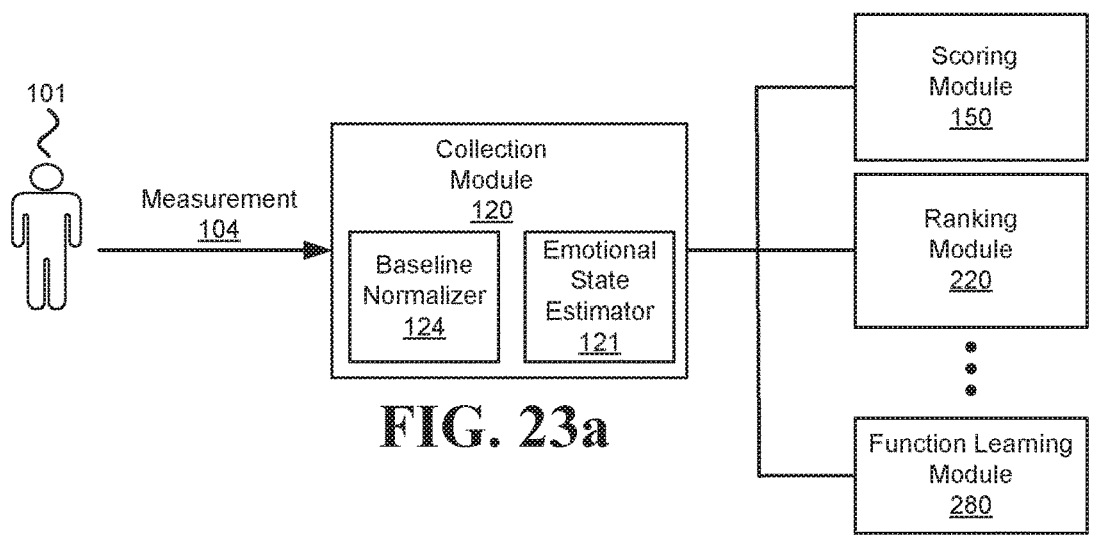
FIG. 23a illustrates a system in which the collection module processes measurements of affective response.
Figure 23B:
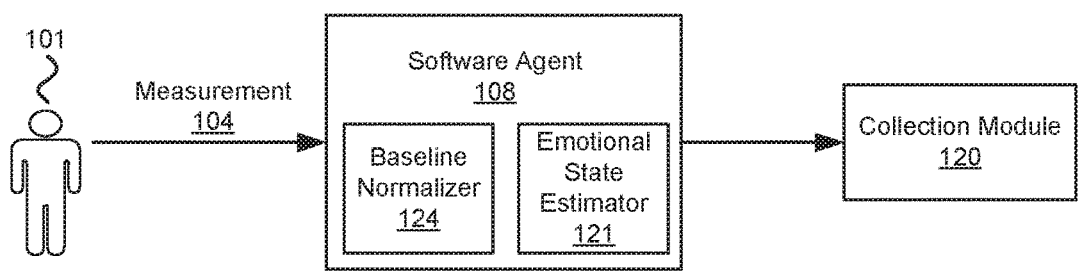
FIG. 23b illustrates a system in which a software agent processes measurements of affective response.

Depending on the embodiment, the processing of measurements of affective response of users may be done in a centralized manner, by the collection module 120, or in a distributed manner, e.g., by software agents operating on behalf of the users. Thus, in some embodiments, various processing methods described in this disclosure are performed in part or in full by the collection module 120, while in others the processing is done in part or in full by the software agents. FIG. 23*a* and FIG. 23*b* illustrate different scenarios that may occur in embodiments described herein, in which the bulk of the processing of measurements of affective response is done either by the collection module 120 or by software agent 108.

FIG. 23*a* illustrates one embodiment in which the collection module 120 does at least some, if not most, of the processing of measurements of affective response that may be provided to various modules in order to compute crowd-based results. The user 101 provides measurement 104 of affective response to the collection module 120. Optionally, the measurement 104 may be a raw measurement (i.e., it includes values essentially as they were received from a sensor) and/or a partially processed measurement (e.g., subjected to certain filtration and/or noise removal procedures). In this embodiment, the collection module 120 may include various modules that may be used to process measurements such as Emotional State Estimator (ESE) 121 and/or baseline normalizer 124. Optionally, in addition to, or instead of, the emotional state estimator 121 and/or the baseline normalizer 124, the collection module 120 may include other modules that perform other types of processing of measurements. For example, the collection module 120 may include modules that compute other forms of affective values described in Section 2—Measurements of Affective Response and/or modules that perform various forms of preprocessing of raw data. In this embodiment, the measurement provided to other modules by the collection module 120 may be considered a processed value and/or an affective value. For example, it may be an affective value representing emotional state 105 and/or normalized measurement 106.

FIG. 23b illustrates one embodiment in which the software agent 108 does at least some, if not most, of the processing of measurements of affective response of the user 101. The user 101 provides measurement 104 of affective response to the software agent 108 which operates on behalf of the user. Optionally, the measurement 104 may be a raw measurement (i.e., it includes values essentially as they were received from a sensor) and/or a partially processed measurement (e.g., subjected to certain filtration and/or noise removal procedures). In this embodiment, the software agent 108 may include various modules that may be used to process measurements such as emotional state estimator 121 and/or baseline normalizer 124. Optionally, in addition to, or instead of, the emotional state estimator 121 and/or the baseline normalizer 124, the software agent 108 may include other modules that perform other types of processing of measurements. For example, the software agent 108 may include modules that compute other forms of affective values described in Section 2—Measurements of Affective Response and/or modules that perform various forms of preprocessing of raw data. In this embodiment, the measurement provided to the collection module 120 may be considered a processed value and/or an affective value. For example, it may be an affective value representing emotional state 105 and/or normalized measurement 106.

Figure 24:
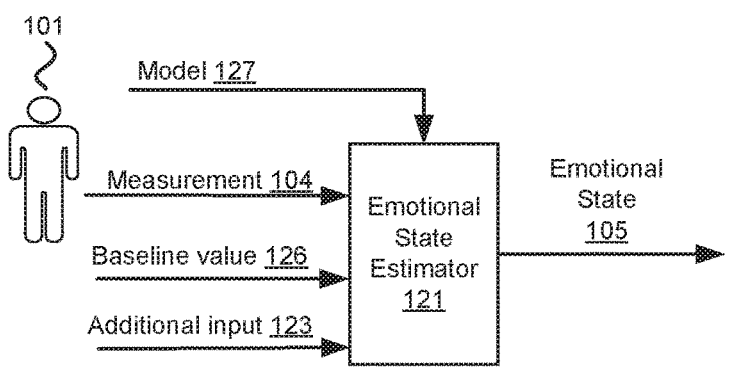
FIG. 24 illustrates an embodiment of an Emotional State Estimator (ESE)

FIG. 24 illustrates one embodiment of the Emotional State Estimator (ESE) 121. In FIG. 24, the user 101 provides a measurement 104 of affective response to emotional state estimator 121. Optionally, the emotional state estimator 121 may receive other inputs such as a baseline affective response value 126 and/or additional inputs 123 which may include contextual data about the measurement e.g., a situation the user was in at the time and/or contextual information about the experience to which the measurement 104 corresponds. Optionally, the emotional state estimator may utilize model 127 in order to estimate the emotional state 105 of the user 101 based on the measurement 104. Optionally, the model 127 is a general model, e.g., which is trained on data collected from multiple users. Alternatively, the model 127 may be a personal model of the user 101, e.g., trained on data collected from the user 101. Additional information regarding how emotional states may be estimated and/or represented as affective values may be found in this disclosure at least in Section 2—Measurements of Affective Response.

Figure 25:
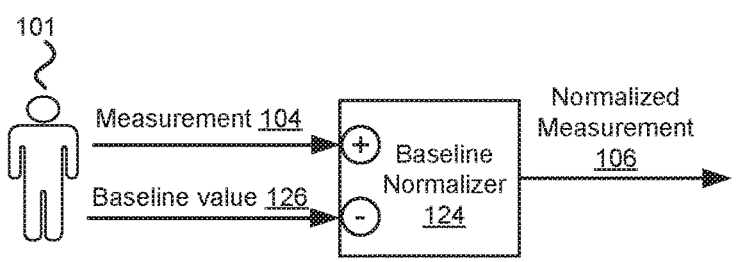
FIG. 25 illustrates an embodiment of a baseline normalizer.

FIG. 25 illustrates one embodiment of the baseline normalizer 124. In this embodiment, the user 101 provides a measurement 104 of affective response and the baseline affective response value 126, and the baseline normalizer 124 computes the normalized measurement 106.

In one embodiment, normalizing a measurement of affective response utilizing a baseline affective response value involves subtracting the baseline affective response value from the measurement. Thus, after normalizing with respect to the baseline, the measurement becomes a relative value, reflecting a difference from the baseline. In another embodiment, normalizing a measurement with respect to a baseline involves computing a value based on the baseline and the measurement such as an average of both (e.g., geometric or arithmetic average).

In some embodiments, a baseline affective response value of a user refers to a value that may represent an affective response of the user under typical conditions. Optionally, a baseline affective response value of a user, that is relevant to a certain time, is obtained utilizing one or more measurements of affective response of the user taken prior to a certain time. For example, a baseline corresponding to a certain time may be based on measurements taken during a window spanning a few minutes, hours, or days prior to the certain time. Additionally or alternatively, a baseline affective response value of a user may be predicted utilizing a model trained on measurements of affective response of the user and/or other users. In some embodiments, a baseline affective response value may correspond to a certain situation, and represent a typical affective response of a user when in the certain situation. Additional discussion regarding baselines, how they are computed, and how they may be utilized may be found in section 2—Measurements of Affective Response, and elsewhere in this disclosure.

In some embodiments, processing of measurements of affective response, performed by the software agent 108 and/or the collection module 120, may involve weighting and/or selection of the measurements. For example, at least some of the measurements 110 may be weighted such that the measurements of each user have the same weight (e.g., so as not to give a user with many measurements more influence on the computed score). In another example, measurements are weighted according to the time they were taken, for instance, by giving higher weights to more recent measurements (thus enabling a result computed based on the measurements 110 to be more biased towards the current state rather than a historical one). Optionally, measurements with a weight that is below a threshold and/or have a weight of zero, are not forwarded to other modules in order to be utilized for computing crowd-based results.

10—Scoring

Various embodiments described herein may include a module that computes a score for an experience based on measurements of affective response of users who had the experience (e.g., the measurements may correspond to events in which users have the experience). Examples of scoring modules include scoring module 150 and dynamic scoring module 180.

In some embodiments, a score for an experience computed by a scoring module is computed solely based on measurements of affective response corresponding to events in which users have the experience. In other embodiments, a score computed for the experience by a scoring module may be computed based on the measurements and other values, such as baseline affective response values or prior measurements. In one example, a score computed by scoring module 150 is computed based on prior measurements, taken before users have an experience, and contemporaneous measurements, taken while the users have the experience. This score may reflect how the users feel about the experience.

When measurements of affective response correspond to a certain experience, e.g., they are taken while and/or shortly after users have the certain experience, a score computed based on the measurements may be indicative of an extent of the affective response users had to the certain experience. For example, measurements of affective response of users taken while the users were at a certain location may be used to compute a score that is indicative of the affective response of the users to being in the certain location. Optionally, the score may be indicative of the quality of the experience and/or of the emotional response users had to the experience (e.g., the score may express a level of enjoyment from having the experience).

In one embodiment, a score for an experience that is computed by a scoring module, such as the score 164, may include a value representing a quality of the experience as determined based on the measurements 110. Optionally, the score includes a value that is at least one of the following:

a physiological signal, a behavioral cue, an emotional state, and an affective value. Optionally, the score includes a value that is a function of measurements of at least five users. Optionally, the score is indicative of the significance of a hypothesis that the at least five users had a certain affective response. In one example, the certain affective response is manifested through changes to values of at least one of the following: measurements of physiological signals, and measurements of behavioral cues.

In one embodiment, a score for an experience that is computed based on measurements of affective response is a statistic of the measurements. For example, the score may be the average, mean, and/or mode of the measurements. In other examples, the score may take the form of other statistics, such as the value of a certain percentile when the measurements are ordered according to their values.

In another embodiment, a score for an experience that is computed from measurements of affective response is computed utilizing a function that receives an input comprising the measurements of affective response, and returns a value that depends, at least to some extent, on the value of the measurements. Optionally, the function according to which the score is computed may be non-trivial in the sense that it does not return the same value for all inputs. Thus, it may be assumed that a score computed based on measurements of affective response utilizes at least one function for which there exist two different sets of inputs comprising measurements of affective response, such that the function produces different outputs for each set of inputs. Depending on the characteristics of the embodiments, various functions may be utilized to compute scores from measurements of affective response; the functions may range from simple statistical functions, as mentioned above, to various arbitrary arithmetic functions (e.g., geometric or harmonic means), and possibly complex functions that involve statistical tests such as likelihood ratio test, computations of p-values, and/or other forms of statistical significance.

In yet another embodiment, a function used to compute a score for an experience based on measurements of affective response involves utilizing a machine learning-based predictor that receives as input measurements of affective response and returns a result that may be interpreted as a score. The objective (target value) computed by the predictor may take various forms, possibly extending beyond values that may be interpreted as directly stemming from emotional responses, such as a degree the experience may be considered "successful" or "profitable". For example, with an experience that involves watching a movie or a concert, the score computed from the measurements may be indicative of how much income can be expected from the experience (e.g., box office returns for a movie or concert) or how long the experience will run (e.g., how many shows are expected before attendance dwindles below a certain level).

In one embodiment, a score for an experience that is computed based on measurements of affective response is obtained by providing the measurements as input to a computer program that may utilize the measurements and possibly other information in order to generate an output that may be utilized, possibly after further processing, in order to generate the score. Optionally, the other information may include information related to the users from whom the measurements were taken and/or related to the events to which the measurements correspond. Optionally, the computer program may be run as an external service, which is not part of the system that utilizes the score. Thus, the system may utilize the score without possessing the actual logic and/or all the input values used to generate the score.

For example, the score may be generated by an external "expert" service that has proprietary information about the users and/or the events, which enables it to generate a value that is more informative about the affective response to an experience to which the measurements correspond.

Some experiences may be considered complex experiences that include multiple "smaller" experiences. When computing a score for such a complex experience, there may be different approaches that may be taken.

In one embodiment, the score for the complex experience is computed based on measurements of affective response corresponding to events that involve having the complex experience. For example, a measurement of affective response corresponding to an event involving a user having the complex experience may be derived from multiple measurements of the user taken during at least some of the smaller experiences comprised in the complex experience. Thus, the measurement represents the affective response of the user to the complex experience.

In another embodiment, the score for the complex experience is computed by aggregating scores computed for the smaller experiences. For example, for each experience comprised in the complex experience, a separate score is computed based on measurements of users who had the complex experience, which were taken during and/or shortly after the smaller experience (i.e., they correspond to events involving the smaller experience).

The score for the complex experience may be a function of the scores for the smaller experiences such as a weighted average of those scores. Optionally, various weighting schemes may be used to weight the scores of the smaller experiences. In one embodiment, the scores of the smaller experiences may be weighted proportionally to their average duration and/or the average dominance levels associated with events involving each smaller experience. In another embodiment, scores of smaller experiences may have preset weights. For example, the score for a complex experience involving going on a vacation may be computed by weighting scores of smaller experiences comprised in the complex experience as follows: a weight of 20% for the score given to the flights to and from the destination, a weight of 30% is given to the stay at the hotel, a weight of 20% to the score given to being at the beach, and a weight of 30% given to the score given to going out (restaurants, clubs, etc.) It is to be noted that in this example, each smaller experience may in itself be a complex experience that is based on multiple experiences that are even smaller.

In some embodiments, the score for the complex experience is computed utilizing a predictor. Optionally, a model utilized by the predictor is trained on samples comprising descriptions of the smaller experiences comprised in the complex experience and/or scores of the smaller experiences and labels that include a score for a complex experience that comprises the smaller experiences. In one example, the score for the complex experience may be determined by an expert (e.g., a human annotator or a software agent). In another example, the score for the complex experience may be determined based on statistics describing the complex experience (e.g., average duration users spend on a vacation and/or the average amount of money they spend when going out to a certain town).

Scores computed based on measurements of affective response may represent different types of values. The type of value a score represents may depend on various factors such as the type of measurements of affective response used to compute the score, the type of experience corresponding to the score, the application for which the score is used, and/or the user interface on which the score is to be presented.

In one embodiment, a score for an experience that is computed from measurements of affective response may be expressed in the same units as the measurements. Furthermore, a score for an experience may be expressed as any type of affective value that is described herein. In one example, the measurements may represent a level of happiness, and the score too may represent a level of happiness, such as the average of the measurements. In another example, if the measurements represent sizes or extents of smiles of users, the score too may represent a size of a smile, such as the median size of smile determined from the measurements. In still another example, if the measurements represent a physiological value, such as heart rates (or changes to heart rates), the score too may be expressed in the same terms (e.g., it may be the average change in the users' heart rates).

In another embodiment, a score for an experience may be expressed in units that are different from the units in which the measurements of affective response used to compute it are expressed. Optionally, the different units may represent values that do not directly convey an affective response (e.g., a value indicating qualities such as utility, profit, and/or a probability). Optionally, the score may represent a numerical value corresponding to a quality of an experience (e.g., a value on a scale of 1 to 10, or a rating of 1 to 5 stars). Optionally, the score may represent a numerical value representing a significance of a hypothesis about the experience (e.g., a p-value of a hypothesis that the measurements of users who had the experience indicate that they enjoyed the experience). Optionally, the score may represent a numerical value representing a probability of the experience belonging to a certain category (e.g., a value indicating whether the experience belongs to the class "popular experiences"). Optionally, the score may represent a similarity level between the experience and another experience (e.g., the similarity of the experience to a certain "blockbuster" experience). Optionally, the score may represent certain performance indicator such as projected sales (e.g., for product, movie, restaurant, etc.) or projected virality (e.g., representing the likelihood that a user will share the fact of having the experience with friends).

In still another embodiment, a score for an experience may represent a probability related to an experience. In one example, a score derived from measurements of affective response comprising EEG measurements of a group of users eating at a restaurant may be expressed as a probability that the users in the group will return to the restaurant within a week. In another example, a score for an experience may be generated from measurements of users taken while they have the experience, and represents a probability that the users will finish having the experience (and not stop in the middle).

In yet another embodiment, a score for an experience may represent a typical and/or average extent of an emotional response of the users who contributed measurements used to compute the score. Optionally, the emotional response corresponds to an increase or decrease in the level of at least one of the following: pain, anxiety, annoyance, stress, aggression, aggravation, fear, sadness, drowsiness, apathy, anger, happiness, content, calmness, attentiveness, affection, and excitement.

A score for an experience may also be expressed in various ways in the different embodiments. Optionally, expressing a score involves presenting it to a user via a user interface (e.g., a display). The way a score is expressed may depend on various factors such as the type of value the score represents, the type of experience corresponding to the score, the application for which the score is used, and/or the user interface on which the score is to be presented.

In one embodiment, a score for an experience is expressed by presenting its value in essentially the same form it is received. In another embodiment, a score for an experience may be expressed as text, and it may indicate a property related to the experience such as a quality, quantity, and/or rating of the experience. In still another embodiment, a score for an experience may be expressed using an image, sound effect, music, animation effect, and/or video. In yet another embodiment, a score for an experience may be expressed as a distribution and/or histogram that involves a plurality of affective responses (e.g., emotional states) that are associated with how the experience makes users who have it feel. In some embodiments, a score for an experience may be presented by overlaying the score (e.g., an image representing the score) on a map or image in which multiple experiences may be presented.

In some embodiments, a measurement of affective response of a user that is used to compute a crowd-based result corresponding to the experience (e.g., a score for an experience or a ranking of experiences) may be considered "contributed" by the user to the computation of the crowd-based result. Similarly, in some embodiments, a user whose measurement of affective response is used to compute a crowd-based result may be considered as a user who contributed the measurement to the result. Optionally, the contribution of a measurement may be considered an action that is actively performed by the user (e.g., by prompting a measurement to be sent) and/or passively performed by the user (e.g., by a device of the user automatically sending data that may also be collected automatically). Optionally, the contribution of a measurement by a user may be considered an action that is done with the user's permission and/or knowledge (e.g., the measurement is taken according to a policy approved by the user), but possibly without the user being aware that it is done. For example, a measurement of affective response may be taken in a manner approved by the user, e.g., the measurement may be taken according to certain terms of use of a device and/or service that were approved by the user, and/or the measurement is taken based on a configuration or instruction of the user. Furthermore, even though a user may not be consciously aware that the measurement was taken, used for the computation of a crowd-based result like a score, and/or that the result was disclosed, in some embodiments, that measurement of affective response is considered contributed by the user.

Disclosing a crowd-based result such as a score for an experience may involve, in some embodiments, providing information about the result to a third party, such as a value of a score, and/or a statistic computed from the result (e.g., an indication of whether a score reaches a certain threshold). Optionally, a score for an experience that is disclosed to a third party or likely to be disclosed to a third party may be referred to as a "disclosed score", a "disclosed crowd-based score", and the like. Optionally, disclosing a crowd-based result may be referred herein as "forwarding" the result. For example, disclosing a score for an experience may be referred to herein as "forwarding" the score. Optionally, a "third party" may refer to any entity that does not have the actual values of measurements of affective response used to compute a crowd-based result from the measurements. Thus, for example, a user who only has knowledge of his or her measurements may be considered a third party if the user receives a score that was computed based on measurements of other users too. In some embodiments, disclosing a crowd-based result entails storing the result in a database that may be accessed by a third party; thus, disclosing a crowd-based result such as a score for an experience may not necessary involve providing a value of the crowd-based result to a third party, rather just putting the value in a condition such that it may be potentially accessed by the third party.

In addition to providing a value corresponding to a crowd-based result such as a score for an experience, or instead of providing the value, in some embodiments, disclosing the result may involve providing information related to the crowd-based result and/or the computation of the crowd-based result. In one example, this information may include one or more of the measurements of affective response used to compute the crowd-based result, and/or statistics related to the measurements (e.g., the number of users whose measurements were used, or the mean and/or variance of the measurements). In another example, the information may include data identifying one or more of the users who contributed measurements of affective response used to compute the crowd-based result and/or statistics about those users (e.g., the number of users, and/or a demographic breakdown of the users).

In some embodiments, disclosing a crowd-based result, such as a score for an experience, may involve presenting the result using a device that conveys information; for example, a smartphone, a wearable device, augmented reality device (e.g., glasses with augmented images), a virtual reality device. Optionally, a crowd-based result may be disclosed via a device that emits sound (e.g., headphones). Optionally, a crowd-based result may be disclosed using haptic feedback. For example, a haptic feedback glove may provide a distinct vibration indicative of a score for an experience when a user's hand is pointed or placed in a position representing the experience (e.g., the hand may be pointing to an object presented in a virtual reality).

In one embodiment, additional data disclosed in addition to, or instead of, a crowd-based result, such as a score for an experience, may include a value indicating the significance of the result. Optionally, the significance may be determined utilizing various statistical tests. Optionally, the significance may be expressed utilizing various values derived from statistical tests, such as p-values, q-values, false discovery rates (FDRs), error bars, and/or confidence intervals.

In another embodiment, additional data disclosed in addition to, or instead of, a score may include a value indicating the risk to privacy associated with disclosing the score. For example, the additional information may indicate the expected amount of information that may be learned about one or more users due to disclosure of the score.

In order to compute a score, scoring modules may utilize various types of scoring approaches. One example of a scoring approach involves generating a score from a statistical test, such as the scoring approach used by the statistical test module 152 and/or statistical test module 158. Another example of a scoring approach involves generating a score utilizing an arithmetic function, such as a function that may be employed by the arithmetic scorer 162.

Figure 26A:
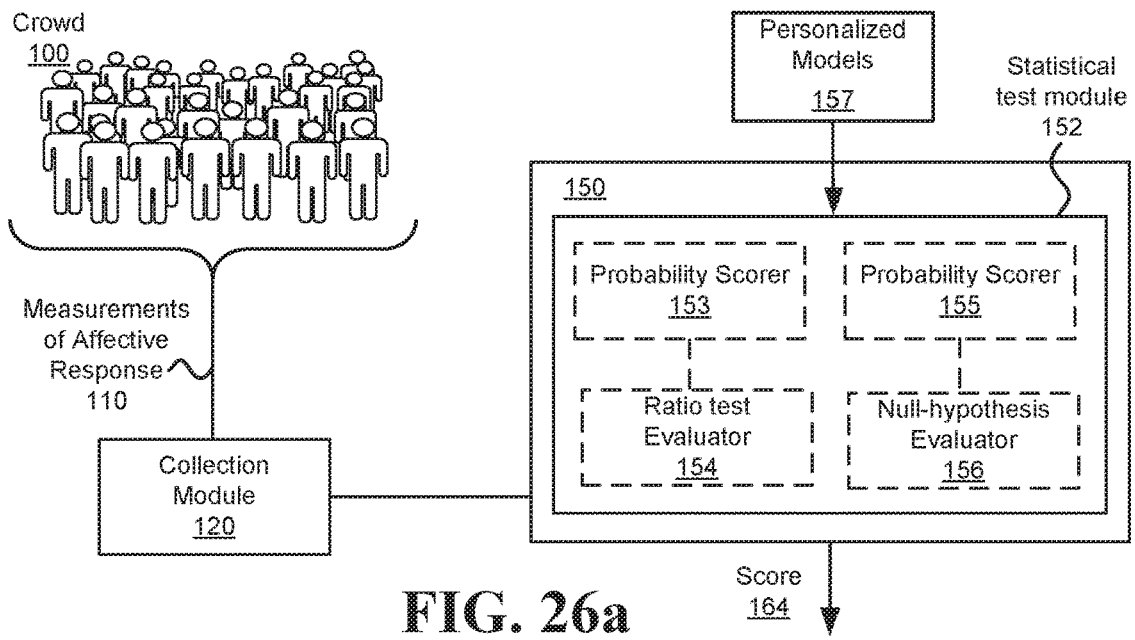
FIG. 26a illustrates an embodiment of a scoring module involving a statistical test module that may use personalized models.
Figure 26B:
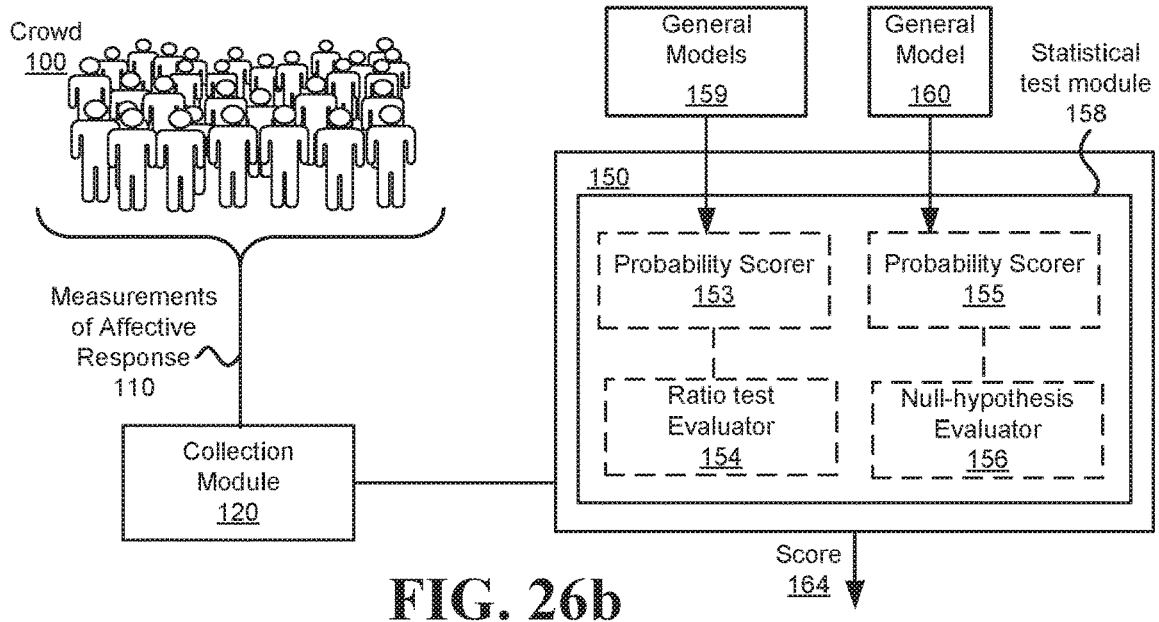
FIG. 26b illustrates an embodiment of a scoring module involving a statistical test module that may use general models.

FIG. 26a and FIG. 26b each illustrates one embodiment in which a scoring module (scoring module 150 in the illustrated embodiments) utilizes a statistical test module to compute a score for an experience (score 164 in the illustrated embodiments). In FIG. 26a, the statistical test module is statistical test module 152, while in FIG. 26b, the statistical test module is statistical test module 158. The statistical test modules 152 and 158 include similar internal components, but differ based on models they utilize to compute statistical tests. The statistical test module 152 utilizes personalized models 157 while the statistical test module 158 utilizes general models 159 (which include a first model and a second model).

In some embodiments, the statistical test modules 152 and 158 each may perform at least one of two different statistical tests in order to compute a score based on a set of measurements of users: a hypothesis test, and a test involving rejection of a null hypothesis.

In some embodiments, performing a hypothesis test utilizing statistical test module 152, is done utilizing a probability scorer 153 and a ratio test evaluator 154. The probability scorer 153 is configured to compute for each measurement of a user, from among the users who provided measurements to compute the score, first and second corresponding values, which are indicative of respective first and second probabilities of observing the measurement based on respective first and second personalized models of the user. Optionally, the first and second personalized models of the users are from among the personalized models 157. Optionally, the first and second personalized models are trained on data comprising measurements of affective response of the user taken when the user had positive and non-positive affective responses, respectively.

The ratio test evaluator 154 is configured to determine the significance level for a hypothesis based on a ratio between a first set of values comprising the first value corresponding to each of the measurements, and a second set of values comprising the second value corresponding to each of the measurements. Optionally, the hypothesis supports an assumption that, on average, the users who contributed measurements to the computation of the score had a positive affective response to the experience. Optionally, the non-positive affective response is a manifestation of a neutral emotional state or a negative emotional state. Thus, if the measurements used to compute the score are better explained by the first model of each user (corresponding to the positive emotional response), then the ratio computed by the ratio evaluator 154 will be positive and/or large. The greater the value of the ratio, the more the score will indicate that the hypothesis is true and that the measurements of the users represent a positive affective response to the experience. However, if the measurements were not positive, it is likely that the ratio will be negative and/or small, representing that the hypothesis should be rejected in favor of a competing hypothesis that states that the users had a non-positive affective response to the experience. Optionally, a score computed based on the ratio is proportional to the logarithm of the ratio. Thus, the stronger the notion to accept the hypothesis based on the hypothesis test, the greater the computed score.

In some embodiments, performing a hypothesis test utilizing statistical test module 158, is done in a similar fashion to the description given above for performing the same test with the statistical test module 152, but rather than using the personalized models 157, the general models 159 are used instead. When using the statistical test module 158, the probability scorer 153 is configured to compute for each measurement of a user, from among the users who provided measurements to compute the score, first and second corresponding values, which are indicative of respective first and second probabilities of observing the measurement based on respective first and second models belonging to the general models 159. Optionally, the first and second models are trained on data comprising measurements of affective response of users taken while the users had positive and non-positive affective responses, respectively.

The ratio test evaluator 154 is configured to determine the significance level for a hypothesis based on a ratio between a first set of values comprising the first value corresponding to each of the measurements, and a second set of values comprising the second value corresponding to each of the measurements. Optionally, the hypothesis supports an assumption that, on average, the users who contributed measurements to the computation of the score had a positive affective response to the experience. Optionally, the non-positive affective response is a manifestation of a neutral emotional state or a negative emotional state. Thus, if the measurements used to compute the score are better explained by the first model from the general models 159 (which corresponds to the positive emotional response), then the ratio computed by the ratio test evaluator 154 will be positive.

In one embodiment, the hypothesis is a supposition and/or proposed explanation used for evaluating the measurements of affective response. By stating that the hypothesis supports an assumption, it is meant that according to the hypothesis, the evidence (e.g., the measurements of affective response and/or baseline affective response values) exhibit values that correspond to the supposition and/or proposed explanation.

In one embodiment, the ratio test evaluator 154 utilizes a log-likelihood test to determine, based on the first and second sets of values, whether the hypothesis should be accepted and/or the significance level of accepting the hypothesis. If the distribution of the log-likelihood ratio corresponding to a particular null and alternative hypothesis can be explicitly determined, then it can directly be used to form decision regions (to accept/reject the null hypothesis). Alternatively or additionally, one may utilize Wilk's theorem which states that as the sample size approaches infinity, the test statistic $-\log(\Lambda)$, with $\Lambda$ being the log-likelihood value, will be $\chi^2$-distributed. Optionally, the score is computed by a scoring module that utilizes a hypothesis test is proportional to the test statistic $-\log(\Lambda)$.

In some embodiments, performing a statistical test that involves rejecting a null hypothesis utilizing statistical test module 152, is done utilizing a probability scorer 155 and a null-hypothesis evaluator 156. The probability scorer 155 is configured to compute, for each measurement of a user, from among the users who provided measurements to compute the score, a probability of observing the measurement based on a personalized model of the user. Optionally, the personalized model of the user is trained on training data comprising measurements of affective response of the user taken while the user had a certain affective response. Optionally, the certain affective response is manifested by changes to values of at least one of the following: measurements of physiological signals, and measurements of behavioral cues. Optionally, the changes to the values are manifestations of an increase or decrease, to at least a certain extent, in a level of at least one of the following emotions: happiness, content, calmness, attentiveness, affection, tenderness, excitement, pain, anxiety, annoyance, stress, aggression, fear, sadness, drowsiness, apathy, and anger.

The null-hypothesis evaluator 156 is configured to determine the significance level for a hypothesis based on probabilities computed by the probability scorer 155 for the measurements of the users who contributed measurements for the computation of the score. Optionally, the hypothesis is a null hypothesis that supports an assumption that the users who contributed measurements of affective response to the computation of the score had the certain affective response when their measurements were taken, and the significance level corresponds to a statistical significance of rejecting the null hypothesis. Optionally, the certain affective response is a neutral affective response. Optionally, the score is computed based on the significance which is expressed as a probability, such as a p-value. For example, the score may be proportional to the logarithm of the p-value.

In one example, the certain affective response corresponds to a manifestation of a negative emotional state. Thus, the stronger the rejection of the null hypothesis, the less likely it is that the users who contributed the measurements were in fact in a negative emotional state, and thus, the more positive the score may be (e.g., if expressed as a log of a p-value of the null hypothesis).

In some embodiments, performing a statistical test that involves rejecting a null hypothesis utilizing statistical test module 158, is done in a similar fashion to the description given above for performing the same test with the statistical test module 152, but rather than using the personalized models 157, the general model 160 is used instead.

The probability scorer 155 is configured to compute, for each measurement of a user, from among the users who provided measurements to compute the score, a probability of observing the measurement based on the general model 160. Optionally, the general model 160 is trained on training data comprising measurements of affective response of users taken while the users had the certain affective response.

The null-hypothesis evaluator 156 is configured to determine the significance level for a hypothesis based on probabilities computed by the probability scorer 155 for the measurements of the users who contributed measurements for the computation of the score. Optionally, the hypothesis is a null hypothesis that supports an assumption that the users of whom the measurements were taken had the certain affective response when their measurements were taken, and the significance level corresponds to a statistical significance of rejecting the null hypothesis.

In some embodiments, a statistical test module such as the statistical test modules 152 and/or 158 are configured to determine whether the significance level for a hypothesis reaches a certain level. Optionally, the significance level reaching the certain level indicates at least one of the following: a p-value computed for the hypothesis equals, or is below, a certain p-value, and a false discovery rate computed for the hypothesis equals, or is below, a certain rate. Optionally, the certain p-value is a value greater than 0 and below 0.33, and the certain rate is a value greater than 0 and below 0.33.

In some cases, the fact that significance for a hypothesis is computed based on measurements of a plurality of users increases the statistical significance of the results of a test of the hypothesis. For example, if the hypothesis is tested based on fewer users, a significance of the hypothesis is likely to be smaller than when it is tested based on measurements of a larger number of users. Thus, it may be possible, for example, for a first significance level for a hypothesis computed based on measurements of at least ten users to reach a certain level. However, on average, a second significance level for the hypothesis, computed based on the measurements of affective response of a randomly selected group of less than five users out of the at least ten users, will not reach the certain level. Optionally, the fact the second significance level does not reach the certain level indicates at least one of the following: a p-value computed for the hypothesis is above the certain p-value, and a false discovery rate computed for the hypothesis is above the certain rate.

Figure 26C:
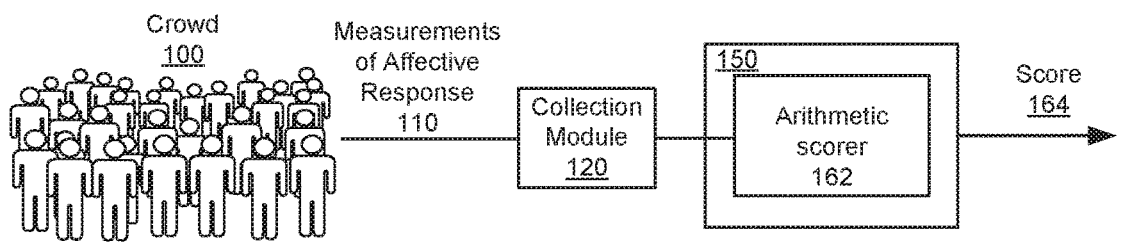
FIG. 26c illustrates an embodiment of a scoring module involving an arithmetic scorer.

FIG. 26c illustrates one embodiment in which a scoring module utilizes the arithmetic scorer 162 in order to compute a score for an experience. The arithmetic scorer 162 receives measurements of affective response from the collection module 120 and computes the score 164 by applying one or more arithmetic functions to the measurements. Optionally, the arithmetic function is a predetermined arithmetic function. For example, the logic of the function is known prior to when the function is applied to the measurements. Optionally, a score computed by the arithmetic function is expressed as a measurement value which is greater than the minimum of the measurements used to compute the score and lower than the maximum of the measurements used to compute the score. In one embodiment, applying the predetermined arithmetic function to the measurements comprises computing at least one of the following: a weighted average of the measurements, a geometric mean of the measurements, and a harmonic mean of the measurements. In another embodiment, the predetermined arithmetic function involves applying mathematical operations dictated by a machine learning model (e.g., a regression model). In some embodiments, the predetermined arithmetic function applied by the arithmetic scorer 162 is executed by a set of instructions that implements operations performed by a machine learning-based predictor that receives the measurements used to compute a score as input.

In some embodiments, a scoring module may compute a score for an experience based on measurements that have associated weights. In one example, the weights may be determined based on the age of the measurements (e.g., when the scoring module is the dynamic scoring module 180). In another example, the weights may be assigned by the personalization module 130, and/or may be determined based on an output generated by the personalization module 130, in order for the scoring module to compute a personalized score. The scoring modules described above can easily be adapted by one skilled in the art in order to accommodate weights. For example, the statistical test modules may utilize weighted versions of the hypothesis test (i.e., a weighted version of the likelihood ratio test and/or the test for rejection of a null hypothesis). Additionally, many arithmetic functions that are used to compute scores can be easily adapted to a case where measurements have associated weights. For example, instead of a score being computed as a regular arithmetic average, it may be computed as a weighted average.

Herein a weighted average of a plurality of measurements may be any function that can be described as a dot product between a vector of real-valued coefficients and a vector of the measurements. Optionally, the function may give at least some of the measurements a different weight (i.e., at least some of the measurements may have different valued corresponding coefficients).

11—Determining Significance of Results

Embodiments described herein may involve a determination of significance (may also be referred to as "statistical significance") of information derived from measurements of affective response of users, such as significance of scores, ranks of experiences, and/or other values derived from the measurements. Additionally or alternatively, the determination may pertain to significance of differences between the ranks, the scores, and/or the other values derived from the measurements. Optionally, in some cases, significance may be expressed utilizing various values derived from statistical tests, such as p-values, q-values, and false discovery rates (FDRs).

Significance may also come into play in some cases, for determining ranges, error-bars, and/or confidence intervals for various values derived from the measurements of affective response. In such cases, the significance may indicate the variability of the data, and help guide decisions based on it. In one example, locations are scored based on a scale from 1 to 10 representing excitement of users at the locations. A first location may be given a score of 6, while a second location may be given a score of 7. In this case, the second location may be preferable to the first. However, if the 95% confidence level for the first location is 5-7, and for the second location, it is 4-8, then a person wanting to be confident of not having a bad experience may select the first location, nonetheless. Making such a choice would minimize the chance of having a bad experience (a score of 4 on the scale of 1 to 10) at the expense of reducing the chance of having a very good experience (score of 8 on the scale of 1 to 10).

After having the blueprint provided herein and familiarizing with the inventive steps, those skilled in the art will recognize that there are various methods in the field of statistics, and also some developed in other disciplines, which may be used to determine significance of results. Below is a non-exhaustive description of some approaches that may be used in conjunction with the inventive concepts discussed herein; other methods may be applied to obtain similar results.

In various embodiments described herein, significance may be expressed in terms of p-values. Herein, a p-value is the probability of obtaining a test statistic result at least as extreme as the one that was actually observed, assuming that the null hypothesis is true. Depending on the embodiments, one skilled in the art may postulate various null hypotheses according to which the p-values are computed. Optionally, when p-values are used to denote a significance of a score, the lower the p-value, the more significant the results may be considered. In some embodiments, reaching a certain p-value such as 0.05 or less indicates that a certain significance is reached, and thus the results should be considered significant.

In some embodiments, determining significance requires performing multiple hypotheses testing, and thus may involve accounting and/or correcting for multiple comparisons. This can be achieved utilizing statistical approaches such as corrections for familywise error rates, e.g., by using Bonferroni correction and/or other similar approaches. In one example, determining a significance of a selection, such as which dish from among a plurality of dishes has the most favorable affective response may require correction for multiple comparisons. In this example, we may want to know whether the top ranked dish is truly exceptional, or maybe its favorable affective response is a statistical artifact. If, for instance, there were more than 20 dishes to select from, one would expect at least one to have affective response that is two standard deviations away above the mean. In this example, the significance of the results is likely to be more accurate if the number of dishes that are evaluated is a parameter that influences the significance value (as it would be when using Bonferroni correction or some other variant that corrects for familywise error rates).

In some embodiments, determining significance involves employing False Discovery Rate (FDR) control, which is a statistical method used in multiple hypotheses testing to correct for multiple comparisons. In a list of findings (i.e. studies where the null-hypotheses are rejected), FDR procedures are designed to control the expected proportion of incorrectly rejected null hypotheses ("false discoveries"). In some cases, FDR controlling procedures exert a less stringent control over false discovery compared to FamilyWise Error Rate (FWER) procedures (such as the Bonferroni correction), which seek to reduce the probability of even one false discovery, as opposed to the expected proportion of false discoveries.

Determining significance of results may be done, in some embodiments, utilizing one or more of the following resampling approaches: (1) Estimating the precision of sample statistics (medians, variances, percentiles) by using subsets of available data (jackknifing) or drawing randomly with replacement from a set of data points (bootstrapping); (2) Exchanging labels on data points when performing significance tests (permutation tests, also called exact tests, randomization tests, or re-randomization tests); and (3) Validating models by using random subsets (bootstrapping, cross validation).

In some embodiments, permutation tests are utilized to determine significance of results, such as significance of scores, ranking, and/or difference between values. Optionally, a permutation test (also called a randomization test, re-randomization test, or an exact test) may be any type of statistical significance test in which the distribution of the test statistic under the null hypothesis is obtained by calculating multiple values of the test statistic under rearrangements of the labels on the observed data points.

In some embodiments, significance is determined for a value, such as a score for an experience. For example, such significance may be determined by the score significance module 165. There are various ways in which significance of a score may be determined.

In one example, significance of a score for an experience is determined based on parameters of a distribution of scores for the experience. For example, the distribution may be determined based on historical values computed for the score for the experience based on previously collected sets of measurements of affective response. Optionally, the significance is represented as a p-value for observing a score that is greater (or lower) than the score. Additionally or alternatively, the significance may be expressed as a percentile and/or another quantile in which the score is positioned relative to the historic scores and/or the distribution. Optionally, in this example, a score with high significance is a score which is less often observed, e.g., an outlier or a score that is relatively higher or lower than most of the scores previously observed.

In another example, significance of a score for an experience may be determined by comparing it to another score for the experience. Optionally, the significance assigned to the score is based on the significance of the difference between the score and the other score as determined utilizing one or more of the statistical approaches described below. Optionally, the other score to which the score is compared is an average of other scores (e.g., computed for various other experiences) and/or an average of historical scores (e.g., computed for the experience). Optionally, in this example, a score with a high significance is a score for which the difference between the score and the other score to which it is compared is significant (e.g., represents at least a certain p-value or has at least a certain t-test statistic).

In yet another example, significance of a score for an experience may be determined by a resampling approach. For example, a set of measurements used to compute the score may be pooled along with other measurements of affective response (e.g., corresponding to other experiences and/or users), to form a larger pool of measurements. From this pool, various resampling approaches may be employed to determine the significance of the score. For example, resampling may involve repeatedly randomly selecting a subset of measurements from the pool, which has the same size as the set, and computing a score based on the subset. The distribution of scores that is obtained this way may be utilized to determine the significance of the score (e.g., by assigning a p-value to the score).

The significance of a result, such as a score for an experience, a difference between scores, and/or a difference in affective response to experiences, may be determined, in some embodiments, utilizing a statistical test. For example, a result may involve two or more scores of some sort, and the significance of a phenomenon related to the scores needs to be determined. The significance may relate to various factors such as whether the fact that one score is higher than the rest is likely a true phenomenon, or is this likely observed due to there being a limited number of measurements of affective response that are used to generate the results. In the latter case, were there a larger number of measurements, perhaps the results would be different. However, in the former case, increasing the number of measurements upon which results are drawn is not likely to change the results significantly (since they are based on observations of a true phenomenon). Following are some examples that may be utilized in various embodiments in this disclosure in which significance of a result (e.g., a crowd-based result) needs to be determined.

One scenario in which significance of results is tested relates to there being two (or more) sets of values that need to be compared. With this approach, certain statistics that characterize the sets of values are computed. For example, a statistic for a set of values may be the empirical mean of the values. Given the statistics computed for the sets of values, a parametric test may be used to answer certain questions about the sets of values. For example, whether they come from the same distribution, or whether the distributions from which the sets of values come have different parameters. Knowing the answer to such questions and/or how likely the answer to them is true, can be translated into a value indicative of the significance of the results (e.g., a p-value).

Consider a scenario in which first and second locations are scored according to measurements of affective response of users who were at the first and second locations. Based on the measurements it is determined that a first location-score for the first location is higher than a second location-score for the second location. In this example, a location-score may represent an average emotional response, such as an average level of happiness, determined from the measurements. It may be the case that the first location-score is higher than the second location-score, which would imply that the first location is preferable to the second location. However, if these results have low significance, for example, tests indicate that the first and second sets of measurements are similar, such as they likely come from the same distribution, then it may be desirable not to treat the first location as being preferable to the second location.

One parametric test approach often used to answer questions about differences between sets of values is a t-test, which herein refers to any statistical hypothesis test in which the test statistic follows a Student's t distribution if the null hypothesis is supported. A t-test can be used to determine if two sets of data are significantly different from each other, and is often applied when the test statistic would follow a normal distribution if the value of a scaling term in the test statistic were known. When the scaling term is unknown and is replaced by an estimate based on the data, the test statistic (under certain conditions) follows a Student's t distribution. Optionally, the test statistic is converted to a p-value that represents the significance.

The t-tests may be utilized in different ways for various tasks such as: a one-sample test of whether the mean of a population has a value specified in a null hypothesis, a two-sample test of the null hypothesis that the means of two populations are equal, a test of the null hypothesis that the difference between two responses measured on the same statistical unit has a mean value of zero, and a test of whether the slope of a regression line differs significantly from zero. Additionally, repeated t-tests may be conducted multiple times between various pairs of sets of measurements in order to evaluate relationships between multiple sets of measurements.

In one embodiment, a t-test is conducted as an independent samples t-test. This t-test approach is used when two separate sets of, what are assumed to be, independent and identically distributed samples are obtained, one sample from each of the two populations being compared. For example, suppose we are evaluating the effect of being in a first and second locations, and we use measurements of affective response of one hundred users, where 50 users were at the first location and the other 50 users were at the second location. In this case, we have two independent samples and could use the unpaired form of the t-test.

In another embodiment, a t-test is conducted as a paired samples t-test, which involves a sample of matched pairs of similar units, or one group of units that has been tested twice (a "repeated measures" t-test). A typical example of the repeated measures t-test would be where measurements of the same users are taken under different conditions (e.g., when in different locations). This may help remove variability (e.g., due to differences in the users), which does not directly concern the aspect being tested (e.g., there being different reactions to being in the different locations). By comparing the same user's measurements corresponding to different locations, we are effectively using each user as their own control.

In yet another embodiment, a t-test is conducted as an overlapping samples t-test, which is used when there are paired samples with data missing in one or the other samples (e.g., due to selection of "Don't know" options in questionnaires or because respondents are randomly assigned to a subset question).

In some embodiments, significance may be determined using other parametric methods besides t-tests, when certain conditions and/or assumptions are met.

In one example, significance may be determined using Welch's t-test (Welch-Aspin Test) which is a two-sample test, and is used to check the hypothesis that two populations have equal means. Welch's t-test may be considered an adaptation of Student's t-test, and is intended for us when the two samples have possibly unequal variances.

In another example, significance may be determined using a Z-test, which is any statistical test for which the distribution of the test statistic under the null hypothesis can be approximated by a normal distribution.

In still another example, significance may be determined using Analysis of variance (ANOVA), which includes a collection of statistical models used to analyze the differences between group means and their associated procedures (such as "variation" among and between groups). In the ANOVA setting, the observed variance in a particular variable is partitioned into components attributable to different sources of variation. In its simplest form, ANOVA provides a statistical test of whether or not the means of several groups are equal, and therefore, may be used to generalize the t-test to more than two groups.

The significance of a result, such as a score for an experience, a difference between scores, and/or a difference in affective response to experiences, may be determined, in some embodiments, utilizing non-parametric alternatives to the aforementioned parametric tests (e.g., t-tests). Optionally, this may be done due to certain assumptions regarding the data not holding (e.g., the normality assumption may not hold). In such cases, a non-parametric alternative to the t-test may be used. For example, for two independent samples when the data distributions are asymmetric (that is, the distributions are skewed) or the distributions have large tails, then the Wilcoxon rank-sum test (also known as the Mann-Whitney U test) can have higher power than the t-test. Another approach that may be used is the nonparametric counterpart to the paired samples t-test, which is the Wilcoxon signed-rank test for paired samples.

12—Factors of Events

As typically used herein, a factor of an event (also called an "event factor") represents an aspect of an event (also referred to as an attribute related to the event). When the context is clear, a factor of an event may be referred to as simply a "factor". The user corresponding to the event may have bias to the aspect represented by the factor, such that when the user is exposed to, and/or aware of, the factor, this may influence the affective response corresponding to the event (e.g., as determined from a measurement of the user corresponding to the event). Optionally, in a case in which an aspect of an event is expected (e.g., according to a model) to influence the affective response to the event, the factor corresponding to the aspect may be considered relevant to the event. Similarly, if an aspect of an event is not expected to influence the affective response to the event, the factor corresponding to the aspect may be considered irrelevant to the event. Herein, when a factor is considered relevant to an event, it may also be considered to "characterize" the event, and in a similar fashion, the event may be considered to be "characterized" by the factor.

An aspect of an event may relate to the user corresponding to the event, the experience corresponding to the event, and/or to the instantiation of the event. In addition to referring to a factor of an event as "representing an aspect of an event", a factor of an event may also be referred to as "describing the aspect of the event", and/or "corresponding to the aspect of the event". Additionally, by corresponding to certain aspects of an event, it may also be said that factors describe the event and/or correspond to it. In such a case, a factor may said to be "a factor of a certain event".

The terms "factor", "factor of an event", and the like, are to be interpreted similar to how the term "variable" may be used in the arts of programming and/or statistics. That is a factor may have an attribute it describes (i.e., the aspect of the event). For example, the attribute may describe the height of the user, the difficulty of the experience, and/or the temperature outside when the user had the experience. In some embodiments, factors may also have values, which are also referred to as weights. These values can describe a quantitative properties of the aspects to which the factors correspond. For example, values corresponding to the latter examples may be: 6'2", 8 on a scale from 1 to 10, and 87° F. Additionally or alternatively, a value associated to a factor of an event may be indicative of the importance and/or dominance of an aspect to which the factor corresponds (in this case the value is often referred to as a weight). Optionally, the weight associated with a factor of an event is indicative of the extent of influence the factor is likely to have on the affective response of the user corresponding to the event. Optionally, the weight associated with a factor of an event is indicative of how relevant that factor is to the event. For example, the higher the weight, the more relevant the factor is considered. Optionally, a factor that is irrelevant to an event receives a weight that is below a threshold. Optionally, a factor that is irrelevant to an event receives a weight of zero. Setting a value and/or weight of a factor may also be referred to herein as assigning the factor with a value and/or weight.

In some embodiments, a factor of an event may have an associated value that is an indicator of whether a certain aspect of the event happened. Optionally, the indicator may be a binary weight, which is zero if the aspect didn't happen and one if it did. For example, a factor of an event may correspond to the user missing a train (it either happened or not), to the user having slept at least eight hours the night before, or to the user having taken prescribed medicine for the day. Depending on the embodiment, some factors corresponding to indicators may instead, or in addition, be represented by a weight describing quantitative properties of the aspects to which the factors correspond. For example, instead of having an indicator on the hours of sleep as described in the example above, the weight of such a factor may be the value representing the actual number of hours of sleep the user had.

In some embodiments, factors of events are derived from descriptions of the events (descriptions of events are discussed further at least in section 4—Events). Optionally, descriptions of events are produced by an event annotator (e.g., event annotator 701) and/or utilize data from various sources, as described further in section 5—Identifying Events. In one embodiment, a description of an event in itself includes factors of the event and/or values of weights of factors. In another embodiment, analysis of the description, possibly involving various programs and/or predictors as described below, may be required in order to be able to assign factors to the event and/or determine weights of factors.

In some embodiments, assigning factors to events is done, at least in part, by software agents, which are described at least in section 7—Software Agents. For example, a software agent may perform some of the monitoring and/or analysis involved in generating a description of an event. Optionally, a software agent operating on behalf of a user may participate in the process of selecting which factors are relevant to an event and/or assigning weights to the factors. For example, the software agent may narrow down a list of possible factors provided by another program and select certain ones that best represent factors that may influence the affective response of the user. Optionally, this selection is based on past events corresponding to the user. Additionally or alternatively, the selection may be based on models of the user such as models describing biases of the user (e.g., the software agent may select factors for which the user has a bias that is not insignificant).

The following are non-limiting examples of some of the types of factors that may be utilized in some embodiments. These examples are presented for illustrative purposes, and are not comprehensive (other types of factors may be utilized in embodiments). Additionally, different embodiments may involve different subsets of the factors described below, and/or involve different variants of these factors.

Each event that involves having a certain experience may, in some embodiment, be characterized by factors corresponding to the certain experience. Optionally, at least one of the factors simply represents that fact that the event involved the certain experience. Optionally, a bias value that corresponds to that factor may express how a user feels about having the certain experience (thus, such a value may be considered a "personal score" of a user towards the certain experience). Below are additional examples of factors that may be related to the experience corresponding to an event.

In some embodiments, a factor of an event may describe an aspect of the experience corresponding to the event, such as what type of experience it is (e.g., mental activity, physical activity, a chore, or recreational), or where it takes place (e.g., at home, outside, at work). Factors may correspond to various attributes regarding the instantiation of the event, such as how long it took, its level of difficulty (e.g., game level), or its cost. Additional examples of factors may relate to the environment in which the experience took place, such as the temperature, noise level, and/or presence or absence of different people when the experience took place (e.g., was the user with a friend or alone).

A factor of an event may correspond to an object that is part of the experience corresponding to the event. In one example, the object might have been used by the user corresponding to the event (e.g., a broom, a ball, or sunscreen). In another example, the object may be something viewed by the user (e.g., an object the user sees while browsing a virtual store). In still another example, the experience corresponding to the event is a computer-related experience, and the factor may correspond to what hardware was used (e.g., what gadget or user-interface were involved) and/or what software was used as part of having the experience.

Furthermore, in some embodiments, factors of an event may correspond to a specific characteristic of an object involved in the experience corresponding to the event. Examples of characteristics that may be addressed in some embodiments include the following: weight, volume, size, time, shape, color, position, texture, density, smell, value, consistency, depth, temperature, function, appearance, price, age, and significance. For example, a factor corresponding to an experience involving buying a shirt may be the color of the shirt or the softness of the fabric. In another example, a factor corresponding to an experience involving drinking soup may be the temperature of the soup. In still another example, a factor corresponding to an experience involving drinking a glass of wine may be the age of the wine and/or the variety of the wine. In yet another example, a factor corresponding to an experience of buying a piece of jewelry may be the price of the piece of jewelry.

In some embodiments, factors may correspond to low-level features of content, such as illumination, color scheme, tempo, sound energy, and the like. Factors may also correspond to high-level concepts of an experience such as genre of content.

When an experience involves a substance that is consumed by the user corresponding to an event (e.g., a food item, a beverage, and/or another type of substance), a factor of the event may relate to the chemical composition of the substance, a nutritional value of the substance, and/or other physical properties of the substance. In one example, a factor describes properties such as the caloric intake involved in consuming the substance, the weight of carbohydrates in the substance, and/or the percentage of saturated fats in the substance. In another example, a factor may relate to certain ingredients in the substance (e.g., whether it includes alcohol, peanuts, or cilantro). In still another example, a factor may relate to the concentration of certain molecules and/or groups of chemicals in the substance (e.g., how many ppm of mercury or what concentration of salts).

Many experiences may involve people or other entities (e.g., robots or avatars) with whom a user having an experience may interact. Additionally or alternatively, the entities may be part of the experience in other ways (e.g., the experience involves viewing an image or video of an entity). Thus, in some embodiments, a factor corresponding to an experience may identify an entity (person or other) that is part of the experience a user has. Optionally, the factor may correspond to certain person (e.g., a certain friend of the user corresponding to an event or a certain teacher of the user) or to a certain entity that is not a real person (e.g., a certain robot, a certain operating system, and/or a certain software agent). A factor of an event may also correspond to groups of entities (e.g., a factor may correspond to the presence of policemen, party-goers, or experienced gamers, who are part of an experience in some way).

A factor of an event may correspond to a characteristic of an entity (person or other) that is part of the experience corresponding to the event. Examples of characteristics may include ethnicity, age, gender, appearance, religion, occupation, height, weight, hairstyle, spoken language, or demeanor. Additionally, a characteristic may correspond to the mood or emotional state of the entity and/or various behavioral traits (e.g., mannerisms that may be considered to be obsessive-compulsive). Optionally, determining behavioral traits may be done from observation of the entity, semantic analysis of communications involving the entity, analysis of voice and body language, reports from the user or other users. For example, U.S. Pat. No. 9,019,174 titled "Wearable emotion detection and feedback system" describes a device comprising cameras mounted on a user's headwear (e.g., glasses) which can be used to determine emotional states of people interacting with the user.

In some embodiments, the quality of the experience corresponding to an event may be considered a factor of the event. Optionally, the quality of the experience corresponding to the event is based on a score computed for the experience corresponding to the event. For example, the score may be a crowd-based score computed based on measurements of affective response of multiple users, such as at least 3, 5, 10, 100, or at least 1000 users, each of whom contributed a measurement of affective response corresponding to the experience towards the computation of the score.

In one example, affective response corresponding to an event that involves watching a live show may be dependent on the quality of the show, with a poor performance yielding a negative affective response to the show, while a good show may make the affective response more positive. It is to be noted that different users may react differently to a factor such as this, with some users, for example, being more disappointed than others by a low quality experience. In this example, the quality of the show may be determined based on a score computed from measurements of affective response of multiple users that are viewing the live show.

In another example, affective response corresponding to an event that involves eating a meal at a restaurant may be dependent on the quality of the food and/or the service at the restaurant. Optionally, the quality of the food and/or service is represented by a score computed based on measurements of affective response of other users who ate at the same restaurant.

In some embodiments, a factor of an event may describe an aspect of the user corresponding to the event, such as a situation in which the user is in during the instantiation of the event. The situation may refer to one or more various conditions that may influence the affective response of the user. Optionally, the situation may refer to a physical and/or mental state of the user. In one example, a situation of the user may be a physiological state such as having high blood pressure or a certain level of sugar in the blood. In another example, the situation may refer to a mental state of the user, such as being intoxicated, depressed, euphoric, or exhausted.

A situation a user is in may refer to certain condition the user is in while having an experience. For example, if the user is alone when having the experience, that may be considered a first situation. However, if the user is not alone, e.g., with one or more other people when having an experience, that may be considered a second situation, which is different from the first situation. In another example, being before a meal (e.g., when the user is likely hungry), is a different situation than being after eating a meal. In still another example, being employed vs. unemployed or in a relationship vs. single, are all examples of different situations a user may be in, which can each have a corresponding factor indicating if the user is in a certain situation during an instantiation of an event.

In some embodiments, a situation may correspond to awareness of the user to a certain characteristic of the user, such as demographic characteristic, a detail about the appearance of the user, etc. Optionally, being aware of the certain characteristic may influence the affective response of the user. For example, when having an experience, a user may be conscious about his/her age (e.g., whether it fits some norm), their appearance (e.g., a "bad hair day"), and/or their weight (e.g., whether it is above a certain value they desire). These facts may be detected and converted to factors. For example, a factor of an event that involves going out to a bar may be indicative of the fact that the age of the user is well above the average age of patrons at the bar.

Some situations may refer to knowledge that the user has, which may influence the affective response of the user to an experience. For example, if a user has certain knowledge that the user will not be able to honor a scheduled appointment due to the user being too far from the location the appointment is to take place, that may be recognized as a situation the user is in (being late), which may negatively affect the affective response of the user. In another example, if the user knows that her children are out and it is late, this may be a situation in which the user may feel worrisome (e.g., since it is past the time they should have returned). In another example, if the user received a message containing praise for the user (e.g., from a superior at work), that may be considered a certain (mental) situation the user is in, which may affect the affective response of the user in a positive way.

In their day-to-day lives, people may have various expectations regarding the experiences they have. For example, these expectations may relate to various characteristics of experiences (e.g., with whom the experience takes place, the outcome of the experience, or possibly any other characteristic of the experience). Often such expectations are based on previous experiences the users had, which involved the certain characteristic for which there is a related expectation. For example, based on past experiences, a user may have certain expectations regarding the outcome of experiences when dealing with a certain person or a person belonging to a certain group (e.g., the group may include people of a certain gender, age group, ethnicity, occupation, etc.).

In one embodiment, determining what expectations a user may have regarding an experience may be done based on analyzing past experiences the user had. This analysis may utilize descriptions of events in which a user had past experiences, and keeping track of various aspects of those experiences. In one example, if a user watches many games in which the user's favorite team loses, it may be assumed that a user's expectation is that the team will lose. In another example, if the user has many aggravating experiences with people in a certain position (e.g., office administrators), it may be assumed that the user has an expectation that experiences involving office administrators will be aggravating. In another example, a user that typically eats ice cream when visiting a park will typically have the expectation of eating ice cream during future visits to the park.

In one embodiment, determining what expectations a user may have regarding an experience may be done from monitoring the user. For example, certain behavioral traits may indicate whether the user is looking forward or not to a certain experience (e.g., this may be indicative of whether the user expects the certain experience to be agreeable or not). In another example, semantic analysis of communications of the user may teach of expectations regarding certain experiences. For example, a user may say or write something in a communication along the lines of "I hope there are clowns at the show"; this would teach of an expectation the user has, to the effect that the experience of attending the show will include clowns.

When a user has certain expectations regarding an experience, then whether or not having the experience lives up to those expectations may affect the affective response of the user. Thus, in some embodiments, a factor of an event may correspond to an expectation the user corresponding to the event has regarding the experience corresponding to the event, and whether or not the event is congruent with the expectation. For example, one factor may correspond to the case where an event confirms and/or is congruent with a certain expectation a user has regarding an experience, and another factor may correspond to the case where the event contradicts the certain expectation. Having such factors may be useful when analyzing affective response corresponding to events since, in some embodiments, it may be the case that the affective response of the user corresponding to an event may be affected by whether or not having the experience corresponding to the event lived up to expectations the user corresponding to the event had with regards to the experience. In some cases, affective response is more positive when an event meets expectations and is more negative when the experience does not.

In some embodiments, a factor of an event may correspond to a consequence of having the experience corresponding to the event. In this case, a user may know that having the experience will lead to the consequence, and this knowledge influences the affective response to the event. For example, a user that has certain dietary restrictions may know that eating a slice of cake may go against those restrictions and lead to unwanted consequences (e.g., going over allotted calories and/or a raise in blood-sugar level). This knowledge may affect the affective response of the user to eating the cake, for example, the user will enjoy the cake less compared to eating it when no such restrictions are in place. In another example, a user that knows that after completing a certain unenjoyable chore, the user will get a reward (e.g., be able to go out with friends). This knowledge may affect the affective response of the user to doing the chore, such that it will be more positive than it typically would, for example, if the user was not expecting to go out with friends after the chore's completion.

It is to be noted that in embodiments described herein, the same factor may correspond to various events possibly involving different experiences. For example, a factor corresponding to the user being sick may be used with respect to many different event involving different experiences the user has while the user is sick. In another example, a factor corresponding to interaction with a person of a certain ethnic group may correspond both to an experience where the user is out shopping and a salesperson the user interacts with is a member of the certain ethnic group, and to an experience where the user is treated in an emergency room and a doctor treating the user is a member of the certain ethnic group.

Additionally, when discussing factors of events, it should be noted that with some factors the duration in which a factor actively affects a user, e.g., because the user is exposed to an aspect of an event to which the factor corresponds, may vary. In some examples, the duration may span a fractions of a second (e.g., briefly seeing a certain image, hearing a noise), while in other examples, the duration may span the whole period of the instantiation of an event, such as when a factor corresponds to a condition the user was in during the instantiation (e.g., a factor corresponding to the user being sick). Optionally, the length of the duration may influence the weight associated with the factor. For example, the weight associated with a factor corresponding to a user being exposed to the sun may be proportional to the time the user spent being exposed to the sun. Alternatively, in other cases, the varying length of the duration in which a user is exposed to an aspect of an event does not influence the weight associated with a corresponding factor. For example, the factor may relate to an aspect for which the important fact was whether or not it occurred, e.g., whether or not the user met a friend, ate lunch, etc., and not how long those experiences lasted.

Factors of events may be represented in different ways in different embodiments described herein. For example, factors may be represented as a subset and/or list of relevant factors, as vectors of values, and/or using other representations of information (e.g., a structured database record). In some embodiments, there may be a plurality of factors that can potentially be relevant to an event. However, typically, only a fraction of the potential factors are relevant to the event to the extent that they are likely to affect the affective response of the user to the experience corresponding to the event.

In one embodiment, relevant factors of an event are a subset of the plurality of the factors that may possibly be used to characterize the event. Optionally, the subset of factors comprises less than half of the plurality of the factors. The subset of factors may be represented in various ways. In one example, the subset may be represented as a list containing the factors in the subset (or information identifying them such as names, codes, indexes, etc.). Optionally, the list is ordered according to the perceived impact of the factors on the affective response of the user. In another example, the subset may be represented as a vector of values, each indicating whether a certain factor belongs to the subset or not (e.g., a vector of indicators in which a "1" indicates that the corresponding factor is relevant and a "0" indicates that it is not).

In another embodiment, a degree of relevancy may be assigned to at least some factors from among the plurality of potential factors. Optionally, the degree of relevancy of a factor is represented by a weight of the factor which may be represented as a numerical value. For example, factors may be represented by a vector of weights, each position in the vector corresponding to a certain factor and the value in each position indicating the weight of the certain factor in the instantiation of the event. Optionally, at least half the plurality of factors have a lower weight than other the rest of the plurality of factors. Optionally, a weight that is below a certain threshold may be indicative that the corresponding factor is not relevant and/or is not likely to have an impact on the affective response of the user corresponding to the event. Optionally, a weight that equals zero is indicative that the corresponding factor is not relevant and/or is not likely to have an impact on the affective response of the user corresponding to the event.

In some embodiments, factors of an event all come from a certain set that includes a plurality of potential factors. For example, the plurality of factors may come from a database of predefined factors or correspond to factors that all belong to a certain set of structures and/or are generated according to a certain set of grammar rules. In another example, each factor may correspond to a dimension in a high dimensional (possibly even infinite) space. When deciding which factors to include in the set of all possible factors, there may be various possibilities that may be guided by various considerations, which can yield different sets in different embodiments. For example, sets may contain a varying number of factors, ranging from one or two factors in simple embodiments to even millions of factors or more in complex embodiments. In addition, sets may contain factors having different levels of specificity and/or complexity, as described below. The choice of which factors to use may depend on various considerations such as the amount of data available, the computational resources required to identify events having the factors, and the desired descriptiveness level of models that utilize the factors.

In some embodiments, factors of events may have different levels of specificity. Herein, the specificity of a factor represents the portion of events for which the factor corresponds to a certain aspect. For example, a factor corresponding to an aspect that may be described as "solving a crossword puzzle while traveling on a busy bus on an autumn afternoon" may be considered rather specific (it is expected to correspond to a small number of events). In contrast, a factor corresponding simply to an aspect of "eating lunch" is quite general, i.e., non-specific, since there are likely many events to which it corresponds (typically most people eat lunch every day).

In some embodiments, a first factor may be considered a more specific variant of a second factor if they both relate to the same aspect of an event, and in addition, all the events to which the first factor is considered relevant (e.g., weight above zero) are also events to which the second factor is considered relevant. For example, a factor indicating that an event involves a clown with a red nose is a more specific variant of a factor indicating that an event involves a clown.

In some embodiments, factors of events may be considered to belong to one or more hierarchies. Optionally, a hierarchy of factors is a structure in which factors may be decedents of other factors, such that when a first factor is a decedent of a second factor it is considered more specific than the second factor.

Similar to the notion of specificity, in some embodiments, factors may be considered with respect to the complexity of the aspects to which they correspond. For example, a factor corresponding to playing a certain video game may be considered simple; it may correspond to events in which a user interacts with a gaming console in a certain way that is typically easily detectable. Optionally, a simple factor may be considered a general factor. However, a factor that describes an aspect along the lines of "awkward social situation" may be considered quite complex. Optionally, a complex factor may correspond to one or more combinations of simple and/or general factors.

In some embodiments, a complex factor that may be described via one or more combinations of simpler factors may be used when a combination of factors may lead to an effect (e.g., bias) that is not apparent or easily deducible from biases towards the individual factors that make up the complex factor. For example, a person may have a positive bias to eating Oreo cookies and also a positive bias to eating guacamole, however, most people would not have a positive bias towards eating both together . . . .

In some embodiments, complex factors of events may correspond to conditions that may influence affective response in possibly unexpected or unanticipated ways. For example, factors may correspond to aspects of an event which may lead to effects of certain cognitive biases. There are many cognitive biases known in the arts of psychology and behavioral research. As typically used herein, the term "cognitive bias" refers to a tendency in certain situations to think in certain ways that can lead to systematic deviations from a standard of rationality or good judgment. The extent a user has a cognitive bias may affect the affective response of the user to an experience, and therefore, in some embodiments, cognitive biases may be represented with corresponding factors that indicate to what extent an event is one in which the user corresponding to the event may have a certain cognitive bias. The actual extent the affective response of a user is affected by a factor representing a certain cognitive bias may be an individual trait of the user.

Following are a few examples of cognitive biases that may influence affective response to experiences:

Bandwagon effect—the tendency to do (or believe) things because many other people do (or believe) the same. Thus, affective response to an experience that is popular with other users may be more positive than its merits warrant. A factor corresponding to this cognitive bias may be indicative of the popularity of an experience.

Extreme aversion—most people will go to great lengths to avoid extremes. An option is more likely to seem appealing if it is the intermediate choice. A factor corresponding to this cognitive bias may be indicative of how extreme an experience is (e.g., relative to other experiences).

Hyperbolic discounting—the tendency of people to have a stronger preference for more immediate payoffs relative to later payoffs, the closer to the present both payoffs are. A factor corresponding to this cognitive bias may be indicative of how close the benefit of an experience is to the time the user has the experience.

Projection bias—the tendency to unconsciously assume that others share the same or similar thoughts, beliefs, values, or positions. A factor corresponding to this cognitive bias may be indicative of how close an experience aligns with the user's beliefs, values, etc.

Spotlight effect—the tendency to overestimate the amount that other people notice your appearance or behavior. Thus, an experience that may be perceived to involve exposure of the user may cause certain users to have a more negative affective response. At factor corresponding to this cognitive bias may be indicative of the extent to which an experience involves public exposure.

Status-Quo bias—the tendency to defend and bolster the status quo (existing social, economic, and political arrangements tend to be preferred, and alternatives disparaged sometimes even at the expense of individual and collective self-interest). Thus, some users may have a more negative affective response to experiences that may be perceived as departing from the status-quo. A factor corresponding to this cognitive bias may be indicative of the extent to which an experience departs from status-quo.

The professional literature includes many more cognitive biases that have been identified and studied, which may be accounted for, in some embodiments, by having factors that correspond to conditions in which these cognitive biases may affect the affective response of a user.

The choice of what level of specificity and/or complexity may depend, in some embodiments, on the amount of event-related data that is used (e.g., in order to model biases of users). In particular, data obtained from monitoring users, such as descriptions of events and corresponding measurements of affective response, may be accumulated over time. Initially, there may be a relatively small body of data that can be analyzed, e.g., in order to generate models involving user bias. When there is a small body of data, it may be better to use a small set of factors in the models. Thus, factors in the set may be relatively non-specific and/or non-complex. However, as the body of data involving a user grows, e.g., from additional monitoring of the user when having various experiences, a larger set of factors may be used. In this case, more specific and/or complex factors may be selected and/or created. For example, when considering factors that may belong to hierarchies, as the amount of data grows, more and more factors that are on lower, more specific, tiers may be used instead of, or in addition to, factors on higher, less specific, tiers that were initially used.

In some embodiments, factors of an event $\tau$ may be represented by a vector $\vec{F}_\tau$ that contains weights that are numerical values (with each position storing the weight corresponding to a certain factor). Optionally, the larger the value of the weight, the more the corresponding factor is expected to influence the affective response of the user corresponding to the event. It is to be noted that the process of assigning weights to factors may be considered a form of selection of relevant factors, since it is possible to determine that factors with a weight above a certain threshold are to be considered factors that are relevant to the event, while the other factors (with lower associated weights), may be considered to be less relevant (or irrelevant). In another example, a certain number of factors with the highest weights are considered relevant to the event, while the other factors (with possibly lower weights) are considered less relevant, or irrelevant, to the event.

In one embodiment, the values in the vector $\vec{F}_\tau$ are binary. For example, a weight of zero in certain position represents that the factor corresponding to the certain position is not relevant, and a weight of one in that position represents that the factor is considered relevant. In another embodiment, the values in the vector $\vec{F}_\tau$ may come from a larger set of numerical values, such as integer or real values. Optionally, the values in $\vec{F}_\tau$ may be non-negative, (e.g., representing that event values may be relevant or non-relevant). Optionally, the values in $\vec{F}_\tau$ may be positive or negative values.

In some embodiments, weights associated with factors may represent quantitative properties of aspects of the events to which the factors correspond. Optionally, a weight for a factor of an event may be obtained by applying various functions to a numerical value obtained from a description of the event. For example, the numerical value may be given to a predictor as input (and the output of the predictor assigned as the weight). Optionally, the numerical value may undergo a transformation, such as filtering, scaling, and/or converting it to another type of value such as a p-value or z-value.

In one embodiment, a weight associated with a factor of an event is derived directly from a value included in a description of the event. In one example, the weight associated with a factor corresponding an image of a car in a picture is a value based on the relative size of the car in the image (e.g., the description may include dimensions of objects in the image). In another example, the weight associated with a factor corresponding to the percentage of fat in a food item is the value of the percentage of fat itself (e.g., the description may include nutritional information of the food item). In still another example, the weight associated with a factor corresponding to the temperature at a place where an event takes place is the value of the temperature (e.g., the description may include a value obtained with a thermometer).

In another embodiment, a weight associated with a factor of an event is indicative of whether a value included in a description of the event reaches a certain threshold. For example, if the temperature during an event reaches a certain threshold (e.g., a value above which it may be considered warm), a factor corresponding to whether the weather was warm is given a value "1", otherwise it is given a value "0". In another example, in an event involving multiple people interacting with the user, a factor corresponding to a person that interacts with the user for at least 10 seconds is given a value "1", while factors corresponding to people who interacted with the user for less time are given a value "0".

In yet another embodiment, a weight associated with a factor of an event is derived from analyzing a description of the event in order to obtain a value for the quantitative aspect to which the factor corresponds.

In one embodiment, a description of an event may include eye tracking data of the user corresponding to the event, taken during the instantiation of the event. Based on the eye tracking data, it may be determined what entities, e.g., objects or people (real and/or virtual), the user corresponding to the event focused on. For example, the eye tracking data may indicate how many times the user focused on a certain entity, how long the user focused on the certain entity each time, and/or the total amount of time the user focused on the certain entity. The weight assigned to a factor corresponding to an entity may be proportional to values obtained from the eye tracking data. Optionally, the weight assigned to a factor corresponding to an entity may be proportional to how long the user focused on an entity, with higher weights being given to factors corresponding to entities on which the user focused for longer durations. For example, the weight given to a factor corresponding to an object the user viewed, such as an image of a car in an event that involves viewing a video commercial, may equal the number of seconds the user focused on the object while the video played. Optionally, if based on the eye tracking data, it is determined that the user corresponding to an event did not focus on a certain entity for at least certain amount of time, and/or for at least a certain proportion of the period of the instantiation of the event, a factor corresponding to the certain entity is assigned a weight that is lower than a certain threshold weight. If, on the other hand, it is determined that the user corresponding to the event did focus on the certain entity for at least the certain amount of time, and/or for at least the certain proportion of the period of the instantiation of the event, the factor corresponding to the certain entity is assigned a weight that is not lower than the certain threshold weight In another embodiment, a description of an event may include information regarding communications and/or other interactions between a user and other entities, which are part of the event. For example, a description of an event involving an assembly of multiple people (e.g., cocktail party), may include information about communications the user had (including identities of the people the user spoke with). Based on the number of communications and/or amount of information exchanged, a weight may be assigned to factors corresponding to the entities, such that the more the user communicated with a person, the larger the weight associated with a factor corresponding to that person. In another example, a description of an event may include actions taken by a user in a game and/or virtual world. In this example, weights assigned to various entities (e.g., objects and/or characters) may be proportional to the amount of time the user spent interacting with those entities (e.g., the weight of a monster in a shootout game may be proportional to the time the user spent fighting the monster).

In still another embodiment, a description of an event may include visual information of what the user saw during an event. For example, the description may include video and/or single images taken from the view point of the user (e.g., using a camera attached to a head mounted display). Given images and/or video, various object recognition and/or saliency modeling approaches are known in the art, which can identify what entities (e.g., object, people, etc.) are in the images and/or video and the extent of attention the user paid to at least some of those entities. Based, on this predicted attention, weights can be assigned to factors corresponding to the entities. For example, the weight assigned to a factor may be proportional to the attention a user is predicted to pay to the entity corresponding to the factor. Some of the many approaches for saliency modeling and/or object recognition that may be used in embodiments described herein are described in the references mentioned in Borji, et al. (2013), "Quantitative analysis of human-model agreement in visual saliency modeling: A comparative study", in *IEEE Transactions on Image Processing*, 22(1), 55-69.

In yet another embodiment, a description of the event may include data describing entities with which the user corresponding to the event interacted. This data may be analyzed in order to give a weight to certain factors that relate to those entities. For example, an event may describe the level of happiness a person the user corresponding to the event is interacting with. In this example, the value of the factor may be based on results obtained from an estimator of an emotional state that receives images of the person, which are included in the description of the event, and returns a real value representing a level of happiness (e.g., on a scale from one to ten).

Assigning weights to factors, and/or identifying which factors characterize an event, may involve additional forms of analysis. For example, in some embodiments these tasks may involve semantic analysis, e.g., of communications involving the user and/or of content the user consumes. Additionally or alternatively, these tasks may involve analysis of various sensors that measure aspects of the environment in which the user is while an experience takes place (e.g., pressure, temperature, light level, noise, etc.) These values may be used to directly set weights of certain corresponding factors, and/or to gain the context which can assist in identifying factors and/or assign weights to factors.

Factors of an event may be filtered, in some embodiments, according to their associated weights. In particular, not all factors that can possibly be used to describe an event in general, are necessarily used to describe a certain event. Some factors may be deemed irrelevant and are filtered out and/or assigned a low weight, such as zero. For example, if an event involves a movie that has certain actors, factors relating to other actors (not in the movie) may be considered irrelevant. In another example, if an event involves swimming at the pool, other factors related to baking a cake may be considered irrelevant. In these examples, the irrelevant factors will often have very low weights (possibly even zero), and as such, may be filtered (e.g., by removing them from a list and/or setting their weight to zero if it is slightly above zero).

Determining relevancy of factors of an event based on their weights may be done in various ways in different embodiments. In one example, factors of an event that have a weight that is below a certain threshold are deemed irrelevant and are not used to describe the event. Optionally, at least half of the factors, which may possibly be used to describe an event, are deemed irrelevant. In another example, factors of an event are filtered such that only a fixed number of factors, which may possibly be used to describe an event, and/or a fixed proportion of those factors, are deemed relevant to the event. Optionally, less than half of the factors that may possibly be used to describe an event are considered relevant to the event. In some embodiments, the fixed number may be quite small, with a very small number of factors, possibly even a single factor, being used to describe an event (with all other factors having a weight of zero).

Filtering factors of an event may be done, in some embodiments, according to the effect the factors are expected to have on the user corresponding to the event. For example, factors that are not likely to affect the user may be filtered out, possibly even if their weight exceeds a threshold. Optionally, filtering factors may be done according to their corresponding bias value. For example, a factor of a certain event for which the corresponding bias value is below a certain magnitude may be filtered and not used to represent the certain event.

In some embodiments, weights associated with factors of events may undergo various forms of normalization, possibly in addition to, or instead of, various forms of filtration, as described above. This normalization may change the values of the weights associated with the factors of an event. In one example, weights of factors characterizing a certain event are normalized such that their sum or norm (e.g., $L_2$-norm) is set to a certain value or falls within a certain range. In another example, weights associated with factors characterizing a certain event, which are represented as a vector of values, are normalized by projecting them onto a certain multidimensional hyperplane and/or to the surface of a multidimensional sphere.

Factors of event are typically, but not necessarily, considered to be objective values, e.g., the same factors, and/or weights associated with factors, will typically represent essentially the same thing for different events involving different users and/or different experiences. Optionally, factors may be considered objective values since they are derived from descriptions of events, which are themselves objective, at least to some extent (e.g., descriptions of events involving different users may be generated using the same set of procedures). For example, a certain factor of an event that involves watching a movie may be indicative of whether or not the movie includes a certain actor. This is essentially a factual assertion, which may be determined from the billing of the movie (e.g., as described in a movie database). In another example, a factor of an event may describe the temperature of the environment in which the event takes place. This too is typically an objective value that may be measured.

However, in some embodiments, at least some factors of events may be considered subjective, at least to a certain extent, such as when the factors correspond to descriptors that may have different meanings with regards to different users and/or experiences. For example, a factor corresponding to a person being "tall" or "attractive" may be defined differently for different users; for some people 6 ft. is considered "tall", while in the Netherlands, such a height may be considered average or even short.

In some embodiments, at least some of the factors that involve a subjective descriptor may be converted to a value on an objective scale. In the example given above, instead of using an indicator of whether a user is "tall", the factor may indicate an actual height (or height range instead). In another example, a subjective factor may be expressed as a combination of objectively determined factors. For example, a subjective attribute like "attractive" with respect to a person may be described via various objective attributes such as height, body build, hair style, eye color, face symmetry, etc. In this case, each user may have a different reaction to a combination of those attributes, which corresponds to his/her notion of attractiveness. However, given sufficient examples of what a user considers "attractive" (and possibly things that do not fall under that category), it may be possible to model such a subjective concept using combinations of objective factors. It is also possible to utilize a machine learning-based predictor that is trained to score concepts like "attractive" based on data indicating what multiple users, or a certain user (for a personal predictor), consider "attractive".

Given an event, there may be various ways in which factors are assigned to the event, in different embodiments described herein. Below are a few example approaches that may be used.

In one embodiment, factors are assigned to an event based on the experience corresponding to the event and/or the user corresponding to the event (possibly without regarding other information that may be in the description of the event). Optionally, each event corresponding to the same experience and/or user is assigned essentially the same factors. Optionally, a set of factors is selected for an event from a database that contains preselected sets of factors appropriate for certain experiences, certain users, or combinations of a certain user and a certain experience. In one example, an event involving riding in the park may have a fixed set of factors corresponding to the following attributes: the condition of the user (e.g., is the user tired?), the environment (e.g., is the environment crowded?), the temperature (e.g., is it hot out?), and whether it is raining. In another example, an experience involving eating a meal at a certain restaurant may have a fixed set of factors assigned to it, corresponding to the following attributes: the hunger level of the user, the quality of meals served at the restaurant (e.g., as determined from a crowd-based score), and the type of dish the user ordered.

In another embodiment, factors of an event are assigned, at least in part, by the user corresponding to the event. This practice may be employed by people engaged in various forms of "life logging", in which users log various parameters of daily life such as experiences they have and various corresponding measurements (possibly including measurements of affective response). The data may be analyzed in order to gain insight into ways in which quality of life may be improved. Thus, as part of the logging, users may provide at least some of the factors they believe corresponded to an event. Optionally, the factors may be selected from a fixed list (e.g., a standard set of factors). Additionally or alternatively, the factors may be arbitrarily assigned by users (e.g., via voice entry or text).

In other embodiments, factors of an event are assigned, at least in part, utilizing programs. A module that is used to assign factors to an event may be referred to herein as a "factor assigner". In some embodiments, a factor assigner may be considered a separate module from an event annotator (described in more detail in section 5—Identifying Events). Optionally, the factor assigner cooperates with an event annotator. For example, the event annotator may generate a description of an event, and the factor assigner may select one or more factors (and possibly the factors with weights), based on the description. In some embodiments, the same module may serve both as an event annotator and as a factor assigner (e.g., the event annotator may generate a description of an event and/or select the factors of the event). Following is a description of some of the approaches that may be utilized by a factor assigner and/or an event annotator in order to assign factors to an event.

Herein, the use of the term "assignment" with reference to factors (e.g., "assignment of factors to an event" or "assignment of factors of an event") involves selecting factors that characterize an event (e.g., from a larger set), generating factors that characterize an event (e.g., according to certain rules that define a set of possible factors). Additionally or alternatively, assignment of factors of an event may involve setting weights for factors of an event. Factors that are assigned to an event are generally considered more relevant to the event than factors that are not assigned to the event. In some embodiments, factors assigned to an event may be considered as factors that characterize the event and/or factors that are relevant to the event (as these terms are used herein). Similarly, factors that are not assigned to an event are not considered to be factors that characterize the event.

In some embodiments, assignment of factors to an event does not require active participation of a user (e.g., of the user corresponding to an event to which the factors are assigned). Optionally, in order to assign factors to an event one or more programs may analyze a description of the event (e.g., using image analysis, semantic analysis, and/or other forms of analyses). Optionally, assigning factors to an event is done, at least in part, by a software agent. Optionally, the software agent operates on behalf of the user corresponding to the event.

Assigning factors to an event can be a task that, in different embodiments, may be of various levels of difficulty. Whether the task is relatively simple or a very complex task (e.g., a task requiring artificial intelligence with knowledge of the world and/or human phycology) may depend on various aspects, such as the type of data included in a description of an event and the type of factors that considered for an event. For example, assigning factors to an event that involves an experience of viewing a movie may primarily involve determining the identity of the lead actors, the genre, and the quality of the movie (e.g., as determined by user votes and/or critics). In this example, such information may be gleaned from databases (e.g., IMDB, rotten tomatoes, and the like). Thus, given an event that involves consuming media content, assigning factors may involve a script that retrieves and parses such information from a database.

The example above may be considered a relatively simple example of assigning factors of events. However, in other embodiments, assigning factors may require much more complex analysis, involving multiple data sources, and/or requiring knowledge of various types. In one embodiment, assigning factors may involve object and/or facial recognition (e.g., to determine from a video feed what are the object of attention). It may further require determining demeanor and/or emotional responses of the user and/or people the user interacts with. In another embodiment, assigning factors may involve identifying situations a user is in, and to what events these situations may be pertinent. For example, a user may have recently suffered a sports-related injury. In this example, a factor corresponding to the user having the injury may be assigned to an event involving an experience such as playing football, but not to an event that involves viewing a movie. In still another embodiment, assigning a factor may involve recognizing complex situations a user may be in, which involve both beliefs and/or expectations of the user, and possibly of other users, such as situations that correspond to cognitive biases, mentioned above.

Assigning factors may also require analysis of data from multiple sources, including reviewing of past events involving a user in order to be able to recognize various social behaviors. For example, the affective response of a user corresponding to an event may depend on the fact that a user is being disparaged and/or patronized, or conversely, respected and/or praised, in the event. Being able to recognize such complex social cues may be required, in some embodiments, in order to accurately assign factors of an event.

The examples given above demonstrate that, in some embodiments, assigning factors to an event may be a somewhat computationally-complex task. Optionally, in such embodiments, assigning factors is a task performed, at least in part, by programs possessing various AI (Artificial Intelligence) capabilities and may involve access and/or utilization of various programs having specific capabilities to recognize objects, emotions, and/or real-world situations. Additionally or alternatively, assigning factors to an event may involve the use of various predictors trained for tasks such as predicting emotional response. Optionally, programs used to assign factors to events may employ various approaches for drawing complex inferences from data (e.g., various "deep learning" and/or "big data" analyses). In some embodiments, assigning certain factors may involve the use of what may be considered a "strong AI" (also referred to as an artificial generalized intelligence).

In order for a program to be able to identify various objects and/or concepts, there may need to be a way of organizing knowledge representing the various objects and/or concepts. In the art of computer science, this is often done with the use of ontologies. An ontology is a formal naming and definition of the types, properties, and interrelationships of the entities that exist for a particular domain of interest. An ontology typically provides a vocabulary describing the domain of interest and a specification of the meaning of terms in that vocabulary. Depending on the precision of this specification, the notion of ontology may encompass several data or conceptual models, e.g., classifications, database schemas, and/or fully axiomatized theories. In some applications, an ontology compartmentalizes the variables needed for some set of computations and establishes the relationships between them, thus limiting complexity and enabling a systematic organization of information. Additional details about ontologies and how they can be used to represent factors of events may be found in Guizzardi and Giancarlo (2005), "Ontological foundations for structural conceptual models", in *CTIT, Centre for Telematics and Information Technology*.

In some embodiments, factors assigned to events are taken from one or more ontologies. The ontologies may be shared and/or public (i.e., many user may use one or more of the ontologies). In some embodiments, one or more ontologies used to assign factors to events of a user may be private. For example, a private ontology may be an ontology that is defined and/or modified based on the history of events and/or expected future events of the user. Optionally, ontologies may be maintained and updated by users and/or software agents operating on their behalf. For example, software agents of multiple users may maintain a shared ontology used to describe experiences of a certain type and/or users in certain situations.

A concept similar to an ontology is a knowledge base; knowledge bases may also be utilized, in some embodiments, in order to assign factors to events. A knowledge base is a technology used to store complex structured and unstructured information used by a computer system. The knowledge base may store various data involving a certain domain and provide a program with the ability to perform inference with regards to concepts in the domain. In particular, one type of knowledge base that may be utilized in some embodiments is a commonsense knowledge base, which is a collection of facts and information that an ordinary person is expected to know. Having this information in a structured and accessible form may enable a program, such as a software agent, to identify various factors that are most likely related to an event, including things that are not necessarily observable in the physical world, such as situations a user may be in, expected behavior of the user or others, and other concepts that may be possible for a human to detect, but are sometimes more difficult for software to recognize.

In some embodiments, information in a commonsense knowledge base utilized for assignment of factors to events may include, but is not limited to, the following: an ontology of classes and individuals, parts and materials of objects, properties of objects (such as color and size), functions and uses of objects, locations of objects and layouts of locations, locations of actions and events, durations of actions and events, preconditions of actions and events, effects (post conditions) of actions and events, subjects and objects of actions, behaviors of devices, stereotypical situations or scripts, human goals and needs, emotions (e.g., common causes for certain emotional reactions), plans and strategies, story themes and genres, and contexts. Those skilled in the art will recognize that in the field of artificial intelligence, a lot of effort has been put into the generation of various commonsense knowledge bases. Some examples of knowledge bases that may be used include: Cyc, Open Mind Common Sense, ConceptNet, and WordNet, to name a few. The choice of which knowledge bases to use, and/or which one to create and maintain, may be determined based on the needs of the specific embodiments involved.

The fields of machine learning and artificial intelligence have been rapidly growing. The capability to analyze and make inferences from large amounts of data ("big data") is continuously increasing. In a similar fashion, the ability of computer programs to model complex real-world phenomena utilizing various computational approaches such as deep learning or graphical models, is also increasing rapidly (see for example the increasing capabilities of systems such as IBM's Watson). Therefore, the discussion given above regarding computational approaches that may be utilized to assign factors to events is given for an exemplary, non-limiting, purpose. One skilled in the art will recognize that embodiments described herein may employ other approaches, tools, and/or resources, beyond the ones mentioned above. This includes both other approaches, tools, and/or resources that may have been known at the time this disclosure was written, and possibly approaches, tools, and/or resources that have been yet to be invented and/or publically disclosed at that time.

13—Bias Values

There are various ways in which the effects of user biases on affective response may be modeled and/or represented in embodiments described herein. In particular, in some embodiments, biases may be considered to have values that are referred to as "bias values". Optionally, bias values may be random variables (e.g., the bias values are represented via parameters of distributions) and/or bias values may be scalar values or vectors. In some embodiments, the bias values are determined from parameters of models trained data that includes measurements of affective response corresponding to events. Below are descriptions of bias values and various ways they may be used in some embodiments, including notations and ways in which data may be utilized in order to learn bias values and/or correct measurements of affective response with respect to bias values. The description is provided for illustrative purposes; those skilled in the art will recognize that there may be other methods of notation that may be used, and other ways of handling, learning, and/or correcting biases that may be employed to achieve similar results.

Bias values may be expressed in various ways. In some embodiments, bias values are expressed in the same units as measurements of affective response and/or scores for experiences are expressed. For example, bias values may be expressed as affective values. Optionally, a bias value may represent a positive or negative value that is added to a measurement and may change the value of the measurement. In one example, a bias value represents a number of heart beats per minute (or a change in the number of heartbeats), e.g., a first bias may equal +5 beats per minute (PBM), while a second bias equal −10 BPM. In another example, a bias value represents a change in emotional response. In this example, emotional responses are expressed as points in the two-dimensional Valence/Arousal plane. A bias value may be expressed as an offset to points on this plane, such as an adding +2 to the Valence and +1 to the Arousal. Thus, in this example, the bias value is a vector that may be used to perform a transformation on a representation of the emotional response. In yet another example, a measurement of affective response may be a time series, such as a brainwave pattern of a certain frequency (band) that is recorded over a period of time. In this example, a bias value may also be expressed as a pattern which may be superposed on the measurement in order to change the pattern (i.e., incorporate the effect of the bias). And in still another example, a bias value may a factor added to a score, such as a factor of −0.5 added to a value on a scale from 1 to 10 that expresses a level of user satisfaction.

In some embodiments, measurements of affective response of users who had experiences are used to train a model that includes biases expressed via bias values; each of the experiences may correspond to something akin to visiting a location, participation in an activity, or utilizing a product. In the embodiments, each of those measurements of affective response may correspond to an event in which a certain user had a certain experience. Additionally, in some embodiments, for the purpose of analysis and/or model training, events may be assumed to belong to sets of events. Sets of events are denoted $V_i$ for some $1 \leq i \leq k$, and the set of all events is denoted $V$, such that $V = \cup_{i=1}^{k} V_i$. Additional information regarding sets of events may be found at least in section 4—Events.

Following is a description of an embodiment in which a user's biases are modeled as bias values that correspond to factors. Thus, the effect of each factor on the affective response of the user is represented by its corresponding bias value. Given an event $\tau$, the user corresponding to the event is denoted below u, the experience corresponding to the event is denoted $e_\tau$, and the measurement of affective response corresponding to the event is denoted $m_\tau$. The set of factors of the event $\tau$ is represented below by the vector $\vec{F}_\tau = (f_1, f_2, \ldots, f_n)$. Optionally, $\vec{F}_\tau$ represents a vector of weights associated with factors of the event $\tau$, such that weight of factor i is $f_i$ (with some of the weights possibly being zero). As described in section 12—Factors of Events, $\vec{F}_\tau$ may contain various types of values, such as binary values or real values. If factors of an event are given as a set of factors, they may be still represented via a vector of factors, e.g., by having $\vec{F}_\tau$ be a vector with weights of one at positions corresponding to factors in the set, and a weight of zero in other positions.

The full set of bias values of a user u are represented below by a vector $\vec{B}$, with each value in a position in the vector $\vec{B}$ corresponding to a certain factor. When referring to a certain event $\tau$, the vector of bias values corresponding to the factors that characterize $\tau$ may be denoted $\vec{B}_\tau = (b_1, b_2, \ldots, b_n)$. Both the vectors $\vec{F}_\tau$ and $\vec{B}_\tau$ are assumed to be of the same length n. If $\vec{F}_\tau$ contains only a subset of all possible factors (e.g., it include only factors that are relevant to $\tau$, at least to a certain degree), it is assumed that the vector $\vec{B}_\tau$ includes the corresponding bias values to the factors in $\vec{F}_\tau$, and not the full set of bias values $\vec{B}_u$ (assuming the user u is the user corresponding to the event $\tau$). Therefore, in Eq. (1) to Eq. (5), the same dimensionality is maintained for both vectors $\vec{F}_\tau$ and $\vec{B}_\tau$ corresponding to each event $\tau$.

In some embodiments, a measurement corresponding to an event $\tau$, denoted $m_\tau$, may be expressed as function that takes into account the accumulated effect of factors represented by $\vec{F}_\tau$ with respect to the bias values represented by $\vec{B}_\tau$, according to the following equation:

$$m_\tau = \mu_\tau + \vec{F}_\tau \cdot \vec{B}_\tau + \varepsilon = \mu_\tau + \left( \sum_{i=1}^{n} f_i \cdot b_i \right) + \varepsilon \qquad (1)$$

where $\mu_\tau$ is a value representing an expected measurement value (e.g., a baseline), and $\varepsilon$ is a noise factor drawn from a certain distribution that typically has a mean of zero, and is often, but not necessarily, a zero-mean Gaussian distribution such that $\varepsilon \sim N(0, \sigma^2)$, for some $\sigma > 0$.

Depending on the embodiment, $\mu_\tau$ may represent different values. For example, in some embodiments $\mu_\tau$ may be set to zero; this may indicate that the measurement of affective response $m_\tau$ is modeled as being dependent on the bias reaction of the user to factors representing the event. In other embodiments, $\mu_\tau$ may be given values that may be non-zero; for example, $\mu_\tau$ may represent a baseline value. In one embodiment, $\mu_\tau$ is the same for all events (e.g., a baseline value for a certain user or of a group of users). In other embodiments, $\mu_\tau$ may be different for different events. For example, $\mu_\tau$ may be a baseline computed for the user $\mu_\tau$ based on measurements of affective response of $\mu_\tau$ taken a certain time before the instantiation of $\mu_\tau$. In another example, $\mu_\tau$ may represent an expected measurement value for the experience $e_\tau$. For example, $\mu_\tau$ may be a baseline computed based on prior measurements of the user $\mu_i$ and/or other users to having the experience $e_\tau$.

In some embodiments, ε from Eq. (1) may represent a sum of multiple noise factors that may be relevant to a certain event τ. Optionally, each of the multiple noise factors is represented by a zero-mean distribution, possibly each having a different standard deviation. For example, there may be multiple noise factors for different users and/or different groups of users. This may reflect the fact that the measurements of certain users are more likely to behave according to model than others (e.g., because their model is more accurate and/or elaborate). In yet another example, different noise factors may be attributed to different conditions in which measurements of affective response are taken (e.g., by different sensors, different durations, and/or different power settings). Optionally, having such different noise factors may reflect the fact that the different conditions may result in measurements of affective response having different degrees of accuracy. In still another example, there may be different noise factors corresponding to different situations a user may be in when having an experience. And in yet another example, there may be different noise factors corresponding to different experiences and/or groups of experiences (e.g., reflecting the fact that the affective response to certain experiences is more predictable than the affective response to others).

It is to be noted that discussions herein regarding bias values, such as the discussions about Eq. (1) to Eq. (5), are not meant to be limited to measurements and bias values that are scalar values. Measurements of affective response, as well as biases, may be expressed as affective values, which can represent various types of values, such as scalars, vectors, and/or time series. In one example, measurements and bias values may be represented as vectors, and thus Eq. (1) may express vector summation (and ε in this case may be a vector of noise values). In another example, measurements and biases may represent time-series, wave functions, and/or patterns, and therefore, Eq. (1) may be interpreted as a summation or superposition of the time-series, wave functions, and/or patterns.

It is also to be noted that though Eq. (1) describes the measurement $m_\tau$ corresponding to an event τ as being the results of a linear combination of factors $\vec{F}_\tau$ and their corresponding bias values $\vec{B}_\tau$, other relationships between factors of events and bias values may exist. In particular, various exponents $c_i \neq 1$ and/or $d_i \neq 1$ may be used to form an equation that is a generalization of Eq. (1) having the form $m_\tau = \mu_\tau + (\sum_{i=1}^n f_i^{c_i} \cdot b_i^{d_i}) + \varepsilon$. However, those skilled in the art will recognize that such an equation may be converted via variable substitutions to a leaner equation such as Eq. (1), in which $c_i = 1$ and $d_i = 1$. Thus, the simpler form of Eq. (1) is assumed to represent other functions in which the exponents $c_i$ and/or $d_i$ may be different than 1. Additionally, as discussed below, a possible lack of independence between different factors and/or between different bias values may be addressed in various ways. For example, one way to address this is by creating factors that are combinations of other factors (e.g., the result of a function of multiple factors).

Furthermore, linear expressions such as Eq. (1) describe a simple relationship between a factor of an event and a bias value: the higher the weight of the factor, the more pronounce is the effect of the corresponding bias (since this effect may be quantified as $f_i \cdot b_i$). However, in reality the actual bias is not always linear in the weight of the corresponding factor. For example, a person may like food to be salty, but only to a certain extent. In this case, modeling the effect of the user's generally positive bias to salt with a term of the form $f_i \cdot b_i$, where $f_i$ represents an amount of salt and $b_i$ represents a positive bias value, may not work well in practice. This is because, for large values of $f_i$, the linear effect described above gives a large positive bias when in reality it should be negative for large values of $f_i$ (e.g., corresponding to tablespoons of salt in one's soup). This type of non-linear effect may occur quite often. For example, some people will generally like to be with people who are about as smart as they are, but might be intimidated by people who are much smarter than them. In another example, a person may enjoy viewing a movie that has a few violent action scenes, but may balk at the prospect of watching a full feature that is packed with nonstop graphic violence. Addressing the non-linearity of the effects of bias with respect to the value of a corresponding factor may be done in various ways, such as by using feature generation functions, as described below.

In one embodiment, a factor of an event may be processed using a feature generation function in order to obtain a value that better describes a range where the user's effect may be considered to be linear. Optionally, the feature generation function may transform a first value to another value describing how much the first value corresponds to the user's "comfort zone". In the above example involving salt, instead of having the factor be linear (e.g., $f_i = s$, where s is the amount of salt in food expressed in mg), the factor may be a higher order polynomial, such as $f_i = as^2 + bs + c$. For certain values of a, b, and c the polynomial may describe the region of acceptable salt amounts better than a simple linear relationship since for negative values of the parameter a $f_i$ may become negative if the value of s is too low or too high.

In another embodiment, a factor may be split into separate factors, each covering a range of values and each having its own corresponding bias value. For example, in the scenario described above involving the salt, instead of having a single factor $f_i = s$, a feature generation function may create three factors, each having a weight "1" when s is in a certain range and a weight "0" otherwise. For example, given the amount of salt s, $f_1 = 1$ if $s < 150$ (and $f_1 = 0$ otherwise), $f_2 = 1$ if $150 \le s \le 300$ (and $f_2 = 0$ otherwise), and $f_3 = 1$ if $s > 300$ (and $f_3 = 0$ otherwise). Note that in addition to indicators, the feature generation function may also provide features representing the magnitude of a value when it is in a certain region. Thus in the above example, the feature generation function may also provide factors $f_4$, $f_5$, and $f_6$, such that $f_4 = s$ if $f_1 = 1$ (and $f_4 = 0$ otherwise), $f_5 = s$ if $f_2 = 1$ (and $f_5 = 0$ otherwise), and $f_6 = s$ if $f_3 = 1$ (and $f_6 = 0$ otherwise). Note that utilizing additional factors that correspond to whether a value is in a certain region and others that describe the value when in a certain region can help, in some embodiments, to more accurately model effects of bias.

In some embodiments, in which measurements of affective response corresponding to events are modeled as additive functions of factors of the events and corresponding bias values, as described in Eq. (1), the bias values may be learned from training data. For example, the bias values for a certain user u, represented by the vector $\vec{B}_u$ (or simply $\vec{B}$ when the context of the user is known) may be learned from a large set of events V involving the user u, with each event $\tau \in V$ having a corresponding vector of factors $\vec{F}_\tau$ and a corresponding measurement of affective response $m_\tau$. Often such a learning process involves finding bias values that optimize a certain objective. In some embodiments, this amounts to a model selection problem of finding an optimal model in the space of possible assignments of values to the set of bias values $\vec{B}$.

There are various objectives, which may be used in embodiments described herein, according to which the merits of a model that includes bias values may be evaluated with respect to training data. One example of an objective that may be used is the squared error between the measurements corresponding to events in V and the values determined by adding bias values to the expected value $\mu_\tau$, as follows:

$$\underset{\vec{B}}{\arg\min} \left\{ \sum_{\tau \in V} \left( m_\tau - \mu_\tau - \vec{F}_\tau \cdot \vec{B}_\tau \right)^2 + \lambda \|\vec{B}\|^2 \right\} \quad (2)$$

Eq. (2) describes an optimization problem in which the full set of bias values $\vec{B}$ needs to be found, such that it minimizes the squared error, which is expressed as the sum of squared differences between the measurements of affective response corresponding to events in V and the values obtained by correcting the expected measurement value $\mu$ based on the bias values and factors of each event $\tau \in V$. Note that similar to Eq. (1), $\mu_\tau$ in Eq. (2) may be zero or some other value such as a baseline, as explained above.

Additionally, In Eq. (2), the term $\lambda \|\vec{B}\|^2$ is a regularization term, in which $\|\vec{B}\|$ represents a norm of the vector $\vec{B}$, such as the $L_2$-norm. Regularization may be used in some embodiments in order to restrict the magnitude of the bias values, which can help reduce the extent of overfitting. The degree of regularization is set by the value of the parameter $\lambda$, which may be chosen a priori or set according to cross validation when training a predictive model (as explained in more detail below). It is to be noted that with $\lambda = 0$, regularization is not employed in the model selection process. Additionally, in some embodiment regularization may be expanded to include multiple terms; for example, by providing different regularization parameters for different types of bias values.

There are various computational approaches known in the art that may be used to find bias values that minimize the squared error in Eq. (2), such as various linear regression techniques, gradient-based approaches, and/or randomized explorations of the search space of possible assignments of values to $\vec{B}$. Note that in a case in which no regularization is used and the noise $\varepsilon$ from Eq. (1) is assumed to be normally distributed with the same standard deviation in all measurements, then minimizing Eq. (2) amounts to solving a set of linear equations. The solution found in this case is a maximum likelihood estimate of the bias values.

Another example of an objective for optimization, which may be used to find bias values based on the training data, is the sum of absolute errors, as follows:

$$\underset{\vec{B}}{\arg\min} \sum_{\tau \in V} \left| m_\tau - \mu_\tau - \vec{F}_\tau \cdot \vec{B}_\tau \right| \quad (3)$$

With the optimization of Eq. (3), it may be assumed that the noise $\varepsilon$ of Eq. (1) comes from a Laplace distribution (in such a case, the solution to Eq. (3) may be considered a maximum likelihood estimate). Note that similar to Eq. (1), $\mu_\tau$ in Eq. (3) may be zero or some other value such as a baseline, as explained above. Additionally, in a similar fashion to Eq. (2), a regularization factor may be added to Eq. (3) as well.

There are various computational methods known in the art that may be used to find a set of bias values that optimize the sum in Eq. (3), such as iteratively re-weighted least squares, Simplex-based methods, and/or various approaches for finding maximum likelihood solutions. Additionally, Eq. (3) can be extended to include linear constraints on the bias values. Optionally, the optimization may be framed as a problem of optimizing a set of linear constraints and be solved using linear programming.

The likelihood of the data is another example of an objective that may be optimized in order to determine bias values for a user. In some embodiments, each of the bias values in $\vec{B}$ may be assumed to be a random variable, drawn from a distribution that has a certain set of parameters. Depending on the type of distributions used to represent the bias values, a closed-form expression may be obtained for the distribution of a weighted sum of a subset of the bias values. Thus, with a given set of training data that includes events with their corresponding factors and measurements of affective response, it is possible to find values of the parameters of the bias values which maximize the likelihood of the training data.

In one embodiment, each bias value is assumed to be a random variable B that is distributed according to a normal distribution with certain corresponding mean $\mu_B$ and variance $\sigma_B^2$, i.e., $B \sim N(\mu_B, \sigma_B^2)$. Thus, given an event $\tau$, it may be assumed that the vector $\vec{B} = (B_1, B_2, \ldots, B_n)$ is a vector with n random variables $B_1, \ldots, B_n$, with each $B_i$ having a mean $\mu_{B_i}$ and a variance $\sigma_{B_i}^2$, such that $\vec{B}_i \sim N(\mu_{B_i}, \sigma_{B_i}^2)$. Additionally, $\tau$ has a corresponding vector of factors $\vec{F}_\tau = (f_1, \ldots, f_n)$. Note that the values $f_i$ are scalars and not random variables. The weighted sum of independent normally-distributed random variables is also a normally-distributed random variable. For example, if $X_i \sim N(\mu_i, \sigma_i^2)$, for $i=1, \ldots, n$, are n normally-distributed random variables, then $\sum_{i=1}^n a_i X_i \sim N(\sum_{i=1}^n a_i \mu_i, \sum_{i=1}^n (a_i \sigma_i)^2)$. Thus, the probability of observing a certain measurement of affective response corresponding to an event given the parameters of the distributions of bias values, may be expressed as:

$$P(\mu + \vec{F}_\tau \cdot \vec{B}_\tau = m_\tau) = P\left(\mu_\tau + \sum_{i=1}^n f_i \cdot B_i = m_\tau\right) \quad (4)$$

$$= N\left(m_\tau \,\bigg|\, \mu_\tau + \sum_{i=1}^n f_i \cdot \mu_{B_i}, \sigma_\varepsilon^2 + \sum_{i=1}^n (f_i \cdot \sigma_{B_i})^2\right)$$

Where similar to Eq. (1), $\mu_\tau$ may be zero or some other value such as a baseline, and $\sigma_\varepsilon^2$ is the variance of noise in the measurement $m_\tau$ ($\sigma_\varepsilon^2$ may be zero or some other value greater than zero). The expression of the form $N(x|a, b^2)$ represents the probability of x under a normal probability distribution with mean a and variance $b^2$, i.e., $$N(x \,|\, a, b^2) = \frac{1}{\sqrt{2\pi b^2}} e^{-\frac{(x-a)^2}{2b^2}}.$$

Let $\Theta$ to denote all the parameter values (i.e., $\Theta$ includes the parameters of the mean and variance of each bias value represented as a random variable). And let V be a set comprising k events $\tau_1, \ldots, \tau_k$, with each event $\tau_i$, $i= 1 \ldots k$, having a corresponding measurement $m_{\tau_i}$ and a corresponding vector of factors $\vec{F}_{\tau_i}$. The likelihood of the data V given the parameters $\Theta$, is denoted $P(V|\Theta)$. Thus in this example, learning parameters of bias values amounts to following an assignment to $\Theta$ that maximizes the likelihood:

$$P(V|\Theta) = \prod_{i=1}^{k} P(\mu_{\tau_i} + \vec{F}_{\tau_i} \cdot \vec{B}_{\tau_i} = m_{\tau_i} | \Theta) \quad (5)$$

Finding the set of parameters $\Theta$ for which $P(V|\Theta)$ is at least locally maximal (a maximum likelihood estimate for $\Theta$) may be done utilizing various approaches for finding a maximum likelihood estimate, such as analytical, heuristic, and/or randomized approaches for searching the space of possible assignments to $\Theta$.

In some embodiments, which involve bias values as described in Eq. (1) to Eq. (3), the bias values may be assumed to be independent of each other. Similarly, in some embodiments, the random variables in Eq. (4) and Eq. (5), may be assumed to be i.i.d random variables. There may be embodiments in which such independence assumptions do not hold in practice, but rather are only violated to a certain (acceptable) degree. Thus, the bias modeling approaches described above are still applicable and useful in embodiments where the independence assumptions may not always hold. Optionally, in some embodiments, dependencies between bias values may be modeled utilizing joint distributions of bias values. For example, the likelihood in Eq. (5) may be modeled utilizing a graphical model (e.g., a Bayesian network) having a structure that takes into account at least some of the dependencies between biases. In another example, certain factors may be generated by combining other factors; thus a bias value corresponding to the combination of factors will take into account dependencies between bias values.

In some embodiments, finding the values of bias values in $\vec{B}$ may be done utilizing a general function of the form $f(\vec{B},V)$, which returns a value indicative of the merit of the bias values of $\vec{B}$ given the measurement data corresponding to the events in V. Depending on the nature of the function $f(\vec{B},V)$ various numerical optimization approaches may be used. Additionally, an assignment of bias values for $\vec{B}$ may be searched utilizing various random and/or heuristic approaches (e.g., simulated annealing or genetic algorithms), regardless of the exact form of f which may even not be known in some cases (e.g., when f is computed externally and is a "black box" as far as the system is concerned).

Training parameters of models, e.g., according to Eq. (2), Eq. (3), Eq. (5), and/or some general function optimization such as $f(\vec{B},V)$ described above, involves setting model parameters based on samples derived from a set of events V. Optionally, each sample derived from an event $\tau \in V$ includes the values of the factors of the event ($\vec{F}_\tau$) and the measurement corresponding to the event ($m_\tau$). The accuracy of a parameter in a model learned from such data may depend on the number of different samples used to set the parameter's value. Depending on the type of model being trained, a parameter may refer to various types of values. In one example, the parameter may be a certain bias value, such as a value in one of the positions in the vector $\vec{B}$ in Eq. (1), and/or a certain distribution parameter, such as one of the $\mu_{B_i}$ or $\sigma_{B_i}$ in Eq. (4). As described above, each parameter in the model has a corresponding factor, such that when training the model, the value of the factor in various samples may influence the value assigned to the parameter. Thus, a sample that is used for training a parameter involves an event for which the factor corresponding to the parameter is a relevant factor (e.g., it belongs to a set of relevant factors or it has a non-zero weight that is larger than a threshold). Additionally, stating that a sample is used to set the value of a parameter implies that in the sample, the factor corresponding to the parameter is a relevant factor (e.g., the factor has a non-zero weight that is greater than the weight assigned to most of the factors in that sample).

Typically, the more different samples are used to set a parameter, the more accurate is the value of the parameter. In particular, it may be beneficial to have each parameter set according to at least a certain number of samples. When the certain number is low, e.g., one, or close to one, the values parameters receive in training may be inaccurate, in the sense that they may be a result of overfitting. Overfitting is a phenomenon known in the art that is caused when too few samples are used to set a value of a parameter, such that value tends to conform to the values from the samples and not necessarily represent the value corresponding to the actual "true" parameter value that would have been computed were a larger number of samples been used. Therefore, in some embodiments, when computing parameters, e.g., according to Eq. (2), Eq. (3), Eq. (5), and/or some general function optimization such as $f(\vec{B},V)$ described above, a minimal number of training samples used to set the value a parameter is observed, at least for most of the parameters (e.g., at least 50%, 75%, 90%, 95%, 99%, or more than 99% of the parameters in the model). Alternatively, the minimal number of training samples used to set each parameter is observed for all the parameters (i.e., each parameter in the model is set by samples derived from at least the certain number of different events). Optionally, the minimal number is at least 2, 5, 10, 25, 100, 1000, or more, different events.

In some embodiments, certain factors of an event, and/or their corresponding bias values, may be filtered out (e.g., by explicitly setting them to zero) if they are below a certain threshold. Optionally, when the values are below the certain threshold, they are considered noise, which when included in a model, e.g., when predicting affective response according to Eq. (1) are suspected of decreasing the accuracy, rather than increasing it. In one example, a factor $f_i$ is filtered out (or $f_i$ is explicitly set to zero) if $|f_i|<t_1$, where $t_1$ is a threshold greater than zero. In another example, a bias value $b_i$ is filtered out (or $b_i$ is explicitly set to zero) if $|b_i|<t_2$, where $t_2$ is a threshold greater than zero. And in another example, a term $f_i \cdot b_i$, e.g., as used in Eq. (1), is filtered out or explicitly set to zero if $|f_i \cdot b_i|<t_3$, where $t_3$ is a threshold greater than zero. Optionally, in the examples above, the thresholds $t_1$, $t_2$, and $t_3$ are set to such values that correspond to a noise level (e.g., as determined from multiple events). Filtering of the factors, bias values, and/or terms that are below their respective thresholds may, in some embodiments, reduce the number of factors and bias values that are considered, to a large extent. For example, such filtration may leave only a small number of terms when utilized by a model, possibly even only one or two factors and bias values. In some cases, the above filtration may remove all factors and bias values from consideration, essentially resorting to modeling a measurement of affective response by using a baseline value. For example, extensive filtration of possibly noisy factors and/or bias values may reduce Eq. (1) to something of the form $m_\tau = \mu_\tau + \varepsilon$.

The discussion regarding training models according to Eq. (2), Eq. (3), Eq. (5), and/or some general function optimization such as $f(\vec{B}, V)$ described above, refers to training models involving bias values for individual users. Thus, the events in a set V may involve events of an individual user. However, those skilled in the art will recognize that the discussion and results mentioned above may be extended to training models of multiple users, such that biases of multiple users may be learned in the same training procedure. In this case, the set V may include events involving multiple users.

In particular, in some embodiments, values of certain bias parameters (e.g., certain bias values or distribution parameters described above), may be shared by multiple users. For example, a certain bias may involve multiple users belonging to a certain group (e.g., a certain ethnic group, gender, age group, etc.), who are assumed to have a similar reaction to a certain factor of an event. For example, this may model an assumption (which may not necessarily be correct) that all elderly people react similarly to rap music, or all politicians react similarly to golf. In some embodiments, setting parameters according to multiple users may be advisable if each user is involved in only a small number of events (e.g., smaller than the minimal number mentioned above). In such a case, setting parameters according to samples from multiple users may increase accuracy and reduce instances of overfitting the parameters to the training data.

14—Bias Functions

The previous section described an approach in which biases are represented through bias values that correspond to factors of an event. A common characteristic of some embodiments using such an approach is that the effect of the biases is modeled as being governed by a structured, relatively simple, closed-form formula, such as Eq. (1). The formula typically reflects an assumption of independence between factors and between bias values, and is often linear in the values of the relevant bias values and weights of factors. However, in some embodiments, the effects of biases may be modeled without such assumptions about the independence of factors, and a formula involving factors and bias values that is additive and/or linear. In particular, in some embodiments, the effects of biases may be complex and reflect various dependencies between factors that may influence affective response of users in a non-linear way.

In some embodiments, bias functions, described in this section, model effects of biases while making less restricted assumptions (e.g., of independency and/or linearity of effects), compared to linear functions of bias values and factors described in the previous section. Optionally, bias functions are implemented using machine learning-based predictors, such as emotional response predictors like ERPs, which are described in more detail at least in section 6—Predictors and Emotional State Estimators.

In some embodiments, implementing a bias function is done utilizing an ERP that receives as input a sample comprising feature values that represent factors related to an event $\tau = (u, e)$. For example, a sample may comprise values of factors, such as values from $\vec{F}_\tau$ described in previous sections, and/or values derived from the factors. Additionally or alternatively, the sample may include various other values derived from a description of the event $\tau$, as discussed in section 4—Events. These other values may include values describing the user u, the experience e, and/or values corresponding to attributes involved in the instantiation of the event $\tau$ (e.g., the location where it happened, how long it took, who participated, etc.). The ERP may then utilize the sample to predict an affective response corresponding to the event, which represents the value m of a measurement of affective response of the user u to having the experience e (had such a measurement been taken).

Many types of machine learning-based predictors, including predictors that may be used to implement an ERP, are capable of representing non-linear functions of feature values that may reflect dependencies between some of the feature values. These dependencies may be between factors and/or other values such as values characterizing the user or experience corresponding to an event. As such, the predictors may be used to model a user's biases (i.e., the user's "bias function"), in which factors may influence the value of affective response to an experience in a wider array of ways than may be modeled with bias values alone, as described in the previous section. This wider capability may be used, in some embodiments, to offer a modeling of various complex thought processes the user may have with respect to relevant factors. The nature of these thought processes and/or their results may be characteristic of the user's psyche, world view, moral values, etc.

In some embodiments, biases of a user modeled using an ERP are learned from data comprising samples derived from a set of events V. Optionally, each sample based an event $\tau \in V$ comprises feature values corresponding to the event $\tau$ and a label that is based on $m_\tau$, which is a measurement of affective response corresponding to $\tau$ (i.e., a measurement of $u_\tau$, the user corresponding to $\tau$, to having $e_\tau$ the experience corresponding to $\tau$). In one example, the feature values may include factors taken from the vector $\vec{F}_\tau$ described above. In another example, the feature values may include values derived from the description of the event $\tau$, such as values describing aspects of the user $u_\tau$, the experience $e_\tau$, and/or aspects of the instantiation of the event $\tau$).

As described in section 6—Predictors and Emotional State Estimators, there may be various machine learning approaches that can be used to train an ERP. Additionally, as mentioned in more detail in that section, depending on the composition of events in V, the ERP may be generalizable and be able to predict affective response to certain events that may not be well represented in V (or represented in V at all). Optionally, an ERP may be generalizable because the samples it is trained with include feature values that describe various aspects of an event. These aspects may come from a description of an event, and not necessarily be factors of the event. Thus, while the user may not have a direct reaction to these aspects, they may help in determining the reaction of the users to other aspects of the event. In one example, feature values in a sample may describe demographic characteristics of a user (e.g., age, occupation, ethnicity, level of education, region of residence, etc.) These aspects are not aspects that a user typically reacts to (since they are the same in all events which involve the user). However, knowing these aspects may help predict the affective response of a user to an event since for example, it is likely that people from a similar background may react similarly to having a certain experience. For further discussion about how an ERP may be generalizable to new users, new experiences, and/or both, see discussion of generalizable ERPs in section 6—Predictors and Emotional State Estimators.

In some embodiments, the set V of events, from which the samples used to train an ERP are derived, includes events corresponding to multiple users. That is, V includes at least first and second events such that the first event corresponds to a first user and the second event corresponds to a second user that is not the first user. Optionally, the first and second events involve different corresponding experiences. Optionally, the first and second events correspond to the same experience. Optionally, V may include events corresponding to a number of different users that is at least 2, 5, 10, 25, 100, 1000, 10000, or at least 100000 different users. Additionally or alternatively, V may include events corresponding to multiple experiences and/or events corresponding to experiences of different types. That is, V includes at least third and fourth events, such that the third event corresponds to a first experience and the fourth event corresponds to a second experience that is not the first experience. Optionally, the third and fourth events involve different corresponding users. Optionally, the third and fourth events correspond to the same user. Optionally, V may include events corresponding to a number of different experiences that is at least 2, 5, 10, 25, 100, 1000, 10000, or at least 100000 different experiences.

It is to be noted that because of the composition of events in V used to train the ERP, the ERP may be considered generalizable to some extent. Optionally, by being "generalizable", it means that the accuracy of the ERP does not fall significantly when predictions are made for samples of unfamiliar events compared to the accuracy of predictions made with samples corresponding to familiar events. The generalizability of an ERP may take various forms. For example, in one embodiment, because V contains events corresponding to multiple users, an ERP trained on samples derived from V may be considered generalizable to unfamiliar events involving unfamiliar users. For example, the ERP may be used to predict affective response corresponding to a certain user, where the number of events corresponding to the certain user in the set V is below a certain threshold, or the set V may not include any events involving the certain user at all. In another embodiment, because V contains events corresponding to multiple experiences, an ERP trained on samples derived from V may be considered generalizable to unfamiliar events involving unfamiliar experiences. For example, the ERP may be used to predict affective response corresponding to a certain experience, where the number of events corresponding to the certain experience in the set V is below a certain threshold, or the set V may not include any events involving the certain experience at all. In still another embodiment, because V contains events corresponding to multiple users and multiple experiences, an ERP trained from samples derived from V may be considered generalizable to unfamiliar events involving unfamiliar combinations of users and experiences. For example, the ERP may be used to predict affective response corresponding to an event involving a certain user and a certain experience, where the number of events corresponding both to the certain user and to the certain experience in the set V is below a certain threshold, or the set V may not include any events involving the both the certain user and the certain experience at all. Section 6—Predictors and Emotional State Estimators contains additional discussion regarding generalizable ERPs and generalizable ERPs.

In some embodiments, the set V of events, from which the samples used to train an ERP are derived, includes events corresponding to multiple users, and at least some of the samples include feature values that are based on one or more scores. For example, each sample, from among the at least some of the samples, may include a feature value that corresponds to the quality of an experience corresponding to the event the sample represents, which is determined from a score for the experience corresponding to the event. Optionally, the score is computed based on measurements of affective response of multiple users, where depending on the embodiment, the multiple users include at least 2, 3, 5, 10, 100, 1000, 10000, or at least 100000 different users. Optionally, at least some of the multiple users are corresponding users for events in V. Alternatively, not one of the multiple users is the corresponding user of an event in V. Additionally, in some embodiments, the measurements of affective response of the multiple users may all be taken within a certain window of time. For example, the window of time may span a second, thirty seconds, a minute, fifteen minutes, an hour, a day, a week, a month, a year, more than a year, or some other time frame between one second and one year.

In some embodiments, when assigning a value to a certain feature of a sample corresponding to an event $\tau$, the value assigned to the certain feature may correspond to a quality of the experience corresponding to the event $\tau$. Optionally, this quality is represented by the value of n score for the experience corresponding to $\tau$. In one example, the certain feature may correspond to the quality of a dining experience at a certain restaurant. In this example, the value of the certain feature is determined from a score computed based on measurements of affective response of multiple users who ate at the restaurant. In another example, the certain feature may correspond to the extent a vacation at a certain destination is relaxing. In this example, this value is computed from a score that expresses a level of expected relaxation, which is computed based on measurements of affective response of multiple users who had a vacation at the certain destination. In yet another example, the certain feature may correspond to the expected satisfaction level from a product. In this example, the expected satisfaction is based on a score computed from measurements of affective response of the multiple users when using the product.

It is to be noted that the value assigned to the certain feature may be different for samples corresponding to different events. This phenomenon may arise when some samples may have the value of the certain feature set based on different scores for an experience, with each different score computed based on a different set of measurements of affective response. Optionally, each different set of measurements may comprise measurements corresponding to a different set of events, which may or may not involve a different set of corresponding users. For example, a feature value corresponding to the quality of a train ride may be set based on a score computed from measurements of users who all traveled on the same train at the same time. Thus, every day, the score may be different, since it is based on a different set of measurements of affective response. Thus, the value given to the certain feature in a first sample, corresponding to a first event whose instantiation was on a first day, may be different than the weight given to the certain feature in a second sample, corresponding to a second event whose instantiation was on a second day, which is different than the first day. This is because the score for the train ride on the first day is not the same as the score for the train ride on the second day, since the score for each day is computed based on a different set of measurements of affective response.

In some embodiments, the multiple users, whose measurements are used to compute a score, may be similar to each other in some way. In one embodiment, the multiple users are considered similar by virtue of belonging to a group of people with a similar demographic characteristic. For example, the similar demographic characteristic may involve belonging to a similar age group, being in a similar income bracket, having a similar type of occupation, having a similar ethnicity or religion, possessing a similar educational background, and/or residing in a certain region. In another embodiment, the multiple users are considered similar by virtue of having similar profiles. In one example, a profile may include indications of experiences its corresponding user had (e.g., type of experience, location, duration, and date). In another example, the profile may include demographic data about of the corresponding user, information about content consumed by the user, and/or content generated by the user (e.g., content from a social network account of a user). In yet another example, a profile of a user may include values of measurements of affective response of the user to experiences and/or models derived from such measurements, such as a model of biases of the user.

In some embodiments, the set V of events, from which the samples used to train an ERP are derived, includes some events with a corresponding measurement of affective response, while other events in V do not have corresponding measurements of affective response. Optionally, a training set comprising samples derived from the events in V is generated in order to train the ERP and comprises labeled samples that have a label derived from a corresponding measurement of affective response, and unlabeled samples that do not have a label derived from a corresponding measurement of affective response. Optionally, most of the weight of samples in the training set is attributed to unlabeled samples. Furthermore, in one embodiment, more than 90% of the weight of samples in the training set is attributed to unlabeled samples. Herein, the weight of samples is indicative of the influence the samples have on parameters of a model trained with the samples, such that the higher the weight of a sample, the more it influences the values of the parameters.

In one embodiment, semi-supervised learning methods may be used to train the ERP, such as bootstrapping, mixture models and Expectation Maximization, and/or co-training. Semi-supervised learning methods are able to utilize as training data unlabeled samples in addition to the labeled samples.

In one embodiment, a bootstrapping approach is utilized, in which unlabeled samples are labeled by an ERP and then the ERP is re-trained with the newly trained samples (in addition to samples that originally labeled samples).

In some embodiments, samples that are provided to an ERP as queries, and/or are utilized for training the ERP, may contain one or more features that represent biases of a user. Optionally, the one or more feature values may be derived from bias values of the user, which were learned from data comprising multiple events. Optionally, at least some of the multiple events may belong to the set V. Alternatively, the bias values may be learned from a set of events that does not belong to the set V.

In one embodiment, a sample corresponding to an event $\tau \in V$ includes, as feature values, the weights of one or more factors of $\tau$, such as values from the vector $\vec{F}_\tau$ described above. Optionally, the sample includes, as feature values, bias values corresponding to the one or more factors, which are taken from the vector $\vec{B}_\tau$ described above. Optionally, the sample may include feature values derived from the bias values corresponding to the one or more factors (e.g., the feature values may be functions of the bias values).

In one embodiment, a sample corresponding to an event $\tau \in V$ includes, as feature values, the product of the weights of one or more factors with their corresponding bias values. For example, given a vector of factors $\vec{F}_\tau$ and corresponding bias values $\vec{B}_\tau = (b_1, b_2, \ldots, b_n)$, the sample may include feature values corresponding to one or more terms of the form $f_i \cdot b_i$, for at least some values of $1 \leq i \leq n$. Optionally, the feature values may be derived from the one or more terms of the form $f_i \cdot b_i$. For example, the feature values may be functions of the one or more terms of the form $f_i \cdot b_i$.

Including feature values that involve bias values, such as the feature values mentioned above, may enable refinement of predictions of affective response. In particular, since some ERPs may involve non-linear functions, providing the ERPs with both bias values and factors may enable an ERP to model certain non-linear dependencies that may not be accurately modeled using a function of factors and bias values that have a simple closed-form formula, such as Eq. (1).

In one embodiment, training a bias function, such as a bias function implemented with an ERP is done in two steps. The first step involves learning bias values from training data. The second step involves training the ERP utilizing the training data and the bias values. Optionally, the second step involves adding bias values as features to training samples in one or more of the ways mentioned above, and training the ERP with the samples that include the bias values as features.

Bias functions may be utilized, in some embodiments, to learn bias values corresponding to individual factors and/or combinations of factors. For example, once an ERP that implements a bias function is trained, it can be used to make various predictions that may teach the bias values a user likely has.

In one embodiment, the bias value corresponding to a certain factor is determined utilizing an ERP. Let f' denote the weight of the certain factor. In this embodiment, the ERP is utilized to compute the corresponding bias value b'. Computing b' is done as follows. Given an event, two related samples are generated for the ERP. The first sample is a sample that contains all factors and their corresponding weights, which would typically be included in a sample corresponding to the event. The second sample is a sample identical to the first, except for the certain factor, whose values is set to zero (i.e., in the second sample f'=0). After providing both samples to the ERP, the difference between the first sample (which includes the certain factor) and the second sample (which does not include the certain factor) represents the effect of the certain factor, from which an estimate of b' may be derived. That is, the difference between the prediction of emotional response to the first sample and the prediction of emotional response to the second sample is the term f'·b'. By dividing the difference by the weight of f', an estimate of the value of b' may be obtained.

In one embodiment, computing an estimate of the bias value using the process described above is repeated n times utilizing different events, where n>1 (e.g., n may be 5, 10, 100, 1000, or 1000). Optionally, the value of b' is determined based on the n estimates of b' computed from pairs of samples generated for the n different events, such as the average of those n estimates. Optionally, additional statistics are computed from the n estimates, such as the variance of b'. Optionally, probability density function of b' is computed from the n estimates.

15—Overview of Risk to Privacy

Various embodiments described herein involve the collection of large amounts of measurements of affective response. Some embodiments may involve the collection of data from dozens, hundreds, thousands, and even millions of users. Additionally, due to the pervasiveness of sensors in our daily lives (e.g., in wearables, gadgets, and implants), this data may be collected many times during the day and/or with respect to a large number of experiences. Thus, processing affective response data is well within the realm of "big data" analysis (which involves analysis of large-scale datasets). Gaining access to measurements of affective response along with data about the event corresponding to the measurements can yield, using various big data analysis approaches, a vast amount of insight into various attitudes, preferences, inclinations, and biases users may have at various times and/or towards a vast number of different experiences and/or issues. The analysis of measurements of affective response may benefit from additional big data from other sources such as browsing histories, billing data (e.g., digital wallet transactions), geo-location data (e.g., smart phone GPS data or network communication data), and/or user communication data (e.g., emails, text messages, audio, and video conversations). All these data sources may be combined in analysis, along with the measurements of affective response, in order to gain more insights measurements and/or the events to which they correspond.

One feature that makes big data analysis very useful is that it can leverage data acquired from many users in order to make inferences about individual users. Various approaches such as clustering and collaborative filtering can utilize data from other users to make inferences about single users regarding aspects about which the single users did not directly provide data. One promising area of big data applications involves content recommendations, such as the movie rating prediction algorithms developed in the Netflix prediction competition (see for example J. Bennet and S. Lanning, "The Netflix Prize", KDD Cup and Workshop, 2007 and the URL: www.netflixprize.com, for more details). In this competition, a large database of user ratings to movies was leveraged using collaborative filtering approaches to generate movie recommendations for users. Each user provided a certain number of ratings to movies the user watched (on average, each user provided ratings to approximately 220 movies from over available 17000). Because the training data was collected from a large number of users (over 480,000), that data was sufficient to infer ratings of users to other movies with fairly high accuracy (see for example Koren et al. (2009), "Matrix factorization techniques for recommender systems", *Computer* 42.8 pages 30-37, which describes a successful collaborative filtering approach used with this data).

The results of the Netflix prediction challenge illustrate the powerful inferences that can be done with big data. However, these inferences are not limited to predicting user ratings. When the ratings are combined with additional data (e.g., from other sources), unintended and/or undesired inferences about users may be made, which may violate the privacy of the users. For example, Salamatian et al. "How to hide the elephant- or the donkey- in the room: Practical privacy against statistical inference for large data," *Global Conference on Signal and Information Processing* (*GlobalSIP*), 2013 *IEEE*, pp. 269-272, describe how knowing user's ratings for television series can reveal information they may consider private such as political inclinations. The juxtaposition of these two examples illustrates both the promises and perils in big data. On the one hand, a user who provides ratings can gain improved services (e.g., suggestion of movies the user may enjoy). And on the other hand, there is a threat that seemingly innocuous rating data (e.g., movie or television program ratings) may be used to make inferences that may violate a user's privacy (e.g., inferences about the user's political orientation, sexual orientation, gender, age, race, education, and/or income).

Both the utility of big data analysis and the danger it poses to privacy depend on the extent of data that is collected. The more data is collected about various facets of users' lives, the better the suggestions and predictions that may be made to benefit users, such as determining which products a user is likely to enjoy, what healthy food the user is likely to find appetizing, or what vacation destination is likely to be the most enjoyable for a user. However, increasing the extent of data collected, both in terms of the amount of data collected per user, and in terms of the number of users of whom data is collected, is also likely to increase the power to make inferences about private data of the users, as discussed above. Thus, bid data analysis may be considered a double-edged sword, with there being a balance that needs to be maintained between utility and the risk to privacy.

Both the benefits and the perils of big data are only likely to increase as more and more measurements of affective response get collected. Measurements of affective response can be collected while a user has a wide range of experiences (e.g., visiting locations, participating in activities, using products, e.g., consuming content). These measurements may be used to determine how the user felt towards the experiences; thus, the measurements may be considered user ratings that may span a much wider range of aspects of a user's life than ratings to content. Additionally, measurements of affective response may be taken automatically, possibly without the user being aware that he/she is rating something at that time. These ratings may be taken multiple times, such as during multiple times a user has the same experience, and therefore, may be combined to provide an accurate rating of the user. Since the measurements are of physiological signals and/or behavioral cues, they are more likely to be a genuine expression of a user's emotion than a response to a survey (e.g., providing a star rating). A response to a survey is more likely to be manipulated by the user than an automatically collected affective response (e.g., a user might be ashamed to rate highly content that the user thinks society considers inappropriate). Thus, measurements of affective response are more likely to reveal a user's true feelings about various aspects of life, which the user might want to keep private, and wouldn't candidly reveal if asked to actively rate those aspects.

In some embodiments, a user may choose to share his/her measurements of affective response with a certain entity. In such a case, the risk of providing the measurements may be assessed. In particular, the risk involved in disclosing the measurements may be assessed before the disclosure in order to determine whether to disclose, how much to disclose, and/or how much compensation is desired for the disclosure. Optionally, this analysis may be performed by a software agent operating on behalf of the user whose measurements are disclosed.

The process of learning biases may be used, in some embodiments, to evaluate the risk posed to a user from disclosing measurements of affective response directly to an entity that may model the user. It is to be noted that this risk may be different from the risk of contributing measurements of affective response to the computation of scores for experiences, which is discussed further in disclosure. The risk associated with direct disclosure of measurements may, in some embodiments, be used to determine whether or not to disclose measurements, the frequency at which measurements are to be disclosed, the extent of measurements that are to be disclosed, and/or the compensation to request for disclosing the measurements. Optionally, the determinations may be made by a software agent operating on behalf of the user, possibly without an intervention by the user.

In order to evaluate the risk of providing the certain entity with measurements, a model of the user may be trained according to those measurements and then analyzed to determine the effect the measurements had on the model. For example, the procedures used to minimize the error in Eq. (2) or Eq. (3) and/or increase the likelihood of Eq. (5), may be run in order to generate a model of the user that includes biases of the user. This model can then be analyzed in order to determine the risk to the user. This risk may be determined based on various characteristics of the model. Optionally, a value representing the risk is generated by a risk assessment module. Optionally, the risk assessment module is part of a software agent operating on behalf of the user whose measurements are analyzed, and/or the risk assessment module is utilized by the software agent.

In one example, the model may be analyzed to determine the average change in one or more bias values due to disclosure of measurements of the user. Optionally, the one or more bias values may initially be assigned a prior value, or set to 0. If the change after incorporating the measurements into the model is large, this may indicate that the measurements provide a lot of information about the user. Thus, in this example, the risk to privacy may be proportional to the change in the values of one or more bias values.

In another example, the model may comprise biases that are described via parameters of distributions of random variables. In such a case, the risk may be expressed as the distance between a prior distribution of one or more of the random variables and a distribution updated according to the measurements (i.e., a posterior distribution). Optionally, the distance may be expressed as a divergence (e.g., Kullback-Leibler divergence) and/or a distance such as Mahalanobis distance. In this example, the higher the distance between the prior and posterior distributions, the more the measurements contributed information about the user (which led to a significant update of the model of the user causing the distance between the distributions).

In yet another example, the predictive power of the model to predict values of measurements of affective response, e.g., according to Eq. (1) or when the model is used by an ERP, may be evaluated by using a test set corresponding to events. The test set may include samples containing factors of the events and labels derived from measurements of affective response corresponding to the events. If the accuracy of the predicted values reaches a certain level (e.g., predicted values are within a certain margin from the actual labels), the user may be considered to be well modeled, and as such at risk. Optionally, the risk may be expressed as the accuracy level of the model when used to predict affective response corresponding to events and/or as the increase in the accuracy (e.g., when compared to the model available prior to updating with the disclosed measurements).

An approach that is often used to protect privacy, and may be used in some embodiments, is to add distortion to data prior to releasing it for big data analysis. This approach is used to obtain "differential privacy", which aims to provide means to maximize the accuracy of queries from statistical databases while minimizing the chances of identifying its records. Typically, noise generated from a Laplace distribution is added to data in such a way that minimizes the information gained on a user from the release of a record of the user (e.g., measurement data), but still enables a statistical query, such as computing a score based on multiple measurements.

However, since measurements of affective response of users may involve repeated measurements to the same experience, in some cases, the actual bias of a user may still be inferred from multiple noisy measurements. This is especially true for measurements corresponding to experiences that involve daily activities, which may be taken hundreds and even thousands of times. Thus, in some embodiments, adding noise to measurements of affective response is not the only step taken to ensure privacy; other steps, such as analysis of risk and/or disclosing scores for experiences, as described below, may be utilized in addition to adding noise or in place of adding noise to measurement data.

Another approach that may be used when trying to maintain privacy is to utilize measurements of affective response to generate aggregate results such as the crowd-based scores described in various embodiments in this disclosure. In this approach, measurements of affective response of individual users are not released, but rather only a result obtained by a function operating on measurements of multiple users is released, such as an average of the measurements of the multiple users. A commonly held assumption is that releasing an aggregate result is often sufficient to protect a user's privacy. There is often no way to tell which users contributed a measurement that was used to compute the aggregate result. Additionally, even if there is information about the identity of the users who contributed measurements to computing an aggregated result, it may be difficult, and even impossible, to infer much information about the value of the measurements of individual users, thus, for example, keeping the users' biases private. However, while this assumption may be true in some cases, as explained below, with measurements of affective response, this assumption may not hold in many cases.

Measurements of affective response of users typically take place in "real world" scenarios, while users are having "real world" experiences such as visiting locations, participating in activities, and/or consuming content. Usually, when taking a measurement of affective response of a user to an experience, there are other parties involved in the experience, besides the user; for example, other users participating in the experience and/or vendors or service providers involved in the experience. These other parties can often recognize the user and forward this information, without the user's knowledge or consent. For example, a company that streams content, knows what each user watches and when, thus if, for example, it receives a certain crowd-based score for a certain program it streamed, it may be able to deduce which users contributed measurements to the score. Similarly, a hotel knows the identity of guests that stayed at it during a certain week, so it may also deduce which users likely contributed measurements to a score of the hotel's performance. In these cases, large numbers of viewers/hotel guests may help mask the users who provided measurements, but lists of likely users may be refined using other sources of information (e.g., information of users frequently rewarded for providing measurements and/or information about users who own gadgets with sensors that may be used to provide measurements). Additionally, with some scores for experiences, such as a score generated from measurements of users that interact with a human service provider during a certain period of time, it may be quite simple to deduce which users provided measurements that are aggregated to produce a score due to the relatively small number of potential users involved.

In addition to the straightforward identification of users described above, in this digital day and age, many devices and/or sensors may identify the location of users in the real world. Users may not be aware that they are providing this information and/or have control on how it is disseminated or used. For example, there is an ever-growing number of cameras in a typical user's surrounding that may be used for surveillance and/or identification of users. These include a variety of webcam and security CCTV cameras operated by various entities (both state and private) and a growing number of wearable cameras (e.g., on Google Glass or HoloLens) that may be used by individual users. Increasing performance of various facial recognition and gait analysis algorithms means that a growing number of entities can identify users in a large number of locations and determine the experiences in which they participate.

Another way users may be identified by third parties is through digital footprints and/or electromagnetic signals of their devices. Users may carry sophisticated devices (e.g., smartphones or wearable devices) that may login or identify themselves to various sites and/or networks. This may be done using various signals such as Bluetooth, Wi-Fi, and/or cellular signals. These signals may be sent frequently, often without a user being aware of it, and enable various entities to place the user at certain times in certain places.

There is a growing trend of conducting more and more interactions by users in the digital world, such as social media posting and utilizing digital wallets to conduct financial transactions. Analysis of this information can help third parties gain information about users' whereabouts and what experiences they had.

Based on the aforementioned examples, it is clear that often users do not know who is collecting data about their whereabouts, what data is collected, or how it is being shared. Additionally, users often do not even have full control over the information they, or their devices, provide to the outside world. Thus, a prudent precaution is to assume that third parties can gain information about users, their whereabouts, and the experiences they have. This information may be used to identify the users who contributed measurements of affective response to a computation of an aggregate score. Therefore, assessment of the potential risk involved in releasing of even aggregate results may be required in order to preserve user privacy and reduce the risk that inferences, which are possibly undesired and/or unintended, are made from their measurements of affective response.

Computing of crowd-based scores for experiences based on measurements of affective response of users may involve, in some embodiments, a trusted entity that collects and/or processes the measurements of affective response in order to produce the score. Herein, a trusted entity is a party that may have access to private data of users and/or to measurements of affective response of the users. Additionally or alternatively, a trusted entity may have access to information that may be used to associate between users and experiences, such as data identifying that users participated in a certain experience and/or that measurements of affective response of certain users were used in the computation of a score for the certain experience.

When considering risks to privacy, in some embodiments, a trusted entity that participates in the computation of scores from measurements of affective response is assumed not to directly disclose values of measurements, identities of users, and/or other information it is not authorized to disclose. That is, as its name suggests, the trusted entity may be "trusted" by users to follow a certain protocol, guidelines, and/or policy according to which it does not perform acts that involve direct disclosure of information of the users that is considered private. Optionally, the trusted entity is the same entity that provides an experience for which a score is computed. Optionally, the trusted entity is a third party that does not represent a user, a group of users, or a provider of an experience. Optionally, the trusted entity operates according to a policy that governs how data it utilizes is acquired, stored, processed, backed-up, and/or deleted. Optionally, the trusted entity operates according to a policy that governs what use may be done with measurements of affective response and/or other data related to experiences and users that had the experiences. Optionally, the policy may identify certain purposes for which using the measurements is acceptable (e.g., computing certain types of scores), while other uses may not be acceptable.

In some embodiments, a trusted entity may identify a level of a risk to the privacy of one or more users, which is associated with disclosing one or more scores computed based on measurements of affective response. Optionally, if the trusted entity determines that the risk to privacy is below a certain level (which is acceptable), it may allow the utilization of the measurements for computing the score and/or it may allow the disclosure of the score. Optionally, if the trusted entity determines that the risk to privacy is not below the certain level, it may forbid utilization of the measurements and/or it may forbid the disclosure of a score computed based on the measurements.

In some embodiments, an aggregator of measurements of affective response of users that are used to compute scores might not be a trusted entity, and/or the aggregator may be assumed a trusted entity, but as a precaution, it may be treated as not being trusted. Optionally, the aggregator operates according to a protocol that does not enable it to determine values of individual measurements of affective response of users, rather only to produce an aggregated (crowd-based) score from the measurements. An example of such an approach is given by Erkin et al. (2014), "Privacy-Preserving Emotion Detection for Crowd Management", *Active Media Technology*, Springer International Publishing, pp. 359-370, which describes a framework that uses homomorphic encryption to create an environment in which a score is computed securely from measurements of affective response of users. The score can only be computed if at least a predetermined number of users contribute their encrypted measurements, and the computation is performed in such a way that does not require access by the aggregator to unencrypted measurements.

Whether a crowd-based score is computed based on using a trusted entity or not, and setting aside the risk of direct leakage of information (e.g., due to hacking and/or some other exploitation of a security vulnerability in an aggregator), releasing scores computed based on measurements of affective response may pose a risk to the privacy of the users who contributed the measurements. Optionally, the risk to the privacy relates to the risk due to the fact that a recipient of a score may make inferences based on the scores about one or more users who contributed a measurement of affective response used to compute the score. Below we discuss some ways in which a risk to privacy may be characterized and/or evaluated.

In some embodiments, the risk to the privacy of users associated with a disclosure of one or more scores is proportional to the amount of private information that may be learned about the users from a disclosure of the one or more scores (which are considered public information). Optionally, private information may be information from a model of a user (e.g., values of bias values the user), which the user may desire to keep hidden from third parties that do not directly receive measurements of affective response of the user. In this context, a risk associated with the disclosure of one or more scores may be considered in terms of improvement to a model of the user that is created by an adversary based on information learned from the one or more scores that are disclosed.

Herein, the term "adversary" is used to describe any entity (human or non-human) that may possibly attempt to learn information about users and/or experiences based on one or more disclosed scores. Optionally, the information about the users may involve values of measurements of affective response contributed by one or more of the users to the computation of a score from among the one or more disclosed scores. Optionally, the information may involve bias values of one or more of the users who contributed a measurement of affective response contributed by one used to compute a score from among the one or more disclosed scores.

It is to be noted that the use of the term "adversary" herein does not necessarily mean that the entity that is the adversary has malevolent motives and/or acts in an unlawful and/or unauthorized way. Additionally, it does not necessarily mean that the adversary actively learns information about the users from a disclosed score and/or intends to learn the information, nor does it necessarily mean that the entity is prohibited from learning the information if it does do so. Additionally, the term adversary does not necessarily imply that the entity may not have access to the information about the users if it requested the information. For example, in some embodiments, an adversary may request values of measurements of affective response (e.g., request the values from a user) and/or request bias values of users from an entity that holds a model of a user (e.g., a software agent of the user or a repository that holds models of users). In addition, the term "adversary" is used to denote multiple entities that may share data collected from monitoring users and/or scores computed based on measurements of users. For example, multiple providers of experiences that share data they collect may be considered in this disclosure an "adversary".

In one embodiment, the improvement to a model may be given in terms of accuracy of parameters of the model. For example, the improvement may be framed as a reduction of the size of confidence intervals for bias values; e.g., a reduction of the 95% confidence range for a bias value towards a certain experience from a first range of 1.5-4 to the range 2-3.5 may be considered an improvement of the model's accuracy. In another example, the accuracy may refer to the magnitude of a parameter in the model such as the variance of a certain bias when represented by a random variable having a certain distribution. In this example, a smaller variance may be considered to correspond to an improved modeling of a user.

In another embodiment, the improvement to a model may be given in information theoretic terms, such as entropy and/or bits of information. Optionally, the improvement may be proportional to the information gain to the model as the result of the disclosure of the one or more scores. For example, assuming X is a random variable corresponding to a bias of a user and X' is the random variable corresponding to the bias from a model of the user that was updated according to disclosed scores, then the information gain may be given according to the Kullback-Leibler divergence ($D_{KL}$) between X and X'. In this example, the larger the $D_{KL}$ between the distributions before and after adjusting according to the disclosed scores, the greater the gain in information about the user as a result of the disclosing of the one or more scores. In another example, the information gain may be given in terms of mutual information between X and X'. In this example, the lower the mutual information, the more the modeling of a bias has changed as the result of disclosing the one or more scores.

In some embodiments, the improvement to a model may be given in terms of the difference between estimated parameters (e.g., parameters estimated by an adversary according to disclosed scores), and a ground truth for the values of the parameters. For example, a user, and/or a trusted entity, may have an accurate model of the biases of the user, which is created directly from measurements of affective response of the user. An adversary may attempt to model biases of the user based on scores, computed based on the measurements of the user (in addition to measurements of other users). In such a case, the user and/or trusted entity may mimic the process performed by an adversary to determine when parameters estimated by an adversary become close to the ground truth parameter values. The distance of the estimated parameters to the ground truth may be expressed in various ways such as the ratio between the estimated parameters and the ground truth and/or a divergence between a distribution corresponding to the estimated parameters and a distribution corresponding to the ground truth parameters.

The risk to privacy posed by disclosing scores may be composed of contributions of various risk components that may be evaluated separately and/or jointly. Optionally, the risk exists because an adversary may have knowledge that identifies at least some of the users that contributed measurements of affective response that were used to compute the scores, which enables the values of the scores to provide information about the at least some of the users. This contributed information may be considered private (e.g., information about biases), which a user does not want to release and/or information that a trusted entity that releases the scores is not supposed to release.

In some embodiments, risk associated with disclosing one or more scores for experiences may be described as a function of the information that is disclosed and/or of values derived from that information. Thus, the information that is disclosed may be viewed as an input to the function. The function may also receive, as input, information that involves previously disclosed scores (disclosed prior to the disclosing of the one or more scores) and/or additional information that may not be directly derived from, and/or related to, the one or more scores. The function returns a value indicative of the extent of the risk to privacy that is associated with disclosing the one or more scores. Optionally, a value returned by the function may refer to the risk to one or more users (e.g., the maximal risk to one of the users who contributed measurements), and/or to the average risk (e.g., to an average user who contributed measurements). Optionally, the function may return the value indicating the risk to a specific user. Optionally, the risk is compared to a threshold to determine how to disclose the one or more scores, such as whether to disclose the one more scores and/or how much information to disclose.

It is to be noted that as used herein, when the risk is said to be a function of a certain input (or component), it means that the value of the risk is computed based on that input. However, this does not preclude the risk from being a function of other inputs (or components). Thus, for example, stating that the risk associated with disclosing a score is a function of the number of users who contributed measurements to the score does not preclude the risk from also depending on the variance of the measurements (thus the risk may also be a function of the variance).

Additionally, as used herein, a reference to a function that is used to compute a risk associated with the disclosure of one or more scores may refer to a single function or a plurality of functions, procedures, and/or services, which are run in a cooperative manner and/or whose results are combined in order to generate a value that describes the risk. Optionally, the plurality of functions, procedures, and/or services need not all be run by a single entity and/or owned by the same entity (e.g., they may run under administrative privileges of different entities). Additionally or alternatively, the plurality of functions, procedures, and/or services need not all run on the same processor (e.g., they may run on various servers, possibly located at various sites) and/or they need not all run at the same time (e.g., some may run in parallel while others may run serially, but not necessarily one directly after the other).

The extent of the risk from disclosing one or more scores for experiences may be influenced by various risk components related to the one or more scores, to the measurements used to compute the one or more scores, and/or to the users who contributed the measurements. Some risk components may relate to a score when viewed independently of the other scores, while other risk components may relate to the effect of disclosing related scores, and/or the cumulative effect of disclosing scores, as described below.

In some embodiments, a risk component may relate to a single disclosed score, which is viewed independently of other scores. In this case, knowing that a user contributed a measurement of affective response to the computation of the disclosed score may reveal private information of the user. This type of risk is discussed in further detail at least in section 16—Independent Inference from Scores.

In some embodiments, a risk component may relate to a disclosure of two (or more) scores consecutively. For example, knowing two consecutive scores and the fact of whether a certain user contributed a measurement of affective response to only one of the two scores may reveal information about the certain user, which may not be revealed when each of the two scores is evaluated independently and/or when the risk to each user is evaluated independently. This type of risk is discussed in further detail at least in section 17—Inferences from Scores in Temporal Proximity.

And in some embodiments, a risk component may relate to disclosure of multiple scores, possibly for different experiences, and possibly involving different sets of users that contribute measurements from which each score is computed. In this case, cumulative information that may be obtained from analysis of the joint analysis of multiple scores may be greater than the information that may be obtained from analysis of each score independently, and/or from the analysis of each of the users independently. This type of risk is discussed in further detail at least in section 18—Inference from Joint Analysis.

16—Independent Inference from Scores

Each time a score is disclosed, its value may provide information about the users who are known to contribute to the measurements used for the computation of the score. Thus, disclosure of even a single score for an experience may, in some embodiments, pose a risk by revealing private information of at least some of the users that contributed measurements of affective response that were used to compute the score. According to information theory, from entropy considerations, these contributions of such information are purely non-negative, repeated disclosure of scores can increase the information revealed about users. For example, if the score discloses that measurements of affective response used to compute a score have a mean of 5 and variance of 1, while an average user has a corresponding measurement that may be modeled as a random variable with a mean 2 with variance 1, then just knowing the single score, independently of all other information, can change the beliefs regarding the actual value of a user's measurement. In this case, the estimated affective response of a user, who is known to contribute a measurement to the score, would move away from 2, the average user value, in a direction towards 5, the value indicated by the score.

It is to be noted that in the discussion herein involving making inferences according to scores, it may be assumed that a score for an experience, computed based on a measurement of affective response of a user, may teach about the value of the measurement of affective response of the user. Additionally, if a model of a user includes a bias corresponding to the experience (e.g., a bias value representing the user's bias towards the experience), then it may be assumed that the score for the experience may also teach about the bias of the user towards the experience. Thus, in discussions below, references to a score providing information about a bias towards an experience may also be interpreted as providing information about the measurement of the user who had the experience, and vice versa.

In some embodiments, the effects of disclosing a score for an experience can be viewed as a process of updating posterior probabilities of bias values, given certain prior beliefs and observed evidence (the evidence, in this case, may be the scores and/or information derived from the scores). Optionally, this analysis may involve a Bayesian approach, which involves bias values modeled as distributions that have conjugate priors. The evidence may be given as a statistic (e.g., average of observed measurements) and/or a distribution, which is used to update the prior distribution. This approach may be applicable both for biases modeled as discrete random variables (e.g., using a Bernoulli variable and a beta distribution conjugate prior or a multinomial variable and a conjugate prior Dirichlet distribution), and/or for biases modeled as continuous distributions. For example, updating bias parameters that are modeled using a normal distribution may utilize approaches described in Murphy, K. (2007), "Conjugate Bayesian Analysis of the Gaussian Distribution", *Technical Report, University of British Columbia*.

In some embodiments, different methods of evaluating the risk posed by disclosing a single score are employed using different risk functions. However, as explained in the examples of risk components given below, different functions used to evaluate risk may often exhibit similar behavior with respect to risk components such as the number of users who contributed measurements used to compute a score, the variance of the measurements used to compute the score, and/or the probability of the score (i.e., the probability of observing a score with a certain value).

In one example, a risk component may involve the number of users who contributed measurements to computing a score. In some embodiments, the larger the number of users who contributed measurements to computing a score, the smaller the risk to the privacy of individual users associated with disclosing the score. One reason for this phenomenon is that with a small number of users, it is easier to associate the score for an experience with the biases of individual users towards the experience (since the measurement of each user contributes largely to the score). However, with a larger number of users, the score is more likely to reflect the general mean of a population (e.g., as expressed by a score computed from many users). Such a value is generally known (e.g., by averaging multiple scores), and says little about the individual users who contributed measurement to computing the score. This is because when a large number of users contribute measurements, this means that each user contributes a little bit to the value of the score. Optionally, the number of users may be disclosed along with the score or be estimated by an adversary (e.g., by estimating the number of people who ate at a restaurant using facial recognition).

In another example, a risk component may involve the variance of the values of the measurements of affective response used to compute a score. In some embodiments, the larger the variance of the measurements, the smaller the risk to the privacy of individual users associated with disclosing the score. When the variance is low, the score is more likely to reflect the value of the measurements of the individual users, since each user likely has a value that is closely represented by the score. However, with a large variance, it is less likely to tell the value of the measurement of an individual user from a score, since there is a large disparity in the values of the measurements. Optionally, the variance may be a value disclosed with the score. Alternatively, the variance may be estimated by an adversary, e.g., based on historical data, or by the adversary knowing the value of the measurements of some of the users.

In yet another example, a risk component may involve the probability of the value of the score. In some embodiments, the less probable the score (e.g., the score is an outlier), the more disclosing the score is considered a risk to the privacy of the users who contributed the measurements used to compute the score. If the value of the score being disclosed is a value that is observed frequently (e.g., the value is close to the mean of the scores for the respective experience), then the score likely does not add much information about individual users who contributed measurements used for the score's computation. In such a case, disclosing the score is likely to indicate that the measurements had typical values, which indicates that the users probably have a typical bias towards the experience corresponding to the score. However, if the value of the score is infrequently observed and has low probability (e.g., it is significantly different from the mean of the scores of a certain experience), then disclosing the score may be more risky since it indicates that, on average, the users who contributed measurements to the score have atypical measurement values. Since for an average user, a model of the user likely indicates the user has typical measurement values (or a typical bias towards an experience), information indicating that the user is likely to have atypical measurement values (or an atypical bias towards the experience), may be more revealing about a user.

In still another example, a risk component may involve the significance of the score, such as expressed via p-values, q-values, and false discovery rates (FDRs). In some embodiments, the less significant the score (e.g., the score has a p-value greater than 0.05), the less disclosing the score is considered a risk to the privacy of the users who contributed the measurements used to compute the score. This is because if the value of the score being disclosed was not determined with sufficient significance, then the information the score may convey about users who contributed measurements to computing it may be considered less reliable. For example, the low significance may be a reflection of the fact that a small number of measurements was used to compute the score and/or that the measurements contained noise. However, a score that is very significant (e.g., p-value close to zero) may indicate that any information it conveys is reliable and thus may be more confidently used to model users.

The examples of risk components given above do not necessarily describe all risk components that influence the risk associated with disclosing a score. In addition, in some embodiments, the risk components may have various dependencies between each other and/or have different significance with respect to an evaluation of the risk to privacy of disclosing a single score.

17—Inferences from Scores in Temporal Proximity

There are cases where disclosing of two or more scores for an experience, computed based on measurements taken in temporal proximity, may pose a certain kind of risk on users who contributed measurements used to compute the scores. This risk may stem from the fact that in some cases, the sets of users whose measurements were used to compute each score might not entirely overlap but also not be completely disjoint. Thus, under certain conditions, the difference between the scores may be attributed to users who do not belong to the set of overlapping users, i.e., to the symmetric difference of the sets. Herein, two or more scores which are computed based on measurements taken in temporal proximity may also be referred to as two or more "consecutive scores".

The following notation is used in the discussion about privacy risks to users belonging to the symmetric difference of sets of users. Let A denote a first set of users whose measurements of affective response were used to compute a first score $S_A$ for an experience. Additionally, let B denote a second set of users whose measurements of affective response were taken in temporal proximity to the measurements of A, and were used to compute a second score $S_B$ for the experience. Note that this set B is not related to other possible instances in this disclosure in which B is used to denote a set of biases or vector of biases (it will be clear to the reader the context of each use of B). Without loss of generality, the measurements of A were taken before the measurements of B. The difference between the first and second scores is denoted by $\Delta_S = S_B - S_A$, and the difference in time between when the measurements of the two sets of users were taken is denoted by $\Delta_t$. If it is assumed that the measurements of the affective response of users having the experience do not change significantly (or at all) over the time of $\Delta_t$, then $\Delta_S$ may be attributed, primarily or entirely, to users belonging to the set users in symmetric difference between A and B, which is the set $D=(A \cup B) \setminus (A \cap B)$. D may include users that are in A and not in B (e.g., a user who had the experience when a measurement used for computing $S_A$ was taken and stopped having the experience before a measurement used to compute $S_B$ was taken). Additionally or alternatively, D may include users that are in B and not in A (e.g., a user who started having the experience after the measurements used to compute $S_A$ were taken). If the symmetric difference D has a small number of users, then the difference $\Delta_S$ may reveal private information about the users in D (such as the likely value or distribution of the measurements of the user in D that led to the difference $\Delta_S$ between the scores $S_A$ and $S_B$).

In some embodiments, an assumption that may be true instead of, or in addition to, the assumption that the measurements of the affective response of users having the experience do not change significantly over the time of $\Delta_1$, is that the measurements of users may change independently (i.e., in an uncorrelated way). Optionally, if the changes in measurements are independent, the expectation of the contribution of the change in measurements of users in $A \cap B$ to the value $\Delta_S$ is zero. Thus, under such an assumption, the change $\Delta_S$ may still be attributed to measurements of users in D, even if the values of the measurements of users belonging to A∩B may change over the period $\Delta_1$.

Herein, temporal proximity refers to closeness in time. What constitutes closeness in time may depend on the embodiment being considered. For example, two sets of measurements taken five minutes apart may not be considered in temporal proximity in one embodiment (e.g., an embodiment in which a score for an experience is generated every 30 seconds). But in another embodiment, two sets of measurements taken more than a day apart may be considered in temporal proximity (e.g., an embodiment in which one score a day is computed for an experience). However, in some embodiments, it is usually the case that sets of users corresponding to measurements of affective response taken during first and second periods in temporal proximity typically overlap, having a certain number of users who continually have the experience to which the measurements correspond during the respective first and second periods. It is to be noted that temporal proximity does not necessarily mean direct temporal adjacency (i.e., consecutive periods of time). For example, two scores computed according to two respective sets of measurements of affective response taken in temporal proximity, may in one embodiment, comprise a first score computed based on a first set of measurements taken between one and two o'clock and a second score computed based on a second set of measurements taken between three and four o'clock.

In some embodiments, temporal proximity is a property that may be determined based on the difference in time between when measurements were taken. For example, first and second scores are computed based on respective first and second sets of measurements of affective response. Without loss of generality, the average time at which a measurement in the first set was taken is before the average time a measurement in the second set is taken. Let $t_1$ denote the largest difference between when two measurements in the first set were taken (i.e., $t_1$ is the difference between the earliest taken and the latest measurements in the first set). Similarly, let $t_2$ denote the largest difference between when two measurements in the second set were taken (i.e., $t_2$ is the difference between the earliest taken and the latest measurements in the second set). And let $t_{12}$ denote the smallest difference in time between when a first measurement from the first set was taken and a second measurement from the second set was taken (i.e., $t_{12}$ is the difference between the latest taken measurement from the first set and the earliest taken measurement in the second set). In one embodiment, if $t_1 > t_{12}$ and $t_2 > t_{12}$ the first and second sets of measurements are considered to be taken in temporal proximity and/or the first and second scores are considered to be in temporal proximity. In another embodiment, if $t_1 > t_{12}$ or $t_2 > t_{12}$ (or both $t_1 > t_{12}$ and $t_2 > t_{12}$), then the first and second sets of measurements are considered to be taken in temporal proximity and/or the first and second scores are considered to be in temporal proximity.

In some embodiments, scores for experiences may be produced by a source (e.g., by a scoring module) in succession, each score corresponding to a certain period of time during which a set of measurements of affective response used to compute the score were taken. Each score may be associated with an average measurement time, which is the average time measurements belonging to its corresponding set were taken. Optionally, the periods corresponding to the scores may have the same length (e.g., one minute, five minutes, hour, day, or week). Optionally, the periods corresponding to the scores may have different lengths. In one embodiment, first and second scores produced by the source are considered in temporal proximity if there is no other score produced by the source with an average measurement time that is between the average measurement time of the first score and the average measurement time of the second score. In another embodiment, first and second scores produced by the source are considered in temporal proximity if the number of scores produced by the source, having an average measurement time that is between the average measurement time of the first score and the average measurement time of the second score, is below a certain threshold such as 2, 3, 5, 10, or 100.

To illustrate this risk associated with disclosing scores computed based on sets of measurements taken in temporal proximity, consider a case in which a score for an experience, such as a being in a location like a railroad car, is computed every five minutes. Each time the score is computed, it utilizes measurements of affective response of users having the experience (i.e., the users at the location during a certain period of time corresponding to the score). Given two such scores, e.g., corresponding to the periods 10:00-10:05 and 10:05-10:10, respectively, it is likely that a first set of users (A) who were at the location during the first period (10:00-10:05), shares many users with a second set of users (B) who were at the location during the second period (10:05-10:10). If it is assumed that the measurements of the affective response of users at the location do not change significantly (or at all) between the first and second periods, then any difference between the first and second scores ($\Delta_S$) may be attributed almost entirely to the measurements of the users belonging to D (the symmetric difference between A and B). In some cases, $\Delta_S$ may reveal the actual value of a measurement of a user. For example, consider a case where A has nine users who provide their measurements according to which a first score is computed. After that, an additional user joins the nine, so B has ten users. The additional user provides a tenth measurement that is used, along with the measurements of the nine users, to compute a second score. If it may be assumed by an adversary that the measurements of the nine users do not change (e.g., due to the short time difference $\Delta_1$), then the measurement of the additional (tenth) user may be deduced directly from $\Delta_S$.

One way in which disclosing scores computed based on measurements taken in temporal proximity poses a risk to the privacy of users is by enabling an adversary to perform better modeling of the users. In some embodiments, a score computed for measurements may be decomposed to contributions of individual users (e.g., the score is an average of the measurements of the users). In such a case, disclosing the scores $S_A$ and $S_B$ to an adversary who has knowledge about the identity of users in A and B, such as who may belong to A\B, B\A, and A∩B, can enable the adversary to make a better model of the users. For example, under an assumption of a uniform contribution to $\Delta_S$ by the users in the symmetric difference D (i.e., the measurement of each user has equal weight), an adversary may estimate the scores $\hat{S}_{A\backslash B}$, $\hat{S}_{B\backslash A}$, and $\hat{S}_{A\cap B}$ corresponding to the sets of users belonging to A\B, B\A, and A∩B, respectively. This process may be referred to herein as "Venn decomposition" or "Venn decomposition of scores", since it utilizes the disclosed scores and information about the relationship between the sets of users to compute estimated scores corresponding to users in the different areas in a Venn diagram of the sets of users.

Having an estimate of three scores ($\hat{S}_{A\backslash B}$, $\hat{S}_{B\backslash A}$, and $\hat{S}_{A\cap B}$) may provide better modeling (and more information about certain users) than only the two scores $S_A$ and $S_B$. In particular, in some cases, the sets A and B may be relatively large, and thus the scores $S_A$ and $S_B$ may not provide a lot of information about individual users belonging to A and/or B. However, if A∩B is also large, this may result in a set D that is small, so having the estimated scores $\hat{S}_{A\setminus B}$ and $\hat{S}_{B\setminus A}$ may provide much more information about the users in D than could be deduced from the disclosed scores $S_A$ and $S_B$.

Following is an example of a method used in some embodiments to perform Venn decomposition in which the scores $\hat{S}_{A\setminus B}$, $\hat{S}_{B\setminus A}$, and $\hat{S}_{A\cap B}$, described above, are estimated from information that includes the scores $S_A$ and $S_B$ and data about the number of users in the different sets A\B, B\A, and A∩B. In this example, the disclosed scores $S_A$ and $S_B$ are assumed to be decomposable in a way that the measurement of each user belonging to a set of users makes an equal contribution to the score computed from the measurements of the set of users. In this example, the decomposable score is a score that represents the average measurement of the users belonging to a set. The score $S_A$ is computed based on measurements of users who belong to the set A\B and from measurements of users who belong to the set A∩B. Thus, since the score $S_A$ represents the average of the measurements of those users, if it is assumed that the measurements of the users in A\B and A∩B have measurements with averages that are represented by $\hat{S}_{A\setminus B}$ and $\hat{S}_{A\cap B}$, respectively, then $S_A$ may be given by the following equation:

$$S_A = \frac{|A \cap B| \cdot \hat{S}_{A\cap B} + |A\setminus B| \cdot \hat{S}_{A\setminus B}}{|A|} \quad (6)$$

And similarly, $S_B$ that represents the weighted average of the measurements of the users belonging to B\A and A∩B, may be given by the following equation:

$$S_B = \frac{|A \cap B| \cdot \hat{S}_{A\cap B} + |B\setminus A| \cdot \hat{S}_{B\setminus A}}{|B|} \quad (7)$$

Given the observation that the users in A and B actually belong to three different sets (A\B, B\A, and A∩B), then using the scores $S_A$ and $S_B$ to represent the measurements of the users in A and B, instead of the three scores $\hat{S}_{A\setminus B}$, $\hat{S}_{B\setminus A}$, and $\hat{S}_{A\cap B}$ introduces an error factor given in Eq. (8):

$$\text{Error} = |A\setminus B|\cdot(S_A - \hat{S}_{A\setminus B})^2 + |A\cap B|\cdot(S_A - \hat{S}_{A\cap B})^2 + |B\setminus A|\cdot(S_B - \hat{S}_{B\setminus A})^2 + |A\cap B|\cdot(S_B - \hat{S}_{A\cdot B})^2 \quad (8)$$

Eq. (8) describes the squared error that is accrued from using the two scores ($S_A$ and $S_B$) to represent the values of the measurements of the users instead of the three scores ($\hat{S}_{A\setminus B}$, $\hat{S}_{B\setminus A}$, and $\hat{S}_{A\cap B}$) The first and second terms in Eq. (8) correspond to the squared errors accrued by representing the measurements of the users in A with the single value $S_A$ for both the users in A\B and A∩B, instead of using the two scores $\hat{S}_{A\setminus B}$ and $\vec{S}_{A\cap B}$, respectively. Similarly, the third and fourth terms in Eq. (8) correspond to the squared errors accrued by representing the measurements of the users in B with the single value $S_B$ for both the users in B\A and A∩B, instead of using the two scores $\vec{S}_{B\setminus A}$ and $\vec{S}_{A\cap B}$, respectively.

In this example, the optimal values for $\hat{S}_{A\setminus B}$, $\vec{S}_{B\setminus A}$, and $\hat{S}_{A\cap B}$ are assumed to be values for which the accrued modeling error of Eq. (8) is minimal. These values can be derived from Eq. (6)-Eq. (8) by rearranging Eq. (6) and Eq. (7) to extract the following expressions for the scores $\hat{S}_{A\setminus B}$, $\hat{S}_{B\setminus A}$:

$$\hat{S}_{A\setminus B} = \frac{|A|\cdot S_A - |A \cap B|\cdot \hat{S}_{A\cap B}}{|A\setminus B|}, \quad (9)$$

$$\hat{S}_{B\setminus A} = \frac{|B|\cdot S_B - |A \cap B|\cdot \hat{S}_{A\cap B}}{|B\setminus A|}$$

Following that, the expressions of Eq. (9) may be inserted into Eq. (8). And following that, taking the derivative of Eq. (8) with respect to $\hat{S}_{A\cap B}$ and setting the derivative to zero yields the following value for $\vec{S}_{A\cap B}$ for which the estimation error of Eq. (8) is minimized:

$$\hat{S}_{A\cap B} = \frac{S_A \cdot |A| \cdot |B\setminus A| + S_B \cdot |B| \cdot |A\setminus B|}{|A|\cdot|B\setminus A| + |B|\cdot|A\setminus B|} \quad (10)$$

The value obtained by using Eq. (10) can be plugged into Eq. (9) to obtain the respective values of $\hat{S}_{A\setminus B}$ and $\vec{S}_{B\setminus A}$ for which the error of Eq. (8) is minimized.

The following numerical example demonstrates how Eq. (9) and Eq. (10) may be used to perform Venn decomposition. In this example, two sets of users provide measurements to create a score for an experience, which is the average of the measurements of the users. The first set A has 25 users, whose measurements are used to generate the score $S_A$, and the second set B has 26 users whose measurements are used to generate the score $S_B$. In this example, |A∩B|=22; thus |A\B|=3 and |B\A|=4. Additionally, unbeknown to an adversary is the fact that the average measurements of users in A\B, A∩B, and B\A are 2, 3, and 5, respectively. The adversary receives only the scores $S_A$ and $S_B$, which are based on the information given above come out to: $S_A$=(3·2+22·3)/25=2.88 and $S_B$=(4·5+22·3)/26=3.31. Additionally, the adversary assumes that the measurements of users in A∩B used to compute $S_A$ are not significantly different (or not different at all) from the measurements of those users that are used to compute $S_B$.

Using the values given above in Eq. (10) yields that the estimated score $S_{A\cap B}$=3.07, and then using that value in Eq. (9) yields that $\hat{S}_{A\setminus B}$=1.49 and $\hat{S}_{B\setminus A}$=4.63. Using these estimated values for $S_{A\setminus B}$, $\hat{S}_{B\setminus A}$, and $\hat{S}_{A\cap B}$ yields a superior modeling for the users (e.g., in term of the error with respect to the "ground truth" that is not known to the adversary). In particular, though for most users (who belong to A∩B) the estimated score ($\hat{S}_{A\cap B}$) is not much different from the disclosed score ($S_A$ or $S_B$), for other users who are in the smaller sets A\B or B\A, the estimated scores are quite different from the disclosed scores (and much closer to the ground truth). For example, for a user belonging to A\B, the score $\hat{S}_{A\setminus B}$=1.49 is closer to the ground truth of 2 than the score $S_A$=2.88. Similarly for a user in B\A, the score $\hat{S}_{B\setminus A}$=4.63 is much closer to the ground truth of 5 than the score $S_B$=3.31. Even for users belonging to A∩B, the score $\hat{S}_{A\cap B}$=3.07 is closer to the ground truth of 3, than $S_A$ or $S_B$.

This numerical example along with the derivation described above demonstrate how, in some embodiments, an adversary that has information about the scores $S_A$ and $S_B$ for an experience, along with data about the number of users in the different sets A\B, B\A, and A∩B, may perform Venn decomposition and derive estimates of the corresponding scores $\hat{S}_{A\setminus B}$, $\hat{S}_{B\setminus A}$, and $\hat{S}_{A\cap B}$. These estimated scores likely model the users with less error compared to using only the scores $S_A$ and $S_B$. The example given above also demonstrates that even though in some cases A and B may be large (so there may be little risk in disclosing $S_A$ and $S_B$), there may still be a risk to the privacy of some users who belong to D=(A∪B)\(A∩B), especially if |D| is small.

It is further to be noted that though the examples given above involve Venn decomposition of two sets of users (A and B) and two scores ($S_A$ and $S_B$), those skilled in the art may recognize that this approach may be expanded and used with a number n>2 of sets of users and corresponding disclosed scores. In such a case, Venn decomposition may result in estimating up to 2n−1 scores corresponding to the possible subsets of users in a Venn diagram involving n sets. In some embodiments, the derivation described above for Venn decomposition is generalized to more than n=2 sets. Additionally or alternatively, in some embodiments, Venn decomposition for n>2 sets may be performed iteratively. For example, a working set is maintained, which initially holds a single set from the n sets, along with its corresponding score. The remainder of the n sets is added to the working set iteratively. In each iteration, one of the n sets is considered the "A" set, and it is subjected to Venn decomposition with some, or all, of the sets in the working set. The results of each of those Venn decompositions (the respective A\B, B\A, and A∩B and their corresponding scores) is added to the working set, and may participate in further Venn decompositions with sets from the n sets that have yet to be added.

There are various risk functions that may be used, in different embodiments, to evaluate risk to privacy of users posed from disclosing scores computed based on measurements taken in temporal proximity. However, as explained in the examples of risk components given below, different functions used to evaluate risk may often exhibit similar behavior with respect to attributes such as the size of D, the magnitude of $\Delta_S = S_B - S_A$, the duration of $\Delta_t$, and/or the rate of change of measurements of users belonging to A∩B.

In one example, a risk component may involve the number of users who belong to the sets A\B and B\A. In some embodiments, the larger the number of users who belong to each of A\B and B\A, the smaller the risk to the privacy of individual users belonging to those sets. The rationale for this phenomenon is similar to the risk associated with a small number of users who contribute measurements for computing a score. Since an adversary may attempt to model the scores $\hat{S}_{A\backslash B}$, $\hat{S}_{B\backslash A}$ and $\hat{S}_{A\cap B}$, a small number of users in one of the sets corresponding to those scores: A\B, B\A, and A∩B, may pose a risk to privacy of the users that belong to the set that has the small number of users.

In another example, a risk component may involve the magnitude of $\Delta_S$. In some embodiments, the larger the magnitude of $\Delta_S$, the greater the risk to the privacy of individual users associated with disclosing measurements used to compute the scores $S_A$ and $S_B$. In these embodiments, there is a risk to the privacy of users belonging to A\B or B\A, since modeling by an adversary in such a case, can yield information about those users that is significantly different compared to the information revealed by the scores $S_A$ and $S_B$. However, if $\Delta_S$ is small, then modeling of scores specific to users in A\B or B\A is not likely to reveal something significantly different about the users since, as may be observed in Eq. (9), $\hat{S}_{A\backslash B}$, $\hat{S}_{B\backslash A}$, and $\hat{S}_{A\cap B}$ will all have similar values. But if $\Delta_S$ is large, such as in the numerical example given above, then the modeled scores $\hat{S}_{A\backslash B}$ and $\hat{S}_{B\backslash A}$ may be significantly different from $S_A$ and $S_B$, thus providing information about the measurements of the users belonging to A\B and B\A.

In yet another example, a risk component may involve the rate of change in measurements of users belonging to A∩B. In some embodiments, the greater the rate of change over time in the values of measurements of affective response of users, the smaller the risk to the privacy of users from disclosing the scores $S_A$ and $S_B$. One rationale for this is that estimating separate scores from $S_A$ and $S_B$ for users belonging to the sets A\B, B\A, and A∩B relies on the fact that the measurements of users in A∩B do not change much (or at all) between when they are used for computing $S_A$ and $S_B$. If there is a significant change in those value, then the modeling is not accurate, and thus, the information derived from the scores $\hat{S}_{A\backslash B}$, $\hat{S}_{B\backslash A}$, and $\hat{S}_{A\cap B}$ is also not likely to be accurate. Thus, when the rate of change in measurements of users belonging to A∩B is small, disclosing $S_A$ and $S_B$ may pose less of a risk to users because there is less of a threat of estimating specific scores for users belonging to the different sets A\B, B\A, and A∩B.

In still another example, a risk component may involve the duration $\Delta_t$ corresponding to the difference between the time the measurements corresponding to $S_A$ and $S_B$ were taken. In some embodiments, the greater the duration $\Delta_t$, the smaller the risk to the privacy of users from disclosing the scores $S_A$ and $S_B$. One rationale for this is that as $\Delta_t$ grows, there may be several factors that decrease the effectiveness of modeling that can be performed to obtain estimated scores such as $S_{A\backslash B}$, $S_{B\backslash A}$, and $\hat{S}_{A\cap B}$. First, as $\Delta_t$ grows, it is more likely that measurements of users in A∩B will change between when they are used to compute $S_A$ and $S_B$, which as explained above, reduces the accuracy of the estimated scores. Additionally, increasing $\Delta_t$ is also likely to increase the number of users in A and B (and also in A\B and B\A), which decreases the risk to privacy, of users in each of those sets, from disclosing both $S_A$ and $S_B$.

The examples of risk components given above do not necessarily describe all risk components that influence the risk associated with disclosing a pair (or more) of scores computed based on sets of measurements taken in temporal proximity. In addition, in some embodiments, the risk components may have various dependencies between each other and/or have different significance with respect to an evaluation of the risk to privacy.

18—Inference from Joint Analysis

From the perspective of information theory, every time a user contributes a measurement of affective response that is used for a computation of a score for an experience, the value of the score provides a certain, possibly infinitesimally minute, amount of information about the user. This information may be analyzed according to the methods described in previous sections, and may be considered to be insignificant (e.g., using approaches described in section 16—Independent Inference from Scores or 17—Inferences from Scores in Temporal Proximity). However, if this information is aggregated over time by an adversary, and/or analyzed jointly for multiple users, the contributions that each on their own provides an infinitesimally minute amount of information, may add up to extensive models of users. These models may describe various aspects of the users (e.g., their biases), aspects that they might not have considered possible to be inferred from noisy data such as scores computed based on measurements of multiple users.

The type of learning of models of users described below is different in some aspects from learning models of users described elsewhere in this disclosure, such as described in the discussion regarding Eq. (2), Eq. (3), and Eq. (5) in section 13—Bias Values. Those methods involved learning bias values from measurements of affective response of the users. This is different from learning from scores that are each computed from measurements of multiple users. In the former approach, the measurement value of each user in each event is known. In the latter approach, the measurement value of each user is often unknown, rather only a, possibly quite noisy, proxy of it is known in the form a score that is considered a function of the multiple measurements. Another difference is that some embodiments that involve the former approaches, involve learning bias values of an individual user from data involving only the user. In the approach described below, some embodiments are geared towards simultaneously learning parameters of multiple users from data of multiple users.

Following is a description of "big data" analysis that may be utilized by an adversary to learn models of biases and other information from data that includes scores. In some embodiments, it is assumed that a score is "decomposable", which means that it is a simple function of the measurements used to compute it. For example, many embodiments model a score as the average of the measurements used to compute it.

In the discussion below, and following the notation and related discussion concerning biases that is given earlier in this disclosure, we assume that the measurements of affective response correspond to events that belong to a set V, where $V=\{\tau_1, \ldots, \tau_{|V|}\}$. Each of the events in V is assumed to be assigned to one or more sets of events $V_i$, $1 \le i \le k$, such that $V=\cup_{i=1}^{k} V_i$. Measurements of affective response corresponding to the k sets of events are used to compute k scores $S_1, \ldots, S_k$, with each score corresponding to a certain experience. It is possible for some scores to correspond to the same experience (e.g., they may be computed based on measurements of users taken at different times), while some scores may correspond to different experiences. Let $S=\{S_1, \ldots, S_k\}$ denote the set of scores disclosed to an adversary. Optionally, the scores are considered public information since they are disclosed (e.g., the scores are displayed on apps, sent in communications, and/or placed in a queryable database). Optionally, certain scores in S may be disclosed to certain recipients (e.g., authorized recipients), and thus considered public information with respect to those recipients, but may be considered private information with respect to other entities that are not the certain recipients.

Herein, a model an adversary creates from data comprising the disclosed scores S is denoted θ. In some embodiments, creating θ may involve the collection of additional, auxiliary data, portions of which may be considered either private data or public data, depending on the embodiment. Optionally, auxiliary data may be data provided to the adversary, e.g., by users and/or providers of experiences. Additionally or alternatively, auxiliary data may be data that the adversary derives from monitoring users and/or providers of experiences. In one example, auxiliary data may include factors of events in V. In another example, auxiliary data may include information about contributions of measurements of users to the computation of scores. And in still another example, auxiliary data may include private information of users such as values of measurements of affective response of users and/or other information about users such as information from profiles of users that may include bias values of the users.

In this disclosure, the model θ is generally considered to include three types of data: data corresponding to contribution of users to computation of scores, which is represented by the contribution matrix C, data corresponding to factors of events the users may have had, which is represented by the matrix of factor vectors F, and data corresponding to bias values of users, which is represented by the bias matrix B.

In some embodiments, the contribution matrix C is represented by a k×|U| matrix, which may be a complete matrix or a partially filled matrix. The k rows in the matrix correspond to the k scores in the set S, and each column in the matrix corresponds to one of the users considered in the model. Each entry $C_{i,j}$ in the matrix C, indicates the contribution of user j to the score $S_i$, where $1 \le i \le k$, and j is an index of a user in an enumeration of the users in U, such that $1 \le j \le |U|$. The values in C may be represented in various ways in different embodiments. In one example, the value of an entry $C_{i,j}$ in C may represent one of two values: 0, indicating that user j did not contribute a measurement to the score $S_i$, or 1, indicating that user j contributed a measurement used to compute the score $S_i$. In another example, entry $C_{i,j}$ may also include a value representing a blank (e.g., '?') or be left empty to indicate that the contribution of user j to score $S_i$ is unknown. In yet another example, $C_{i,j}$ may include a value indicative of a weight of the measurement of user j when used to compute the score $S_i$. In still another example, $C_{i,j}$ may have a value indicative of a probability that user j contributed a measurement used to compute the score $S_i$.

The information corresponding to the matrix C may be known in full, or in part, to an adversary. Optionally, at least some of the information corresponding to C is received from a source that provides at least some of the scores in S. For example, the information may include descriptions related to events, such as identities of users who corresponding to events and/or statistics related to sets of events. Examples of statistics that may be received include the number of users corresponding to a set of events, the average age of users corresponding to a set of events, and/or other demographic information related to users corresponding to the sets of events. Additionally or alternatively, as discussed further at least in section 15—Overview of Risk to Privacy, in different embodiments, there may be various ways in which an adversary may gain information that can be used to estimate values in C. For example, determining that a user had an experience at a certain time may be done using a camera, by detecting digital signals related to the user (e.g., Wi-Fi and/or cellular signals of a device of the user), and/or receiving information related to transactions of the user (e.g., digital wallet transactions).

In some embodiments, the matrix of factor vectors F is represented by a k×|U| matrix. Each entry in F is denoted $\vec{F}_{(i,j)}$, and represents the factors that are assigned to the event (i,j), which is an event corresponding to the user j having he experience corresponding to the score i. In some embodiments, the event indexed (i,j), may or may not have taken place in reality. For example, the adversary may assume that user j had the experience corresponding to row i in F and C (and also contributed a measurement to the computation of $S_i$), but this, in fact, may not have happened (e.g., the adversary was given wrong information or reached incorrect conclusions from monitoring the user j). Nonetheless, the adversary may assign to $\vec{F}_{(i,j)}$ values representing likely factors of the event (i,j) that the adversary assumes would be relevant had the user j indeed had the experience corresponding to $S_i$. Optionally, $\vec{F}_{(i,j)}$ may contain weights for n factors (with most weights typically being zero), such that the indexes of values in $\vec{F}_{(i,j)}$, referred to with the letter h, run from 1 to n.

In some embodiments, F may be a complete matrix or a partly filled matrix. For example, an adversary may provide entries in F only for entries (i,j) for which $C_{i,j}>0$ and/or for which the adversary was able to obtain meaningful information. In some embodiments, every entry in F may at least include a vector $\vec{F}_{(i,j)}$ that includes a factor corresponding to the fact that the user had the experience corresponding to the row i.

The quality and extensiveness of factors of events, which are assigned by an adversary, may be different than the factors that may be assigned by a user (e.g., by a software agent of the user, as described in section 12—Factors of Events). The difference between the factors assigned by an adversary and the factors assigned by the user may stem from the possibly different sources of information available to the adversary and the user, which are used to assign the factors. In one example, a software agent operating on behalf of a user may have access to communications of the user, billing information of the user, and/or live feed of images from a camera mounted on the user (e.g., a headset), which enable the software agent to determine various aspects of events involving the user. An adversary may have access to some of this information, or none at all, and rely for example, on images of the user taken by a remote camera to determine aspects of some of the events involving the user. While generally an adversary will have less accurate assignments of factors than the user (or an entity operating on behalf of the user), in some embodiments, an adversary may have certain knowledge of certain aspects of experiences, of which the user has no knowledge, and therefore, may be able to model the user with a different set of biases. For example, the adversary may be a provider of an experience or may cooperate with the provider of an experience, and therefore, be privy to certain information not available to a user, such as components in food served to a user, strategies employed by a service provider when dealing with the user, and/or environmental variables that the user is not aware of, or cannot detect.

Nonetheless, in some embodiments, it is to be assumed that the adversary has limited capabilities to assign factors of events. In particular, the adversary may be only able to assign a subset of the relevant factors of some of the events used to compute scores in S. Additionally or alternatively, it may only be able to assign only coarse weighting to some factors. For example, for certain factors of an event (i,j) represented as a vector $\vec{F}_{(i,j)}$, an adversary may assign a weight indicating relevance (e.g., weight of one), or irrelevance (e.g., weight zero). However, a software agent operating on behalf of the user would be able to assign a wider range of values to factors in $\vec{F}_{(i,j)}$, due to additional information the software agent has access to.

Because the data used to model users by an adversary may be different from the data collected by the users (or software agents operating on behalf of them), biases learned by the adversary may be different from the biases learned by the users. However, given a sufficiently large amount of training data (e.g., involving many scores for experiences), it is possible for the model of the adversary to approximate, maybe even quite closely, models of biases of users.

In some embodiments, the bias matrix B may be represented by a |U|×n matrix. Each row in the matrix represents biases of one of the users in U. Each row represents the n bias values a user may have (to n possible factors of events). That is, each user may have biases that are a subset of these columns, with entries in columns representing biases that are not relevant to a certain user being left empty or having a certain value such as zero. The entries in the matrix B are denoted $B_{j,h}$, where $B_{j,h}$ represents the bias the $j^{th}$ user has to the $h^{th}$ factor, with $1 \leq j \leq |U|$ and $1 \leq h \leq n$. Optionally, $B_{j,h}$ may be a bias value. Additionally or alternatively, $B_{j,h}$ may hold parameters of a distribution (e.g., mean and variance) for a bias that is represented by a random variable. Below, the biases of a specific user (which are described in a certain row of B) may be referenced using a vector notation. For example, the biases of the $j^{th}$ user may be referred to using the notation $\vec{B}_j$.

Prior to learning values in θ, in some embodiments, at least some of the entries in B may be initialized with certain values that are different from zero. In one embodiment, values of biases corresponding to some of the factors are initialized based on a prior probability determined from biases computed from a set of scores that comprises scores that are not in S (e.g., they were computed based on measurements of affective response corresponding to events not in V). In another embodiment, various forms of collaborative filtering may be used to initialize biases for certain users. In one example, a profile of the certain user is used to find users with similar profiles, and biases of the certain user set to be averages of the corresponding biases of the users with similar profiles.

In some embodiments, some biases users have may be assumed to be corrected already in the measurements of affective response used to compute the scores in S. In such a case, biases that are known to be corrected for, may be excluded from the matrix B and/or not have corresponding factors assigned to vectors of factors in F or given weights indicating they are relevant factors. For example, the measurements of affective response may be assumed to be already corrected for biases towards weather conditions and the time of day, but may be assumed not to be corrected with respect to other biases. In such a case, vectors of factors in F may possibly not include factors corresponding to the weather and/or time of day, and/or there may be no bias values corresponding to these factors in the matrix B.

Biases of users may change over time, e.g., changes may occur over long periods spanning weeks, months, and even years. To account for possible changes in biases, in some embodiments, a temporal aspect may be added to θ. For example, certain bias values in B may be represented by multiple values, each computed based on data corresponding to a different period (e.g., certain bias values may be computed on a monthly basis based on data of the preceding three months). In another example, bias values in B may be assigned a timestamp t and be computed using a weighting mechanism that weights scores closer to t higher than scores computed much earlier than t.

In various embodiments described herein, a reference may be made to matrices, such as one or more of the matrices that are comprised in θ, which include the contribution matrix C, the matrix of factor vectors F, and/or the bias matrix B. It is to be noted that herein, a reference to matrix refers to data that may be represented as a matrix. For example, in some embodiments, information related to the contribution of measurements of users to scores need not be stored in a single matrix C (e.g., a single memory location). Optionally, this information may be stored in various locations (e.g., different logical and/or physical locations) and/or various data structures (e.g., lists, database records, or hash tables). Additionally, the data need not necessarily be stored as values $C_{i,j}$ as described above. Rather, as used herein, a reference to a matrix C refers to data that may be aggregated from various sources, processed, and/or analyzed, in order to generate the matrix C. Additionally or alternatively, a reference in an embodiment to having, receiving, and/or accessing the matrix C refers to a capability to receive values corresponding of at least some of the entries $C_{i,j}$ in C. Thus, for example, when a reference is made to a function that receives the matrix C, it is understood that the function may not have access to a single data structure that contains entries in C, rather that the function has the ability to gain access to values representing at least some entries $C_{i,j}$ (e.g., through performing certain database queries, computations, and/or utilizing other functions). Those skilled in the art will recognize that the discussion above regarding the matrix C is applicable to other matrices described in this disclosure, and in particular to F and B.

Given one or more disclosed scores S, and information that may be represented by matrices C, F, and B described above, in some embodiments, the goal of the adversary is to learn and/or update values of parameters of the model θ. This may be done in different ways and involve different components of θ. In one embodiment, after assigning values to entries in C, F, and B, the matrices C and F are assumed to be fixed. Learning and/or updating θ involves finding and/or updating values of biases in B. In another embodiment, after assigning values to entries in C, F, and B, certain entries in those matrices, or even all entries in those matrices, may be updated according to optimizations involving the scores in S, as described below.

In some embodiments, θ may include certain parameters that do not correspond to a specific user (i.e., they are non-user-specific parameters); rather, these parameters may be considered general parameters such as biases corresponding to multiple users (e.g., biases of groups of users) or factors derived from scores for experiences (which are based on measurements of affective response of multiple users). Optionally, certain groups of users may receive separate parameters, such as separate parameters for young users vs. older users, or male users vs. female users.

In some embodiments, non-user-specific parameters are used when certain entries in C are unknown, such as when C is estimated in part by an adversary based on incomplete information collected from cameras, signal detection from user devices, and/or analysis of transactions of users. In such cases, not all the events corresponding to scores in S may be known and/or identified by an adversary. For example, if it is known that a score is computed based on measurements of 10 users, but an adversary performing modeling only has information about 7 users who had the corresponding experience, then the weight corresponding to the remaining 3 users may be assigned to a non-user-specific parameter for the experience (e.g., corresponding to bias of a general user to the experience). In another example, an adversary may estimate that there is a 50% probability of an event in which a certain user had a certain experience. Therefore, when incorporating evidence corresponding to the event, 50% of the weight may be associated with bias parameters related to the user, while the other 50% may be assigned to a corresponding non user-specific parameter. In some embodiments, when non user-specific parameters are used for a non-negligible portion of the cases (e.g., more than 10% of the events correspond to non-user-specific parameters), then the values of the non-user-specific parameters are likely to correspond to an average user or representative user (also referred to as a "general user").

In some embodiments, general users corresponding to non-user-specific parameters are represented by columns in the matrix C that do not correspond to a specific user (but rather to a general user). For example, column j' may correspond to all users, while j" may correspond to male users whose specific identity is not known, and j''' may correspond to female users whose specific identity is not known. An adversary may assign values to entries in C that correspond to the general users. For example, consider a case where the adversary assumes that a certain score Si was computed according to events involving 10 users. It may have knowledge of the identity of 7 of those users, in which case, it may set $C_{i,j}=1$, for 7 specific values of j corresponding to those users. Additionally, the adversary may know that one of the remaining 3 users is an unidentified male (e.g., based on image analysis of users that were at the location), then the adversary may model this by setting $C_{i,j''}=1$. And on the remaining two users, the adversary may have no information, in which case, the adversary could set $C_{i,j'}=2$. General users may also have corresponding rows in the matrix B describing biases of the general users (e.g., average biases of all users, of all males, or all females, in the examples involving j', j", and j''' above). Additionally, F may include factor vectors that correspond to general users. For example, certain factors may be weighted differently for males than for females.

In some embodiments, a set of scores S and a matrix of contributions C may be modified to generate an additional number of scores and corresponding rows in C using a process of Venn decomposition, as described in section 17—Inferences from Scores in Temporal Proximity. For example, rows $i_1$ and $i_2$ in C along with the scores $S_{i_1}$ and $S_{i_2}$ may be used to generate three new rows $i'_1$, $i'_2$, and $i'_3$ and corresponding scores $S_{i'_1}$, $S_{i'_2}$ and $S_{i'_3}$ using Venn decomposition. Optionally, the three new rows $i'_1$, $i'_2$, and $i'_3$ may replace the original rows $i_1$ and $i_2$ in C and the three new scores $S_{i'_1}$, $S_{i'_2}$ and $S_{i'_3}$ may replace the two original scores $S_{i'_1}$ and $S_{i'_2}$ in S. In one example, the Venn decomposition is performed by assuming that the row $i_1$ in C corresponds to the users in the set A (i.e., every user j for which $C_{i_1,j}>0$ is assumed to be in A), and similarly the row $i_2$ in C corresponds to the users in the set B mentioned in the explanation about Venn decomposition. Additionally, the score $S_{i_1}$ corresponds to the score $S_A$ in the discussion about Venn decomposition given in section 17—Inferences from Scores in Temporal Proximity, and similarly the score $S_{i_2}$ corresponds to the score $S_B$. The new row $i'_1$ in C is given all entries of users j for which $C_{i_1,j}>0$ but $C_{i_2,j}=0$ (i.e., users belonging to A\B). The new row $S_{i'_2}$ in C is given all entries of users j for which $C_{i_1,j}>0$ and $C_{i_2,j}>0$ (i.e., users belonging to A∩B). And the new row $S_{i'_3}$ in C is given all entries of users j for which $C_{i_1,j}=0$ and $C_{i_2,j}>0$ (i.e., users belonging to B\A). Once these sets are determined, the scores $S_{i'_1}$, $S_{i'_2}$ and $S_{i'_3}$ that correspond to the new rows are computed using the Venn decomposition described above. The matrix F can be updated for the results of Venn decomposition by assigning entries in the rows $i'_1$, $i'_2$, and $i'_3$ according to their corresponding values in C. For example, if $C_{i'_1,j}>0$ then $\vec{F}_{(i'_1,j)}$ may receive the factor vector of $\vec{F}_{(i_1,j)}$. Similarly, if $C_{i'_3,j}>0$ then $\vec{F}_{(i'_3,j)}$ may receive the factor vector of $F_{(i_2,j)}$. And if $C_{i'_2,j}>0$ then $\vec{F}_{(i'_2,j)}$ may receive an factor vector that is some combination of $\vec{F}_{(i_1,j)}$ and $\vec{F}_{(i_2,j)}$, such as a vector that is the average of those two vectors.

In some embodiments, the Venn decomposition involving the scores S and matrix C may be performed multiple times; each iteration expanding C by another row and adding an additional score to S. Optionally, this process is done by identifying pairs of rows in C for which the corresponding sets of users that are derived, denoted A and B, satisfy a certain criterion. In one example, the certain criterion may comprise a condition that both |B\A| and |A\B| are greater than zero but below a certain threshold. In another example, the criterion may comprise a condition that the sets of events corresponding to A and B involve measurements taken within a certain window of time. In still another example, the criterion may comprise a condition that the difference between the corresponding scores $S_A$ and $S_B$ has at least a certain magnitude. Optionally, the process of expanding C and S with Venn decomposition is repeated until no pair of rows is found in C that satisfies the certain criterion.

There are various approaches that may be used by an adversary to learn at least some of the parameters θ from crowd-based scores for experiences (the scores S). Optionally, at least some of the information in θ may assumed to be given, such as information about the contribution of users to the scores (entries in the matrix C), vectors of factors of some of the events (entries in the matrix F), and/or some prior values assigned to biases of users (entries in the matrix B). Learning typically involves updating values in B based on the scores S, but may also involve, or alternatively involve, learning entries in the matrices C and/or F. For example, in some embodiments, where C is partially known, the adversary may learn information about C (e.g., determine likely users who participated in certain experiences), as part of the learning process.

It is to be noted that ideally, an adversary would want to learn θ directly from measurements of affective response, such as with the optimization techniques given with respect to Eq. (2) or Eq. (3). However, since it is assumed the adversary does not have access to at least some, if not all, the measurements, the adversary needs to learn θ via the scores S, which may be viewed as (possibly noisy or less informative) proxies for the measurements. The following is a non-exhaustive description of some example approaches that may be used by the adversary.

In some embodiments, learning θ may be an iterative process, which involves starting from initial values of θ (which may be determined from observed data or randomly selected), and iteratively improving θ based on how well they model the disclosed scores S. In particular, in some embodiments, it is assumed that an adversary has knowledge of a certain function used to compute each score $S_i$ in S from the measurements of affective response of the corresponding set of events $V_i$ (with membership in the set $V_i$ being reflected by the values of entries in the $i^{th}$ row in C). Since in practice the adversary does not to have full knowledge of the events $V_i$ (which corresponds to knowing the true values of C and their corresponding measurements), but instead has only the possibly inaccurate values of the model θ, the adversary may attempt to estimate the measurements corresponding to $V_i$ based on θ. This gives rise to an iterative process in which the users corresponding to $V_i$ are determined according to C, and a measurement of each user estimated from the factors in F and the biases in B using Eq. (1). After estimating the measurements corresponding to a set of events $V_i$, the adversary can compute a score corresponding to the set of events and check how well it matches with the disclosed score $S_i$. The adversary can then leverage the comparison with the disclosed scores to update the model (by changing values in θ, such as updating biases in B) in order to bring the estimated scores close to the disclosed scores. This iterative process may be repeated until a certain number of iterations has passed or an acceptable convergence is reached.

Different approaches to iteratively learning θ may be appropriate in different embodiments, depending on the modeling assumptions that are made in each embodiment. Following is a description of some, but not all, algorithmic approaches that may be used, which serve as examples of possible approaches that may be taken.

In one embodiment, an adversary utilizes a function of the f(S,B|C,F) that computes a value indicative of the similarity between scores S' computed based on θ and the disclosed scores S. Optionally, through learning process, the values of biases B are optimized, while the values of C and F remain fixed. For example, f may return a value that equals the squared difference between scores S and corresponding estimated scores S'. Given the function $f$, the adversary may search the parameter space B* of possible assignments to B to find an assignment to B for which f(S,B|C,F) is optimal or locally optimal, using an iterative process as described above. Optionally, the iterative approach may involve a random exploration of the search space B*, through which optimization of B may be performed, such as using simulated annealing and/or genetic algorithms. Optionally, multiple initial assignments to θ may be utilized in order to find an assignment for θ that matches the data well. Optionally, the function $f$ is derivable and an assignment for values of B is found using analytic approaches such as the Newton-Raphson method.

In another embodiment, the measurements of affective response corresponding to events are assumed to be a linear function of parameters in θ, such as linear combinations of bias values and factors, as described in Eq. (1) or Eq. (4). Additionally, in this embodiment, each score $S_i$ is assumed to be a function of a linear combination of the measurements used to compute it. Without loss of generality, in the example below a score $S_i$ for the experience corresponding to a set of events $V_i$ is the average of the measurements of affective response corresponding to the set of events Additionally, in this embodiment, it is assumed that knowledge of which users contributed a measurement to the computation of a score and/or the weight of the measurement of each user in the computation of the score is given in the matrix C. Each score $S_i$ may be expressed as a linear equation of the following form:

$$S_i = \frac{1}{\sum_j C_{i,j}} \sum_j C_{i,j}\left(\mu_{(i,j)} + \vec{F}_{(i,j)} \cdot \vec{B}_{(j)}\right) + \varepsilon_i \quad (11)$$

$$= \frac{1}{\sum_j C_{i,j}} \sum_j C_{i,j}\left(\mu_{(i,j)} + \left(\sum_{h=1}^{n} f_{(i,j),h} \cdot b_{j,h}\right)\right) + \varepsilon_i$$

The summations over j in Eq. (11) involves all the users, thus in the summations j receives the values from 1 to |U|. Optionally, the term µ from Eq. (1) may be added also in the parentheses if Eq. (11), where it is denoted with $\mu_{(i,j)}$ and represents an expected (or average) value of a measurement of affective response to the event involving user j having the experience corresponding to the score $S_i$. Optionally, the noise term $\varepsilon_j$ has a function similar to the noise factors added to Eq. (1) may be added to the sum in Eq. (11) in order to represent the error in estimation of measurements for individual users. Alternatively, a single noise term c may be added to Eq. (11) to represent the error in estimating the score $S_i$. Optionally, if included in Eq. (11), noise terms come from a zero-mean distribution, such as a zero-mean normal distribution or a zero-mean Laplacian distribution.

Depending on the embodiment, $\mu_{(i,j)}$ may take on different values. In one example, $\mu_{(i,j)}$ is set to zero at least for some pairs (i,j). In another example, $\mu_{(i,j)}$ is a value µ representing the mean affective response of all users or of a group of users. In still another example, $\mu_{(i,j)}$ is a value of the form $\mu_j$ representing the expected affective response of user j. In yet another example, $\mu_{(i,j)}$ is a value of the form $\mu_e$ representing the expected affective response of users to having the experience e which is the experience to which the score $S_i$ corresponds. And in still another embodiment, $\mu_{(i,j)}$ is a value representing the expected affective response of user j to having the experience corresponding to the score $S_i$. Optionally, the value of $\mu_{(i,j)}$ for at least some pairs (i,j) is received from other sources (e.g., it may be received from one or more users and/or from a third party). Optionally, the value of $\mu_{(i,j)}$ for at least some pairs (i,j) is estimated by the adversary. Optionally, the value of $\mu_{(i,j)}$ for at least some pairs (i,j) is a parameter belonging to $\theta$, and is optimized as part of the training. For example, $\mu_{(i,j)}$ may have a corresponding factor that is assigned to a certain event in which the value $\mu_{(i,j)}$ is used. Thus, $\mu_{(i,j)}$ may be considered in some embodiments to be a form of a general bias that is common to multiple experiences and/or users.

Eq. (11) describes each score $S_i$ to be a linear combination of the product of factors ($\vec{F}_{(i,j)}$) and bias parameters ($\vec{B}_{(j)}$) from $\theta$. Optionally, some of the parameters remain constant. For example, in one embodiment, entries in the matrices C and F are considered constant, while entries in B are tuned in the optimization. Thus, the disclosed scores $S=\{S_1, \ldots, S_k\}$ and the matrices C and F may be used to create a set of k linear equations. Those skilled in the art will recognize that Eq. (11) may be used in various ways to utilize S and $\theta$ to phrase optimization problems for finding optimal values for the biases in B.

In one embodiment, the set of linear equations created for the scores S is solved in order to determine an assignment of values to at least some of the biases in B. Optionally, solving the set of equations is done with the objective of minimizing the squared error (i.e., minimizing $\Sigma_{i=1}^{k}\varepsilon_i^2$). There are various numerical analysis approaches for solving sets of linear equations that are known in the art and may be used to set the values in B. In addition, if the noise terms $\varepsilon_i$ are assumed to be from a normal distribution with the same variance, the solution obtained from solving the set linear equations is the maximum likelihood solution.

In other embodiments, optimization problems for finding assignments based on the equations expressed by Eq. (11) may be solved using one or more of various computational approaches known in the art, such as linear programming (e.g., simplex-based methods), convex optimization, and/or nonlinear programming.

In one embodiment, the disclosed scores S and the matrices C, B, and F are used to form an optimization problem involving linear inequalities which, aims to find values for parameters in $\theta$ which minimizes the noise terms that need to be added (which may be considered slack parameters). For example, the optimization problem may be of the form:

$$\text{Minimize} \sum_{i=1}^{k} \varepsilon_i \quad (12)$$

$$\text{Subject to } 0 \leq \left| S_i - \frac{1}{\sum_j C_{i,j}} \sum_j C_{i,j}(\mu_{(i,j)} + \vec{F}_{(i,j)} \cdot \vec{B}_{(j)}) \right| < \varepsilon_i,$$

for $1 \leq i \leq k$

Similarly to Eq. (11), $\mu_{(i,j)}$ may take on various values in different embodiments, as described above. Eq. (12) is a linear programming optimization problem. In one embodiment, the parameters being optimized are one or more entries in B. Additionally or alternatively, the parameters being optimized may include one or more entries in F and/or one or more entries in C. Similar to Eq. (11), $\mu_{(i,j)}$ may take on various values in different embodiments, as described above. Those skilled in the art may recognize that the optimization problem described above in Eq. (12) may be solved using various approaches for solving linear programming. In some embodiments, the optimization problem may be expanded to include additional constraints such as constraining the magnitude of $\varepsilon_i$ and/or the biases in B. Additionally or alternatively, a regularization term for the learned parameters may be added; for example, by turning the objective to minimize $\Sigma_{i=1}^{k}|\varepsilon_i|+\alpha\Sigma_{j,h}|b_{j,h}|$ for some $\alpha>0$.

In some embodiments, when trying to learn parameters $\theta$ by optimizing an objective such as Eq. (12), the optimization may need to rely on partial and/or incomplete data; for example, partial entries in the matrix C (e.g., due to incomplete monitoring of users). Therefore, as described above, some of the bias terms used in the optimization problem may relate to general users (e.g., an average user) and/or be considered additional slack variables in the equations. Optionally, these slack variables may be subjected to regularization and/or constraints on the values that they may assume.

In some embodiments, the optimization problem of the linear programming may be expanded to include corresponding weights for the k scores. For example, scores may be weighted according to the number of users who contributed measurements to their computation. In another example, a score $S_i$ may be weighted according to the certainty in the values of $i^{th}$ row in C that relate to it. Optionally, one way in which weighting may be incorporated is by adding k weight parameters $w_1, \ldots, w_k$ that correspond to the k scores. Optionally, Eq. (12) may be modified to incorporate weights by changing the optimization target to: Minimize $\Sigma_{i=1}^{k}|w_i \cdot \varepsilon_i|$.

As described previously with respect to Eq. (4) and Eq. (5), biases may be viewed as random variables having parameters corresponding to a distribution of values, in which case, finding optimal values for B may be viewed as a problem of finding a maximum likelihood solution (which involves an assignment of values to B). However, in contrary, an adversary is assumed not to have full information about events, and in particular, not to have information about measurements of some or all users. Thus, a direct maximization of the likelihood, such as an optimization of the probability in Eq. (5), is typically not possible. Instead, an adversary may need to maximize the likelihood to find optimal values for $\theta$ based on proxies of the measurements, namely, the scores S and the parameters in the model $\theta$.

In one embodiment, the previously discussed assumptions of linearity are also assumed, similar to the assumptions related to Eq. (11). Namely, that a measurement of a user is a linear function of a product of factors and biases (e.g., the sum of the biases), and that a score $S_i$ is a function of a linear combination of measurements. Additionally, as described with respect to Eq. (5), each bias $b_{j,h}$ in B may be assumed to correspond to a distribution of values having certain parameters (e.g., a mean and variance). Under these assumptions, the probability of the data observed by an adversary S may be expressed as a probability that is conditional in $\theta$, as follows:

$$P(S\mid\theta)= \qquad (13)$$

$$\prod_{i=1}^{k} P(S_i\mid\theta) = \prod_{i=1}^{k} P\left(\frac{1}{\sum_j C_{i,j}} \sum_j C_{i,j}(\mu_{(i,j)} + \vec{F}_{(i,j)} \cdot \vec{B}_{(j)}) = S_i\mid\theta\right)$$

Similarly to Eq. (11), $\mu_{(i,j)}$ may take on various values in different embodiments, as described above. Different embodiments may employ various approaches for finding values of θ in Eq. (13) for which the probability P(S|θ) is maximal. Note that the probability P(S|θ) may also be referred to herein as the likelihood of θ given the data S, and denoted L(θ;S), this is because the same assignment to θ that maximizes the probability P(S|θ) maximizes the likelihood.

One analytical approach for finding an assignment for θ may involve taking the logarithm of Eq. (13), which is referred to as the "log-likelihood", and finding a maximum by setting the derivative of the log-likelihood to θ. If the parameters that are being optimized (e.g., bias parameters) are assumed to correspond to normal distributions, taking the derivative of the log-likelihood with respect to the biases yields a set of linear equations, which when solved, provides a maximum likelihood solution.

Another approach for finding values θ that may be used in some embodiments is outlined in the following paragraphs. Those skilled in the art may recognize that Eq. (13) corresponds to a likelihood function that has the property of being convex, and as such can be optimized to find a local optimum using convex optimization approaches such as Expectation Maximization. In such optimization approaches, the goal is to start from an initial assignment of values to θ (denoted $\theta^0$), and to iteratively refine the values in θ in order to increase the probability of Eq. (13), which amounts to increasing the likelihood. Due to the convexity of the likelihood function, the iterative process is guaranteed to increase the likelihood in each iteration, until convergence at a local optimum. Thus, the iterative process may be viewed as generating a successive series of sets of parameters $\theta^1, \theta^2, \ldots, \theta^{t-1}, \theta^t$, such that the probability in Eq. (13) typically increases in each iteration, i.e., typically $P(S|\theta^t) > P(S|\theta^{t-1})$ for t>0. If the probability $P(S|\theta^{t+1})$ cannot be increased, or the only achievable increase is below a certain threshold, convergence at a local optimum may be assumed. Since the local optimum that is reached is not necessarily the global optimum, it is customary (but not necessary) to perform the process multiple times using different initial assignments to $\theta^0$ to increase the chance of reaching a local optimum that is close to, or equal to, the global optimum. Below is one such example of how this iterative process may be carried out. Those skilled in the art will recognize that there are other algorithms and/or derivations that may be employed to accomplish the same goal.

It is to be noted that in different embodiments, the difference between different assignments to θ may involve only a subset of the parameters in θ. For example, in one embodiment, optimization of θ may involve only updating entries of biases in B, while the contribution matrix C and the matrix of factor vectors F are assumed to remain constant. In another embodiment, in addition to updating at least some of the entries in B, or instead of updating those entries, certain entries in C or F may be updated. For example, this may involve, as part of the optimization determining which users contributed measurements to the computation of certain scores (i.e., updating values of certain rows in C).

In some embodiments, a General Expectation Maximization (GEM) approach is used to find an assignment of values to θ for which the probability in Eq. (13) is locally optimal. With a GEM algorithm, one or more parameters in θ are updated in each iteration in a way that increases the likelihood. It is to be noted that, in some embodiments, the update to the parameters in each iteration is not necessarily the best possible in terms of increase in likelihood. Rather, it merely suffices that for a certain portion of the iterations the updates increase the likelihood. By alternating between parameters in different iterations and continually improving the likelihood, the GEM algorithm will converge on a locally optimal θ.

Updating $\theta^t$ is typically done by utilizing values $\theta^{t-1}$ from a previous iteration, and changing one or more parameters to increase the likelihood. In one embodiment, $\theta^t$ is set by randomly changing one or more parameters $\theta^{t-1}$ until the likelihood corresponding to Eq. (13) increases. In another embodiment, line searches and/or gradient-based methods are used to update $\theta^t$ based on the previous iteration's $\theta^{t-1}$. In yet another embodiment, a genetic algorithm approach is utilized to update the likelihood, in which in each generation the assignments that are kept are ones that have a higher likelihood than previous generations.

In some embodiments, the optimization problem of finding a maximum likelihood assignment for θ may be expanded to include corresponding weights for the k scores. For example, scores may be weighted according to the number of users who contributed measurements to their computation. In another example, a score $S_i$ may be weighted according to the certainty in the values of $i^{th}$ row in C that relate to it. Optionally, one way in which weighting may be incorporated is by adding k weight parameters $w_1, \ldots, w_k$ that correspond to the k scores and multiplying the values in each row i in C by the corresponding $w_i$.

In some embodiments, learning bias parameters in θ is a process that is performed over time. Initially, for certain users, the amount of measurement data may not suffice to enable accurate learning of bias parameters. Thus, information corresponding to these users may be considered corresponding to general users even if their identity is known. Once a sufficient amount of data corresponding to the users is collected, then they may be treated as identified users (e.g., have a corresponding column j in the matrix C and/or have parameters corresponding to the users in θ).

In some embodiments, when solving sets of equations to find values for the bias parameters in θ, the number of scores involved (expressed by the value k) should typically be larger than the number of parameters being learned (denoted |θ|). In some cases, k will be significantly larger than |θ|, such as at least 2 times larger, 5 times larger, or more than 10 times larger than |θ|.

As described above, given a set of scores $S=\{S_1, \ldots, S_k\}$ it is possible for an adversary to learn, using various techniques, a model θ that includes the matrices C, F, and B mentioned above. Additionally, given a model θ it is possible to determine its merit with respect to the observed scores S. In different embodiments, the merit may be determined in different ways.

In one embodiment, the merit of θ with respect to scores S may be expressed in terms of the errors $\varepsilon_i$ described in Eq. (11) or Eq. (12). Thus, if it is assumed that for each $S_i$ the error given the parameters of θ is $$\varepsilon_i = S_i - \frac{1}{\sum_j C_{i,j}} \sum_j C_{i,j}(\mu_{(i,j)} + \vec{F}_{(i,j)} \cdot \vec{B}_{(j)}),$$

then the merit of $\theta$ given the observed scores may be given by $M(\theta,S)=\Sigma_i|\varepsilon_i|$. Optionally, comparing two models $\theta$ and $\theta'$ with this merit measure is done by observing the value $\Delta M(\theta,\theta',S)=M(\theta,S)-M(\theta',S)$. Optionally, $\Delta M(\theta,\theta',S)$ may be normalized with respect to the extent of the difference between $\theta$ and $\theta'$. For example, if the extent of the difference is expressed by $n_\delta$, the number of parameters that have different values in $\theta$ and $\theta'$, then one form of normalization may be $\Delta M(\theta,\theta',S)=[M(\theta,S)-M(\theta',S)]\cdot(n_\delta)^{-0.5}$.

In another embodiment, the merit of $\theta$ with respect to scores S may be expressed in terms of likelihood $L(\theta;S)$, where the likelihood is the term for $P(S|\theta)$ given in Eq. (13). Optionally, comparing two models $\theta$ and $\theta'$ with this merit measure is done by a likelihood ratio test, such as observing the value of the difference in log-likelihood expressed by $\Delta L(\theta,\theta',S)=\log(P(S|\theta)/P(S|\theta'))$. Optionally, when determining significance of the difference $\Delta L(\theta,\theta',S)$, the extent of the difference between $\theta$ and $\theta'$ is taken into account such that, the larger the difference between $\theta$ and $\theta'$ the less significant the value for $\Delta L(\theta,\theta',S)$ becomes.

Given a merit measure for evaluating $\theta$ with respect to scores S, it is possible to compare different models with respect to S, in order to determine which is a better fit. Being able to do this may enable an adversary to make inferences by comparing variants of $\theta$ to see which is more accurate or more likely. Variants of $\theta$ may differ according to various aspects, such as the entries in C, the entries in F, and/or the entries in B.

In one embodiment, a variant of $\theta$ may be created by setting certain entries in the matrix C in order to explore the extent to which one or more users might have contributed measurements to certain scores. For example, the adversary may suspect that a user provides measurements for a recurring score (e.g., a daily rating of a teacher). The adversary may then add entries to C in order to reflect the fact that the user contributed measurements to certain scores. The merits of such a model may be compared with a model in which the user did not contribute measurements to such scores in order to determine which scenario is more likely and/or to what extent.

In another embodiment, a variant of $\theta$ may be created by modifying certain factors in F by changing certain values in some entries $\vec{F}_{(i,j)}$ in the matrix F. This can enable an adversary to see whether it is likely that a certain factor was overlooked (e.g., a factor that corresponds to a user being sick, depressed, unemployed, etc.). In one example, the adversary may suspect that the user separated from a spouse at a certain date. The adversary may add a factor corresponding to such a separation to multiple events from that data on (e.g., for a period of a week). The adversary may then compare the merits of two models, one $\theta$ in which it is not assumed that the separation took place, and the other $\theta'$ in which the factor corresponding to the separation was added to multiple events, in order to see which better fits the scores.

In another embodiment, certain bias parameter values may be changed in order to create a variant of $\theta$. An adversary may suspect that a user likely has certain bias values, but because of a lack of sufficient training data and/or a certain selection of an initial starting point for estimating $\theta$, the values in $\theta$ did not converge to "correct" values. In such a case, the adversary may generate a variant $\theta'$ with other values for certain biases (e.g., biases taken from other similar users or using a certain prior distribution) in order to evaluate whether $\theta'$ is a better fit to the scores S, compared to $\theta$.

In different embodiments, creating variants of $\theta$ may be done in different ways. In one embodiment, certain values in $\theta$ are modified (e.g., changing certain values $C_{i,j}$, adding certain factors to one or more vectors $\vec{F}_{(i,j)}$, etc.). Thus, the parameters in a variant $\theta'$ are the same as $\theta$, except for parameters that are explicitly altered. Optionally, following such an alteration, the model $\theta'$ is further trained (e.g., using additional iterative optimization steps), to adjust for the fact that after making the alterations to some parameters $\theta'$ may be suboptimal. The additional steps may help adjust other parameters to compensate for the changes and bring the model to a new local minima. Optionally, the altered parameters are kept fixed in this process in order for their values to remain constant (while other parameters may be adjusted slightly).

In another embodiment, two variants of models may be trained separately. For example, certain model parameters may be fixed in each model, and then the training procedure of each model may proceed without altering the fixed parameters. This may enable obtaining two variants $\theta$ and $\theta'$ that are quite different from each other, each one being optimal (or locally optimal) with respect to the initial assumptions encoded in it by the fixed parameters.

19—Assessing Risk based on an Adversary's Model

The preceding discussion in this disclosure described how an adversary model may be learned based on disclosed scores for experiences. This section discusses some aspects of how the adversary model (and changes to it due to disclosed scores) may be utilized to determine the risk to the privacy of one or more users from disclosing one or more scores to which they contributed measurements.

In some embodiments, the aforementioned risk assessment involves estimating what additional information an adversary may have access to (in addition to the disclosed scores), and then mimicking the modeling process performed by the adversary with the additional information. In one example, this additional information may include portions of the matrix C described above, comprising information the adversary likely obtained via monitoring users, information provided by the users themselves, and/or information provided by other parties. In another example, the additional information may include measurements of certain users (e.g., measurements provided by the users themselves).

Given an estimation of the additional information an adversary is likely to have, in some embodiments, assessing the risk to privacy involves running a similar algorithm to an algorithm an adversary may use, with the disclosed scores and the additional information, in order to model one or more users who contributed measurements for computing the scores. For example, to mimic the modeling done by an adversary, a system may use one or more of the approaches described above, such as the linear programming or maximum likelihood approaches. Optionally, this process may result in a model $\vec{\theta}$, which is an estimation of the model $\theta$ that the adversary is likely to have after analyzing the disclosed scores and the additional information. Optionally, the model $\hat{\theta}$ stores estimations of one or more parameters that describe private information of a user, such as estimations of values of one or more biases of a user (entries in B), estimations of the contributions of the user (entries in C), and/or estimation of factors related to the user (entries in F).

The model $\hat{\theta}$ may be analyzed, in some embodiments, in order to determine the risk to privacy from disclosure of a set of scores S that is used to generate $\hat{\theta}$. Optionally, the model $\hat{\theta}$ may be viewed as representing a likely state of the knowledge an adversary may have about private information related to users and/or experiences they had after the disclosure of the scores. The extent and/or quality of the state of the knowledge the adversary may have about the private information may be expressed in various ways, as described in the following embodiments.

In one embodiment, parameters in $\hat{\theta}$ may be evaluated to determine the accuracy of the modeling of private information likely achieved by an adversary, such as the accuracy of the values assigned to bias parameters in B. In one example, the accuracy may be expressed as a ratio between an estimated parameter (e.g., a certain bias value of a certain user) and the ground truth value for that parameter, which is known based on a model learned directly from the measurements of the user. In another example, the accuracy may be expressed as a margin between the estimated parameter and the ground truth value for the parameter. In still another example, the accuracy may be expressed as a divergence (e.g., Kullback-Leibler divergence) between an estimated distribution for a parameter and the ground truth distribution for the parameter. In yet another example, the accuracy of parameters may be expressed by a size of confidence bars assigned to it. Optionally, these confidence bars may represent the margin of error that is needed for parameters in $\hat{\theta}$ in order for a certain proportion of the values of parameters in $\hat{\theta}$ to fall within the confidence bars. For example, the accuracy may be expressed as the size of the 95% confidence bars being at ±20% of the values, which means that for 95% of the parameters in $\hat{\theta}$, the values in $\hat{\theta}$ are within 20% from the ground truth; for the other 5%, the error may be larger than 20%.

In another embodiment, the parameters in $\hat{\theta}$ may be utilized by a predictor that predicts scores based on a set of users who likely contributed measurements of affective response that were used to generate the scores. For example, the predictor may receive information regarding a set of users, such as the total number of users in the set and/or identities of certain users (or all of the users). The score generated by the predictor represents the adversary's estimate of a score computed based on the measurements of the users, which takes into account various parameters in the adversary's model such as at least some of the biases of the users. Optionally, the predictor utilizes a machine learning algorithm, such as regression model, a support vector for regression, a neural network, or a decision tree. Optionally, $\hat{\theta}$ comprises one or more parameters used by the predictor, which are obtained from running a training procedure on training data comprising one or more scores for experiences.

The accuracy of the predictor (referred to herein also as its "predictive power") may be determined utilizing a test set that includes disclosed scores and information about their corresponding sets of users (users who contributed measurements from which the disclosed scores were computed). Each predicted score may be compared to the corresponding disclosed score in order to obtain a value indicative of the accuracy of the prediction. By aggregating these values for multiple scores, a value representing the accuracy of the predictor can be determined. Optionally, the accuracy of the predictor may serve as an indicator of the accuracy of $\hat{\theta}$, since the more accurate the estimated parameters in $\hat{\theta}$, the better the performance of the predictor is expected to be. Optionally, scores in the test set are not also used to learn $\hat{\theta}$. Optionally, the predictive power may be expressed by various values related to the quality of predictions such as squared error (e.g., average error of a predicted score) and/or error rate (e.g., proportion of predicted scores whose difference from the corresponding disclosed score exceeds a certain threshold).

In yet another embodiment, parameters in $\hat{\theta}$ may be evaluated to determine the extent of information they carry, such as the number of bits of information the parameters hold and/or the entropy of the parameters (when expressed as random variables coming from a certain distribution). For example, parameters that are known only slightly, or not at all, may be modeled as random variables that are uniform and/or have a high variance (to express uncertainty in their values). This may result in a high entropy for the parameters in $\hat{\theta}$. However, parameters that are known in more detail may be modeled as random variables that are non-uniform and/or have a low variance (to express less uncertainty in their values). This may result in a lower entropy for the parameters in $\hat{\theta}$. Thus, the entropy of $\hat{\theta}$ or another information-related statistic of $\hat{\theta}$, may serve as an indicator of the extent of the modeling of users from data comprising disclosed scores. In another example, the model $\hat{\theta}$ may be evaluated using other information-based criteria, such as the Akaike information criterion (AIC), which is a measure of the relative quality of a statistical model given the number of parameters in the model and the likelihood of the data.

It is to be noted that in some embodiments, analyzing $\hat{\theta}$ to determine the accuracy with respect to the ground truth may require access to information that may be considered private. This private information may be required in order to ascertain what the ground truth is with respect to at least some of the parameters in $\hat{\theta}$. Optionally, the private information may be related to sets of events corresponding to at least some of the disclosed scores used to learn $\hat{\theta}$. For example, the information may include identifying information of users, information about factors related to experiences the users has, and/or values of measurements of affective response of the users. Optionally, the information may include values of biases (e.g., bias values of some users) and/or other parameters computed based on measurements of affective response of users.

However, in other embodiments, analyzing $\hat{\theta}$ in order to determine risk to privacy may not require access to private information. For example, determining the predictive power of a predictor using $\hat{\theta}$ and/or the information contained in $\hat{\theta}$ (e.g., via entropy of parameters in $\hat{\theta}$) may be done, in some embodiments, without accessing information that may be considered private information of users.

The results of an evaluation of the parameters in $\hat{\theta}$ (e.g., the accuracy, predictive power, and/or entropy, as described above) may be used in some embodiments to evaluate the risk to privacy. Optionally, the magnitude of a value determined in the evaluation of the parameters in $\hat{\theta}$ may express the extent of the risk to privacy. For example, the accuracy of the parameters in $\hat{\theta}$ (e.g., the ratio compared to the ground truth) is a value indicating the risk; the closer the value to 1, the higher the risk (since users are more accurately modeled). Similarly, the more predictive power a predictor that utilizes $\hat{\theta}$ has, the more risk there is to privacy (since the accurate scores are likely the product of accurate modeling of the users). Optionally, the fact that a value determined in the evaluation of the parameters in $\hat{\theta}$ reaches a certain threshold may express the extent of the risk to privacy. For example, if the entropy of $\hat{\theta}$ falls below a certain number of bits, this may indicate that the privacy of users with corresponding parameters in $\hat{\theta}$ may be at risk (since the low entropy reflects the amount of knowledge about the users reaches a certain threshold).

In some embodiments, the risk to privacy may be evaluated and/or expressed for a single user and/or on a per-user basis. For example, the risk to a certain user is determined based on the accuracy of the parameters corresponding to the certain user (e.g., the biases in $\hat{\theta}$ of the certain user). Optionally, if the average accuracy of the estimated parameters corresponding to the certain user reaches a certain level, e.g., within 5%, 10%, or 25% from the ground truth, then the certain user's privacy is considered at risk. Optionally, the risk to the privacy of the certain user is expressed in terms of the accuracy of the estimated parameters corresponding to the certain user. In another example, the risk to a user may be expressed as the entropy of the parameters corresponding to the certain user. Optionally, the certain user may be considered at risk if the entropy of parameters in $\hat{\theta}$ corresponding to the certain user falls below a certain threshold.

In some embodiments, the risk to privacy may be evaluated and/or expressed with respect to a group of users, for example, the risk may be expressed as an average value of the group of users and/or other statistics corresponding to the group (e.g., mode or median). For example, the risk to a group of users who have corresponding parameters in $\hat{\theta}$ may be expressed as the average accuracy of the parameters and/or the average per-user accuracy. Optionally, the group of users may be considered at risk if the average accuracy is within a certain level from the ground truth, such as within 5%, 10%, 25%, or 50% of the ground truth.

When evaluating risk on a per-user basis (i.e., the risk to privacy of each user may be evaluated separately), in some embodiments, the risk to privacy of a group of users may be expressed via a statistic of the per-user risk evaluations. For example, the risk may be represented by the average of the per-user risks, the maximum, the median, and/or the mode. Optionally, if the statistic reaches a certain level, then the whole group of users may be considered at risk.

In some embodiments, analysis of the risk to privacy associated with disclosing scores may involve comparing a current estimated model $\hat{\theta}$, with an updated estimated model $\hat{\theta}'$, which is obtained by incorporating information learned from the disclosure of one or more scores for experiences. Optionally, results of the comparison may indicate how much additional information is gained from the disclosure and/or how much the modeling has improved from the disclosure. The model $\hat{\theta}$ may be a model learned from previously disclosed scores or a model generated from prior probability distributions for parameters which an adversary likely used. Thus, in these embodiments, $\hat{\theta}$ may serve as a starting point from which to start the analysis of the risk associated with disclosing the one or more scores. Optionally, $\hat{\theta}'$ is an updated version of $\hat{\theta}$, generated from $\hat{\theta}$ by modifying one or more parameters in $\hat{\theta}$ based on the one or more disclosed scores.

When a difference between $\hat{\theta}$ and $\hat{\theta}'$ is used to analyze a risk to privacy, the difference may be expressed in different ways in different embodiments. Optionally, the difference between $\hat{\theta}$ and $\hat{\theta}'$ may be represented by value computed based on $\hat{\theta}$ and $\hat{\theta}'$ (e.g., by treating $\hat{\theta}$ and $\hat{\theta}'$ as vectors and providing a vector representing $\hat{\theta}'-\hat{\theta}$). Optionally, a function that evaluates the risk receives the value computed based on $\hat{\theta}$ and $\hat{\theta}'$, and utilizes the value to compute the risk. Optionally, the difference between $\hat{\theta}$ and $\hat{\theta}'$ may be represented by at least a first value from $\hat{\theta}$ and at least a second value from $\hat{\theta}'$. Optionally, a function that evaluates the risk receives the first and second values as input and utilizes the first and second values to compute the risk.

In one embodiment, the difference between $\hat{\theta}$ and $\hat{\theta}'$ may express an added accuracy to one or more parameters with respect to the ground truth. In one example, the difference between $\hat{\theta}$ and $\hat{\theta}'$ indicates how much closer the value a certain bias is in $\hat{\theta}'$ compared to the value of the certain bias in $\hat{\theta}$. In another example, the difference between $\hat{\theta}$ and $\hat{\theta}'$ may express the difference between a first ratio between values of one or more parameters in $\hat{\theta}$ and their corresponding ground truth values, and second ratio between values of the one or more parameters in $\hat{\theta}'$ and their corresponding ground truth values.

In another embodiment, the difference between $\hat{\theta}$ and $\hat{\theta}'$ may be expressed in terms of a difference of predictive power between when a predictor utilizes parameters in $\hat{\theta}$ to predict a score for a set of users who have a certain experience and when the predictor utilizes parameters in $\hat{\theta}'$ to predict the score. Optionally, the difference may be expressed as a change to a value related to the quality of predictions, such as the difference in the squared error and/or the error rate.

In yet another embodiment, the difference between $\hat{\theta}$ and $\hat{\theta}'$ may express added information about parameters being modeled. In one example, the difference between $\hat{\theta}$ and $\hat{\theta}'$ is indicative of divergence between a first distribution of a parameter described in $\hat{\theta}$ and a second distribution of the parameter described in $\hat{\theta}'$. In another example, the difference between $\hat{\theta}$ and $\hat{\theta}'$ is indicative of a difference between two divergences. Optionally, the first divergence is between a first distribution of a parameter described in $\hat{\theta}$ and a certain prior distribution of the parameter and the second divergence is between a second distribution of the parameter described in $\hat{\theta}'$ and the certain prior distribution of the parameter. In still another example, the difference between $\hat{\theta}$ and $\hat{\theta}'$ is indicative of mutual information between a first distribution of a parameter described in $\hat{\theta}$ and a second distribution of the parameter described in $\hat{\theta}'$. And in yet another example, the difference between $\hat{\theta}$ and $\hat{\theta}'$ is indicative of the difference between a value corresponding to the entropy of a distribution of a parameter described in $\hat{\theta}$ a value corresponding to the entropy of a distribution of the parameter described in $\hat{\theta}'$.

The results of a comparison between $\hat{\theta}$ and $\hat{\theta}'$ may be used, in some embodiments, to evaluate the risk to privacy. Optionally, the magnitude of a difference between $\hat{\theta}$ and $\hat{\theta}'$ may express the extent of the risk to privacy associated with disclosure of the one or more scores that were utilized to update the estimated model of an adversary from $\hat{\theta}$ to $\hat{\theta}'$. For example, the magnitude of the increase in accuracy of the parameters may be a value indicating the risk; the larger the improvement, the higher the risk (since users are more accurately modeled in $\hat{\theta}'$ compared to how they were modeled in $\hat{\theta}$. Similarly, the larger the change in predictive power between predictors using $\hat{\theta}$ and $\hat{\theta}'$, the more risk there is to privacy (since the increase in accuracy is likely the product of updating the models). Optionally, the fact that difference between $\hat{\theta}$ and $\hat{\theta}'$ reaches a certain threshold may express the extent of the risk to privacy. For example, if the difference in entropy between $\hat{\theta}$ and $\hat{\theta}'$ is above a certain number of bits, this may indicate that the privacy of users with corresponding parameters in $\hat{\theta}$ may be at risk (since the lower entropy of $\hat{\theta}'$ reflects the amount of additional knowledge about the users reaches a certain threshold).

When comparing between $\hat{\theta}$ and $\hat{\theta}'$ to evaluate risk to privacy, in some embodiments, the difference between $\hat{\theta}$ and $\hat{\theta}'$ (e.g., expressed as a change to accuracy, predictive power, and/or entropy) may be normalized to obtain a rate of privacy loss. Optionally, the normalization is done with respect to the number of disclosed scores that were utilized to update the estimated model from $\hat{\theta}$ to $\hat{\theta}'$ and/or with respect to the number of users who contributed measurements used to compute the disclosed scores. For example, a value representing the difference in the entropy of $\hat{\theta}$ and $\hat{\theta}'$ may be divided by the number of disclosed scores that were utilized to update the estimated model from $\hat{\theta}$ to $\hat{\theta}'$, to obtain a rate of loss of privacy that may be given in bits of information learned by the adversary per disclosed score. Optionally, the value of the rate of privacy loss is indicative of the risk to the privacy of users. Optionally, when the rate of privacy loss exceeds a certain rate, the privacy of the users is considered to be at risk. Optionally, a rate of privacy loss may be computed per user, i.e., based on the difference between the parameters corresponding to a certain user in $\hat{\theta}$ and $\hat{\theta}'$. Optionally, if the rate of privacy loss of the certain user exceeds a certain rate, the privacy of the certain user is considered to be at risk.

It is to be noted that the rate of privacy loss may influence various decisions regarding the contribution of measurements and/or disclosure of scores. In one example, a user may elect not to contribute a measurement of affective response to the computation of a certain score if the estimated rate of privacy loss is too great (i.e., the rate of privacy loss reaches a certain threshold). In another example, one or more scores may not be released if the rate of privacy loss associated with their disclosure is too great.

Additionally or alternatively, a rate of privacy loss may, in some embodiments, influence the estimated utility of contributing measurements of affective response to computation of scores and/or the valuation of the contribution of the measurements and/or of a disclosure of scores computed based on the measurements. In one example, a factor influencing the utility to a user from contributing a measurement of affective response to the computation of a score may be the loss of privacy associated with the contribution of the measurement. While contributing a measurement may have a certain utility to a user, e.g., by enabling personalized services for the user and/or by making the user eligible to a compensation for the measurement, a high rate of privacy loss may decrease the utility for the user of contributing the measurement. In such case, the services and/or compensation need to be weighed against the damage to the user in terms of loss of privacy. Optionally, different users may have different attitudes towards loss of privacy; thus, the same rate of loss of privacy may affect different users to different extents and cause them to make different decisions regarding the contribution of measurements when in similar circumstances. In another example, an entity that discloses scores may set a valuation for a score based on the rate of loss of privacy to users who contributed measurements to computing the score.

In some embodiments, the risk to privacy associated with a change in an adversary's model from $\hat{\theta}$ to $\hat{\theta}'$ may be evaluated for a single user and/or on a per-user basis. For example, the risk to a certain user is determined based on the increased accuracy to the parameters corresponding to the certain user (e.g., increased accuracy the values of biases of the user in $\hat{\theta}'$ compared to those values in $\hat{\theta}$). Optionally, if the average increase in the accuracy of the estimated parameters corresponding to the certain user reaches a certain level, e.g., an improvement of 5%, 10%, or more than 25%, then the certain user's privacy is considered at risk.

In some embodiments, the risk to privacy associated with a change in an adversary's model from $\hat{\theta}$ to $\hat{\theta}'$ may be evaluated with respect to a group of users. For example, the risk to a group of users may be expressed as the average increase in the accuracy of the parameters and/or the average per-user accuracy. Optionally, the group of users may be considered at risk if the average increase to accuracy reaches a certain level such as at least 3%, 5%, 10%, 25%, or 50%.

The analyses of risk to privacy described above may be placed in a probabilistic setting, which takes into account assumptions regarding the extent of information an adversary likely has (e.g., the disclosed scores S, a contribution matrix C, and/or the matrix of factor vectors F, mentioned above).

In one embodiment, the analysis of risk to privacy from disclosing a set S comprising one or more scores may involve determining a distribution of values that is generated by analyzing a plurality of models $\hat{\Theta}=\{\hat{\theta}_1, \hat{\theta}_2, \ldots, \hat{\theta}_r\}$. Optionally, the analysis of multiple models may be in addition to, or instead of, analysis of a single model $\hat{\theta}$, as described above. Similarly to the analysis of a single model $\hat{\theta}$, distributions learned from $\hat{\Theta}$ may describe various probabilities that may be related to an extent of risk to the privacy of users. For example, these probabilities may describe the probability that the accuracy of parameters in models learned from S reaches a certain level, the probability that the predictive power of a predictor trained with S reaches a certain level, and/or the probability that a model trained from S contains a certain amount of additional information.

Analyzing multiple models may provide probabilistic answers to questions regarding the risk to privacy associated with disclosing a set of scores S. In one example, analyzing multiple models can give the probability that disclosing S can lead an adversary to a model for which the average accuracy of a bias parameter is within a certain level from the ground truth, such as within 5%, 10%, 25%, or 50% from the ground truth. In another example, analyzing multiple models can give the probability that disclosing S can lead an adversary to a model with a corresponding predictive power that exceeds a certain rate, such as a squared error that is below a certain rate. In yet another example, analyzing multiple models can give the probability that disclosing S can lead an adversary to gain at least a certain amount of information (which corresponds to a decrease of at least a certain extent in the entropy of a model).

In one example, analyzing multiple models involves learning parameters of a distribution of values that can describe the risk to privacy associated with disclosing a set of scores S. Optionally, the distribution describes probabilities of observing different values that may be extracted from analysis of a model that is trained on data involved in the disclosure of S (e.g., data comprising S and a corresponding contribution matrix C and/or a matrix of factor vectors F). Optionally, the distribution may include a distribution of values such as the accuracy of parameters in a trained model, the predictive power of a predictor using the trained model, and/or the information of in the trained model. Examples of the parameters that may be learned to describe the distributions include moments (e.g., mean and variance) and other parameters of various parametric distributions (e.g., the Normal, Laplace, or Gamma distributions).

In another example, analyzing multiple models involves creating a histogram that describes the risk to privacy associated with disclosing a set of scores S. Optionally, the histogram describes probabilities of observing different values related to the risk to privacy that may be extracted from analysis of a model that is trained on data involved in the disclosure of S. Optionally, the histogram may describe values such as the accuracy of parameters in a trained model, the predictive power of a predictor using the trained model, and/or the information of in the trained model.

In some embodiments, multiple differences between different pairs of models may be used to learn distributions of values representing the risk to privacy of users dues to updating models based on disclosed scores. Optionally, this analysis may be done in addition to a determination of a value from a single difference between models $\hat{\theta}$ and $\hat{\theta}'$ (where $\hat{\theta}'$ is an update of $\hat{\theta}$ based on disclosed scores), as described above. Optionally, the multiple differences are obtained by: evaluating differences between various models $\hat{\theta} \in \hat{\Theta}$ and a model $\hat{\theta}'$, evaluating differences between a model $\hat{\theta}$ and various updated models $\hat{\theta}' \in \hat{\Theta}' = \{\hat{\theta}'_1, \hat{\theta}'_2, \ldots, \hat{\theta}'_r\}$, and/or evaluating differences between various pairs of models $\hat{\theta} \in \hat{\Theta}$ and $\hat{\theta} \in \hat{\Theta}'$. Similar to the analysis of a single difference between a model $\hat{\theta}$ and an updated model $\hat{\theta}'$, distributions learned from multiple differences may describe various probabilities that may be related to an extent of risk to privacy of users. For example, these probabilities may describe the probability that the accuracy of parameters in models learned from S increased by certain level when updating models from $\hat{\theta}$ to $\hat{\theta}'$, the probability that the predictive power of a predictor trained with S increased by certain level when updating models from $\hat{\theta}$ to $\hat{\theta}'$, and/or the probability that updating models from $\hat{\theta}$ to $\hat{\theta}'$ based on S involved gaining a certain amount of information.

Analyzing multiple differences between pairs of models (each pair involving a model $\hat{\theta}$ and an updated model $\hat{\theta}'$) may provide probabilistic answers to questions regarding the risk to privacy associated with the disclosure of a set of scores S and the ensuing updating of models based on the disclosed scores. In one example, analyzing multiple differences can give the probability that disclosing the set of scores S can lead an adversary to update a model in such a way that the average accuracy of a bias parameter increases by at least a certain value, such as 1%, 5%, 10, or 25%. In another example, analyzing multiple differences can give the probability that disclosing the set of scores S can lead an adversary to increase the predictive power of a model by a certain rate, such as reducing the squared error by at least 5%. In yet another example, analyzing multiple differencing can give the probability that disclosing the set of scores S can lead an adversary to gain at least a certain amount of information (which corresponds to a decrease of at least a certain extent in the entropy of parameters in the updated models).

In one example, analyzing multiple differences involves learning parameters of a distribution of values that can describe the risk to privacy associated with disclosing a set of scores S. Optionally, the distribution describes probabilities of observing different values that may be extracted from analysis of a model that is updated based on data involved in the disclosure of S (e.g., data comprising S, a corresponding contribution matrix C, and a matrix of factor vectors F). Optionally, the distributions may include distributions of values such as the increase in accuracy of parameters in the updated model, the increase in predictive power of a predictor using the updated model, and/or the increase in information in the updated model. Examples of the parameters that may be learned to describe the distributions include moments (e.g., mean and variance) and other parameters of various parametric distributions (e.g., the Normal, Laplace, or Gamma distributions).

In another example, analyzing multiple models differences involves creating a histogram that describes the risk to privacy associated with disclosing a set of scores S. Optionally, the histogram describes probabilities of observing different values related to the risk to privacy, which may be extracted from analysis of a model that is updated based on data involved in the disclosure of S (e.g., data comprising S, a corresponding contribution matrix C, and a matrix of factor vectors F). Optionally, the histogram may describe values such as the increase in accuracy of parameters in the updated model, the increase of the predictive power of a predictor using the updated model, and/or the increase in the information in the updated model.

In some embodiments, probabilistic analyses, such as the analyses described above, involve the generation of a plurality of models $\hat{\Theta}$ and/or a plurality of updated models $\hat{\Theta}'$. Optionally, the different models belonging to $\hat{\Theta}$ and/or $\hat{\Theta}'$ may be generated in different ways. Optionally, the different models belonging to $\hat{\Theta}$ and/or $\hat{\Theta}'$ are generated from the same set of training data, or a similar set. In one example, different models may be generated by using different algorithmic approached (e.g., different optimizations and/or algorithms for searches in the parameter space). In another example, different models may be generated by using different initialization parameters (e.g., different initial values $\hat{\theta}^0$ from which different models $\hat{\theta}$ may emerge after convergence). Optionally, the different models belonging to $\hat{\Theta}$ and/or $\hat{\Theta}'$ may be generated from different training data, such as different subsets of the disclosed scores S, different matrices C, and/or different matrices F.

Those skilled in the art may recognize that there are various randomized approaches such as Monte Carlo simulations that may be used to generate models belonging to the sets $\hat{\Theta}$ and/or $\hat{\Theta}'$, described above. In particular, in some embodiments, various randomized procedures involving subsampling, addition of noise, resampling, and/or generative approaches may be used in order to obtain the sets of models $\hat{\Theta}$ and/or $\hat{\Theta}'$ for the analyses described above.

In some embodiments, the models in the sets $\hat{\Theta}$ and/or $\hat{\Theta}'$ are generated, at least in part, utilizing subsampling in order to generate multiple datasets from which the models in $\hat{\theta}$ and/or $\hat{\theta}'$ may be trained. Optionally, the subsampling involves selecting a subset from a full set of data comprising a set of scores S, a contribution matrix C, and a matrix of factor vectors F. Optionally, the subsampling involves selecting a certain subset of the scores S and their corresponding rows in C and F. Additionally or alternatively, the subsampling may involve selecting a certain set of columns in C and F (i.e., the subsampling involves modeling based on a certain subset of users). Additionally or alternatively, the subsampling may involve a random selection of entries from C and F.

Following the subsampling, a model can be trained based on the subset of the data selected in the subsampling. In some embodiments, it is possible that different subsets of data may yield models with different parameters, thus subsampling and training models based on the subsampled data can be used to populate $\hat{\Theta}$ and/or $\hat{\Theta}'$ with different models. There are various criteria according to which subsampling may be performed. Following are a few examples of various approaches that may be used; those skilled in the art will realize that other approaches may be used. In particular, some embodiments may involve a combination of one or more of the example approaches described below.

In one example, subsampling may be done under an assumption that an adversary can typically determine a proportion $\alpha$ of the entries of the matrix C, where $0 < \alpha < 1$. In such a case, resampling may be done by generating datasets that comprise the disclosed scores S and partial contribution matrices. Optionally, each partial contribution matrix is created by randomly selecting entries from C to be included in the partial contribution matrix, such that each entry from C has probability α of being included in the partial contribution matrix.

In another example, subsampling may be done under an assumption that an adversary can typically determine the contribution to scores for a certain proportion of the users, which corresponds to selecting a proportion α of the columns in the matrix C and the same columns in F, where 0<α<1. In such a case, resampling may be done by generating datasets that comprise the disclosed scores S and partial contribution matrices and corresponding partial matrices of factor vectors. Optionally, each partial contribution matrix is created by randomly selecting columns from C to be included in the partial contribution matrix, such that each column in C has probability α of being included in the partial contribution matrix.

In yet another example, subsampling may be done under an assumption that an adversary can typically determine the contribution to scores for a certain proportion of the experiences and/or for a certain proportion of scores. Optionally, this corresponds to selecting a proportion α of the rows in the matrix C and F, where 0<α<1. In such a case, resampling may be done by generating datasets that comprise a subset of the disclosed scores S and a contribution matrix comprising the corresponding rows to the selected scores in C (and similarly a matrix of factor vectors that involves the corresponding rows from F). Optionally, scores and corresponding rows are subsampled in such a way that each score in S, and its corresponding row in C and F, have probability α of being selected to by in a certain subsample dataset.

In some embodiments, the models in the sets $\hat{\Theta}$ and/or $\hat{\Theta}'$ are generated, at least in part, by adding noise to data comprising the disclosed scores S and/or the contribution matrix C in order to generate multiple datasets from which the models in $\hat{\Theta}$ and/or $\hat{\Theta}'$ may be trained. Optionally, the noise that is added is random or pseudorandom. Optionally, the noise that is added has a mean of zero, such that it does not change expected values of the data (i.e., an average of the values of multiple data sets to which noise is added are expected to be the same as the values in the original data). Optionally, generating datasets by adding noise is done to simulate a situation where the data collected by an adversary is assumed to have limited fidelity. For example, an adversary is assumed to obtain entries in C from independent monitoring of users (e.g., using cameras and/or detecting signals of devices of the users). In such a situation, at least a certain portion of the entries in C may be incorrect. Additionally or alternatively, noise may be added to F in a similar fashion to the way it is added to C in order to create multiple datasets.

In one example, a dataset used to train a model may be generated by adding noise to entries in C. Optionally, if the entries in C are binary (e.g., 0 and 1 values), adding noise may amount to randomly flipping a certain number of entries in C (e.g., changing 1's to 0's and vice versa, for a certain proportion of entries). Optionally, if the entries are real valued, adding noise may be achieved by adding a random value to a certain proportion of the entries in C. For example, a random value added to each entry of the certain proportion may be a value drawn from a zero mean normal distribution or a zero mean Laplacian distribution. It is to be noted that if values in C have typical ranges, various steps can be applied to ensure that adding noise does not yield values that extend beyond the typical ranges of values.

In another example, a dataset used to train a model nay be generated by adding noise the scores S. This may be done to emulate a situation where an adversary is not assumed to have access to all the disclosed scores, and/or may receive information about disclosed scores from a third party after the scores may have gone further modification and/or normalization. Optionally, noise is added to scores by adding to each of at least a certain proportion of the scores a random value drawn from a zero mean distribution (e.g., a normal or a Laplacian distribution).

In some embodiments, the models in the sets $\hat{\Theta}$ and/or $\hat{\Theta}'$ are generated, at least in part, utilizing resampling to generate multiple datasets from which the models in $\hat{\Theta}$ and/or $\hat{\Theta}'$ may be trained. Optionally, resampling involves selecting at random a certain number of scores from S and their corresponding rows in C and F in order to generate a dataset. Optionally, each score in S and corresponding rows in C and F may be selected more than once.

In some embodiments, the models in the sets $\hat{\Theta}$ and/or $\hat{\Theta}'$ are generated, at least in part, utilizing a generative approach. Optionally, a generative approach enables the creation of models $\hat{\Theta}$ and/or $\hat{\Theta}'$ at random without needing to rely on a specific set of scores S, a contribution matrix C, and/or a matrix of factor vectors F that were generated from actual measurements of affective response of users.

In one embodiment, the generative approach may involve a "meta-model" for the models in sets $\hat{\Theta}$ and/or $\hat{\Theta}'$, which may include parameters of distributions that may be used to randomly generate a model. For example, the meta-model may include parameters describing distributions for biases of typical users. Thus, drawing random values from the distributions described by the meta-model may generate a model that has values that look like they were generated from a real dataset and/or a model that has statistical properties that are similar to models generated from real datasets.

In another embodiment, the generative approach may involve a "dataset model" that may be used to generate scores belonging to the set S and/or entries in the matrix C and/or F. In one example, the dataset model may include a distribution for the values S. Optionally, the dataset model may include multiple distributions corresponding to scores for different experiences or different groups of experiences. In another example, the dataset model may include parameters that may be used to generate biases for individual users. These biases may be used in turn to generate random values of measurements of affective response for the users, from which the scores may be computed. Optionally, the dataset model may describe distributions from which entries in C and/or F may be generated, such as parameters that indicate the probability that users may have a certain experience and/or a certain type of experience. Optionally, a dataset may be created from randomly generated measurements of affective response and a corresponding randomly generated contribution matrix, as described above. The randomly generated dataset can then be used to generate a model that may populate the sets $\hat{\Theta}$ and/or $\hat{\Theta}'$.

20—Risk Functions

Some of the approaches for analyzing the risk to privacy discussed above involve analysis of models generated based on data related to disclosed scores (e.g., a set of disclosed scores S, a corresponding contribution matrix C, and/or a corresponding matrix of factor vectors F). However, analyzing the risk to privacy may not necessarily require access to the actual data related to the disclosed scores. Rather, in some embodiments, such as embodiments described below, analyzing the risk to privacy may rely on values that describe the disclosed data, such as statistics corresponding to the disclosed scores S, the contribution matrix C, and/or the matrix of factor vectors F. Additionally or alternatively, in some embodiments, analyzing the risk to privacy may rely on values that describe assumptions about the extent and/or accuracy of the data the adversary may have, such as the proportion of the entries in C and/or F the adversary may have access to, and/or the accuracy of the entries in the adversary's version of C and/or F.

It is to be noted that, in some embodiments, analyzing the risk to privacy based on statistics describing the disclosed data and/or assumptions about the adversary has the advantage that it does not require access to the full data (e.g., ground truth data comprising measurements of affective response and/or the true contribution information). Thus, this analysis may be performed in a less restricted fashion than analysis that requires access to the full data. For example, the analysis of the risk to privacy may be performed by a third party that determines whether to contribute measurements of users and/or disclosed the scores that were computed based on the measurements. Optionally, the third party is not an entity that aggregates the measurements of affective response (e.g., the collection module 120) and/or computes the scores based on the measurements (e.g., the scoring module 150).

In some embodiments, analysis of risk to privacy involves determining a value corresponding to the risk based on values describing attributes related to the disclosed data and/or to an adversary that is expected to perform modeling based on the disclosed data. Optionally, the value corresponding to the risk is generated utilizing the risk function module 849. The risk function module 849 may be considered a predictor, since it computes a value (indicative of the risk to privacy) based on an input comprising feature values that representing attributes related to the disclosed data and/or the adversary.

In embodiments described herein, the risk function module 849 may utilize various models called risk models (e.g., risk model 847, risk model 855, risk model 873, risk model 881, and risk model 890). Each risk model may include various parameters that may be utilized by the risk function module 849 to generate the value representing the risk to privacy. The various models need not correspond to the same set of features (i.e., they may be used to represent functions with different domains). Additionally, even if the different risk models have the same domain, they need not predict the same values for the same input (i.e., they may be used to compute different functions).

In some embodiments, a risk model that is utilized by the risk function module 849 may be generated manually (e.g., by an expert and/or an entity that wants to enforce a custom privacy policy that manages disclosure of user data). In one example, a manual risk model may encode a set of rules for a decision tree that is used to assign risk. A manually generated risk model can be used to set rules that may be used various aspects of the disclosure of data. In one example, manually encoded rules can set a risk level for a user to be proportional to the amount of measurements the user contributes to disclosed scores. For example, any disclosure of a score to which the user contributes a measurement, after contributing five measurements in the same day, may be deemed a high risk. In another example, the risk may be tied to the number of users who contribute measurements to a score. So for example, if less than 10 user contribute to the score, the risk is set to be high, if the number is 10 to 20, the risk is medium, and if the number of users is greater than 20, the risk is low. As these examples demonstrate, manual generation of risk models can lead to generation of various, possibly complex, risk function that may be used to create complex behaviors for modules that control disclosure of data (e.g., the privacy filter module 810 and the measurement filter module 883).

In one embodiment, a risk model that is utilized by the risk function module 849 is generated using a machine learning-based training algorithm. Thus the risk function module 849 may be considered to implement a machine learning-based predictor, such as a neural network, a support vector machine, a random forest, a regression models, and/or a graphical models. Optionally, training the risk model is done by collecting a training set comprising samples and corresponding labels. Each sample corresponds to an instance of a disclosure of one or more scores, and its corresponding label is a value representing the risk to privacy from the disclosure. Those skilled in the art may recognize that various machine learning-based approaches may be utilized for this task. Some examples of include training procedures that may be utilized to train a risk model are described in section 6—Predictors and Emotional State Estimators.

In some embodiments, some risk models may be trained by the risk model learner 845, which may employ one or more of the various machine learning-based training procedures mentioned in this disclosure. Samples are typically generated by a sample generator module (e.g., the sample generator 842, the sample generator 852, the sample generator 878, and the sample generator 888). The sample generator includes a feature generator module that creates feature values based on data obtained from various sources. Different reference numerals are used for the various sample generators and feature generators in order to indicate that different types of models may be generated (involving samples with possibly different feature sets). The sample generator may also utilize label generator 844 to convert a determination of the privacy risk assessment module 808 into a label for a sample. Optionally, the value of the determination may be used as is (e.g., if the value indicating the extent of risk is given in the determination).

Samples used to train a risk model may be represented as vectors of feature values, with each vector corresponding to an instance in which one or more scores were disclosed. A sample may include various types of features values that may describe an instance in which one or more scores are disclosed:

In one embodiment, some of the features may include statistics about the scores, such as how many scores were disclosed, how many users contributed measurements to each score (an average value for the scores and/or numbers of users corresponding to each score), and/or statistics about the values of the scores (e.g., average score) and/or statistics about the values of the measurements (e.g., the variance of the measurements used to compute a score). Optionally, features may correspond to the probability of the scores (e.g., how often a score with such a value is observed). Optionally, features may correspond to the confidence in the scores (e.g., corresponding to p-values and/or the size of confidence intervals).

In another embodiment, some of the features may include statistics about the contribution of measurements by users to the scores, such as the average number of measurements contributed by the users, number of times individual users contributed measurements, and/or the number of different experiences the users had, for which the users contributed measurements. Generally, the more measurements contributed by users, the larger the risk to their privacy.

In yet another embodiment, some of the features may describe characteristics of the users who contributed measurements to the scores and/or characteristics of the experiences corresponding to the scores. In one example, characteristics of the users may include demographic characteristics, information about devices of the users, and/or activities in which the users participate. Optionally, such information may assist in modeling the fact that some users may be more susceptible than others to risks to privacy (e.g., through their activities, properties of the devices they own, and/or by their belonging to a demographic group whose personal data is more valuable). In another example, characteristics of the experiences may include a type of experience, the duration of the experience, and the place the experience took place. Optionally, such information may assist in modeling the fact that for some experiences, it may be easier to detect information regarding participation of users, which may increase the risk to the users. Additionally or alternatively, certain experiences may be more important to adversaries than other experiences, and as such, users who participate in those experiences may be at a higher risk than others.

In still another embodiment, some of the features may include values indicative of a prior state of information about the users, such as the likely extent of information an adversary has about certain users and/or an average user. Optionally, the extent of information may be expressed by values corresponding to bits of information, sizes of confidence intervals, and/or divergence from ground truth values.

In some embodiments, samples may include features that correspond to the effort and/or the cost to an adversary associated with gaining data corresponding to the samples; for example, the effort and/or cost of getting the contribution data C, feature values from entries in F, and/or the scores S. Additionally or alternatively, samples may include features that correspond to the effort and/or cost involved in making inferences based on disclosed scores. Additionally or alternatively, samples may include features that correspond to the utility and/or value of inferences that may be made about users corresponding to the samples. Optionally, having at least some of the aforementioned features included in samples may assist in estimating a risk to privacy. For example, in some cases, the risk to privacy associated with disclosing scores may be reduced if the cost and/or the effort for an adversary involved in obtaining some of the aforementioned data outstrips the utility to the adversary, such as the value of likely inferences the adversary may make about an average user who contributed measurements to the scores S. Conversely, in another example, the risk to privacy associated with disclosing scores may be increased if the cost and/or the effort for an adversary involved in obtaining data that falls short of the expected utility to the adversary from making inferences based on the data.

In some embodiments, a sample that describes an instance in which one or more scores are disclosed may be referred to as (a sample) corresponding to the one or more scores. Additionally or alternatively, the sample may be referred to as corresponding to a user or users who contributed measurements of affective response upon which the one or more scores were computed.

A label corresponding to a sample may correspond to various entities, and describe the risk to the privacy of the entities as a result of disclosure of scores described by the sample. For example, a label may describe the risk to a certain user (e.g., when the sample comprises features corresponding to a certain user), the risk to a group of users (e.g., when the sample comprises features corresponding to the group of users), and/or the risk to a non-specific, general and/or average, user (when the sample comprises features that do not correspond to specific users and/or when the sample comprises features that correspond to multiple users). In another example, the label may describe the maximal risk to a user from among the users who contributed measurements to the scores that were disclosed.

The risk to privacy may be expressed using various types of values. In one example, a label may describe risk as a binary value (e.g., at risk/not at risk) or a categorical value (e.g., no risk/low risk/medium risk/high risk). In another example, risk to privacy may be a scalar on a certain scale, such as a value between 0 to 10 indicating the level of risk with 0 being no risk and 10 being the highest level of risk. In some embodiments, a label is indicative of a level of risk to privacy and has a value corresponding to a statistic derived from a model learned and/or updated according to the disclosed scores to which the risk refers. In one example, a level of risk may indicate the accuracy of parameters in a model learned from the disclosed scores and/or the increase in the accuracy of parameters in a model updated according to the disclosed scores. Optionally, the accuracy may be expressed as a difference from ground truth values (e.g., a value corresponding to a ratio or a divergence from the ground truth). In another example, a level of risk may indicate the predictive power of a predictor whose model was trained on the disclosed scores and/or an increase to the predictive power of a predictor whose model was updated based on the disclosed score. In yet another example, a level of risk may indicate the extent of information in a model learned from the disclosed scores and/or the extent of the information added to a model that is updated according to the disclosed scores.

Labels that correspond to samples may be obtained from various sources in embodiments described herein. Following are some examples of ways in which labels may be generated and/or of sources of labels. The examples below are not mutually exclusive, i.e., labels may be generated through a combination of example approaches described below. Additionally, the examples are not exhaustive; there may be other approaches to generating labels that are used in embodiments, which are not described below.

In one embodiment, a label corresponding to a sample is generated, at least in part, based on a determination made by the privacy risk assessment module 808. Optionally, making the determination may involve one or more of the modules described herein as being utilized by, and/or comprised in, the privacy risk assessment module 808.

In another embodiment, a label corresponding to a sample is generated, at least in part, based on manual annotation and/or an externally generated annotation. For example, an entity may determine for a sample corresponding to disclosure of one or more scores the extent of risk to privacy associated with the disclosure of the one or more scores (e.g., an estimation of a manual annotator). The extent of risk may be expressed using various values, as described above, and be converted to a label corresponding to the sample. Optionally, the entity may be a person (e.g., a user corresponding to the sample and/or a risk auditor who is not a user) or an external entity operating automatically (e.g., a company operating risk auditing utilizing an algorithm).

In yet another embodiment, a label corresponding to a sample is generated, at least in part, according to observation and/or analysis of external events with respect to a user corresponding to the sample. Optionally, an external event may occur in the physical world and/or in a digital domain. Optionally, by monitoring the external event, it may be determined whether it is likely that the privacy of a certain user, and/or a group of users, is at risk and/or to what extent the privacy may be at risk. In one example, an external event may be related to a user receiving a communication from an entity (e.g., an advertisement from a commercial company). Optionally, receiving communications from the entity indicates that the user may have been identified as having a certain trait and/or belong to a certain population. Reaching this conclusion by the entity may indicate that private information about the user is known, at least to a certain extent, which may correspond to a certain level of risk to the privacy of the user. Similarly, identification of a change of behavior of external entities with respect to a user, which involve stopping communications and/or interactions with the user, may also indicate that the entity has learned private information about the user which corresponds to a risk to the privacy of the user.

After obtaining a plurality of samples, at least some with corresponding labels, various machine learning-based approaches may be used to train a risk model. After training, the risk function module 849 may be provided with a sample that might not have a label, and utilizing the risk model, it can generate a value corresponding to the perceived risk to privacy due to the disclosure of the one or more scores that correspond to the sample.

In some embodiments, at least some of the samples used to train the risk model may not have corresponding labels (i.e., unlabeled samples). In these embodiments, various semi-supervised training may be used to train the risk model utilizing both labeled samples and the unlabeled samples. For example, the semi-supervised training may involve bootstrapping, mixture models and Expectation Maximization, and/or co-training.

The reason that some samples may not have a label may stem from limited resources. For example, generating labels for all samples may take too much time, require too much computing power, and/or be too costly (e.g., when a label is obtained from an external service). Additionally or alternatively, generating labels may be done, at least partly, manually, in which case, generating labels for a large number of samples may be infeasible. However, it may be possible to request from an entity that generates labels for samples to generate a label for a certain number of unlabeled samples that are optionally deemed useful or important for the training process. This process is sometimes referred to in the art as "active learning". In some embodiments, active learning is utilized as part of the semi-supervised training a risk model. There may be various criteria for the selection of unlabeled samples to receive a label. Optionally, the criteria involve identifying samples that are likely to provide additional information to what is already provided by the labeled samples.

In one example, a sample for which a label is requested may be a sample that is not similar to other labeled samples. That is, the distance between the sample and other samples for which there is a label exceeds a threshold (where the distance may be computed according to a distance measure that may be applied to pairs of samples such as a dot product to determine the angle between vector representation of the samples (cosine law), hamming distance, and/or Euclidean distance).

In another example, samples are clustered into clusters having similar samples using a clustering algorithm. Optionally, the clustering algorithm may assign both labeled and unlabeled samples to the clusters. In this example, a sample for which a label is requested may be a sample that belongs to a cluster for which the number of labeled samples is small (e.g., the number of labeled samples is below a certain threshold and/or is even zero).

In some embodiments, labels may be requested for samples that are similar to labeled samples on which the risk function module 849 (the predictor) performs poorly. For example, during the training it is determined that a predictor being trained makes errors when predicting risk for certain labeled samples (e.g., by comparing the predicted risk for a sample to the risk value indicated by the label of the sample). In such a case, the training procedure may try to obtain additional labeled samples that are similar to a labeled sample on which the predictor performed poorly. Optionally, an additional labeled sample is obtained by requesting a label for an unlabeled sample that is similar, based on a distance function, to the labeled sample on which the predictor performs poorly. Optionally, an additional labeled sample is obtained by requesting a label for an unlabeled sample that belongs to a same cluster as the labeled sample on which the predictor performs poorly.

The risk from disclosure of one or more scores for experiences, such as the risk assessed by the risk function module 849, when using one of the risk models described in this disclosure, may involve utilizing various functions. Though different risk functions may involve different computations, often the functions produce similar qualitative results for the same inputs. Thus, it is possible to discuss a general characterization of behavior for risk functions in term of a generic risk function R( ) and how it behaves with respect to various characteristics of inputs. In the description below a risk function R( ) represents various possible risk functions. The functions may possibly be trained with various sets of training data and/or using different machine learning approaches. Optionally, the described characterizations of the function R( ) describe various behaviors that may be observed for functions implemented by the risk function module 849.

It is to be noted that herein, the notation R( ) such as R(n), means that R is a function that exhibits a behavior that depends on the value of n (e.g., n may be a number of users). In this example, n may be referred to as a component (a component of the risk). This does not mean or imply that R may not also be a function of other components (e.g., variance of measurements). The notation R(n) is just intended to clarify that in the discussion of the risk function that immediately follows the use of R(n), a described characterization of the function R(n) involves the behavior of R with respect to n. Furthermore, the notation R( ) such as in R(n), does not mean or imply that the component n needs to be an input that is provided to the risk function; rather, that in some way, the input provided to the risk function reflect the component n. For example, the value of n may be implied and/or derived from the input provided to the function. Additionally, in the discussion below, an expression of the form $R(n_1)<R(n_2)$, means that according to the function R described, the risk estimated for the input corresponding to the value of $n_1$ is lower than the risk estimated for the input corresponding to the value of $n_2$.

In one embodiment, the risk to privacy associated with the disclosure of a score for an experience is determined based on a result of function that behaves like R(v); where R(v) is a function that takes into account the variance v, which is the variance of the measurements used to compute the score. Optionally, with other things being equal, disclosure of a score computed based on measurements with a low variance has a higher risk to privacy than disclosure of a score computed based on measurements with a higher variance (see for example the discussion of risk components in the section 16—Independent Inference from Scores). Optionally, the first set of measurements has a variance ($v_1$) that is higher than the variance of second set of measurements ($v_2$). Consequently, if the risk function module 849 implements a function that behaves like the function R(v) described above, with other things being equal, it is expected that $v_1>v_2$ implies that $R(v_1)<R(v_2)$.

It is noted that herein use of the term "with other things being equal" refers to a scenario in which two inputs (e.g., inputs to the risk function), are essentially the same, except for a certain component or components specified in the statement. For example, the above statement "with other things being equal, disclosure of a score . . . with a low variance has a higher risk to privacy than disclosure of a score . . . with a higher variance" means that given two inputs that are essentially the same with respect to other characteristics that may be measured (e.g., number of users who provided measurements), it is expected that the risk evaluated will behave like the function R(v). Optionally, two inputs are considered essentially the same if a distance function operating on the inputs determines that the distance between them is below a certain threshold. Optionally, two inputs are considered essentially the same if the difference between them (e.g., according to a distance function) is smaller than the average distance between pairs of inputs (when considering pairs from a larger set of inputs). Optionally, stating that risk is expected to behave like a function, does not mean that it needs to behave like the function in all of the times, rather that it is expected to behave like the function most of the time. For example, given randomly selected pairs of inputs and/or pairs of inputs observed from real world usage, it is expected that in most of the cases the risk that is evaluated behaves according to the function.

Those skilled in the art will recognize that there are various implementations that may be used in which a risk function behaves like R(v) may be implemented. In one example, the risk function may have a multiplicative component that is proportional to 1/v. In another example, the risk function may be a step function that assigns non-decreasing risk as the value of v decreases.

In one embodiment, the risk to privacy associated with the disclosure of a score for an experience is determined based on a result of a function that behaves like R(p); where R(p) is a function that takes into account the probability p of observing the score. Optionally, with other things being equal, disclosure of a score that has a low probability of being observed brings with it a higher risk to privacy than disclosure of a score that has a higher probability of being observed (see for example the discussion of risk components in section 16—Independent Inference from Scores). Optionally, the first score has a higher probability of being observed ($p_1$) than the probability of being observed that the second score has ($p_2$). Consequently, if the risk function module 849 implements a function that behaves like the function R(p) described above, with other things being equal, it is expected that $p_1>p_2$ implies that $R(p_1)<R(p_2)$. Optionally, determining a probability of observing a score may be done utilizing a probability density function that is based on empirical results, such as a histogram or distribution created from scores that were observed in practice.

Those skilled in the art will recognize that there are various implementations that may be used in which a risk function behaves like R(p) may be implemented. In one example, the risk function may have a multiplicative component that is proportional to p. In another example, the risk function may be a step function that assigns non-increasing risk as the value of p increases.

In another embodiment, the risk to privacy associated with the disclosure of a score for an experience is determined based on a result of a function that behaves like R(n); where R(n) is a function that takes into account n, which is the size of the set of users whose measurements of affective response are used to compute the score. Optionally, with other things being equal, disclosure of a score that is computed based on measurements of a smaller number of users has a higher risk to privacy than disclosure of a score that is computed based on measurements of a smaller number of users (see for example the discussion of risk components in section 16—Independent Inference from Scores).

Optionally, the first set of users, which has $n_1$ users, is larger than the second set of users, which has $n_2$ users. Consequently if the risk function module 849 implements a function that behaves like the function R(n) described above, with other things being equal, it is expected that $n_1>n_2$ implies that $R(n_1)<R(n_2)$.

Those skilled in the art will recognize that there are various implementations that may be used in which a risk function behaves like R(n) may be implemented. In one example, the risk function may have a multiplicative component that is proportional to n. In another example, the risk function may be a step function that assigns non-increasing risk as the value of n increases.

It is to be noted that estimating risk associated with disclosing a single score can be extended to multiple scores. For example, in the discussion above, risk functions utilized by the risk function module 849 may, in some embodiments, be applied to assess risk of multiple scores and exhibit similar behavior to the above described behaviors that refer to a single score. Those skilled in the art may recognize that extending risk assessment to multiple scores may be done in various ways. For example, the risk of multiple scores may be a function of the risk of individual scores (e.g., the sum of the risks and/or the average risk). Similarly, a function for computing the risk of a single score may be provided with a value representing multiple scores (e.g., the sum of the input values of the multiple scores or the average input value for the multiple scores).

The discussion above describes how various components, such as the number of users, the variance of measurements, and the probability of scores, may influence the assessment of the risk associated with disclosing a score or multiple scores. In some embodiments, a function used to assess risk may behave as a function of multiple components.

In one embodiment, the risk to privacy associated with the disclosure of a score for an experience is determined based on a result of a function that behaves like a function R(n,v); where n is a value that represents the size of the set of users whose measurements of affective response are used to compute the score, and v represents the value of the variance of those measurements. Optionally, with other things being equal, a disclosure of a score that is computed based on measurements of a smaller number of users has a higher risk to privacy than a disclosure of a score that is computed based on measurements of a smaller number of users. And similarly, with other things being equal, disclosure of a score computed based on measurements with a low variance has a higher risk to privacy than disclosure of a score computed based on measurements with a higher variance (for a rationale for these assumptions see for example the discussion of risk components in section 16—Independent Inference from Scores).

In this embodiment, the risk function module 849 assesses the risk to privacy from disclosing first, second, and third scores, which are computed based on first, second, and third sets of measurements of affective response, respectively.

The first, second, and third sets comprise measurements of $n_1$, $n_2$, and $n_3$ users, respectively. The values of $n_1$, $n_2$, and $n_3$ are such that $n_1 > n_2 > n_3$. Additionally, the first, second, and third sets of measurements have variances $v_1$, $v_2$, and $v_3$, respectively. The values of $v_1$, $v_2$, and $v_3$ are such that $v_1 < v_2 < v_3$. In this embodiment, to determine the extent of risk to privacy, the risk assessment module utilizes a function that behaves like R(n,v) described above, which assess the risk from disclosing the second score to be lower than the risk of disclosing each of the first or third scores. That is, the function implemented by the risk function module 849 behaves like a function R(n,v), for which $R(n_1,v_1) > R(n_2,v_2)$ and $R(n_3,v_3) > R(n_2,v_2)$. Consequently, in this embodiment, the privacy filter may forward the first and third scores in a manner that is less descriptive than the manner in which it forwards the second score.

21—Additional Considerations

Figure 27:
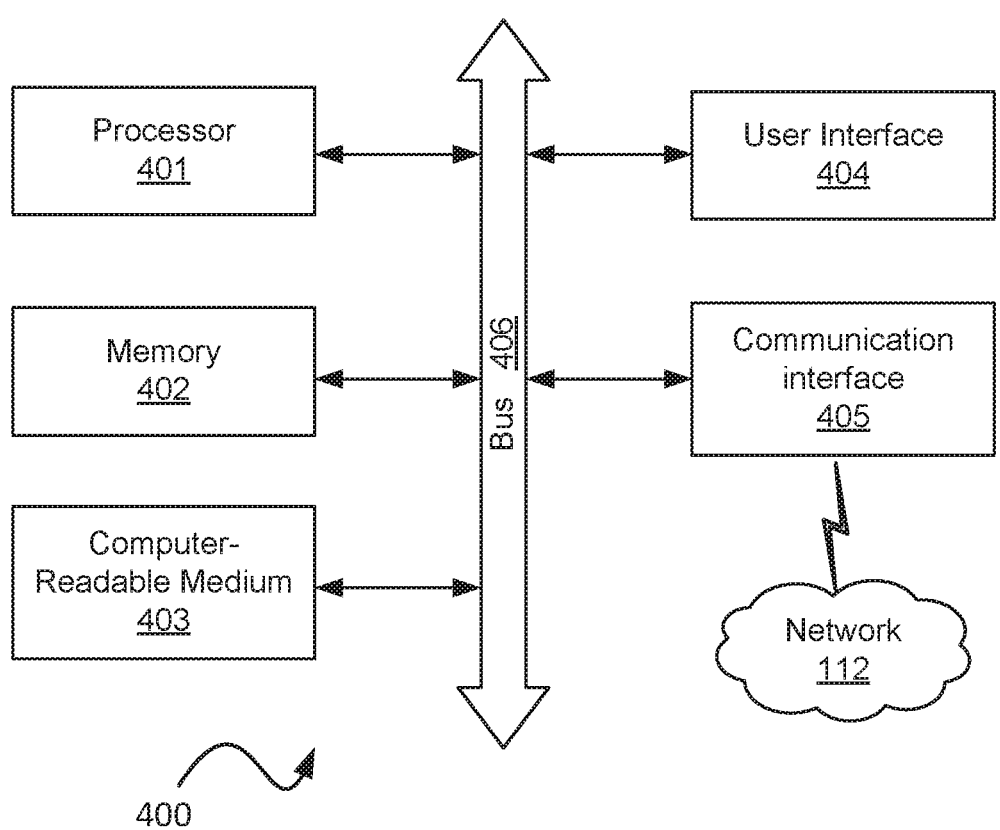
FIG. 27 illustrates a computer system architecture that may be utilized in various embodiments in this disclosure.

FIG. 27 is a schematic illustration of a computer 400 that is able to realize any one or more of the embodiments discussed herein. The computer 400 may be implemented in various ways, such as, but not limited to, a server, a client, a personal computer, a set-top box (STB), a network device, a handheld device (e.g., a smartphone), computing devices embedded in wearable devices (e.g., a smartwatch or a computer embedded in clothing), computing devices implanted in the human body, and/or any other computer form capable of executing a set of computer instructions. Further, references to a computer include any collection of one or more computers that individually or jointly execute one or more sets of computer instructions to perform any one or more of the disclosed embodiments.

The computer 400 includes one or more of the following components: processor 401, memory 402, computer readable medium 403, user interface 404, communication interface 405, and bus 406. In one example, the processor 401 may include one or more of the following components: a general-purpose processing device, a microprocessor, a central processing unit, a complex instruction set computing (CISC) microprocessor, a reduced instruction set computing (RISC) microprocessor, a very long instruction word (VLIW) microprocessor, a special-purpose processing device, an application specific integrated circuit (ASIC), a field programmable gate array (FPGA), a digital signal processor (DSP), a distributed processing entity, and/or a network processor. Continuing the example, the memory 402 may include one or more of the following memory components: CPU cache, main memory, read-only memory (ROM), dynamic random access memory (DRAM) such as synchronous DRAM (SDRAM), flash memory, static random access memory (SRAM), and/or a data storage device. The processor 401 and the one or more memory components may communicate with each other via a bus, such as bus 406.

Still continuing the example, the communication interface 405 may include one or more components for connecting to one or more of the following: LAN, Ethernet, intranet, the Internet, a fiber communication network, a wired communication network, and/or a wireless communication network. Optionally, the communication interface 405 is used to connect with the network 112. Additionally or alternatively, the communication interface 405 may be used to connect to other networks and/or other communication interfaces. Still continuing the example, the user interface 404 may include one or more of the following components: (i) an image generation device, such as a video display, an augmented reality system, a virtual reality system, and/or a mixed reality system, (ii) an audio generation device, such as one or more speakers, (iii) an input device, such as a keyboard, a mouse, a gesture based input device that may be active or passive, and/or a brain-computer interface.

Functionality of various embodiments may be implemented in hardware, software, firmware, or any combination thereof. If implemented at least in part in software, implementing the functionality may involve a computer program that includes one or more instructions or code stored or transmitted on a computer-readable medium and executed by one or more processors. Computer-readable media may include computer-readable storage media, which corresponds to a tangible medium such as data storage media, or communication media including any medium that facilitates transfer of a computer program from one place to another. Computer-readable medium may be any media that can be accessed by one or more computers to retrieve instructions, code and/or data structures for implementation of the described embodiments. A computer program product may include a computer-readable medium.

In one example, the computer-readable medium 403 may include one or more of the following: RAM, ROM, EEPROM, optical storage, magnetic storage, biologic storage, flash memory, or any other medium that can store computer readable data. Additionally, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of a medium. It should be understood, however, that computer-readable medium does not include connections, carrier waves, signals, or other transient media, but are instead directed to non-transient, tangible storage media.

A computer program (also known as a program, software, software application, script, program code, or code) can be written in any form of programming language, including compiled or interpreted languages, declarative or procedural languages. The program can be deployed in any form, including as a standalone program or as a module, component, subroutine, object, or another unit suitable for use in a computing environment. A computer program may correspond to a file in a file system, may be stored in a portion of a file that holds other programs or data, and/or may be stored in one or more files that may be dedicated to the program. A computer program may be deployed to be executed on one or more computers that are located at one or more sites that may be interconnected by a communication network.

Computer-readable medium may include a single medium and/or multiple media (e.g., a centralized or distributed database, and/or associated caches and servers) that store the one or more sets of instructions. In various embodiments, a computer program, and/or portions of a computer program, may be stored on a non-transitory computer-readable medium. The non-transitory computer-readable medium may be implemented, for example, via one or more of a volatile computer memory, a non-volatile memory, a hard drive, a flash drive, a magnetic data storage, an optical data storage, and/or any other type of tangible computer memory to be invented that is not transitory signals per se. The computer program may be updated on the non-transitory computer-readable medium and/or downloaded to the non-transitory computer-readable medium via a communication network such as the Internet. Optionally, the computer program may be downloaded from a central repository such as Apple App Store and/or Google Play. Optionally, the computer program may be downloaded from a repository such as an open source and/or community run repository (e.g., GitHub).

At least some of the methods described in this disclosure, which may also be referred to as "computer-implemented methods", are implemented on a computer, such as the computer 400. When implementing a method from among the at least some of the methods, at least some of the steps belonging to the method are performed by the processor 401 by executing instructions. Additionally, at least some of the instructions for running methods described in this disclosure and/or for implementing systems described in this disclosure may be stored on a non-transitory computer-readable medium.

Some of the embodiments described herein include a number of modules. Modules may also be referred to herein as "components" or "functional units". Additionally, modules and/or components may be referred to as being "computer executed" and/or "computer implemented"; this is indicative of the modules being implemented within the context of a computer system that typically includes a processor and memory. Generally, a module is a component of a system that performs certain operations towards the implementation of a certain functionality. Examples of functionalities include receiving measurements (e.g., by a collection module), computing a score for an experience (e.g., by a scoring module), and various other functionalities described in embodiments in this disclosure. Though the name of many of the modules described herein includes the word "module" in the name (e.g., the scoring module 150), this is not the case with all modules; some names of modules described herein do not include the word "module" in their name (e.g., the profile comparator 133).

The following is a general comment about the use of reference numerals in this disclosure. It is to be noted that in this disclosure, as a general practice, the same reference numeral is used in different embodiments for a module when the module performs the same functionality (e.g., when given essentially the same type/format of data). Thus, as typically used herein, the same reference numeral may be used for a module that processes data even though the data may be collected in different ways and/or represent different things in different embodiments. For example, the reference numeral 150 is used to denote the scoring module in various embodiments described herein. The functionality may be the essentially the same in each of the different embodiments—the scoring module 150 computes a score from measurements of multiple users; however, in each embodiment, the measurements used to compute the score may be different. For example, in one embodiment, the measurements may be of users who had an experience (in general), and in another embodiment, the measurements may be of users who had a more specific experience (e.g., users who were at a hotel, users who had an experience during a certain period of time, or users who at a certain type of food). In all the examples above, the different types of measurements may be provided to the same module (possibly referred to by the same reference numeral) in order to produce a similar type of value (i.e., a score, a ranking, function parameters, a recommendation, etc.).

It is to be further noted that though the use of the convention described above that involves using the same reference numeral for modules is a general practice in this disclosure, it is not necessarily implemented with respect to all embodiments described herein. Modules referred to by a different reference numeral may perform the same (or similar) functionality, and the fact they are referred to in this disclosure by a different reference numeral does not mean that they might not have the same functionality.

Executing modules included in embodiments described in this disclosure typically involves hardware. For example, a module may comprise dedicated circuitry or logic that is permanently configured (e.g., as a special-purpose processor, such as a field programmable gate array (FPGA) or an application-specific integrated circuit (ASIC) to perform certain operations. Additionally or alternatively, a module may comprise programmable logic or circuitry (e.g., as encompassed within a general-purpose processor or another programmable processor) that is temporarily configured by software to perform certain operations. For example, a computer system such as the computer system illustrated in FIG. 27 may be used to implement one or more modules. In some instances, a module may be implemented using both dedicated circuitry and programmable circuitry. For example, a collection module may be implemented using dedicated circuitry that preprocesses signals obtained with a sensor (e.g., circuitry belonging to a device of the user) and in addition the collection module may be implemented with a general purpose processor that organizes and coalesces data received from multiple users.

It will be appreciated that the decision to implement a module in dedicated permanently configured circuitry and/or in temporarily configured circuitry (e.g., configured by software) may be driven by various considerations such as considerations of cost, time, and ease of manufacturing and/or distribution. In any case, the term "module" should be understood to encompass a tangible entity, be that an entity that is physically constructed, permanently configured (e.g., hardwired), or temporarily configured (e.g., programmed) to operate in a certain manner or to perform certain operations described herein. Considering embodiments in which modules are temporarily configured (e.g., programmed), not every module has to be configured or instantiated at every point in time. For example, a general-purpose processor may be configured to run different modules at different times.

In some embodiments, a processor implements a module by executing instructions that implement at least some of the functionality of the module. Optionally, a memory may store the instructions (e.g., as computer code), which are read and processed by the processor, causing the processor to perform at least some operations involved in implementing the functionality of the module. Additionally or alternatively, the memory may store data (e.g., measurements of affective response), which is read and processed by the processor in order to implement at least some of the functionality of the module. The memory may include one or more hardware elements that can store information that is accessible to a processor. In some cases, at least some of the memory may be considered part of the processor or on the same chip as the processor, while in other cases, the memory may be considered a separate physical element than the processor. Referring to FIG. 27 for example, one or more processors 401, may execute instructions stored in memory 402 (that may include one or more memory devices), which perform operations involved in implementing the functionality of a certain module.

The one or more processors may also operate to support performance of the relevant operations in a "cloud computing" environment or as a "software as a service" (SaaS). For example, at least some of the operations involved in implementing a module, may be performed by a group of computers accessible via a network (e.g., the Internet) and/or via one or more appropriate interfaces (e.g., application program interfaces (APIs)). Optionally, some of the modules may be executed in a distributed manner among multiple processors. The one or more processors may be located in a single geographic location (e.g., within a home environment, an office environment, or a server farm), and/or distributed across a number of geographic locations. Optionally, some modules may involve execution of instructions on devices that belong to the users and/or are adjacent to the users. For example, procedures that involve data preprocessing and/or presentation of results may run, in part or in full, on processors belonging to devices of the users (e.g., smartphones and/or wearable computers). In this example, preprocessed data may further be uploaded to cloud-based servers for additional processing. Additionally, preprocessing and/or presentation of results for a user may be performed by a software agent that operates on behalf of the user.

In some embodiments, modules may provide information to other modules, and/or receive information from other modules. Accordingly, such modules may be regarded as being communicatively coupled. Where multiple of such modules exist contemporaneously, communications may be achieved through signal transmission (e.g., over appropriate circuits and buses). In embodiments in which modules are configured or instantiated at different times, communications between such modules may be achieved, for example, through the storage and retrieval of information in memory structures to which the multiple modules have access. For example, one module may perform an operation and store the output of that operation in a memory device to which it is communicatively coupled. A different module may then, at a later time, access the memory device to retrieve and process the stored output.

It is to be noted that in the claims, when a dependent system claim is formulated according to a structure similar to the following: "further comprising module X configured to do Y", it is to be interpreted as: "the memory is further configured to store module X, the processor is further configured to execute module X, and module X is configured to do Y".

Modules and other system elements (e.g., databases or models) are typically illustrated in figures in this disclosure as geometric shapes (e.g., rectangles) that may be connected via lines. A line between two shapes typically indicates a relationship between the two elements the shapes represent, such as a communication that involves an exchange of information and/or control signals between the two elements. This does not imply that in every embodiment there is such a relationship between the two elements, rather, it serves to illustrate that in some embodiments such a relationship may exist. Similarly, a directional connection (e.g., an arrow) between two shapes may indicate that, in some embodiments, the relationship between the two elements represented by the shapes is directional, according the direction of the arrow (e.g., one element provides the other with information). However, the use of an arrow does not indicate that the exchange of information between the elements cannot be in the reverse direction too.

The illustrations in this disclosure depict some, but not necessarily all, the connections between modules and/or other system element. Thus, for example, a lack of a line connecting between two elements does not necessarily imply that there is no relationship between the two elements, e.g., involving some form of communication between the two. Additionally, the depiction in an illustration of modules as separate entities is done to emphasize different functionalities of the modules. In some embodiments, modules that are illustrated and/or described as separate entities may in fact be implemented via the same software program, and in other embodiments, a module that is illustrates and/or described as being a single element may in fact be implemented via multiple programs and/or involve multiple hardware elements possibly in different locations.

As used herein, any reference to "one embodiment" or "an embodiment" means that a particular element, feature, structure, or characteristic described in connection with the embodiment is included in at least one embodiment. Moreover, separate references to "one embodiment" or "some embodiments" in this description do not necessarily refer to the same embodiment. Additionally, references to "one embodiment" and "another embodiment" may not necessarily refer to different embodiments, but may be terms used, at times, to illustrate different aspects of an embodiment. Similarly, references to "some embodiments" and "other embodiments" may refer, at times, to the same embodiments.

Herein, a predetermined value, such as a threshold, a predetermined rank, or a predetermined level, is a fixed value and/or a value determined any time before performing a calculation that compares a certain value with the predetermined value. Optionally, a first value may be considered a predetermined value when the logic (e.g., circuitry, computer code, and/or algorithm), used to compare a second value to the first value, is known before the computations used to perform the comparison are started.

Some embodiments may be described using the expression "coupled" and/or "connected", along with their derivatives. For example, some embodiments may be described using the term "coupled" to indicate that two or more elements are in direct physical or electrical contact. The term "coupled," however, may also mean that two or more elements are not in direct contact with each other, but yet still cooperate or interact with each other. The embodiments are not limited in this context.

Some embodiments may be described using the verb "indicating", the adjective "indicative", and/or using variations thereof. For example, a value may be described as being "indicative" of something. When a value is indicative of something, this means that the value directly describes the something and/or is likely to be interpreted as meaning that something (e.g., by a person and/or software that processes the value). Verbs of the form "indicating" or "indicate" may have an active and/or passive meaning, depending on the context. For example, when a module indicates something, that meaning may correspond to providing information by directly stating the something and/or providing information that is likely to be interpreted (e.g., by a human or software) to mean the something. In another example, a value may be referred to as indicating something (e.g., a determination indicates that a risk reaches a threshold), in this case, the verb "indicate" has a passive meaning; examination of the value would lead to the conclusion to which it indicates (e.g., analyzing the determination would lead one to the conclusion that the risk reaches the threshold).

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus.

In addition, use of the "a" or "an" is employed to describe one or more elements/components/steps/modules/things of the embodiments herein. This description should be read to include one or at least one, and the singular also includes the plural unless it is obvious that it is meant otherwise. Additionally, the phrase "based on" is intended to mean "based, at least in part, on". For example, stating that a score is computed "based on measurements" means that the computation may use, in addition to the measurements, additional data that are not measurements, such as models, billing statements, and/or demographic information of users.

Though this disclosure in divided into sections having various titles, this partitioning is done just for the purpose of assisting the reader and is not meant to be limiting in any way. In particular, embodiments described in this disclosure may include elements, features, components, steps, and/or modules that may appear in various sections of this disclosure that have different titles. Furthermore, section numbering and/or location in the disclosure of subject matter are not to be interpreted as indicating order and/or importance. For example, a method may include steps described in sections having various numbers. These numbers and/or the relative location of the section in the disclosure are not to be interpreted in any way as indicating an order according to which the steps are to be performed when executing the method.

With respect to computer systems described herein, various possibilities may exist regarding how to describe systems implementing a similar functionality as a collection of modules. For example, what is described as a single module in one embodiment may be described in another embodiment utilizing more than one module. Such a decision on separation of a system into modules and/or on the nature of an interaction between modules may be guided by various considerations. One consideration, which may be relevant to some embodiments, involves how to clearly and logically partition a system into several components, each performing a certain functionality. Thus, for example, hardware and/or software elements that are related to a certain functionality may belong to a single module. Another consideration that may be relevant for some embodiments, involves grouping hardware elements and/or software elements that are utilized in a certain location together. For example, elements that operate at the user end may belong to a single module, while other elements that operate on a server side may belong to a different module. Still another consideration, which may be relevant to some embodiments, involves grouping together hardware and/or software elements that operate together at a certain time and/or stage in the lifecycle of data. For example, elements that operate on measurements of affective response may belong to a first module, elements that operate on a product of the measurements may belong to a second module, while elements that are involved in presenting a result based on the product, may belong to a third module.

It is to be noted that essentially the same embodiments may be described in different ways. In one example, a first description of a computer system may include descriptions of modules used to implement it. A second description of essentially the same computer system may include a description of operations that a processor is configured to execute (which implement the functionality of the modules belonging to the first description). The operations recited in the second description may be viewed, in some cases, as corresponding to steps of a method that performs the functionality of the computer system. In another example, a first description of a computer-readable medium may include a description of computer code, which when executed on a processor performs operations corresponding to certain steps of a method. A second description of essentially the same computer-readable medium may include a description of modules that are to be implemented by a computer system having a processor that executes code stored on the computer-implemented medium. The modules described in the second description may be viewed, in some cases, as producing the same functionality as executing the operations corresponding to the certain steps of the method.

While the methods disclosed herein may be described and shown with reference to particular steps performed in a particular order, it is understood that these steps may be combined, sub-divided, and/or reordered to form an equivalent method without departing from the teachings of the embodiments. Accordingly, unless specifically indicated herein, the order and grouping of the steps is not a limitation of the embodiments. Furthermore, methods and mechanisms of the embodiments will sometimes be described in singular form for clarity. However, some embodiments may include multiple iterations of a method or multiple instantiations of a mechanism unless noted otherwise. For example, when a processor is disclosed in one embodiment, the scope of the embodiment is intended to also cover the use of multiple processors. Certain features of the embodiments, which may have been, for clarity, described in the context of separate embodiments, may also be provided in various combinations in a single embodiment. Conversely, various features of the embodiments, which may have been, for brevity, described in the context of a single embodiment, may also be provided separately or in any suitable sub-combination.

Some embodiments described herein may be practiced with various computer system configurations, such as cloud computing, a client-server model, grid computing, peer-to-peer, hand-held devices, multiprocessor systems, microprocessor-based systems, programmable consumer electronics, minicomputers, and/or mainframe computers. Additionally or alternatively, some of the embodiments may be practiced in a distributed computing environment where tasks are performed by remote processing devices that are linked through a communication network. In a distributed computing environment, program components may be located in both local and remote computing and/or storage devices. Additionally or alternatively, some of the embodiments may be practiced in the form of a service, such as infrastructure as a service (IaaS), platform as a service (PaaS), software as a service (SaaS), and/or network as a service (NaaS).

Embodiments described in conjunction with specific examples are presented by way of example, and not limitation. Moreover, it is evident that many alternatives, modifications, and variations will be apparent to those skilled in the art. It is to be understood that other embodiments may be utilized and structural changes may be made without departing from the scope of the appended claims and their equivalents.

What is claimed is:

1. A system configured to disclose scores in a manner that reduces risk to privacy, comprising:
    sensors coupled to users who had experiences and configured to take measurements of affective response of the users; and
    a computer configured to:
    compute scores for the experiences; wherein each score for an experience is computed based on a subset of the measurements comprising measurements of at least five of the users who had the experience;

calculate a risk to privacy based on an extent of improvement in an adversary bias model comprising bias values due to an update of the adversary bias model based on values of the one or more of the scores; wherein the improvement in the adversary bias model corresponds to one or more of the following: a reduction in a distance between the adversary bias model and a ground truth model that includes bias values of a user, and a divergence between the adversary bias model and the updated adversary bias model; and disclose the one or more of the scores responsive to the risk to privacy not reaching a threshold.

2. The system of claim 1, wherein the improvement in the adversary bias model further corresponds to one or more of the following: a reduction in entropy of parameters of the adversary bias model, and a reduction in a size of a confidence interval related to a certain bias value from the adversary bias model.

3. The system of claim 1, wherein the ground truth model is trained on data comprising measurements of affective response of the user and factors of events to which the measurements correspond.

4. The system of claim 1, wherein the risk to privacy is calculated utilizing a function that receives one or more values, each indicative of at least one of the following statistics: a statistic of the measurements contributed for the computation of a score from among the one or more of the scores, a statistic regarding the value of a score from among the one or more of the scores, a statistic regarding extent of disclosure of data regarding at least one user from among the users who contributed measurements for the computation of a score from among the one or more of the scores.

5. The system of claim 4, wherein the statistic of the measurements contributed for the computation of the score is indicative of one or more of the following values: a number of users who contributed measurements for the computation of the score, and a variance of the measurements contributed for the computation of the score.

6. The system of claim 4, wherein the statistic regarding extent of disclosure of data regarding the at least one user is indicative of one or more of the following values: a number of measurements contributed by the at least one user, a frequency at which the at least one user contributes measurements, an entropy of a model of the at least one user, and a volume of data collected about the at least one user.

7. The system of claim 1, wherein the risk to privacy is indicative of an average extent of a risk to privacy of the users who contributed measurements of affective response to the computation of at least some of the one or more of the scores.

8. The system of claim 1, wherein having an experience involves doing at least one of the following: spending time at a certain location, consuming certain digital content, having a social interaction with a certain entity in the physical world, having a social interaction with a certain entity in a virtual world, viewing a certain live performance, performing a certain exercise, traveling a certain route, and consuming a certain product.

9. The system of claim 1, wherein the risk to privacy is indicative of a maximal extent of a risk to privacy of a user, from among users who contributed measurements of affective response to the computation of at least some of the one or more of the scores.

10. The system of claim 1, wherein the computer is further configured to disclose the one or more scores in a first manner responsive to the risk not reaching the threshold, and to disclose the one or more scores in a second manner, which is less descriptive than the first manner, responsive to the risk reaching the threshold; wherein disclosing the one or more of the scores in the second manner involves one or more of the following: providing fewer values associated with the one or more of the scores, providing less information describing users who contributed measurements used to compute the one or more of the scores, and providing fewer bits of information describing the one or more of the scores.

11. A method for disclosing scores in a manner that reduces risk to privacy, comprising:

taking, utilizing sensors coupled to users who had experiences, measurements of affective response of the users;

computing scores for the experiences based on at least some of the measurements; wherein each score for an experience is computed based on a subset of the measurements comprising measurements of at least five of the users who had the experience;

calculating a risk to privacy based on an extent of improvement in an adversary bias model comprising bias values due to an update of the adversary bias model based on values of the one or more of the scores; wherein the improvement in the adversary bias model corresponds to one or more of the following: a reduction in a distance between the adversary bias model and a ground truth model that includes bias values of a user, and a divergence between the adversary bias model and the updated adversary bias model; and disclosing the one or more of the scores responsive to the risk not reaching a threshold.

12. The method of claim 11, wherein the improvement in the adversary bias model further corresponds to one or more of the following: a reduction in entropy of parameters of the adversary bias model, and a reduction in a size of a confidence interval related to a certain bias value from the adversary bias model.

13. The method of claim 11, further comprising utilizing a function to calculate the risk to privacy; wherein the function receives an input comprising one or more values, each indicative of at least one of the following statistics: a statistic of the measurements contributed for the computation of a score from among the one or more of the scores, a statistic regarding the value of a score from among the one or more of the scores, a statistic regarding extent of disclosure of data regarding at least one user from among the users who contributed measurements for the computation of a score from among the one or more of the scores.

14. The method of claim 11, further comprising generating the ground truth model based on data comprising measurements of affective response and factors of events to which the measurements correspond.

15. The method of claim 11, further comprising disclosing the one or more scores in a first manner responsive to the risk not reaching the threshold, and disclosing the one or more scores in a second manner, which is less descriptive than the first manner, responsive to the risk reaching the threshold; wherein disclosing the one or more of the scores in the second manner involves one or more of the following: providing fewer values associated with the one or more of the scores, providing less information describing users who contributed measurements used to compute the one or more of the scores, and providing fewer bits of information describing the one or more of the scores.

16. A non-transitory computer-readable medium having instructions stored thereon that, in response to execution by a system including a processor and memory, causes the system to perform operations comprising:

taking, utilizing sensors coupled to users who had experiences, measurements of affective response of the users;

computing scores for the experiences; wherein each score for an experience is computed based on a subset of the measurements comprising measurements of at least five of the users who had the experience;

calculating a risk to privacy based on an extent of improvement in an adversary bias model comprising bias values due to an update of the adversary bias model based on values of the one or more of the scores; wherein the improvement in the adversary bias model corresponds to one or more of the following: a reduction in a distance between the adversary bias model and a ground truth model that includes bias values of a user, and a divergence between the adversary bias model and the updated adversary bias model; and disclosing the one or more of the scores responsive to the risk not reaching a threshold.

17. The non-transitory computer-readable medium of claim 16, wherein the improvement in the adversary bias model further corresponds to one or more of the following: a reduction in entropy of parameters of the adversary bias model, and a reduction in a size of a confidence interval related to a certain bias value from the adversary bias model.

18. The non-transitory computer-readable medium of claim 16, further comprising instructions defining the step of utilizing a function to calculate the risk to privacy; wherein the function receives an input comprising one or more values, each indicative of at least one of the following statistics: a statistic of the measurements contributed for the computation of a score from among the one or more of the scores, a statistic regarding the value of a score from among the one or more of the scores, a statistic regarding extent of disclosure of data regarding at least one user from among the users who contributed measurements for the computation of a score from among the one or more of the scores.

19. The non-transitory computer-readable medium of claim 16, further comprising instructions defining the step of generating the ground truth model based on data comprising measurements of affective response and factors of events to which the measurements correspond.

20. The non-transitory computer-readable medium of claim 16, further comprising instructions defining the following steps: disclosing the one or more scores in a first manner responsive to the risk not reaching the threshold, and disclosing the one or more scores in a second manner, which is less descriptive than the first manner, responsive to the risk reaching the threshold; wherein disclosing the one or more of the scores in the second manner involves one or more of the following: providing fewer values associated with the one or more of the scores, providing less information describing users who contributed measurements used to compute the one or more of the scores, and providing fewer bits of information describing the one or more of the scores.

* * * * *